US005235379A

United States Patent [19]

Katoh et al.

[11] Patent Number: 5,235,379

[45] Date of Patent: Aug. 10, 1993

[54] CAMERA SYSTEM

[75] Inventors: Takehiro Katoh; Yoshihiko Azuma; Masayasu Hirano; Naohiro Kageyama; Toshihiko Ishimura; Kenji Tsuji; Hiroshi Ootsuka, all of Osaka, Japan

[73] Assignee: Minolta Camera Kabushiki Kaisha, Osaka, Japan

[21] Appl. No.: 353,051

[22] Filed: May 16, 1989

[30] Foreign Application Priority Data

| | | | |
|---|---|---|---|
| May 16, 1988 | [JP] | Japan | 63-120305 |
| May 28, 1988 | [JP] | Japan | 63-131289 |
| May 28, 1988 | [JP] | Japan | 63-131290 |

[51] Int. Cl.[5] ............ G03B 7/08

[52] U.S. Cl. ............ 354/443

[58] Field of Search ............ 354/442, 443

[56] References Cited

U.S. PATENT DOCUMENTS

| | | | |
|---|---|---|---|
| 3,355,004 | 11/1967 | Rupert | 198/572 |
| 3,735,881 | 5/1973 | Wilding | 414/786 |
| 3,780,886 | 12/1973 | Allen | 414/295 |
| 3,811,585 | 5/1974 | Wilding | 414/786 |
| 3,877,585 | 4/1975 | Burgess, Jr. | 414/295 |
| 3,885,683 | 5/1975 | Bornfleth et al. | 414/294 |
| 3,921,853 | 11/1975 | Burgess, Jr. | 222/1 |
| 3,942,626 | 3/1976 | Wilding | 198/826 |
| 3,952,854 | 4/1976 | Selonke et al. | 198/347 |
| 4,138,010 | 2/1979 | Pidgeon et al. | 198/573 |
| 4,212,382 | 7/1980 | Williams | 198/502.2 |
| 4,286,849 | 9/1981 | Uchidoi et al. . | |
| 4,312,579 | 1/1982 | Araki . | |
| 4,328,886 | 5/1982 | Seragnoli | 198/347 |
| 4,329,029 | 5/1982 | Haskell | 354/443 |
| 4,336,873 | 6/1982 | Focke | 198/347 |
| 4,353,676 | 10/1982 | Mikulich et al. | 414/512 |
| 4,358,188 | 11/1982 | Uchidoi et al. | 354/38 |
| 4,413,640 | 11/1983 | Wahle et al. | 130/281 |
| 4,431,360 | 2/1984 | Maeno | 414/294 |
| 4,534,639 | 8/1985 | Konishi et al. | 354/432 |
| 4,574,938 | 3/1986 | Orlandi | 198/347 |
| 4,609,274 | 9/1986 | Iwashita et al. | 354/400 |
| 4,616,916 | 10/1986 | Someya et al. | 354/442 |
| 4,653,893 | 3/1987 | Inoue et al. | 354/443 |
| 4,673,277 | 6/1987 | Someya et al. | 354/474 |
| 4,718,541 | 1/1988 | Wilding | 198/699.1 |
| 4,725,181 | 2/1988 | Mine et al. | 414/268 |
| 4,745,428 | 5/1988 | Miyasaka | 354/443 |
| 4,769,668 | 9/1988 | Ishikawa et al. | 354/443 |
| 4,774,401 | 9/1988 | Yamada et al. | 250/201 |
| 4,779,115 | 10/1988 | Fujino et al. | 354/443 |
| 4,855,779 | 8/1989 | Ishikawa et al. . | |

FOREIGN PATENT DOCUMENTS

| | | |
|---|---|---|
| 59-226327 | 12/1984 | Japan . |
| 63-128321 | 5/1988 | Japan . |

*Primary Examiner*—Russell E. Adams
*Attorney, Agent, or Firm*—Burns, Doane, Swecker & Mathis

[57] ABSTRACT

A camera system comprises a selector, an operable switch, a changing circuit and an inhibiting circuit. The selector selects one of a plurality of exposure lines. The changing circuit change as combination of the aperture value and the shutter speed value determine by both the selected exposure line and a brightness value in response to the operation of the operable switch. The inhibiting circuit inhibits the operation of changing circuit when a predetermined exposure line is selected by the selector. In the camera system, a photographer may only select the exposure mode through the operable switch in accordance with his intention and purpose in photography, and then the change of the exposure combination is inhibited in a certain exposure mode.

4 Claims, 111 Drawing Sheets

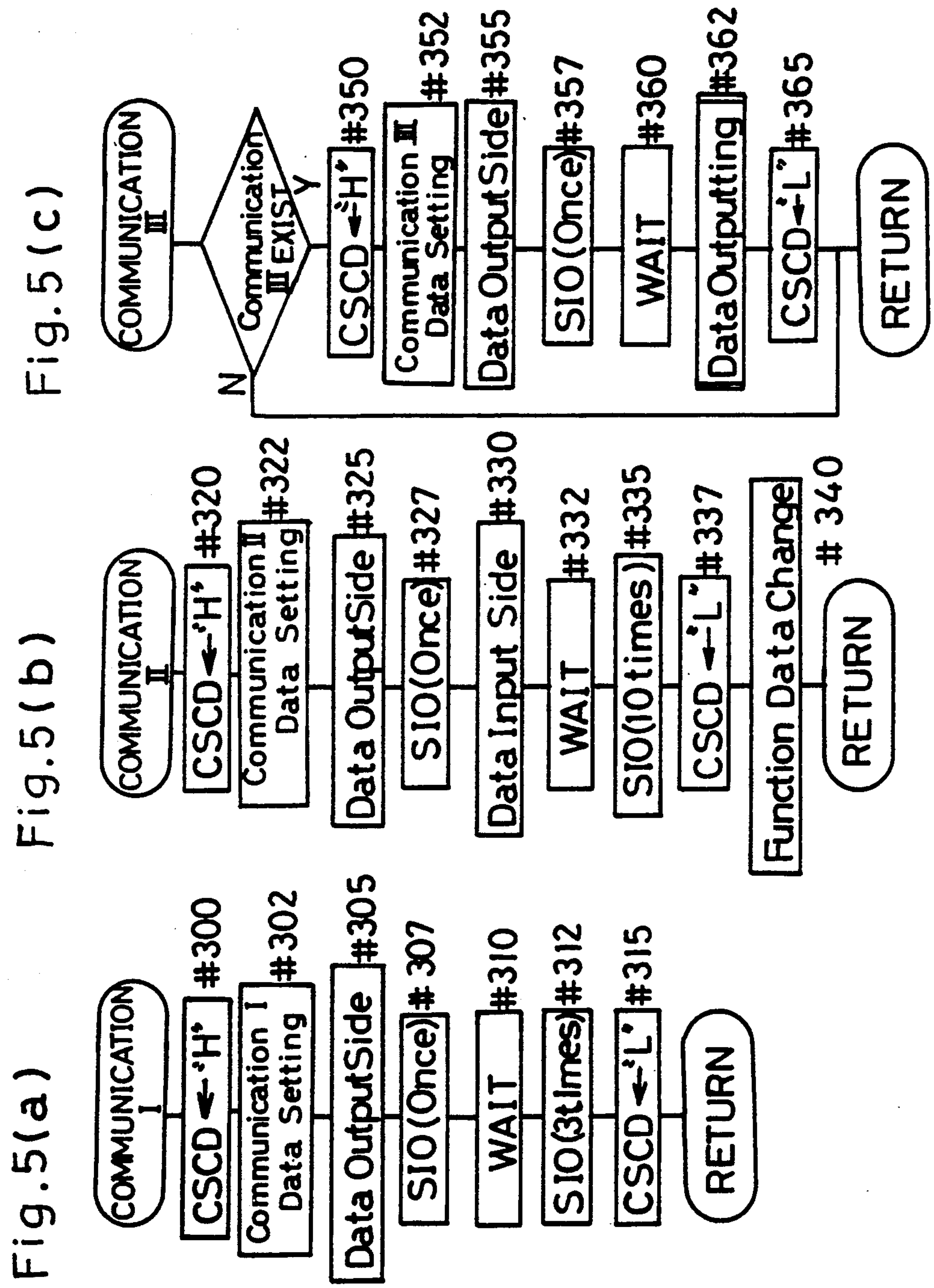
Fig.5(a)
COMMUNICATION I
CSCD←"H" #300
Communication I Data Setting #302
Data Output Side #305
SIO(Once) #307
WAIT #310
SIO(3times) #312
CSCD←"L" #315
RETURN
Fig.5(b)
COMMUNICATION II
CSCD←"H" #320
Communication II Data Setting #322
Data Output Side #325
SIO(Once) #327
Data Input Side #330
WAIT #332
SIO(10times) #335
CSCD←"L" #337
Function Data Change #340
RETURN
Fig.5(c)
COMMUNICATION III
Communication III EXIST
Y
N
CSCD←"H" #350
Communication III Data Setting #352
Data Output Side #355
SIO(Once) #357
WAIT #360
Data Outputting #362
CSCD←"L" #365
RETURN (AE OPERATION OF SPORTS CARD)

FIG. 51(a)A

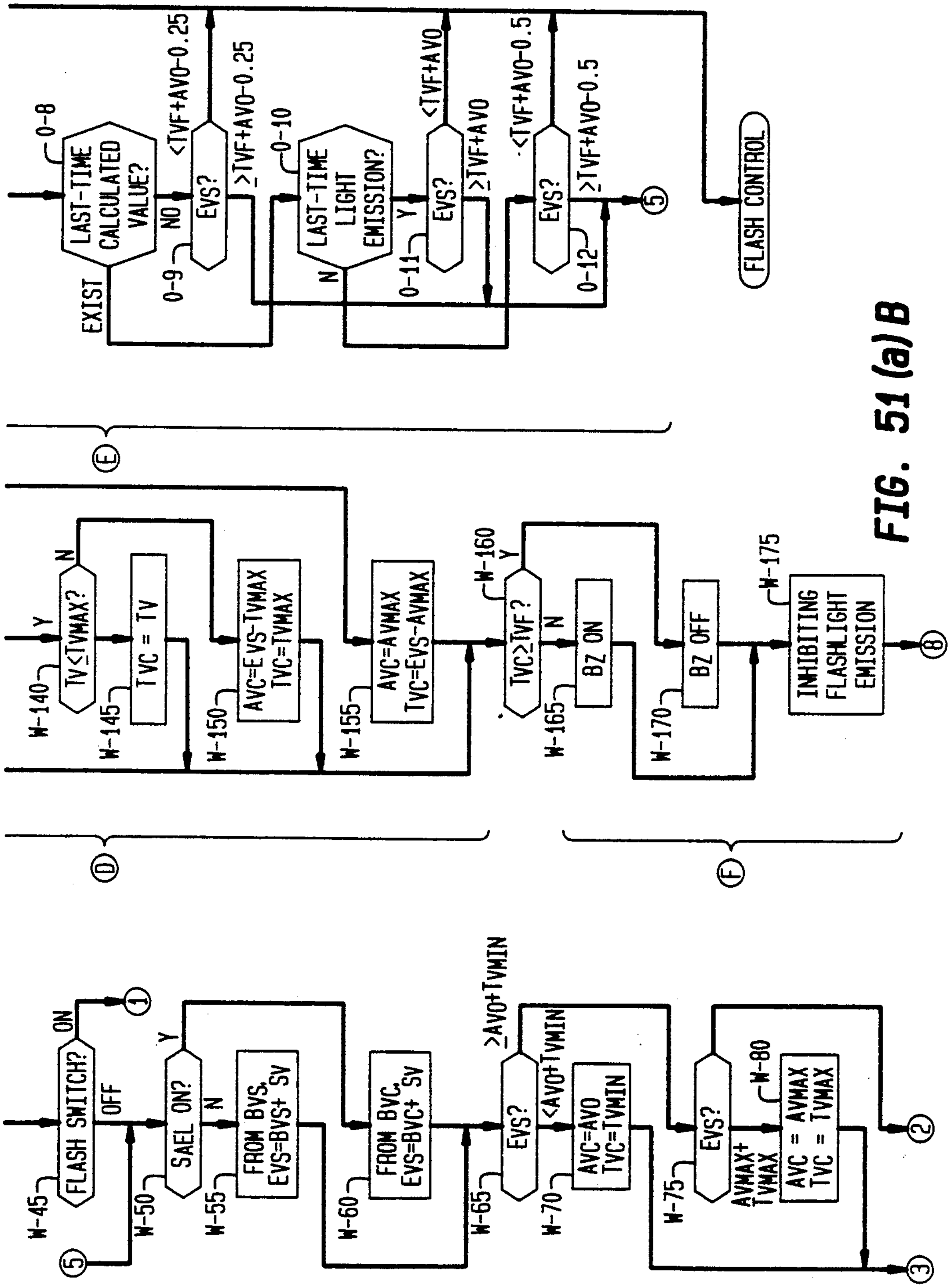
FIG. 51(a)B

[ Calculation of Flashlight Adjusting Level ]

FIG. 66(a) A

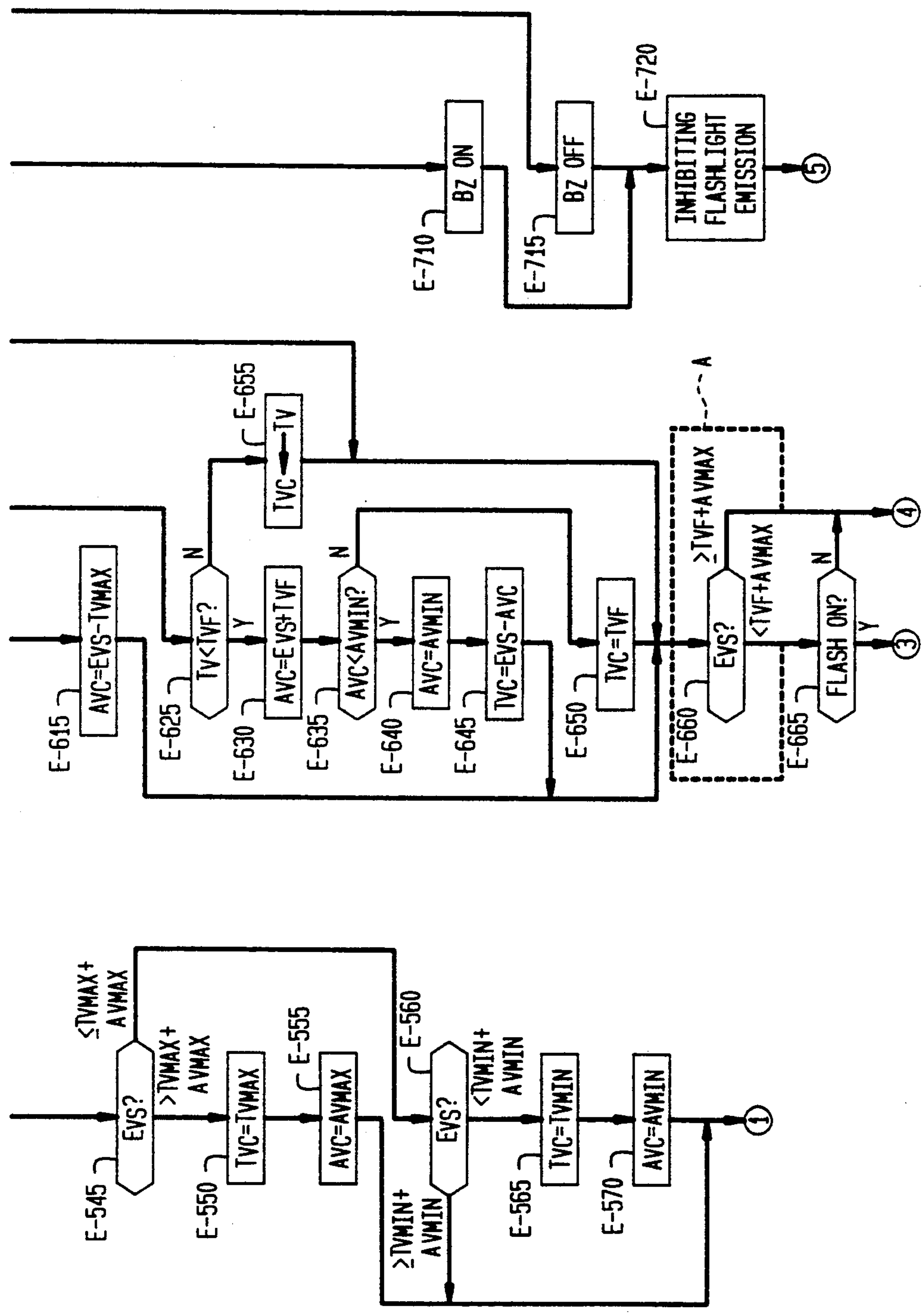
FIG. 66 (a) B (AE OPERATION OF PORTRAIT CARD)

(AE OPERATION OF PORTRAIT CARD)

Program — Diagram of Range of Av,Tv Depending on Image Magnification

Program — Diagram of Range of Av, Tv Not Depending on Image Magnification

CAMERA SYSTEM

BACKGROUND OF THE INVENTION

1. Field of the Invention

The present invention relates to a camera system and more specifically, to a camera system provided with a plurality of selectable exposure lines or exposure modes.

2. Description of the Prior Art

U.S. Pat. Nos. 4,534,639 and 4,673,277 discloses such a camera system in which a plurality of AE modes are provided so as to correspond to various purposes in photography, and in which photometric mode is changed in response to a selected AE mode and judgment is made on whether or not the selection thereof is proper or not.

On the other hand, another camera system is disclosed in U.S. Pat. No. 4,358,188 in which a combination of an aperture value and a shutter speed value relative to a certain brightness value can be changed without changing the exposure amount by a predetermined amount. According to this camera system, when the shutter speed value and the aperture value to be changed have reached control limits of the camera respectively, further change is inhibited.

However, there are some cases where the combination of the aperture value and the shutter speed value determined in a certain AE mode should not be changed in order to achieve a certain purpose or to obtain a certain effect in photography. And, because such a change depends on the skill of a photography, it is not desirable to change the combination for an unskilled photographer, for example, a beginner.

SUMMARY OF THE INVENTION

It is an object of the present invention to provide a camera system in which change in combination of an aperture value and a shutter speed value is inhibited when a mode or a exposure line is selected corresponding to a purpose in photography.

Another object of the present invention is to provide a camera system in which the combination of the aperture value and the shutter speed value relative to a brightness value can be not only changed, but also inhibited from being changed as the case may be.

In accordance with one feature of the present invention, the camera system comprises:

a plurality of exposure lines in which each exposure line determines at each brightness value a combination of an aperture value and a shutter speed value and each exposure line is different from each other;

means for selecting one of the exposure lines;

an operable member;

means for changing the combination of the aperture value and the shutter speed value determined by both the selected exposure line and a brightness value, in response to the operation of the operable member; and means for inhibiting the operation of the changing means when a predetermined exposure line is selected by the selecting means.

In accordance with another feature of the present invention, the camera system comprises:

a plurality of modes in which each mode determines at each brightness value a combination of an aperture value and a shutter speed value;

means for selecting one of the modes;

an operable member;

means for changing the combination of the aperture value and the shutter speed value determined by both the selected mode and the brightness value, in response to the operation of the operable member; and means for inhibiting the change operation of the changing means when a predetermined mode is selected by the selecting means.

In accordance with further feature of the present invention, the camera system for photographing in a flash photographing mode in which flash light is used and in a normal photographing mode is which flash light is not used: comprises;

means for determining at each brightness value a combination of an aperture value and a shutter speed value;

an operable member;

means for changing, kin the normal photographing mode, the combination of the aperture value and the shutter speed value determined by both the determining means and the brightness value, in response to the operation of the operable member;

means for inhibiting, in the normal photographing mode irrespective of the combination of the aperture value and the shutter speed value, the operation of the changing means; and means for deciding whether or not the operation of the inhibiting means is actuated.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which:

FIG. 6 is a flowchart showing a routine performing photometry, AF, display, exposure control and the like.

DETAILED DESCRIPTION OF THE PREFERRED EMBODIMENT

Hereinafter, description is made on an embodiment constructed in accordance with the present invention in reference to drawings. In the following description, chiefly the whole system of controlling a camera system by means of IC cards is described, wherein features of the present invention are employed.

Figure 1:
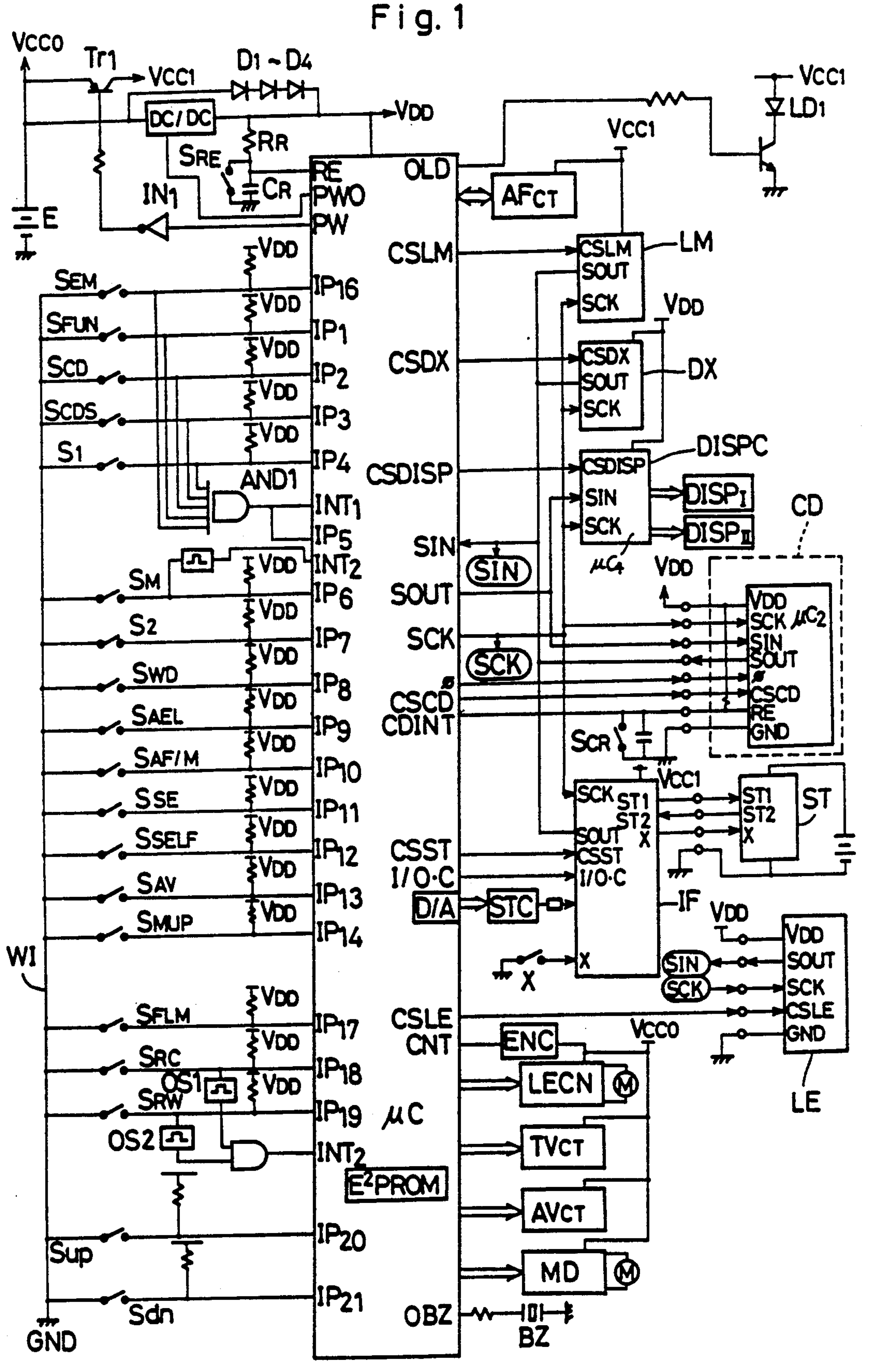
FIG. 1 is a circuit block diagram of a whole camera system in accordance with the present invention.

FIG. 1 is a circuit block diagram of a camera system of this embodiment. In this FIG. 1, a micro-computer $\mu C$, which is provided in a camera body CB shown in FIG. 99, performs control and various calculations of the camera. The micro-computer $\mu C$ comprises an Electrically Erasable Programmable Read Only Memory (so-called EEPROM or $E^2PROM$).

A focus condition detecting circuit $AF_{ct}$ detects the focus condition, which includes a Charge Coupled Device (hereinafter referred to as CCD), an integration control circuit for controlling integration of charge produced in CCD and an analog-to-digital converting circuit. It receives information of subjects from three distance measuring areas as described later, and converts this information from analog value to digital value to output it to the micro-computer $\mu C$. Hereinafter "from analog value to digital value" is referred to as A-C.

An auxiliary light emitting device LD, emits light for assisting the focusing operation in the dark.

A light measuring circuit LM performs measurement of light at four areas as described later, and A-D-converts the measured light values to give them to the micro-computer $\mu C$ as luminance information. A display controlling circuit DISPC receives display data and a display controlling signal from the micro-computer $\mu C$ and causes various displays in a display part DISP, on the upper surface of the camera body and in a display part $DISP_{II}$ in a view-finder to perform predetermined displays.

Figure 99:
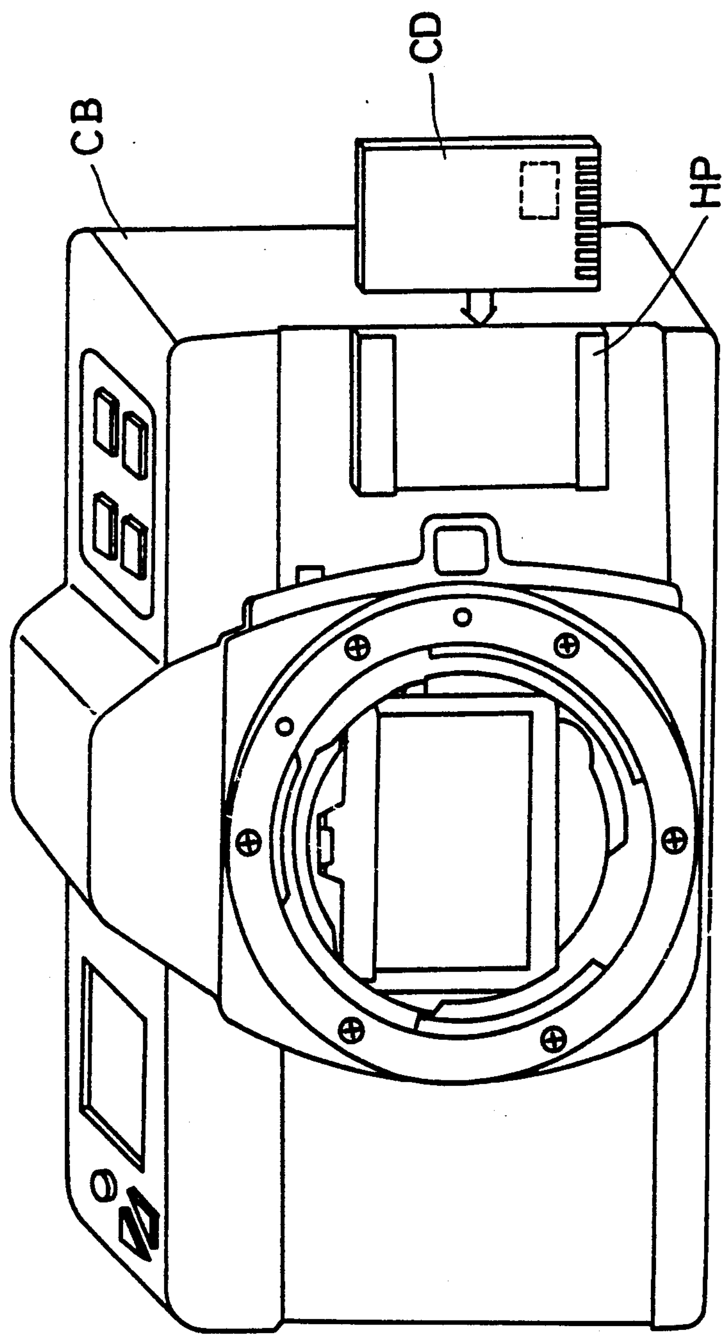
FIG. 99 is a perspective view showing an IC card attaching structure of the camera body.

FIG. 99 shows an arrangement in which an IC card CD is attachable to the camera body CB through a card-holder HP. The IC card is electrically connected to the camera body CB when it is attached to the camera body CB.

In this embodiment, IC cards include ten cards consisting of four kinds: a custom card by which the mode of the camera can be selected or changed, four program cards by which controls (AE mode, automatically focusing mode and so on) of various functions of the camera are automatically determined in response to photographing circumstances, four function cards by which particular functions are added and a memory card by which photographing data is memorized. Hereinafter, automatically focusing is referred to as AF. Detailed description for these cards is made later. An interface IF is installed between the micro-computer μC of the camera body and an electric flash apparatus ST. A flash light adjusting circuit STC receives the flask light reflected by subjects which comes through an interchangeable lens as taking lens, and stops the flashlight emission when the exposure quantity reaches a preset value. A lens circuit LE is installed in an interchangeable lens, which outputs information peculiar to the interchangeable lens to the micro-computer μC of the camera body. A lens drive controlling circuit LECN drives the lens based on information about the detected focus condition. A converter ENC detects the rotation of a motor driving the interchangeable lens, and outputs pulses to the micro-computer μC every time the motor is rotated by a predetermined angle. The micro-computer μC counts these pulses, detects the quantity of move-out (the number CT of move-out pulses) of the lens from the position for ∞, and thereby detects the subject distance.

A shutter controlling circuit $TV_{CT}$ controls a shutter based on a control signal from the micro-computer μC. A diaphragm aperture controlling circuit $AV_{CT}$ controls the diaphragm aperture based on a control signal from the micro-computer μC. A motor controlling circuit MD controls winding and rewinding of a film based on a control signal from the micro-computer μC. A buzzer BZ is provided for raising an alarm when the shutter speed becomes too slow to cause blurring. Symbol E designates a battery for a power supply, and symbol DC/DC designates a DC/DC converter for making a voltage $V_{DD}$ supplied to the micro-computer μC steady. Diodes $D_1$ to $D_4$ supply lower voltage than the voltage $V_{DD}$ to the micro-computer μC to consume less power when the DC/DC converter DC/DC is in the OFF state. The hardware of the micro-computer μC of the camera body can be operated even by this low voltage.

Symbols $R_R$ and $C_R$ designate a resistor and a condenser respectively for resetting the micro-computer μC when the battery i attached. Symbol $Tr_1$ designates a transistor for controlling a power supply to the above-described circuits.

Next, description is made for switches. A battery attachment switch $S_{RE}$ is turned to OFF when battery is attached. In accordance with turn OFF of the switch $S_{RE}$, a signal changing from the "L" level to the "H" level is applied to a terminal RE of the micro-computer μC, and thereby the micro-computer μC is triggered to execute a resetting routine as described later. An exposure mode changing switch $S_{EM}$ is a push-type switch which is normally opened. The exposure mode is changed by operating both this switch $S_{EM}$ and an up switch Sup or both the switch $S_{EM}$ and a down switch Sdn as described later. A function changing switch $S_{FUN}$ is a push-type switch which is normally opened. A change of function (for example, change-over between continuous-AF and one-shot AF) is performed by operating both this switch $S_{FUN}$ and the up switch Sup or the down switch Sdn. The continuous-AF means that the focus condition is kept in an infocus condition, so that the exposure is carried out with infocus condition continuously even after infocus condition i s once obtained. And one-shot AF means that the lens position is kept once an infocus condition is achieved. A card switch $S_{CD}$ is a push-type switch which is normally opened. This switch $S_{CD}$ is operated to change-over enable/disable of the card function when the card is attached to the camera body, or is used at the time of changing data setting in the cards (detailed description is made later). A card data setting switch $S_{CDS}$ is operated at the time of data setting or mode changing when a card is attached to the camera body. A switch $S_1$ is a switch for performing preparatory operations such as photometry and AF operation required for photographing. This switch $S_1$ is turned to ON by depressing a first stroke of an operation button. Out of the above-mentioned switches $S_{EM}$, $S_{FUN}$, $S_{CD}$, $S_{CDS}$ and $S_1$, when one switch is turned to ON, the micro-computer μC executes an interrupt flow $INT_1$ as described later. A main switch $S_M$ is a witch for enabling the operation of the camera, and by means of the turn-on or turn-off of this switch $S_M$, the micro-computer μC executes an interrupt flow $INT_2$ as described later. A mirror up switch $S_{MUP}$ is turned to ON with completion of mirror-up control, and turned to OFF when shutter mechanism is charged and mirror-down control is performed. A shutter release switch $S_Z$ is operated when a photographing operation is performed, and it is turned to ON by depressing a second stroke (deeper than the first stroke) of the above-mentioned operation button. A one-frame switch $S_{WD}$ is turned to ON by winding up one frame of a film. An AE locking switch $S_{AEL}$ for performing AE lock (exposure value lock) is a normally-opened push-type switch. A focus condition adjusting mode changing-over switch $S_{AF/M}$ performs change-over AF and manual focus condition.

A normally-opened change data selecting switch $S_{SE}$ is operated to select data to be changed. A self mode setting switch $S_{SELF}$ is normally-opened push-type switch, and it is operated when a self photographing operation is performed. The self photographing operation starts by setting of the self mode and turn-on of the release switch $S_Z$. A diaphragm aperture value changing switch $S_{AV}$ changes a diaphragm aperture value by operating this switch $S_{AV}$ with the up switch Sup or the down switch Sdn when the exposure mode is a M mode. A film detecting switch $S_{FLM}$ detects whether or not a film has been loaded to a predetermined place in the camera body. This switch $S_{FLM}$ is arranged on the film rail surface in the vicinity of a spool chamber, being turned to OFF when the film is present at this place.

A rear lid close detecting switch $S_{RC}$ is turned to ON when the rear lid is closed and is turned to OFF when opened, and by turning this switch to ON, the micro-computer μC executes an interrupting routine as described later. A rewinding switch $S_{RW}$ for starting rewinding of the film is turned to ON when it is operated, and the interrupting routine as described later is executed, and when the rear lid is opened, it is turned to OFF. An AC card attachment switch $S_{CR}$ is turned to OFF when an AC card CD is attached to the camera body. A micro-computer $\mu C_2$ of the IC card CD is reset when the switch $S_{CR}$ is turned to OFF. A so-called X contact X is turned to ON after completing first-curtain running of the shutter, and is turned to OFF on charging the shutter.

A normally-opened up switch Sup performs change-over to another mode or addition of data to be changed, and a normally-opened down switch Sdn performs change-over or subtraction of the data. When the diaphragm aperture value is changed in the M mode, the up/down function of the diaphragm aperture value is carried out by turn-on of the diaphragm aperture value changing switch $S_{AV}$ and operation of the up switch Sup/the down switch Sdn respectively, and the up/-down function of the shutter speed is carried out by turn-off of the switch $S_{AV}$ and operation of the up switch Sup/the down switch Sdn respectively. An operation of the up switch Sup or the down switch Sdn is detected by the detection that a terminal $IP_{20}$ or a terminal $IP_{21}$ has become the "L" level, respectively. In FIG. 1, a line WI connected in common with the above-mentioned respective switches is connected to a ground potential point GND.

Table 1 shows the above described respective switches and the functions thereof in the lump.

Next, prior to describing the operation of the camera system of the present embodiment, description is provided of the four kinds of IC cards used here.

(I) Custom card

This IC card purposes to provide a camera responding to the photographer's intention by selecting the functions necessary for the photographer (or delecting the unnecessary functions) from among the many functions (controllable functions) possessed by the camera or by taking the alternative of the functions. Also, since the unnecessary functions can be omitted by this feature, the camera has a simplified and good operability for the photographer. Next, description is made for this card with the display performed relating thereto.

First, selections of the functions of this IC card include, (i) selection of the exposure modes, (ii) selection between two functions, (iii) selection due to operation of a switch on the lens side, and the like.

First, the exposure modes relating to the selection of the exposure modes in the above-mentioned item (i) include, (b-1) Program mode (P mode),
(b-2) Diaphragm aperture priority mode (A mode),
(b-3) Manual mode (M mode), and
(b-4) Shutter priority mode (S mode), and the P mode is incorporated without fail as a base mode, and combinations of the remaining three modes (A, M and S modes) can be selected. Accordingly, the re are eight combinations as follows:

| selected No. | content(s) | | | |
|---|---|---|---|---|
| 0 | P | A | M | S |
| 1 | P | | M | S |
| 2 | P | A | | S |
| 3 | P | A | M | |
| 4 | P | A | | |
| 5 | P | | | S |
| 6 | P | | M | |
| 7 | P | | | |

Figure 2:
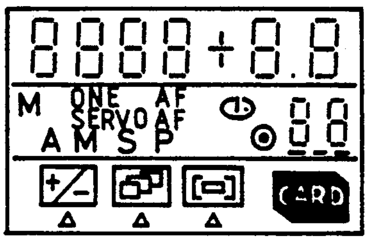
FIGS. 2(*a*) to 2(*f*) are views of displaying forms in a display part of the camera.
Figure 2:
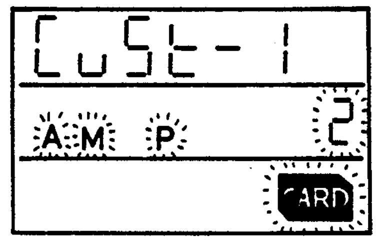
Figure 2:
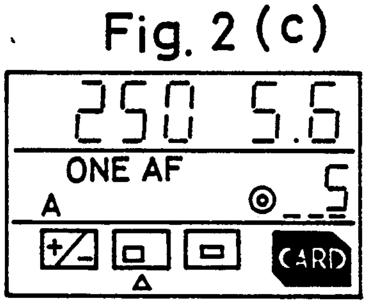
Figure 2:
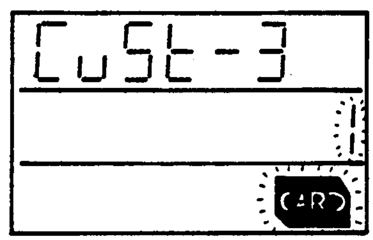
Figure 2:
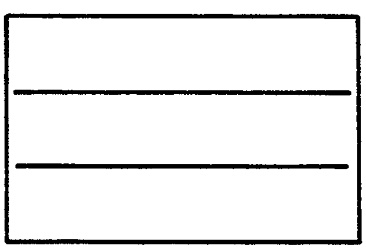
Figure 2:
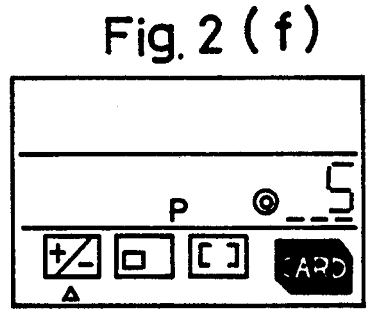

Then, as to the display, among four modes displayed in the middle portion on display part $DISP_I$ shown in FIG. 2(*a*), a display of the selected combination is performed, for example, as shown in FIG. 2(*b*) at mode setting, and a display of one selected exposure mode (FIG. 2(*c*) A mode selection) is performed at photographing. In the figures, dots around characters or numerical values represent blinking displays. Detailed description for the displays is made later.

Next, as to selection between two functions in the above-mentioned item (ii), operation or non-operation of a blurring warning buzzer exists. Among displays as shown in FIG. 2(*d*), Numeral "3" shows the operation or non-operation of a blurring warning buzzer, and Numeral "16" on the film counter position shows operation of the buzzer, while non-operation of the buzzer is shown by numeral "2".

The selection due to operation of the switch on the lens side in the above-mentioned item (iii) is directed to which AF modes should be selected when the switch (described later) installed on the lens side is operated, and the modes include, ① First, when the switch is not operated,
(E-1) One-shot AF by multi-spot measurement for AF ② When the switch is operated,
(E-2) Focus lock
(E-3) Spot AF
(E-4) Continuous AF and Numeral "3" of display "CuSt-3" as shown in FIG. 2(*d*) turns to "2", and further Numeral "1" displayed in a blinking manner turns to "1" to "3" at mode setting. Numerals "1" to "3" displayed blinkingly correspond to the above-mentioned E-2 to E-4 respectively. The selected Numbers and the functions thereof are shown in Table 2.

The above-mentioned modes (i) to (iii) are selected in sequence by turning-on the card switch $S_{CD}$ at the mode setting, and the functions in respective modes is selected by operating the up switch Sup or the down switch Sdn.

The above-mentioned modes (i) to (iii) and the functions thereof are made settable cyclically.

(II) Program card

The program card is a card made for the purpose of photographing suitably for the photographing scene by determining the AF modes (Continuous/One-shot, multi-spot/spot), the shutter speed and the diaphragm aperture of AE mode (exposure line) in response to the condition of the set photographing scene or subjects (detailed description is made later).

(III) Function cards (3-1) H/S card (highlight/shadow card)

This card is for photographing a bright subject as bright and a dark subject as dark with over-adjustment of the exposure value obtained by the camera by a constant value (+2.0) (highlight) and under-adjustment by a constant value (−2.0) (shadow) respectively. And this adjustment is performed by attaching this card (one of H/S selections) and operating the AE locking switch.

(3-2) AE bracket card

This card is for changing an exposure value from the correct exposure value obtained in the camera body to the "over" side or the "under" side by a predetermined step respectively (detailed description is made later).

(3-3) Autoshift card

This card changes combination of the diaphragm aperture value and the shutter speed of the obtained exposure value, and thereby changes the effect of photographing (depth or speed).

(3-4) Defocusing card

This card drives the focusing lens during exposure, and thereby gives an effect of soft focus or an effect of zooming during exposure.

(IV) Data memory card

This card memorizes data of photographing as follows;

Film counter
Control diaphragm aperture value
Control shutter speed
Exposure adjusting value
AE mode
Lens information (focal length and a smallest F-value
Film speed These memorized data can be seen through a liquid crystal display $DISP_I$ on the camera body (detailed description is made later).

Figure 3:
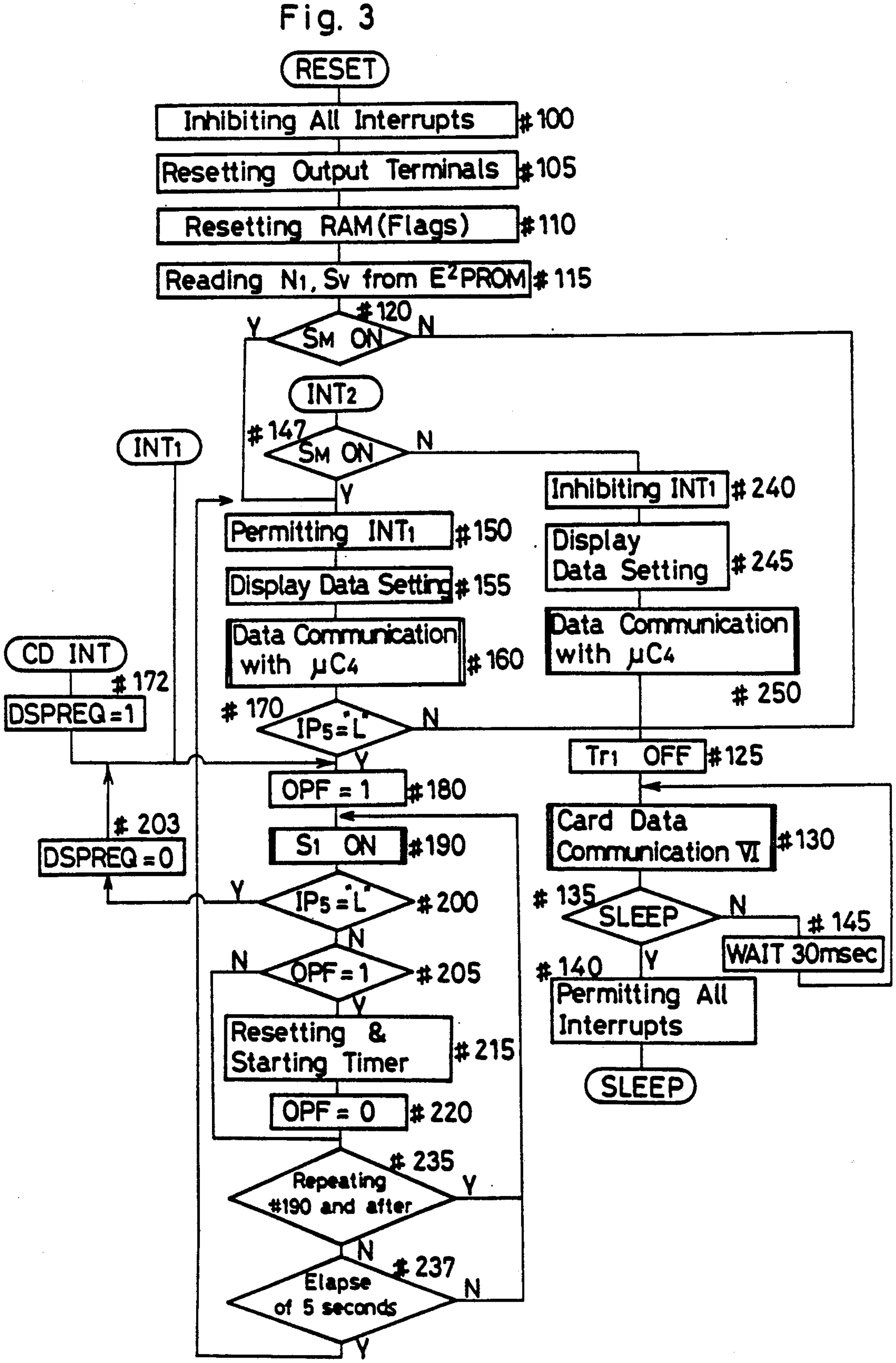
FIG. 3 is a flowchart showing a routine of resetting of the camera.

Next, description is made for operation of the camera based on flowcharts of the micro-computer $\mu C$ as shown in FIG. 3 and the subsequent figures and detailed description is made for each part of the flowcharts as required.

Description for the operation

When a battery E is attached to the camera body, the battery attachment switch $S_{RE}$ is turned to OFF, a signal changing from the "L" level to the "H" level is inputted to a terminal RE of the micro-computer, and the DC/DC converter is turned to ON (terminal PWO="H" level). A clock oscillator, which is provided in the micro-computer $\mu C$, is enabled in response to the entry of the above-mentioned signal, and a clock signal thereof is sent also the IC card CD from the micro-computer $\mu C$ through a terminal $\phi$. When interrupts are executed, turn-on of the DC/DC converter and start of clock oscillation are automatically performed in a circuit. Then, the micro-computer $\mu C$ executes a routine RESET as shown in FIG. 3.

First, the micro-computer $\mu C$ inhibits all interrupts to this flow (#100), and resets all output terminals thereof to the "L" level except the terminal PWO for the DC/DC converter control (#150). Also, it resets all of flags (refer to Table 8, described later) in a random access memory (hereinafter referred to RAM) and RAMs (registers) (#110). Thereby, the exposure mode is set to the P mode, the spot (S)/multi-spot AF (A) is set to the multi-spot AF mode (A), and the one-shot (S)/continuous shot (C) is set to the one-shot mode (S), and the mode not performing exposure adjustment and the other modes are set.

In the subsequent step #115, the micro-computer $\mu C$ reads the contents of the quantity $N_1$ of film frames and a film speed Sv stored in the $E^2PROM$, and transfers them into the predetermined storage portions of the RAM. Thereafter, it is judged whether or not the main switch $S_M$ is in the ON state (6190 120). If the main switch $S_M$ is in the OFF state ($IP_6$="H"), processing proceeds to step #125, and the transistor $Tr_1$ is turned to OFF (PW="L") and thereafter a serial data communication (VI) is performed with a card.

Here, brief description is made for the operation of serial communication. First, a transfer start signal is sent to a target to which data is transferred (in the case of cards, CSCD="H"), and the serial clock signal for transfer of data is outputted from a terminal SCK of the camera body in response to an instruction of serial communication. In synchronism with a rise of this clock signal, the output side outputs data by one bit, and in synchronism with a fall thereof, the input side inputs the data by one bit. By repeating this operation eight times, data transfer at a time is completed. By performing this data transfer as required, the predetermined data is obtained. Data communications with the lens circuit LE, the display controlling circuit DISPC, and the electric flash apparatus are similarly performed.

Here, description is made for the data communication (VI) with the above-mentioned IC card in reference to FIG. 5(*f*). In this communication, first, a terminal CSCD is turned to "H" to request communication (#270). Next, data showing the data communication (VI) is set, and the camera body is set to the output side, and data communication of the data showing the communication (VI) is performed (#272-#277).

On completing this, next, the camera body is set to the input side, and setting of data of the IC card is waited (#280, #282). Data communication is performed (#285), and data is inputted, and thereafter the terminal CSCD is set to "L" to show completion of the communication (#286). From the data thus inputted, judgment is made on whether or not the micro-computer $\mu C$ of the camera body is allowed to sleep (halt), and this is because clock pulses and a voltage $V_{DD}$ required for operation of the IC card are sent from the micro-computer $\mu C$ of the camera body to the IC card CD, and therefore if sending of these clock pulses and voltage is stopped during the operation of the IC card (the generation of clock pulse is stopped and the voltage decreases if the camera sleeps), the micro-computer $\mu C_2$ of the IC card cannot execute the predetermined signal processing (write control to the $E^2PROM$), and therefore this should be prevented beforehand.

Reverting to FIG. 3, in step #135, the above-described judgment, that is, the judgment on whether or not the micro-computer $\mu C$ of the camera body is allowed to sleep is made by the inputted data, and here, when the micro-computer $\mu C$ is allowed to sleep, all interrupts are permitted in step #140 and it sleeps. By this sleep, halt of clock pulses and turn-off of DC-DC converter are performed in a hardware manner. When no sleep can be allowed, processing waits for 30 msec in step #145, and thereafter returns to step #130, and repeats similar processing.

Next, description is made for an interrupt $INT_2$ by means of turning on or off the main switch $S_M$.

First, in step #147, judgment is made on whether or not an interrupt is made by turning on the main switch $S_M$, and when the interrupt is not made by turn-on of the main switch $S_M$ ($IP_6$="H"), the interrupt $INT_1$ is inhibited (#240), display data (at this time, display of putting out all lights) is set (#245), data communication is performed with a micro-computer $\mu C_4$ for display of the display controlling circuit DISPC, and processing proceeds to step #125, performing processing similar to the above-described processing. The micro-computer $\mu C_4$ for display inputs data for putting out all of the lights by the data communication, and thereby all lights are put out (refer to FIG. 2(*e*)). In addition, description for control of the micro-computer $\mu C_4$ for display is made later.

On the other hand, in step #147, when the main switch $S_M$ is turned to ON, only the interrupt $INT_1$ is permitted in step ·0150, and in the next step #155, display data is set (display of standby), and data communication is performed with the micro-computer for display in step #160. By this data communication, the micro-computer for display performs a display as shown in FIG. 2(*f*). In this FIG. 2(*f*), the P mode is selected for the AE mode, and non-adjustment of exposure, one-shot mode, multi-spot distance measurement, card function ON and a quantity of film frames 5 are shown respectively.

Next, in step #170, the micro-computer $\mu C$ of the camera body judges whether or not a terminal $IP_5$ is put at the "L" level (any one of the switches $S_{EM}$, $S_{FUN}$, $S_{CD}$, $S_{CDS}$, and $S_1$ is in ON state), and if the terminal is not put at the "L" level, processing proceeds to step #125, performing control of the sleep as described above. If it is put at the "L" level, processing proceeds to step #180, sets a flag OPF for holding power for five seconds, and executes a subroutine as described later (#190). Next, it is judged again whether or not the terminal $IP_5$ is put at the "L" level (#200). If it is put at the "L" level, a card request signal DSPREQ is set to 0 in step #203, and thereafter processing proceeds to step #180, and repeats steps #180 and #190. If it is not put at the "L" level (that is, if no one of the above-mentioned five switches has been operated), processing proceeds to step #205, and judges whether or not the flag OPF for holding power has been set, and if it has been set, resets and starts a timer for holding power in step #215, and in the following step #220, resets the flag OPF, and proceeds to step #235. When the flag OPF for holding power has not been set, processing also proceeds to step #235, and judges whether or not a request signal of repeating a loop $S_1$ ON has been sent from the IC card CD, and when the signal has been sent, returns to step #190. This is because where data is under setting or the like, when display by the micro-computer for display is controlled based on data from the IC card, if five seconds of power hold of the camera body side expires, the display changes to a display of standby arbitrarily regardless of whether the user wants to see the display, and therefore it should be inhibited that the display changes to a display which is inconvenient for use. Where this request for repeating has not been sent, processing proceeds to step #237 and judges whether or not five seconds have elapsed from the start of the above-mentioned timer.

If five seconds have elapsed, processing proceeds to step #150, and changes from the display of standby to the sleep control, and on the other hand, if five seconds have not elapsed, processing repeats the flow from $S_1$ ON in step #190.

When the IC card CD is attached to the camera body, the signal DSPREQ of requesting display by the card is set in step #172, and thereafter processing proceeds to the flow of step #180 and the subsequent steps.

Figure 4:
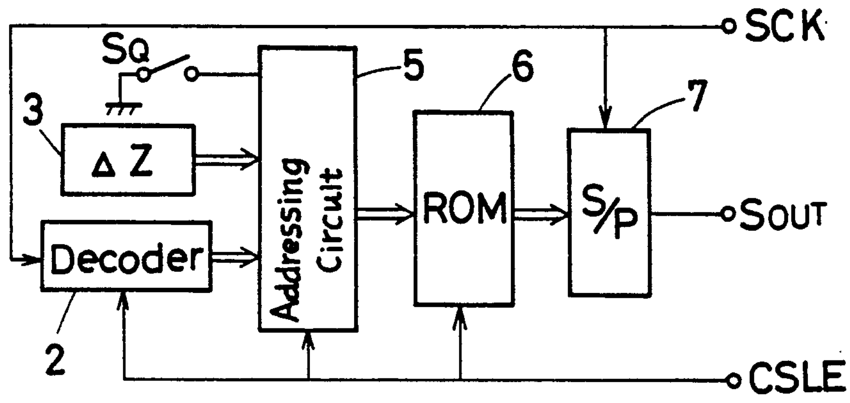
FIG. 4(*a*) is a circuit diagram of a lens circuit, and FIG. 4(*b*) is a side view of interchangeable lens of the camera.
Figure 4:
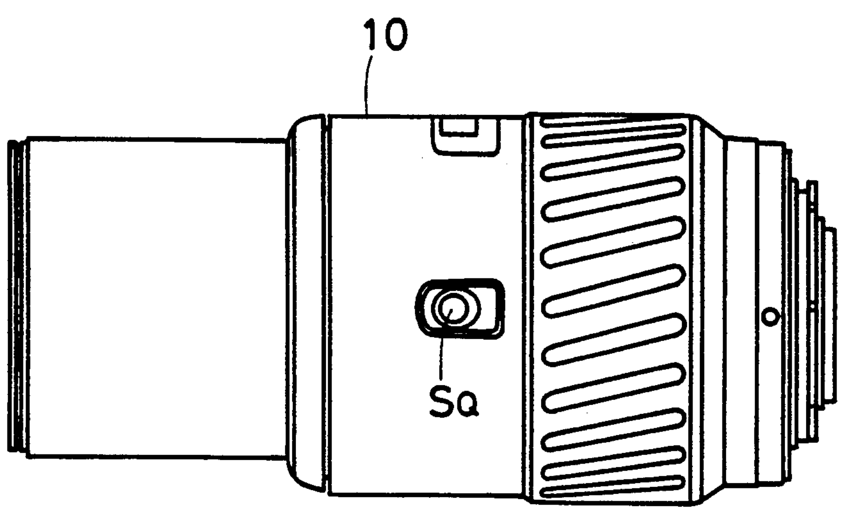
Figure 5F:
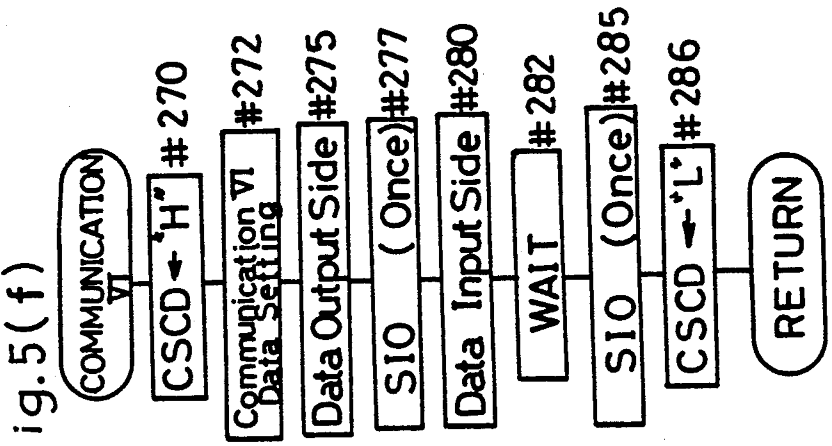
FIGS. 5(*a*) to 5(*h*) are flowcharts showing routines relating to data communications between the camera and IC cards attached thereto.
Figure 5E:
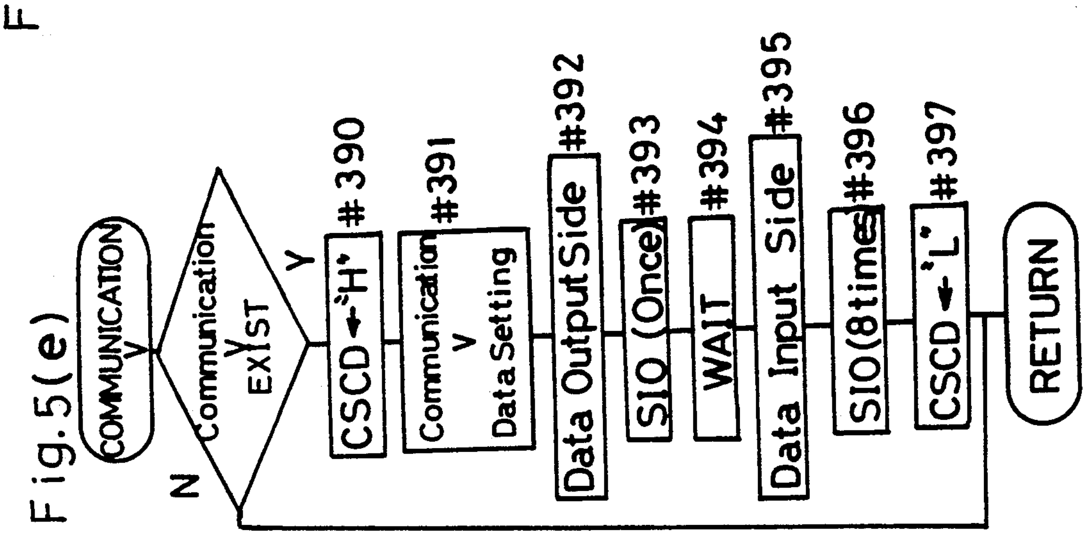
Figure 5D:
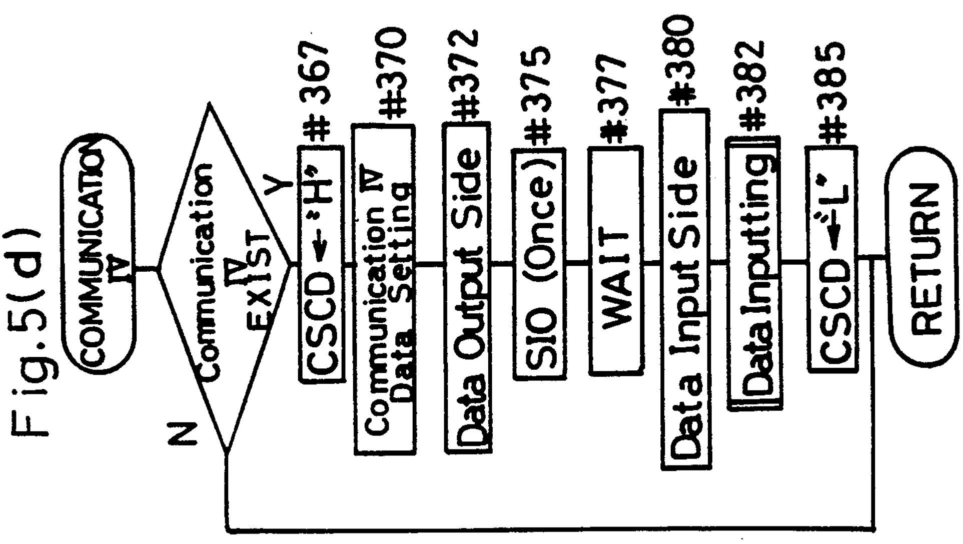
Figure 5G:
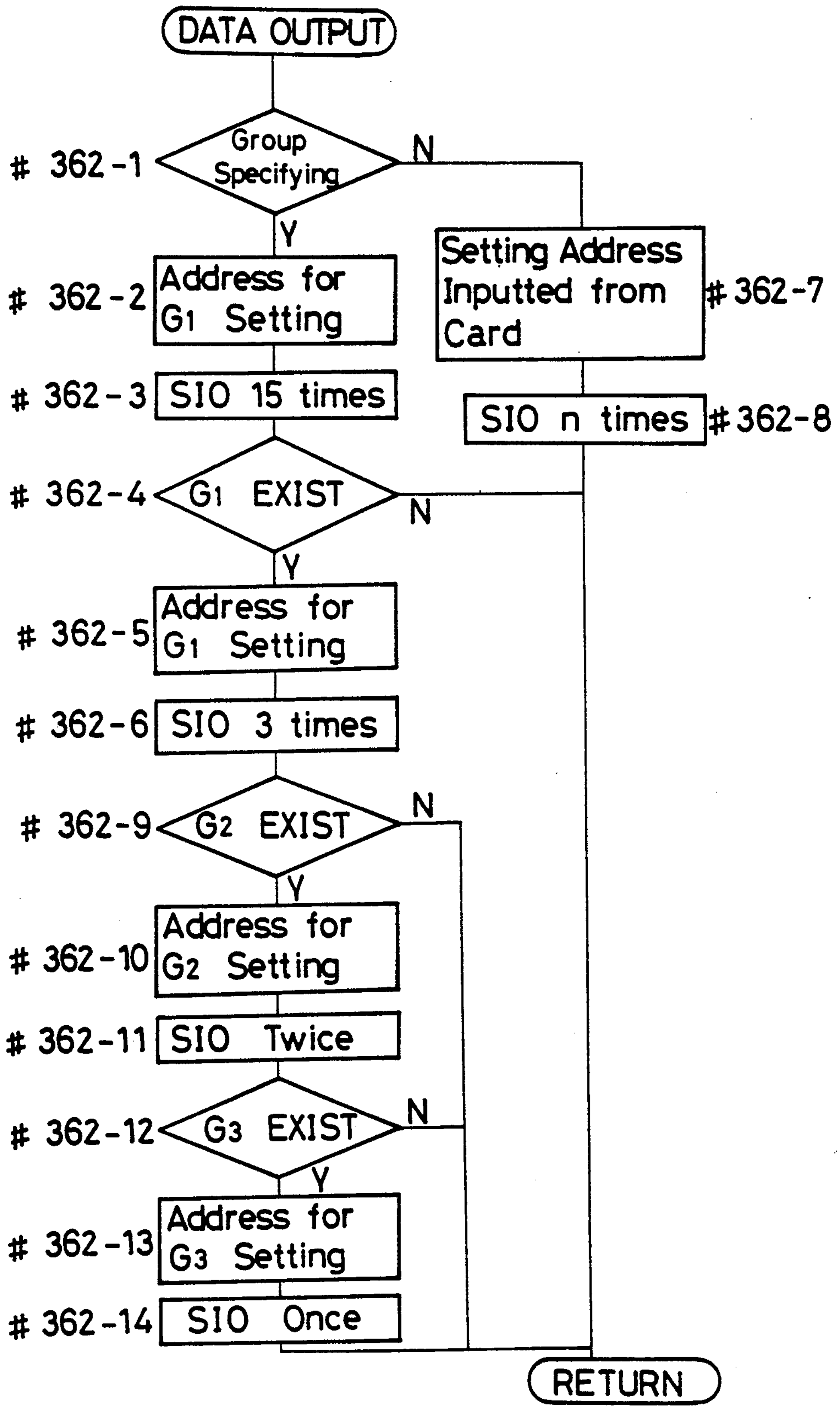
Figure 5H:
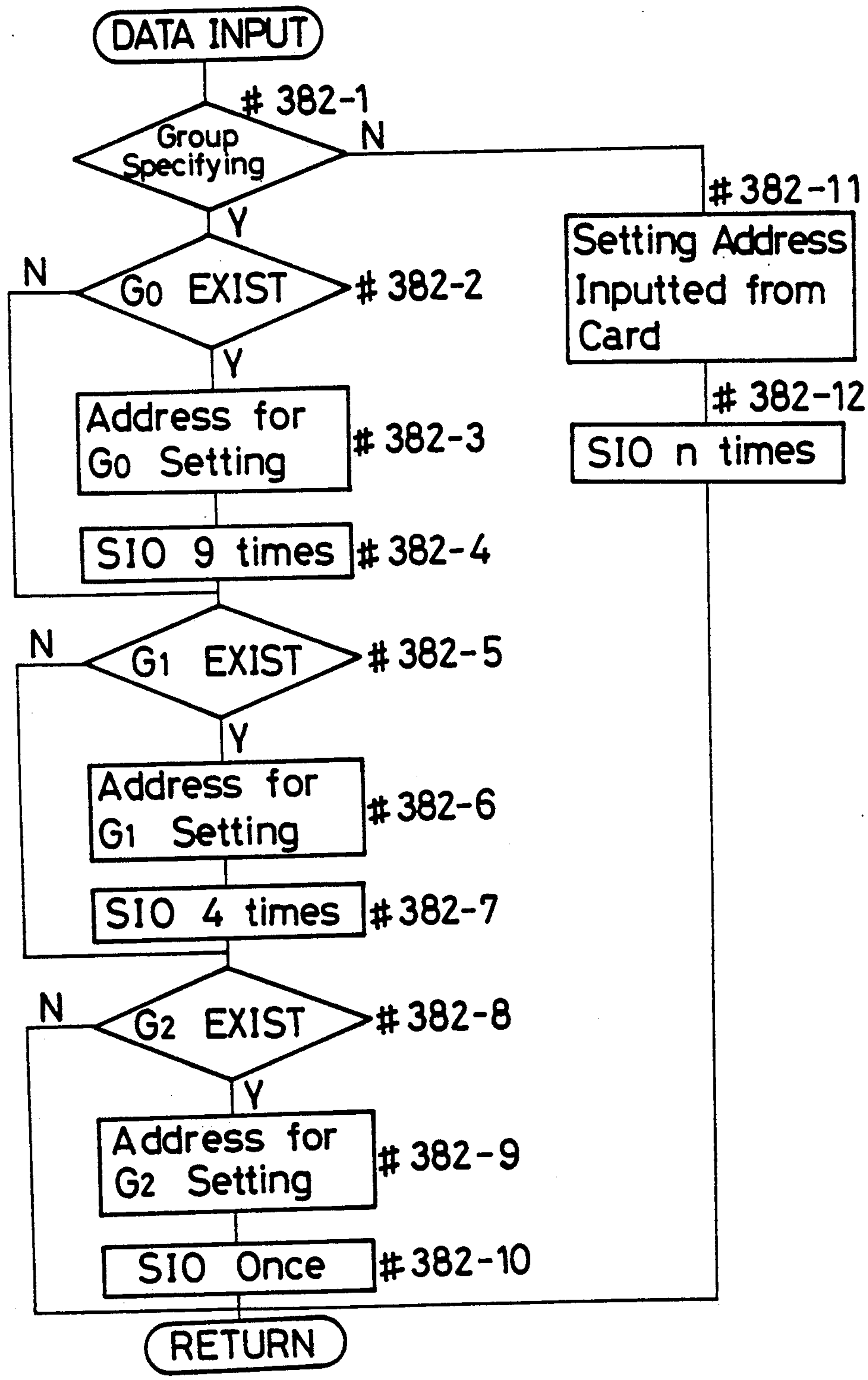
Figure 6:
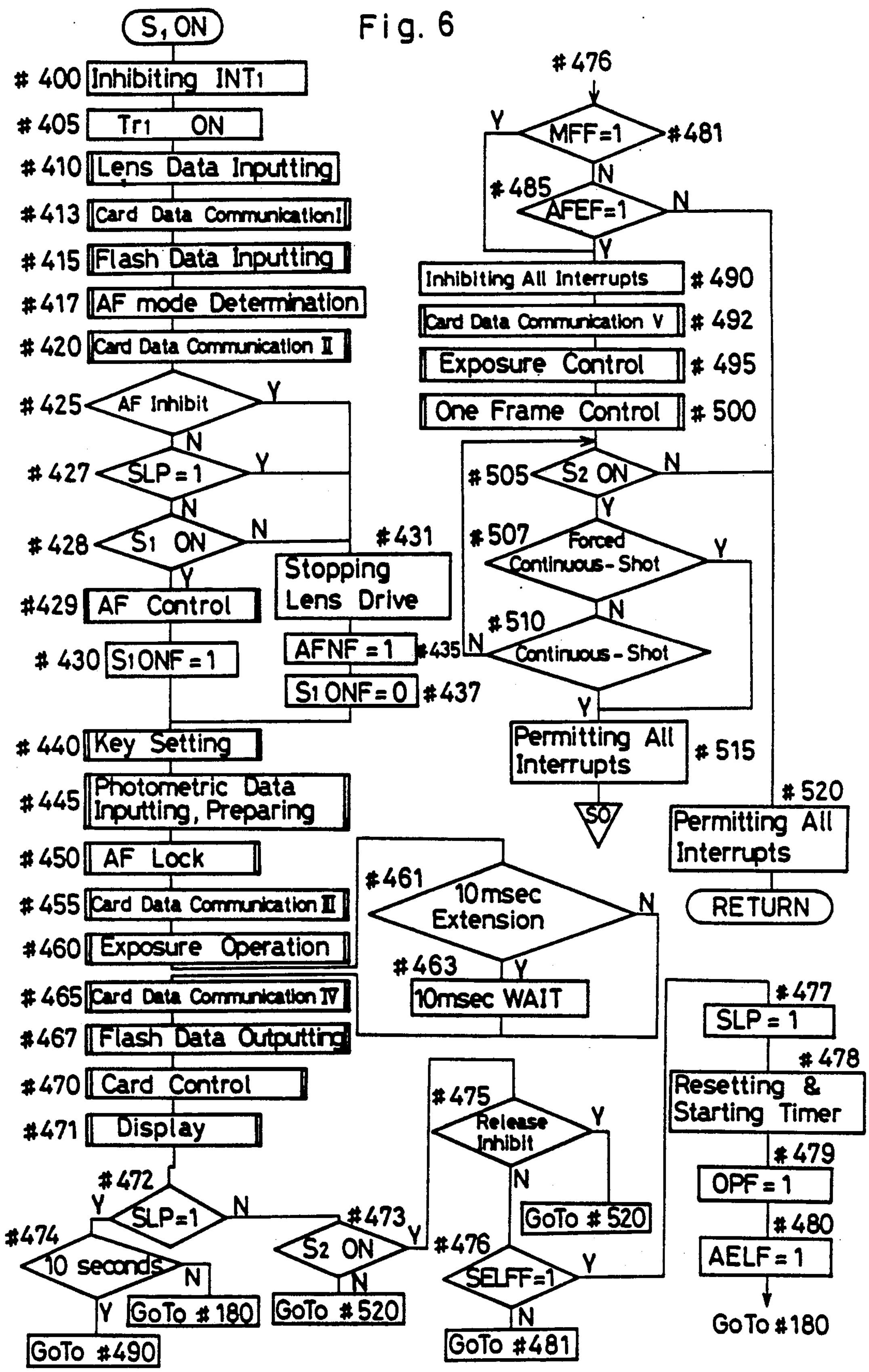
Figure 10:
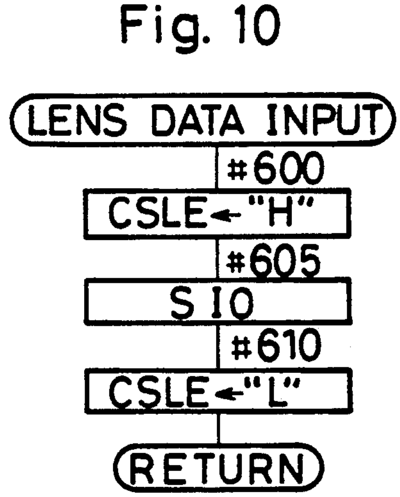
FIG. 10 is a flowchart showing a routing of lens data input.

Next, description is made for a routine $S_1$ ON for controlling photometry, AF and display according to FIG. 6. First, the interrupt $INT_1$ applied to this flow is inhibited (#400). This is because, if the interrupt $INT_1$ as shown in FIG. 3 is applied half way through this control the, controlling operation would not proceed further. Next, in step #405, a terminal PW of the micro-computer $\mu C$ is turned to the "H" level, and by applying the voltage of positive level to the base of the PNP-type transistor $Tr_1$ through an inverter $IN_1$, the transistor $Tr_1$ is turned on, and power is supplied to a photometric circuit LM, an AF circuit $AF_{CT}$ and the like. Subsequently, information peculiar to the interchangeable lens is inputted from a lens circuit LE (#410). This is explained according to FIG. 10. First, a terminal CSLE is turned to the "H" level (#600), and information is inputted from the lens by performing serial communications by a ;required number of times (#605). A circuit in the lens is shown in FIG. 4(*a*) to be explained. Clock pulses inputted for the camera body are counted by a decoder 2 and an address signal is produced. At this time, if a predetermined address is produced, the address identifies lens data changing according to zooming, and therefore the focal length is detected by an encoder 3 detecting the focal length, and the address is changed by an address circuit 5 according to the above-mentioned focal length, and a predetermined data is outputted to the camera body. The switch $S_Q$ is a lens side switch (refer to FIG. 4(*b*)) installed on an interchangeable lens 10, and change of the address is performed to change data also by the switch $S_Q$.

The address thus set is outputted to a ROM 6. The ROM 6 outputs data based on the specified address. This output is converted into a serial signal by a parallel-serial converting circuit 7, being given to the camera body.

Next, description is made for lens information. As shown in Table 11,lens information sent to the camera body includes the signal of lens attachment, the open diaphragm aperture value Avo of the lens, the maximum diaphragm aperture value Avmax of the lens, the maximum quantity of moving-out close to $\infty$ of the lens, information of focal length, the quantity of lens drive/-the quantity of defocus conversion coefficient K, ON/-OFF of the above-mentioned lens-side switch $S_Q$, the signal LOK showing whether or not the lens is allowed to be driven and the like, and these are inputted to an address of RAM in the camera body as shown on the table. When the camera is put in the state that AF cannot be performed, responding to this state, this signal LOK changes from "1" to "0". The camera body inputs this signal and stops the motor.

On the other hand, the lens 10 has a configuration of ROM and address as shown on Table 9. Memory areas (A) and (B) store two similar data differing only in data relating to $S_Q$ and relating to LOK in the same ROM, respectively.

Conventionally, the memory portion of ROM is divided into a plurality of areas, and each portion is assigned to the divided number of lenses, thereby the work to make the ROM is simplified. If new data is required to be added to the portion (for example, in the case where data of $06_H$, $08_H$, $09_H$ on Table 10 are added with respect to the other data), the addresses of all areas of the ROM should be changed, as the portion has no extra memory space.

In the present embodiment, two memory portions are selectable to use for one lens; one memory portion (A) is the same as conventional memory portion and the other portion (B) includes different data from those of portion (B). Thereby it is not necessary to change the address, through the number of lenses which are assigned the memory portion is decreased. If each memory portion has extra space for adding data, it is also possible to add new data into an assigned memory portion as data of $08_H$ and $09_H$ on Table 10 and to select new data as requested. In the ROM as shown on Table 9, when the lens-side switch $S_Q$ is in the OFF state, data of the memory area (A) are sent, and conversely, when in the ON state, data of the memory area (B) ($b_o=0$, AF motor stop) are sent. Among the address data, (xxx) shows address data to be changed depending on the quantity of move-out of the zoom lens or focusing lens, and they are inputted from the encoder 3.

The above-mentioned signal LOK in the lens shows whether or not the lens can be adjusted for focus by the motor installed in the camera body. The camera body inhibits AF operation (lens drive) when the signal LOK is 0, and performs only focus condition detecting operation. For example, with the macro zoom lens attached, when the set mode is the macro mode, data of the memory area (B) are sent to inhibit AF operation, and when the mode is not the macro mode, data of the memory area (A) are sent to permit AF operation.

As to control of the camera body side, judgment is made on whether or not AF inhibit is to be performed when the data of the above-mentioned lens data has been read, and control of presence or absence of AF inhibit has only to be performed, and therefore description thereon in reference to drawings is omitted.

On completing input of the lens information as described above, processing turns the terminal CSLE to the "L" level (#610) and returns.

Reverting to FIG. 6, subsequently, the micro-computer $\mu C$ performs the data communication (I) with the card in step #413. In this data communication (I(), data showing the state of switches, data of the AE mode and control data are sent from the camera body to the IC card.

Table 6 shows this content (refer to the column of the communication (I)). FIG. 5(*a*) shows the data communication (I). The method of communication is nearly the same as that of the data communication (VI) in FIG. 5(*f*), and differs in that data showing the communication (I) is set and outputted, data communication SI0 thereafter is performed three times, and the camera body is the output side also in this communication. In addition, description for use of these data is made later.

Next, the micro-computer $\mu C$ inputs information of the electric flash apparatus ST from the electric flush apparatus ST (#415). The information includes two parts: a guide number GN showing the quantity of light emission and ON/OFF of the switch. Here, description is made for the electric flash apparatus used in this embodiment.

Figure 8:
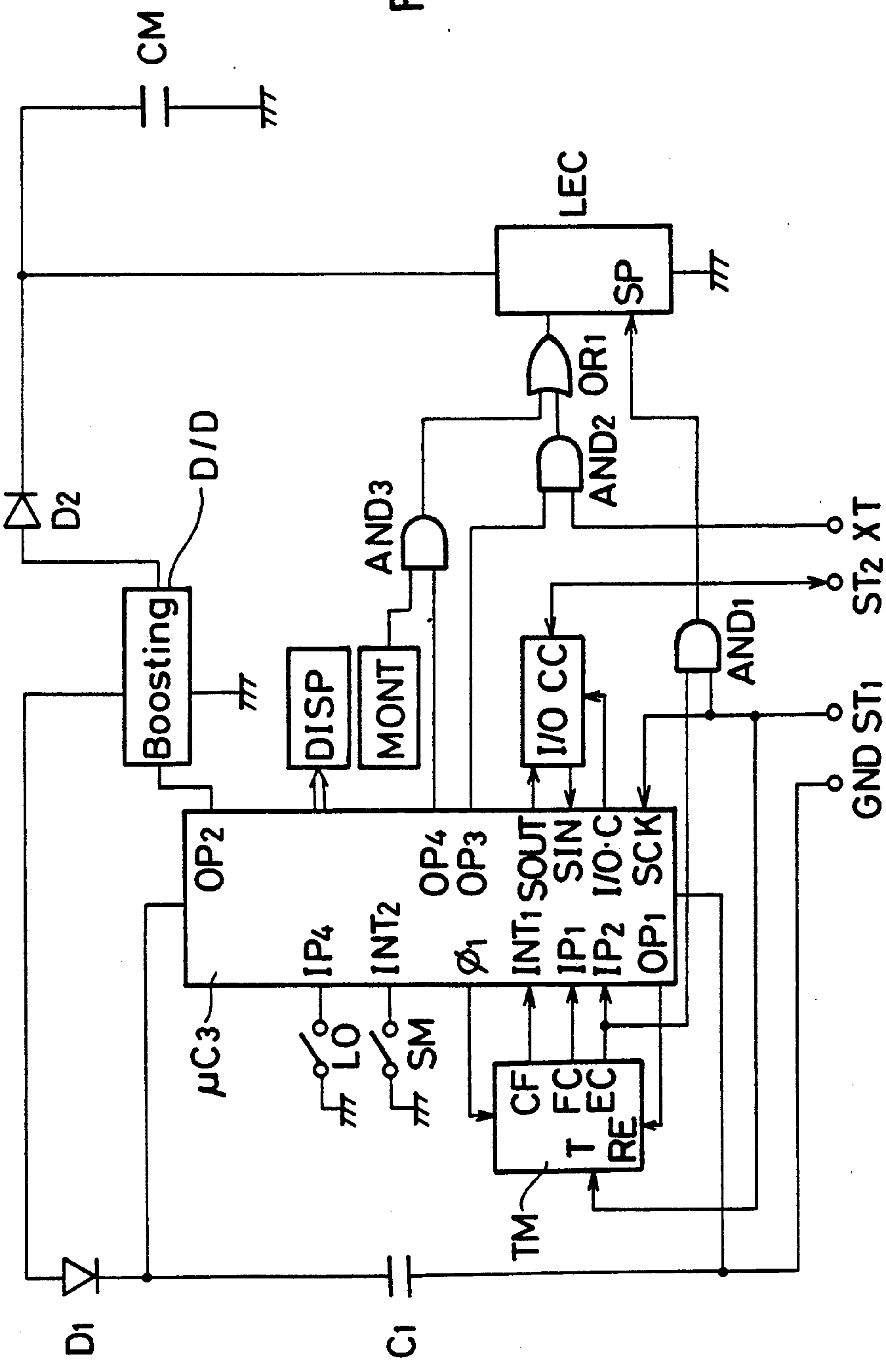
FIG. 8(*a*) is a circuit diagram of an electric flash apparatus, FIG. 8(*b*) is a view for explaining the display thereof, and FIGS. 8(*c*) and 8(*d*) are flowcharts showing routines of interrupts relating to the electric flash apparatus.
Figure 8:
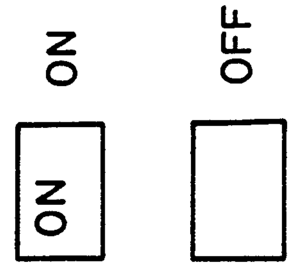
Figure 8:
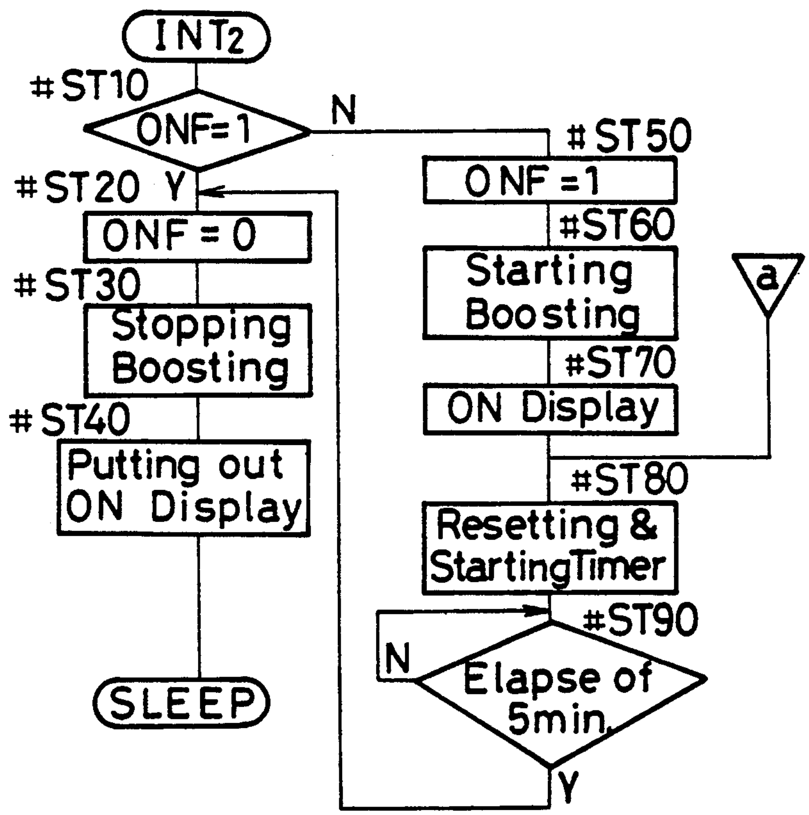
Figure 8D:
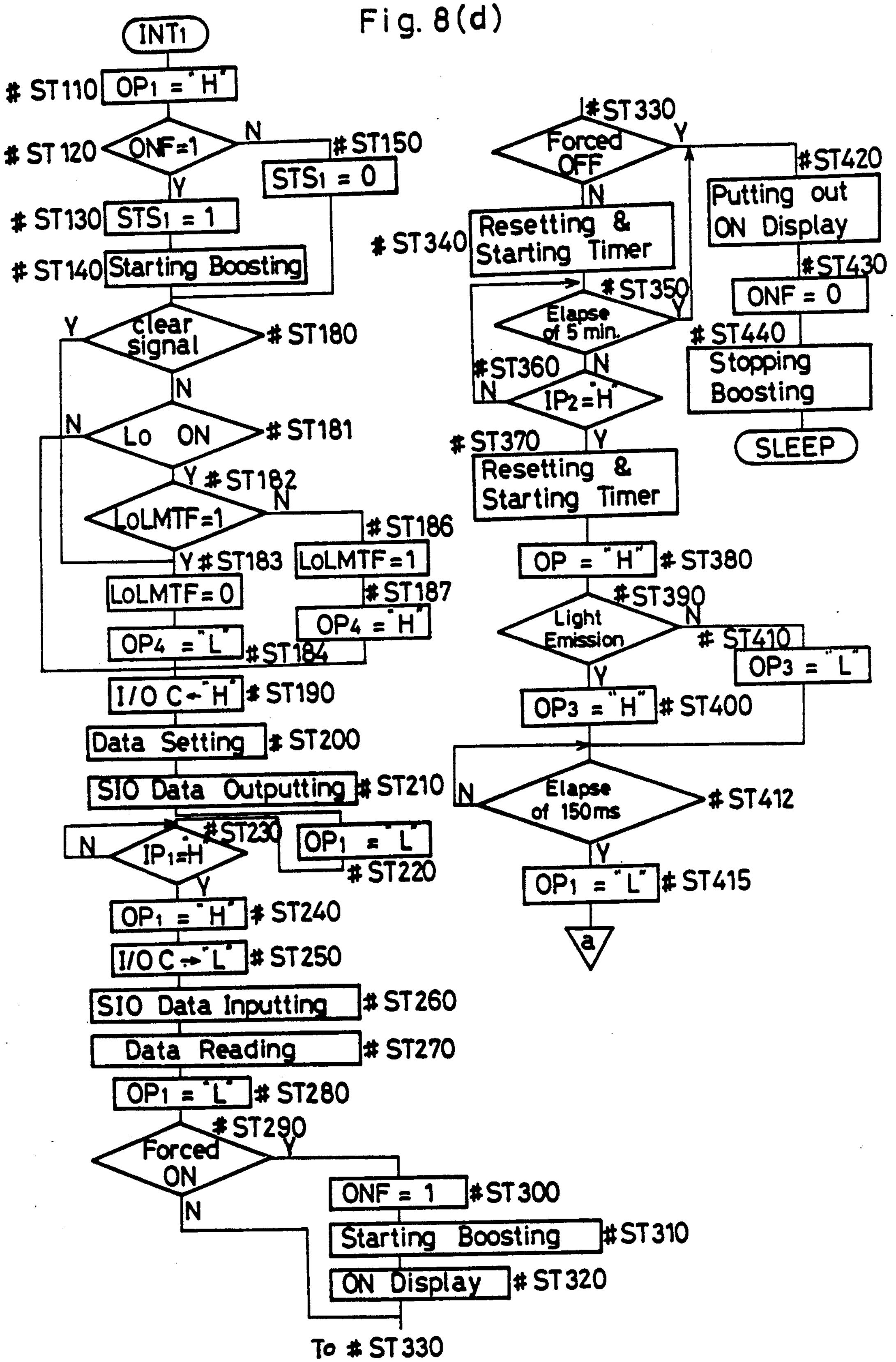

FIG. 8(*a*) shows a circuit block diagram of the electric flash apparatus. Symbol $D_1$ designates a condenser for preventing back charging, symbol $C_1$ designates a back-up condenser having a large capacity, symbol $\mu C_3$ designates a micro-computer performing sequence control, symbol TM designates a detecting circuit which detects the pulse width showing the kind of serial communication from the camera body and outputs a signal showing the kind of communication to the micro-computer $\mu C_3$. Symbol D/D designates a boosting circuit which converts a low voltage into a high voltage, and starts and stops boosting by a signal from the micro-computer $\mu C_3$. Symbol $D_2$ designates a rectifying diode, symbol CM designates a main condenser storing energy from the boosting circuit, symbol LEC designates a light emission controlling circuit for controlling light emission, and symbol DISP designates a displaying circuit, which, as shown in FIG. 8(*h*), displays whether or not power is in the ON state (the state in which boosting and data communication with the camera body can be performed by signals), and displays ON in the ON state, and displays nothing in the OFF state. Symbol I/OCC designates an input-output switching circuit switching-over input and output of communication with the camera body. Symbol SM designates a normally-opened push switch performing switch-over of ON and OFF of power, which is turned to OFF when power is in the ON state, and is turned to ON when power is in the OFF state. Symbol MONT is a circuit monitoring the quantity of light emission itself, which outputs the "H" signal when the quantity of light emission reaches ¼ of full light emission. Symbol $L_0$ designates a normally-opened switch switching-over the quantity of light emission to ¼ and full, and switch-over of ¼←→full light emission is made very time the switch is turned on.

In the circuits shown in FIG. 8(*a*), and AND circuit $AND_1$ is operated only during exposure controlling operation, and accepts a light adjustment end signal. An AND circuit $AND_2$ decides whether or not light emission signal sent from the camera body is permitted. Based on a signal from the camera body, the micro-computer $\mu C_3$ turns the terminal $OP_3$ to the "H" level or the "L" level.

Flowcharts of the micro-computer $\mu C_3$ performing sequence control of this electric flash apparatus are shown in FIG. 8(*c*) to be explained.

When the above-mentioned power switch SM is operated, a signal changing from "H" (the terminal is pulled up inside to "L"is inputted to the micro-computer $\mu C_3$, and an interrupt is applied to the micro-computer $\mu C_3$, and the micro-computer $\mu C_3$ executes a flowchart as shown in FIG. 8(*c*). In this flowchart, first, judgment is made on whether or not a flag ONF showing ON state of power has been set (#ST10). When the flag has been set (ONF=1), the micro-computer $\mu C_3$ turns a terminal $OP_2$ to the "L" level to stop boosting by resetting this flag, erases the display of ON, and sleeps (#ST20–#ST40). When the above-mentioned flag ONF has not been set, the micro-computer $\mu C_3$ sets the flag ONF as an operation from OFF to ON of power, turns the terminal $OP_2$ to the "H" level, and starts boosting (#ST50–#ST60). Then, ON is displayed (#ST70). Next, the timer is reset and started (#ST80), and a lapse of five minutes is waited (#ST90), and after a lapse of five minutes, processing proceeds to step #ST20, performs the same control as the case of power OFF, and sleeps.

Next, the interrupt processing $INT_1$ which is performed when a request for data communication for sending data from the electric flash apparatus to the camera body is given from the camera body is shown in FIG. 8(*d*) to be explained. First, when the "H" signal having a pulse width of $T_1$ is sent from the camera body, the detecting circuit TM detects this time $T_1$, and outputs a signal changing from the "L" level to the "H" level to the terminal of $INT_1$ of the micro-computer $\mu C_3$. The micro-computer $\mu C_3$ inputs this changing signal, and performs processing of the interrupt $INT_1$. In addition, a terminal $\phi_1$ works all the time when the battery is attached, and clock pulses are sent from the micro-computer $\mu C_3$ to the timer detecting circuit TM through this terminal $\phi_1$.

The micro-computer $\mu C_3$, first, turns a terminal $OP_1$ to the "H" level and resets the timer, turns all outputs of the timer to the "L" level, and even if a signal directed to the timer is inputted, no response is made to this signal (#ST110). Then, in step #ST120, judgment is made on whether or not the flag ONF showing power ON has been set, and when it has been set, a bit $STS_1$ for data communication showing the attachment of the electric flash apparatus is set to "1" (#ST130), and the terminal $OP_2$ is turned to the "H" level to start boosting in step #ST140, and processing proceeds to step #ST180. On the other hand, when the flag has not been set, the above-mentioned bit $STS_1$ is reset (#ST150), and processing proceeds to step #ST180. When a guide number limit clear signal has been inputted from the camera body, processing proceeds to step #ST183, and controls clearance of guide number limitation. When the above-mentioned signal has not been inputted, judgment is made on whether or not a guide number limiting switch $L_0$ has been turned on (#ST181), and when it has been turned on (IP−"L"), judgment is made on whether or not a flag $L_0$LMTF showing this limitation has been set (#ST182). When it has been set, this is reset, and a terminal $OP_4$ is turned to the "L" level, and inhibits a light emission stop signal from the monitoring circuit MONT from being inputted to the light emission controlling circuit (#ST183, #ST184).

When the flag $L_0$LMTF has not been set, this is set (#ST186), and the terminal $OP_4$ is turned to the "H" level to permit limitation of the quantity of light emission (#ST187), and data $STS_3$ for communication is set. When the switch $L_0$ has not been turned on, processing proceeds to step #ST190.

In addition, to this step #ST190, processing comes also from step #ST184 and step #ST187.

In step #ST190, a terminal I/OC is turned to the "H" level to inform the input-output switching circuit I/OCC that the electric flash apparatus ST is the output side. A signal of the above-mentioned bit $STS_1$ and a signal showing the guide number responding to the electric flash apparatus ST are set (#ST200), and a clock signal for data communication is waited to be sent from the terminal SCK of the camera body, and when this clock signal is sent, in synchronism with this clock signal, communication outputting data through a terminal Sout and the input-output switching circuit I/OCC is controlled (#ST210). On completing this, the terminal $OP_1$ is turned to the "L" level (#ST220), and the above-mentioned timer is reset, and thereby the width of pulse from the camera body can e detected any time.

When a signal of a pulse width of $T_2$ is inputted from the camera body, the detecting circuit TM turns a terminal FC to the "H" level. The micro-computer $\mu C_3$ inputs this to a terminal $IP_1$, and proceeds from step #ST230 to step #ST240.

In step #ST240, likewise the above-described, the terminal $OP_1$ is turned to the "H" level, and the terminal I/OC showing control of input and output is turned to the "L" level (#ST250), and the electric flash apparatus ST is controlled to be the input side. Then, data of the camera body sent in synchronism with the clock signal from the camera body is inputted to a terminal $S_{IN}$ through the input-output switching circuit I/OCC, and this is read into a predetermined register (RAM) (#ST260, #ST270). Then, the terminal $OP_1$ is turned to the "L" level to make it possible to receive pulses from the camera body (#ST280). Signals of presence/absence of light emission, presence/absence of forced power OFF and presence/absence of forced power ON and a signal of presence/absence of light emission limit clearance are inputted.

In step #ST290, it is judged based on the inputted data whether or not power has been turned forcedly to ON. If not forced to ON, processing proceeds to step #ST330. On the other hand, if force ON is shown, the flag ONF showing power ON is set (#ST300), and the terminal $OP_2$ is turned to the "H" level to start boosting (#ST310), and ON is displayed (#ST320), and processing proceeds to step #ST330.

In step #ST330, it is judged based on data from the camera body whether or not power has been turned forcedly to OFF. If power is turned forcedly to OFF, the micro-computer $\mu C_3$ erases the display of ON, resets the flag ONF showing power OFF, turns the terminal $OP_2$ to the "L" level to step boosting (#ST420–#ST440), and sleeps. On the other hand, when power has not been turned forcedly to FF, processing proceeds to step #ST340, resets and starts the timer and judges whether or not five minutes have elapsed (#ST350). When five minutes have elapsed, processing proceeds to step #ST420, performing the same control as the case of forced OFF. When five minutes have not elapsed, it is judged whether or not exposure control has been started (#ST360), and when exposure control is not started, processing returns to step #ST350, repeating steps #ST350 and #ST360. A signal from the camera body showing that this exposure control has been started is a signal of a pulse width of $T_3$ inputted through a terminal $ST_1$. The detecting circuit TM detects this, and turns a terminal EC to the "H" level. When this signal is inputted, the micro-computer $\mu C_3$ resets and starts the timer (#ST370), and when light emission is shown based on the signal showing presence/absence of light emission sent from the camera body, the micro-computer $\mu C_3$ turns a terminal $OP_3$ to the "H" level, $OP_3$ to the "L" level, and proceeds to step #ST412, respectively. In this step #ST412, a time from a turn-on of the switch $S_2$ to completion of first-curtain running of the shutter (time of light emission of the electric flash apparatus) (approximately 150 msec) is waited, and then the terminal $OP_1$ is turned to the "L" level (#ST415), and thereby even if a pulse for interrupt is inputted from the camera body, processing is made possible, and processing proceeds to step #ST 80 as shown in FIG. 8(*c*).

Figure 9:
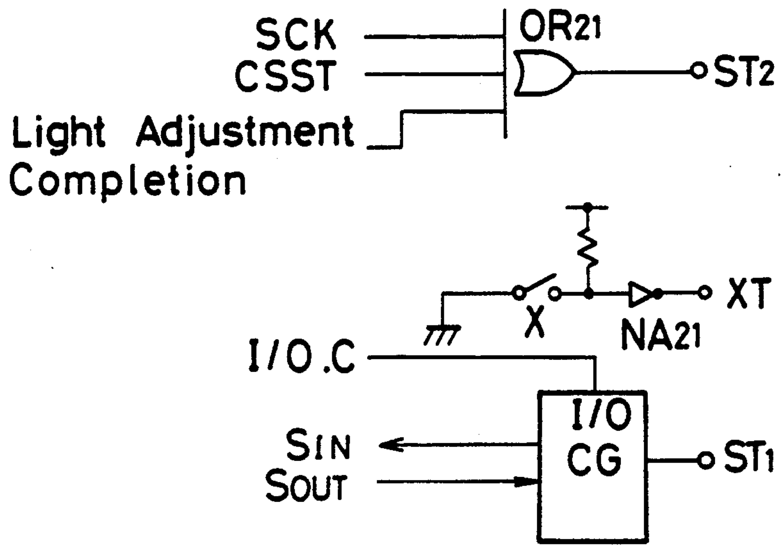
FIG. 9 is a circuit diagram of an interface of the electric flash apparatus.

Next, description is made for an interface circuit as shown in FIG. 9.

A signal CSST showing the kind (the pulse width varies responding to the kind) of data communication to the electric flash apparatus ST, the clock signal in communication and a signal showing completion of light emission adjustment are supplied to the electric flash apparatus ST through an OR circuit $OR_{21}$. On completing first-curtain running of the shutter, the X contact X is turned on (this is turned off by changing operation at winding), and a signal of "H" level is outputted from a terminal XT.

Symbol I/OCG designates an input-output switching circuit, which switches-over the direction (input or output) of communication of data to the electric flash apparatus ST in response to a signal from the terminal I/OC of the camera body.

Figure 11A:
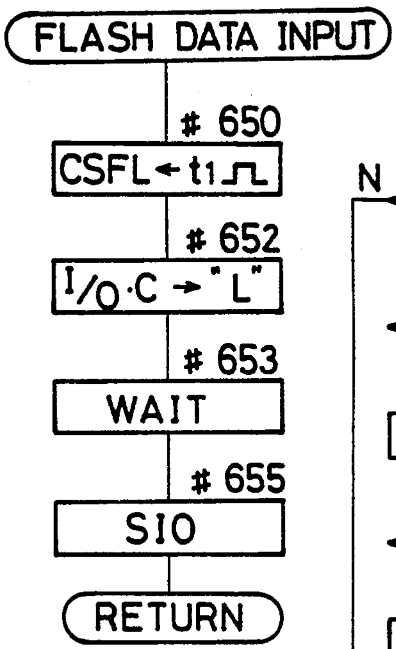
FIGS. 11(*a*) and 11(*b*) are flowcharts showing routines of flash data input and flash data output respectively.
Figure 11B:
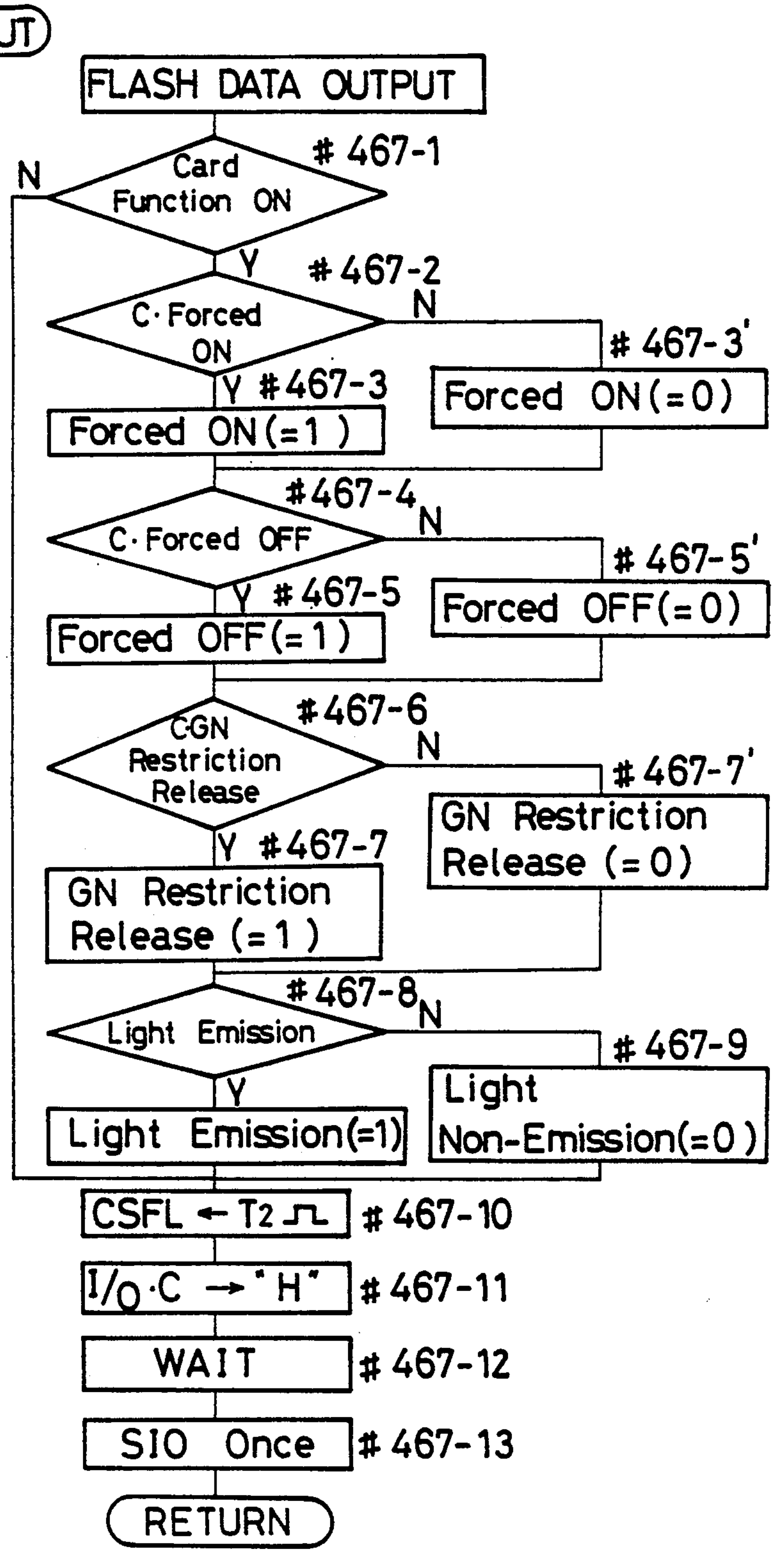

In FIG. 11(*a*), in order to perform data communication with the electric flash apparatus (the camera body is the input side), the micro-computer $\mu C$ of the camera body outputs a pulse signal of a width of a constant time $t_1$ to a terminal CSST to turn the terminal I/OC to the "L" level, and waits data setting of the electric flash apparatus with the input/output circuit set as the input side, and performs input of data by serial communication once (#650–#655).

Figure 7:
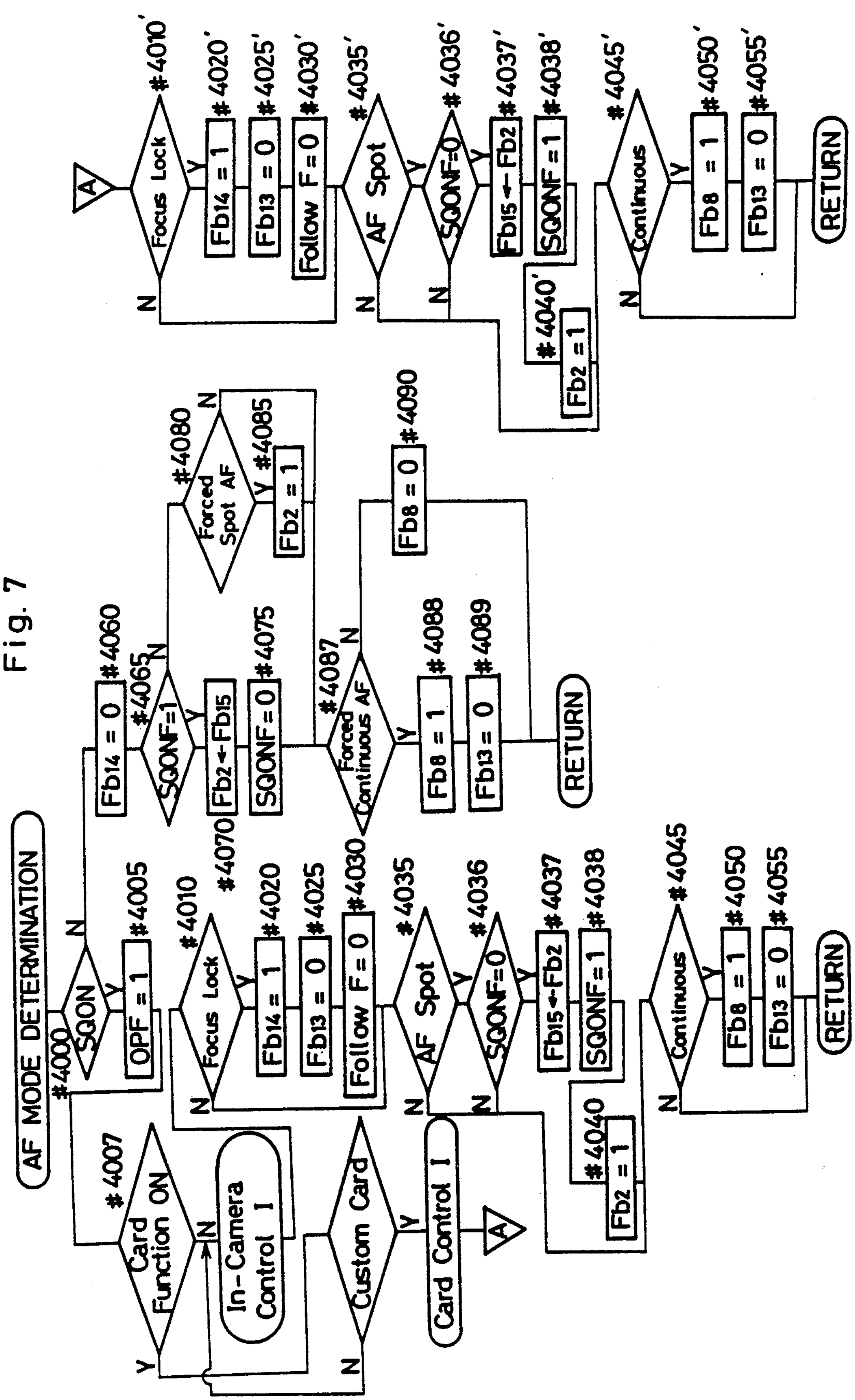
FIG. 7 is a flowchart showing a routine performing AF mode determination as shown in FIG. 6 and focus lock.

Reverting to FIG. 6, the AF mode is decided in step #417. FIG. 7 shows a subroutine of deciding this AF mode. First, it is judged whether or not the above-described lens-side switch $S_Q$ has been turned on from lens information (#4000). When this switch is in the ON state, the flag OFF is set in step #4005 to reset and start the power holding time (start from 10 seconds), and it is judged based on a signal of ON/OFF of the card function inputted through data communication(II) (as described later) whether or not the card function has been turned on or off (#4007).

When the card function is in the OFF state, based on information of the $E^2$PROM in the camera body, AF control is performed in the AF mode stored previously.

On the other hand, when the card function is in the ON state, it is judged whether or not the set card is the custom card, and when it is not the custom card, switch-over of the AF mode by the switch $S_Q$ is performed based on information of the $E^2$PROM in the camera body.

When it is the custom card, AF control is performed based on AF information set in the card which has been inputted from the card through the data communication(IV) as described later.

In addition, control is performed in the same manner in both the case of determining the AF mode by the $E^2$PROM in the camera body and the case of determining the AF mode by the $E^2$PROM in the custom card except for data to be used, and therefore description is made only on the case of deciding the AF mode by the $E^2$PROM in the camera body.

The micro-computer μC reads information from the $E^2$PROM in the camera body, and judges whether or not the AF mode is the focus lock mode in step #4010. Here, in the case of the focus lock mode, a bit $Fb_{14}$ of focus lock by the switch $S_Q$ is set, and bit $Fb_{13}$ showing the auxiliary light mode is reset, and further a flag (follow F) is reset to erase the display of the follow mode (#4020–#4030).

This is because, in the focus lock mode, AF operation is inhibited, and thereby AF operation thereafter is not required, and therefore light emissions of auxiliary light required for AF operation is inhibited to save power.

Next, judgment is made on whether or not the AF mode is the spot AF mode (#4035). Processing is also sent to step #4035 when the mode is not the focus lock mode. Here, in the case of the spot AF mode, judgment is made in step #4036 on whether or not a flag SQONF, showing that the switch $S_Q$ has been turned ON and processing has passed through this flow for the first time, has been set. And when it has not been set, processing proceeds to step #4037, moves the content of a bit $Fb_2$ to a bit $Fb_{15}$ to store the multi/spot mode before turning on the switch $S_Q$, sets the above-mentioned flag SQONF (#4038), sets the spot mode ($Fb_2=1$) in step #4040, and proceeds to step #4045. Also, when the flag SQONF has been set, processing skips over step #4037 and the like, proceeding to step #4045. In step #4045, it is judged whether or not AF is continuous AF, and in the case of continuous AF, a bit ($Fb_2=1$), showing continuous AF is set (#4050), and the bit $Fb_{13}$ showing auxiliary light is reset in step #4055, and processing returns. Now, it is assumed that the auxiliary light mode for continuous AF is inhibited in view of power saving. This is because, where auxiliary light is emitted every time of focus condition detection (integration) in the continuous AF wherein focus condition adjustment never terminates, the battery being a power supply is soon exhausted, and thereby the quantity of film frames capable of photographing is reduced. When AF is not continuous AF in step #4045, processing returns immediately. In addition, in the flow wherein the switch $S_Q$ is in the ON state, for example, where focus lock is set in step #4010, NO is selected in both steps #4035 and #4045.

When the lens-side switch $S_Q$ is in the OFF state in the above-mentioned step #4000, processing proceeds to step #4060. In this step #4060, a bit $Fb_{14}$ showing the focus lock function is reset.

In step #4065, it is judged whether or not control is made immediately after the switch $S_Q$ has been turned off after the spot AF has been selected by the switch $S_Q$ by whether or not the flag SQONF has been set. When the flag has been set, the content of the bit $b_{15}$ is moved to the bit $b_2$, and thereby the mode information of multi-spot/spot before selection by the switch $S_Q$ is obtained (#4070). Then processing resets the flag SQONF, proceeds to step #4087. In step #4065, when the flag SQONF has not been set, judgment is made on whether or not the set mode is the forced spot AF by the IC card (close-up card), and in the case of forced spot AF, the bit $Fb_2$ is set to show spot AF, and processing proceeds to step #4087. When the set mode is not forced spot AF, processing skips over step #4085, proceeding to step #4087. Next, in step #4087, it is judged based on a signal inputted from the card (sport card) whether or not the set mode is forced continuous AF, and in the case of forced continuous AF, the bit $Fb_S$ showing this is set, and the bit $Fb_{13}$ is reset to inhibit the auxiliary light mode, and processing returns (#4088, #4089). When the set mode is not forced continuous AF, the bit $Fb_S$ is reset to show one-shot AF (#4090), and processing returns.

After deciding the above-mentioned AF mode, the micro-computer μC performs the card data communication(II) with the IC card to discriminate the kind of the IC card CD (#420).

Description is made for this card data communication(II) in reference to FIG. 5(*b*). In this data communication, first, data showing the data communication(II) is sent from the camera body to the card (serial communication one time) (#320 to #327), and when the camera body is set to the input side (#330), processing is put simultaneously in ready state (#332), and performs serial communication 10 times and obtains 10-byte data (#335). Brief description is made on the content of this data. The first four bytes are data for controlling individual functions of the camera in response to the card (detailed description is made later).

The following fifth and sixth bytes are missing, and the seventh and the eighth bytes are for specifying the number and the head address of data of output side in the data communication(IV) (the camera body is input side) following this, and this is called in this embodiment the "directly-specified-address type". The following ninth and the tenth bytes are for inputting required data by specifying a group of data of the output side in the communication(III) and the communication(IV), and particularly the ninth byte shows the communication(III) and the tenth byte shows the communication(IV), and this is called in this embodiment the "group-specified type". Then, these two specifying methods are changed-over by the card using a bit $b_6$ of a third byte out of the above-mentioned four bytes, and data communication sending only required data is performed, and thereby processing time is reduced efficiently. Then, reverting to FIG. 6, judgment is made on whether or not AF inhibit data inputted by the communication(II) has been set (#425), and when it has not been set, or when self time counting is not being performed (SLP=0), it is judged by the level of the terminal $LP_5$ whether or to the AF starting switch $S_1$ has been turned on (#428). When the above-mentioned switch $S_1$ has been turned on ($IP_5$="L" level), AF control is performed (#429), and a flag $S_1$ONF showing ON of the switch $S_1$ is set (#430).

When the AF inhibit data has been set based on the data inputted from the card by the communication(II), or when self time counting is being performed, or when the switch $S_1$ is in the OFF state ($IP_5$="H" level), lens drive is stopped by outputting a signal of stopping the AF driving motor to a lens controlling circuit LECN (#431) to inhibit AF operation, and a flag AFNF showing that AF is not performed is set (#435), and further the flag $S_1$ONF showing ON of the switch $S_1$ is reset (#437). Thus, when the data setting mode has been set, data setting is given priority by inhibiting AF control by instruction from the card side, and thereby AF operation is not performed even if the AF starting switch $S_1$ is depressed by mistake during data setting. In addition, when the above-mentioned flag AFNF has been set, a signal ($b_1$ of AEFLAG) showing that the image magnification data $\beta$ cannot be used because of no reliability is set to "0", and is outputted to the card in the data communication(III).

Figure 12:
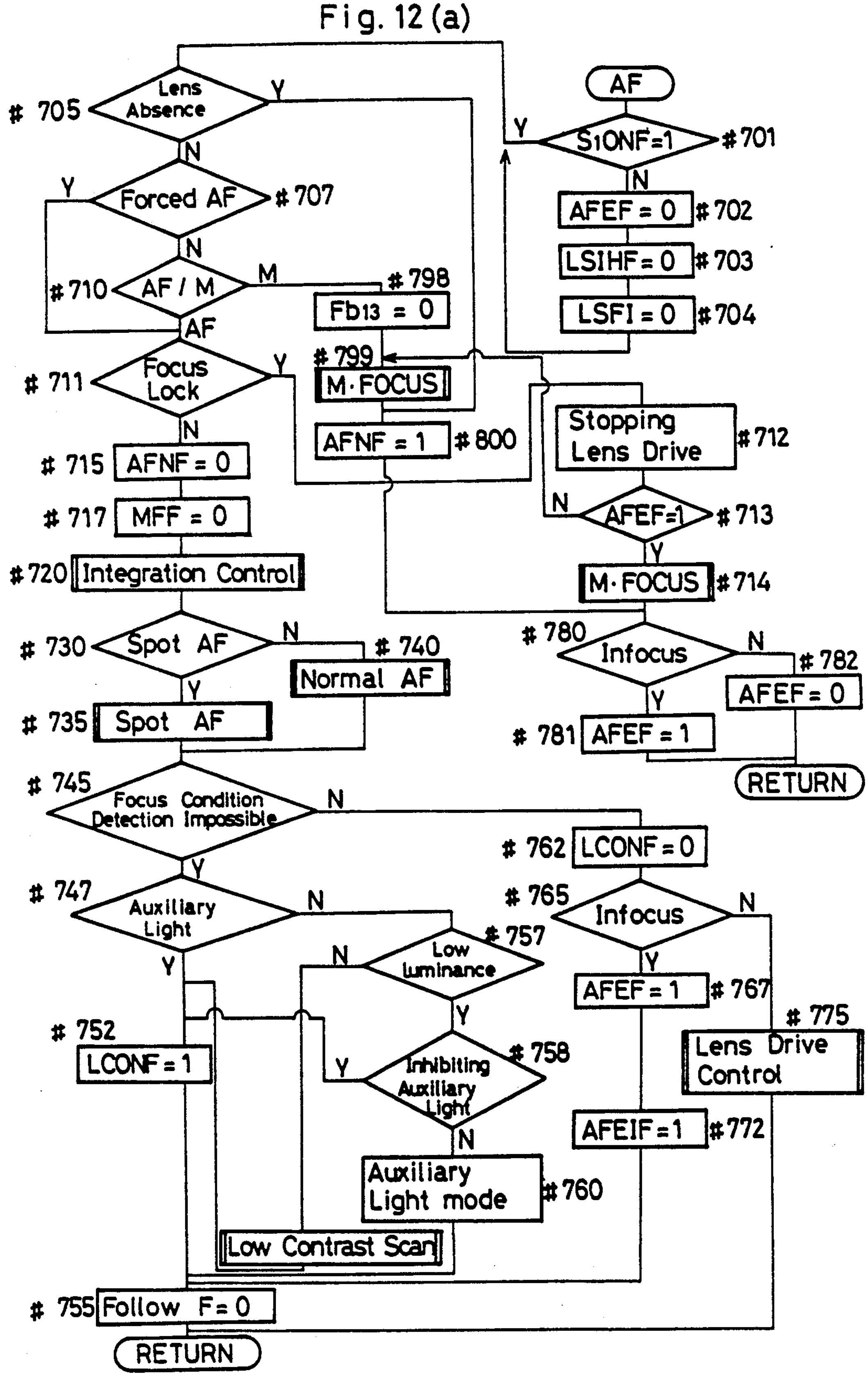
FIG. 12(*a*) is a flowchart showing an AF routine, and FIGS. 12(*b*) to 12(*h*) are flowcharts relating thereto.
Figures 12B, 12C, 12D:
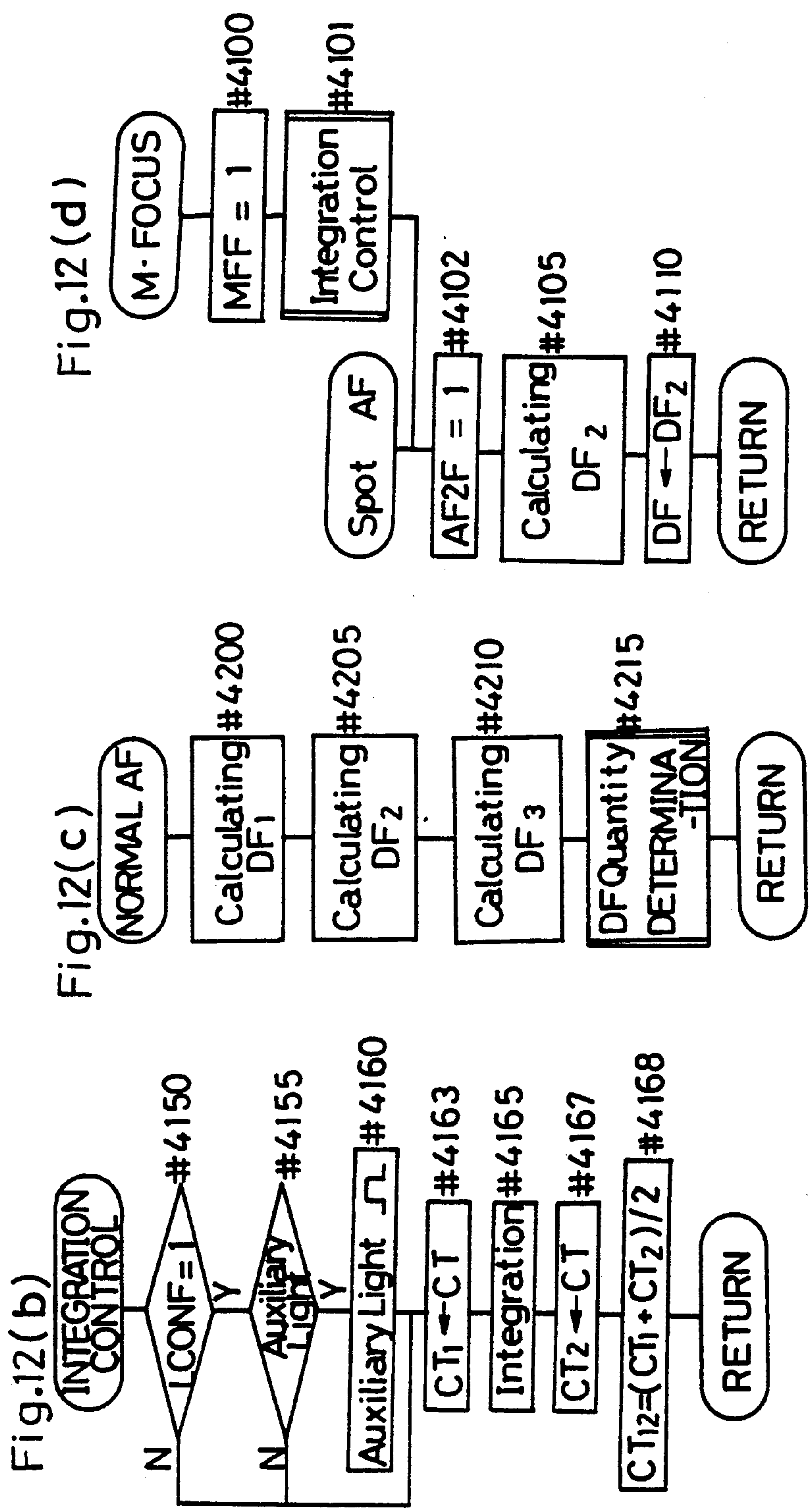
Figure 12E:
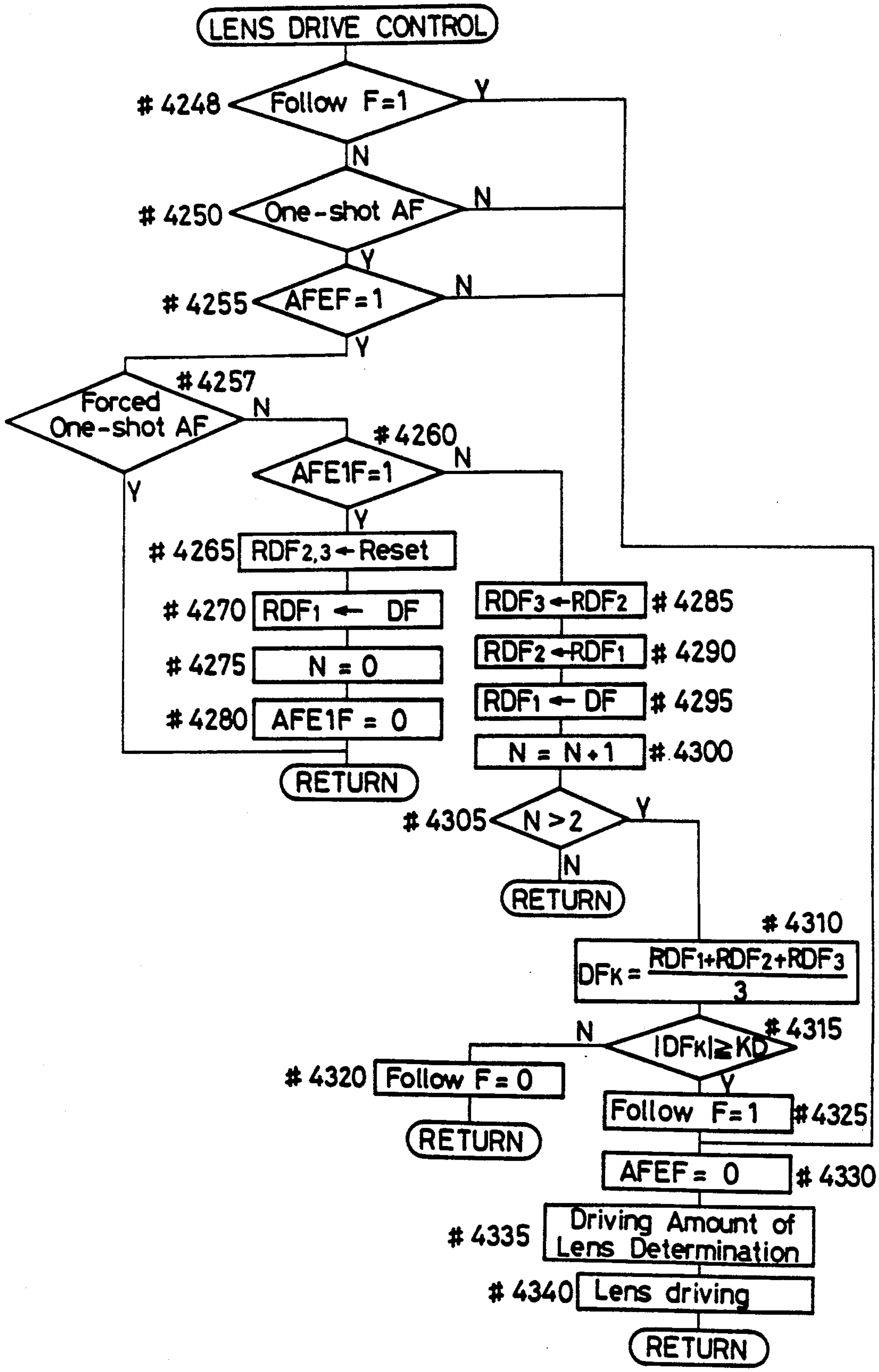
Figure 12G:
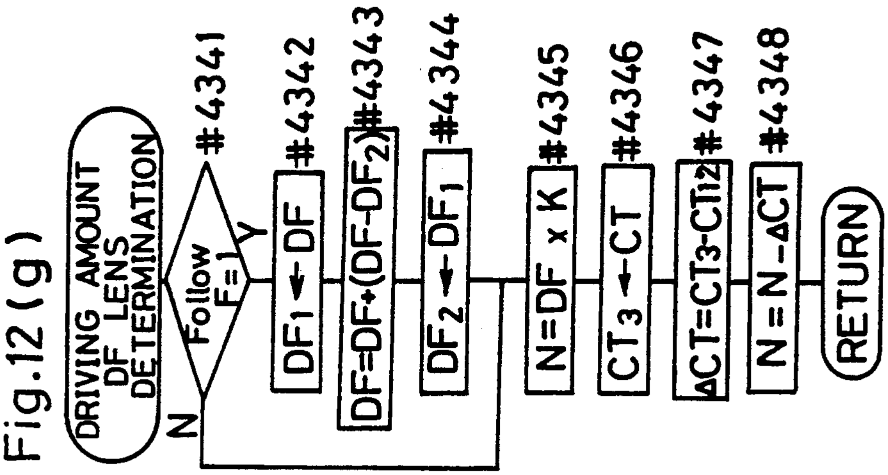
Figure 12F:
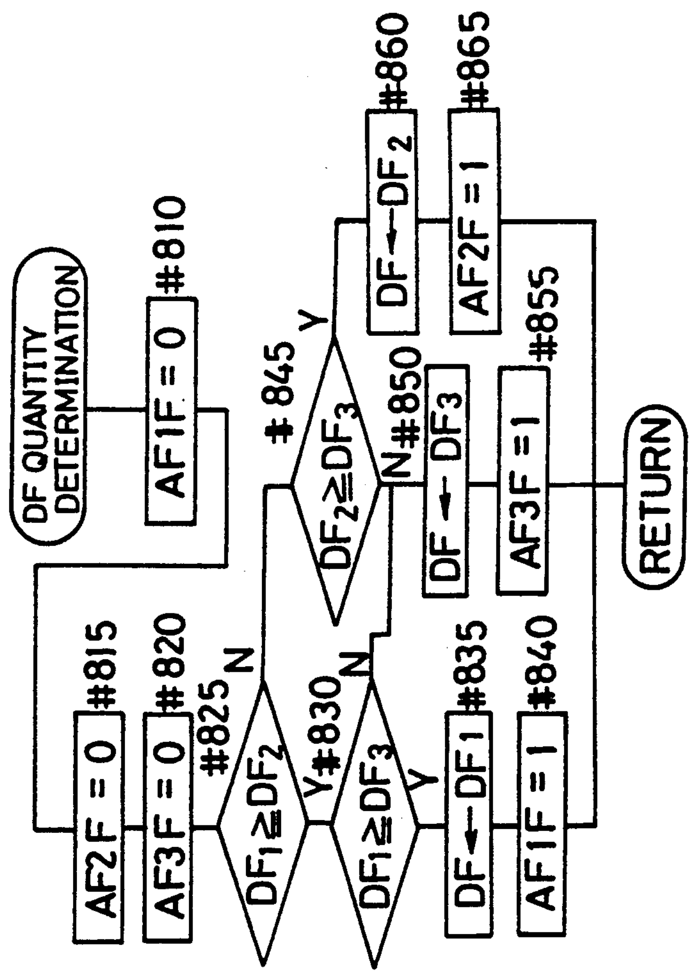
Figure 12:
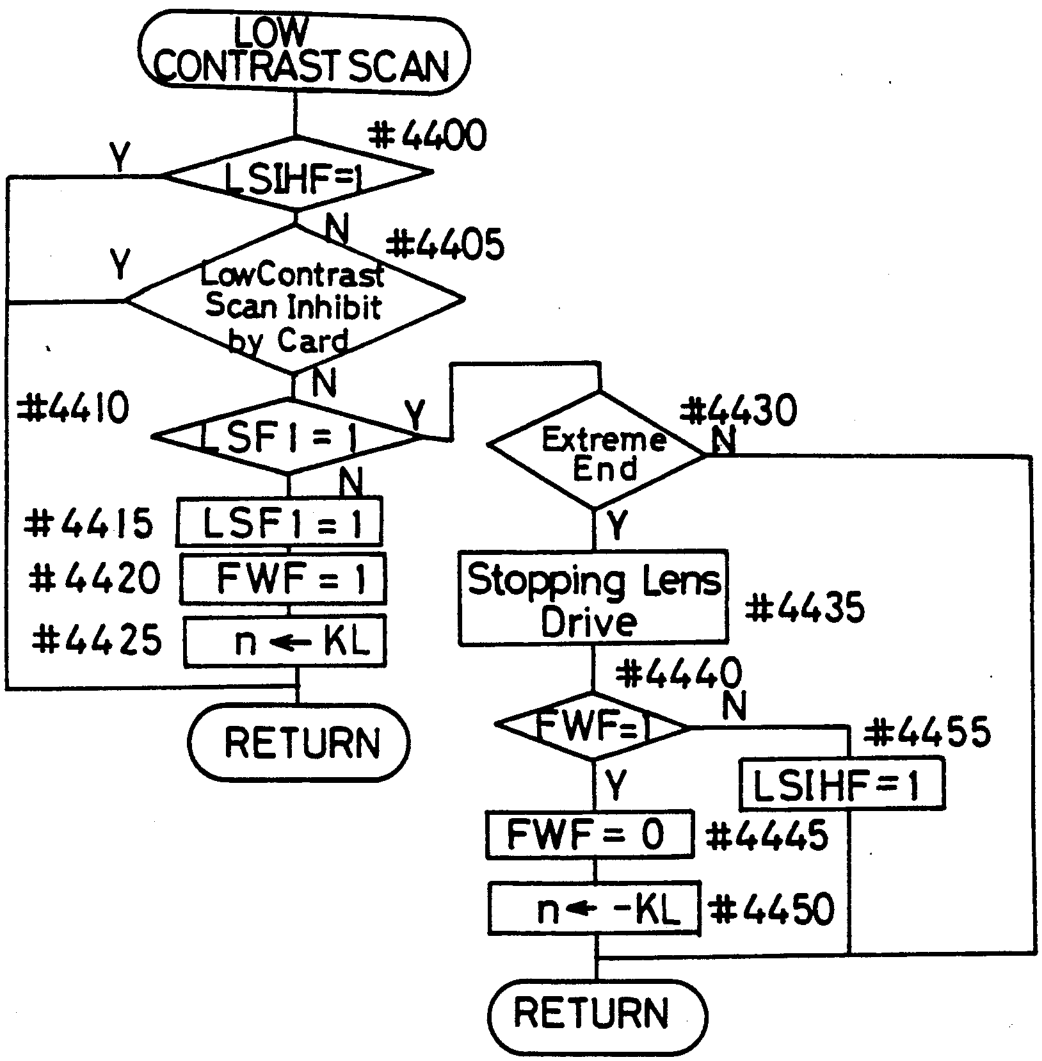
Figure 14:
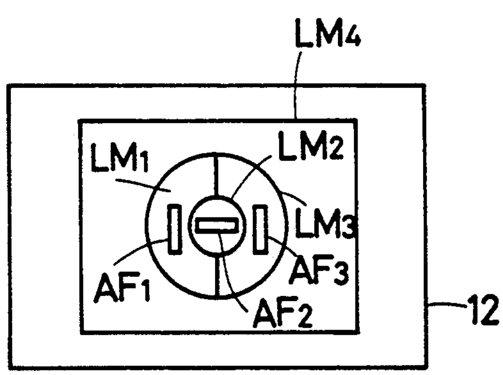
FIG. 14 is a view showing distance measuring ranges and photometric ranges in a photographing image plane.

Here, description is made for the above-described AF control as shown in flowcharts of FIG. 12(*a*) to FIG. 12(*h*) in reference to FIG. 14 showing the focus condition detecting range for the photographing image plane. Here, the photometric range is also described.

First, in FIG. 14, an outside rectangle 12 shows the photographing image plane. Symbols $LM_1$ to $LM_4$ therein show photometric ranges, and symbols $AF_1$ to $AF_3$ show focus condition detecting ranges. Description is made for the focus condition detecting range. In the camera, change-over of spot-multi-spot AF can be made, and when the spot AF is selected, the AF is performed based on information on a subject in the focus condition detecting range $AF_2$, and when the multi-spot AF is selected, the AF is performed so that a subject nearest to the camera is focused by selecting one range corresponding to the nearest subject from among the above-mentioned three ranges $AF_1$ to $AF_3$. Accordingly, on the multi-spot AF, the area for detecting the focus condition is larger or wider than that on the spot AF. Hereinafter, the $AF_1$ is referred to as the first island, the $AF_2$ as the second island, and the $AF_3$ as the third island, respectively.

Description is made for AF control as shown by the flowchart of FIG. 12(*a*). First, to detect whether or not the AF starting switch $S_1$ has been depressed for the first time, the flag $S_1$ONF is judged. And when it has not been set, assuming that it has been depressed for the first time, a flag AFEF showing infocus, a flag LSIHF showing inhibit of low-contrast scanning and a flag LSFI showing the beginning of low-contrast scanning are reset respectively (#702, #703, and #740), and processing proceeds to step #705. In addition, description is made later on low-contrast scanning and flags thereof. When the flag $S_1$ONF is set, processing proceeds directly to step #705 without passing through steps #702 to #704. Judgment is made based on the input signal from the lens on whether or not the lens is attached (#750). When the lens has not been attached in step #705, the flag AFNF showing that AF is not performed is set (#800), and processing proceeds to the above-mentioned step #780.

When the lens has been attached, judgment is made on whether or not the forced AF mode (even if manual focus condition adjustment has been selected by operation, the AF mode is forcedly set, and lens drive by motor is made possible) has been selected by the card (#707). When the set mode is forced AF, processing proceeds to step #711. On the other hand, when the set mode is not forced AF, it is judged by the level of a terminal $IF_{10}$ whether the focus condition adjusting mode is the AF mode or the M mode (#710), and when the set mode is AF, it is judged in step #711 by the bit $F_{14}$ whether or not the focus lock mode has been selected. When the set mode is M, the auxiliary light mode is inhibited ($Fb_{13}=0$) in step #798, and in the following step #799, a subroutine MFOCUS of manual focusing is executed, and thereafter the flag AFNF showing that AF is not performed is set (#800), and then, it is judged whether or not the subject is in an infocus condition (#780). And if the subject is in an infocus condition, the flag AFEF is set (#781), and if it is not in an infocus condition, the flag is reset (#782), and processing returns.

A subroutine of this manual focusing is shown in FIG. 12(*d*) to be explained. First, a flag MFF showing manual focusing is set, and integration control is performed. In manual focusing, A flag AF2F showing a second island out of three islands of the AF area is set, and quantity $DF_2$ of defocus of this island is calculated to set this as the quantity of defocus, and processing returns (#4100 to #4110).

A subroutine of integration control in the above-described step #4101 is shown in FIG. 12(*b*) to be explained. First, when focus condition detection is impossible (LCONF=1), or when the set mode is not the auxiliary light mode ($Fb_{13}=0$), auxiliary light is not emitted, and processing proceeds to step #4163 (#4150, #4155). When focus condition detection is impossible, and when the set mode is the auxiliary light mode, a terminal OLD is turned to the "H" level for a certain time to start emitting light before setting integration and to continue to emit for predetermined time (#4150–#4160), and processing proceeds to step #4163.

In step #4163, count value CT of quantity of move-out (the number of pulses of move-out) is read, being set as $CT_1$. Next, integration is performed, and after completing integration, the count CT is read once more, being set as $CT_2$ (#4165, #4167). An average value of the values $CT_1$ and $CT_2$ is evaluated and is set as $CT_{12}$ (#4168), and processing returns.

Reverting to FIG. 12(*a*), when the set mode is not manual focus condition adjustment in step #710, or when the set mode is forced AF in step #707, it is judged in step #711 whether or not the focus lock mode has been selected. Where focus lock mode has been selected by the switch $S_Q$ in the AF mode as a result of the judgment in step #711, lens drive is stopped in step #712, and it is judged whether the subject is in an infocus condition or not by whether or not the flag AFEF has been set (#713), and when the flag has been set, processing proceeds to step #714, and controls the M focusing, proceeding to step #780. When the flag has not been set, processing proceeds to step #799.

The judgment of infocus condition in step #713 is intended to determine the photometric value using the distance data (used for the calculation of the image magnification $\beta$) of the subject in an infocus condition where focus lock is applied after focusing.

When the AF mode has been selected in step #710 in FIG. 12(*a*), and focus lock is not performed ($Fb_{14}=0$) in the subsequent step #711, the flag AFNF showing that AF is not performed is reset (#715) and also the flag MFF for showing the manual focusing is reset (#717). The micro-computer $\mu$C controls storage (integration) of charges generated in a plurality of CCD, which is prepared for detecting the focus condition with respect to each island, responding to the quantity of incident light. After completing the integration, the micro-computer inputs data obtained by A-D-converting the value of integration (#720. Then, it is judged whether or not the mode is the spot AF (judged based on function data $Fb_2$) in step #730, and if the spot AF is selected ($Fb_2=1$), processing proceeds to step #735 and a subroutine of the spot AF as shown in FIG. 12(*d*). In this subroutine, the flag AF2F for showing that AF is performed based on the second island is set, and a quantity $DF_2$ of defocus of the second island is calculated from the inputted data, and a value obtained by this calculation is set as the quantity of defocus for driving the lens (#4102 to #4110).

On the other hand, where the multi-spot AF mode is selected in step #730 in FIG. 12(*a*), processing proceeds to step #740 and a subroutine of the normal AF control as shown in FIG. 12(*c*) is executed. At this time, the quantities of defocus of the first, the second and the third islands are calculated respectively, and the quantity of defocus for a subject nearest to the camera is determined among the above-mentioned quantities (#4200 to #4215).

FIG. 12(*f*) shows a subroutine of determining this quantity of defocus. For FIG. 12(*f*), it should be noted that the quantity of defocus is represented with negative sing in the case of front focus, and the quantity is represented with positive sing in the case of rear focus, and the absolute values thereof represent the magnitudes of defocus. It is possible to determine the subject nearest to the camera by detecting the largest quantity of defocus among the quantities of defocus of the three islands. The main subject is considered to be located in that nearest island corresponding to the largest quantity of defocus.

In FIG. 12(*f*), first, the micro-computer $\mu$C resets flags AF1F to AF3F showing the islands, detects the island of the largest quantity of defocus, sets the detected quantity of defocus of the island as the quantity of defocus for driving the lens, and sets one of the above-described flags AF1F to AF3F corresponding to that island, and returns (#810--865).

After the quantity of defocus has been calculated, it is checked in step #745 of FIG. 12(*a*) whether or not focus condition detection is impossible (data is unreliable), (for example, it is judged whether or not the contrast is low, and if it is low, focus condition detection is assumed not to be reliable), and if focus condition detection is impossible, processing proceeds to step #747, and judges whether or not the set mode has been the auxiliary light mode, and when the set mode has been the auxiliary light mode, further focus condition detection is useless, and therefore a flag LCONF showing this is set (#752), and a flag showing the follow mode (as described later) is reset (#755), and processing returns. When the set mode is not the auxiliary light mode in step #747, processing proceeds to step #757, and detects whether or not the luminance is low, and when the luminance is not low, performs control to scanning the lens for low-contrast without auxiliary light emission. This low contrast scanning is to perform focus condition detection while driving the lens to search for an area where focus condition detection is possible when focus condition detection is impossible. This is shown in FIG. 12(*h*) to be explained. First, judgment is made on whether or not the flag LSIHF has been set which shows that low-contrast scanning has been performed, but an area where focus condition detection is possible has not been obtained (#4400). When the flag has been set, further low-contrast scanning is useless, and therefore processing returns. When the flag has not been set, judgment is made on whether or not a signal showing inhibit of low-contrast scanning has been inputted from the card (#4405). When the signal has been inputted, low-contrast scanning is not performed likewise, and processing returns. When the signal has not been inputted, judgment is made on whether or not the flag LSFI showing that this flow has been executed has been set (#4410), and when the flag has not been set, this is set (#4415), a flag FWF showing the direction of move-out is set (#4420), and drive of move-out of the lens is performed with the quantity N of lens drive set to a positive value KL larger than the maximum quantity of move-out of the lens (#4425). When the flag LSFI has been set, judgment is made on whether or not the lens has reached the endmost of move-out or the endmost of move-in (#4430), and if the lens has not reached either of the endmost positions, processing returns. When the lens has reached either of the endmost positions, the lens is stopped (#4430), and judgment is made on whether or not the lens has been moved out before stop (#4440). To detect this endmost position, a hardware timer (not illustrated) is working, and this hardware timer is reset and started every time a pulse is inputted from the encoder. When this timer has counted a certain time, the endmost of move-out or the endmost of move-in is detected as the state that the lens cannot be driven. Then, when the lens has been moved out (FWF=1), this is reset (#4445), and this time, to perform control of move-in, the quantity of lens drive is set to a negative value KL (#4450), and processing returns. When the flag FWF has not been set, assuming that both move-out and move-in has been performed, further low-contrast scanning is useless, and therefore the flag LSIHF showing this is set (#4455), and processing returns. Then, processing proceeds to step #752, performing the same processing as the above-described.

On the other hand, when the luminance is low in step #757 of FIG. 12(*a*), it is judged in step #758 whether or not the set mode is inhibit of auxiliary light from the card, and when the set mode is the inhibit mode, processing proceeds to step #752, and inhibits AF by auxiliary light emission, and when the set mode is not the inhibit mode, sets the auxiliary light mode ($Fb_{13}-1$), in step #760, proceeding to step #755.

Next, when focus condition detection is possible, the micro-computer $\mu$C resets the flag LCONF (#762), judges whether or not the subject is in infocus condition from the quantity of defocus for lens drive in step #765. And if infocus condition, processing sets the flag AFEF showing infocus condition (#767), sets a flag AFEIF, and proceeds to step #755.

When the subject is not in infocus condition in step #765, processing proceeds to step #775, and executes a subroutine of lens drive control and thereafter returns. This subroutine is shown in FIG. 12(*e*) to be explained. Judgment is made on whether or not the flag (follow F) showing the following mode has ben set (#4248), If the set mode is the follow mode, processing proceeds to step #4330. When the flag (follow F) has not been set, it is judged from data $Fb_S$ whether the set mode is one-shot AF (when focused once, lens drive thereafter is stopped, and this time focus condition detection can also be stopped) or continuous AF (after infocus, follows the subject, performing lens drive responding to the evaluated quantity of defocus) (#4250). In the case of one-shot AF ($Fb_S=0$), it is judged whether or not the flag AFEF showing infocus state has been set in step #4255, and when the flag has not been set, or in the case of continuous AF ($Fb_8-1$), processing proceeds to step #4340 via steps #4330 and #4335, performing control of lens drive. The flag AFEF showing infocus state is reset in step #4330, and the quantity of lens drive is determined in step #4335, and the lens is driven in step #4340, and processing returns. In addition, lens drive in this step #4340 is performed in a manner that the lens driving circuit LECN drives the lens by a value corresponding to the above-mentioned quantity N of lens drive.

A subroutine of determining the above-mentioned quantity of lens drive is shown in FIG. 12(*g*) to be explained. The micro-computer μC judges whether or not the flag (follow F) showing the follow mode has been set (#4341), and when it has not been set, processing proceeds to step #4345. When the flag (follow F) has been set, the quantity DF of defocus obtained this time is set as $DF_1$ (#4342). Then, the quantity DF of defocus, $DF=DF_1+(DF_1-DF_2)$ ($DF_2$ is the quantity of defocus at the last time, that is, the difference between the quantities of defocus at the last time and this time is added to the quantity at this time) is evaluated, and $DF_1$ is set as $DF_2$ and processing proceeds to step #4345. In this step #4345, the quantity N of lens drive is evaluated by multiplying the evaluated quantity of defocus by the converting coefficient K. The number of pulses of move-out of the lens at that time is read and is taken as $CT_3$, and $\Delta CT$ is evaluated by $(CT_3-CT_{12})$ as the quantity of movement of lens from the integration center, and $\Delta CT$ is subtracted from the above-mentioned N, and thereby the quantity of lens drive at the end of operation is evaluated, and processing returns (#4346-#4348).

In step #4255, when the flag AFEF showing infocus state has been set, processing proceeds to step #4257. Then, it is judged whether or not the set mode is forced one-shot AF, and when the set mode is forced one-shot AF, processing returns immediately. Thereby, the follow mode in the forced one-shot AF mode is inhibited. When the set mode is the normal one-shot AF mode where the follow mode is not inhibited, it is judged whether or not the flag AFEIF showing that the subject has been in infocus state from the out-of-focus state has been set (#4260). When the flag has been set, preparatory processing for follow judgment as described later (it is judged whether or not the subject is moving) is performed. First, in step #4265, registers $RDF_2$ and $RDF_3$ storing the quantities of defocus are reset, the evaluated quantity DF of defocus is stored in a similar register $RDF_1$ (#4270), a variable numeral N is set to 0 (#4275), the above-mentioned flag AFEIF is reset (#4280), and processing returns. In step #4260, when focus condition detection at the second time and thereafter is performed (AFE1F=0) after focusing (AFEF=1), processing proceeds to step #4285, and the quantities of defocus are stored sequentially in the registers storing the quantity of defocus (the content of the register $RDF_2$ is stored in the register $RDF_3$, the content of the register $RDF_1$ is stored in the register $RDF_2$, and the evaluated quantity DF of defocus is stored in the register $RDF_1$), and 1 is added to the variable N. And judgment is made on whether or not this N is two or more, that is, after focusing, focus condition detection has been performed three times, and if two times or less, lens drive is not performed, and processing returns (#4285-#4305).

In step #4305, when the focus condition detection has been made three times or more ($N>2$), processing proceeds to step #4310, and evaluates the quantity of defocus by averaging the quantities of defocus of the past three times (average of contents stored in the register), and judges whether or not this value is not less than the predetermined value KD in the following step #4315. This means that it is judged by the past focus condition detection of three times whether or not the subject is moving at a predetermined speed (on the photographing image plane). When this value is less than the predetermined value, assuming that the subject is not moving, processing resets the follow flag (#4320), and returns.

This flag is used for display $DISP_{II}$ (in-finder). On the other hand, when the above-mentioned quantity of defocusing is not less than the predetermined value, assuming that the subject is moving, the flag (follow F) is set as the follow mode (#4325). And the flag AFEF is reset (#4330), the quantity of lens drive is evaluated (#4335), and lens drive is performed (#4340), and processing returns.

Figure 13:
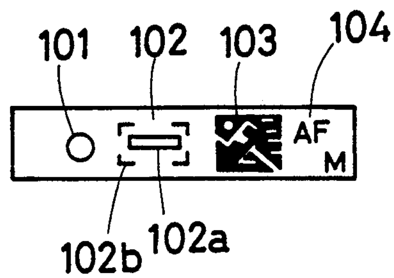
FIG. 13 is a view showing an example of display in a finder.

Here, description is made for display part $DISP_{II}$ in the finder relating to focus condition detection based on FIG. 13. Numeral 101 designates a display showing infocus state or focus condition detection impossible, and when it is set base don an infocus flag for display (infocus F), a green light emitting diode is lit and if not so (infocus F=0), it is put out. Also, in the case of focus condition detection impossible (LCONF=1), a red light emitting diode blinks, and if not so (LCONF=0), it is put out. Numeral 102 designates a focus condition detection area, and when the inside area 102*a* is displayed, spot AF is shown, and in the case of only the outside area 102*b*, multi-spot distance measurement is shown. Numeral 103 designates a display when the continuous mode or the follow mode is shown (follow F=1), and when the set mode is not the continuous AF or the follow modes, it is erased. "AF/M" designated by 104 performs AF display in the AF mode (AFNF=0), and performs M display in the other cases (AFNF=1). In addition, when the AF switch $S_1$ is in the OFF state ($S_1ONF=0$), the display in the finder is erased.

Reverting to FIG. 6 again, the micro-computer μC controls changes of various data by operations of various key switches (#440).

Figure 15:
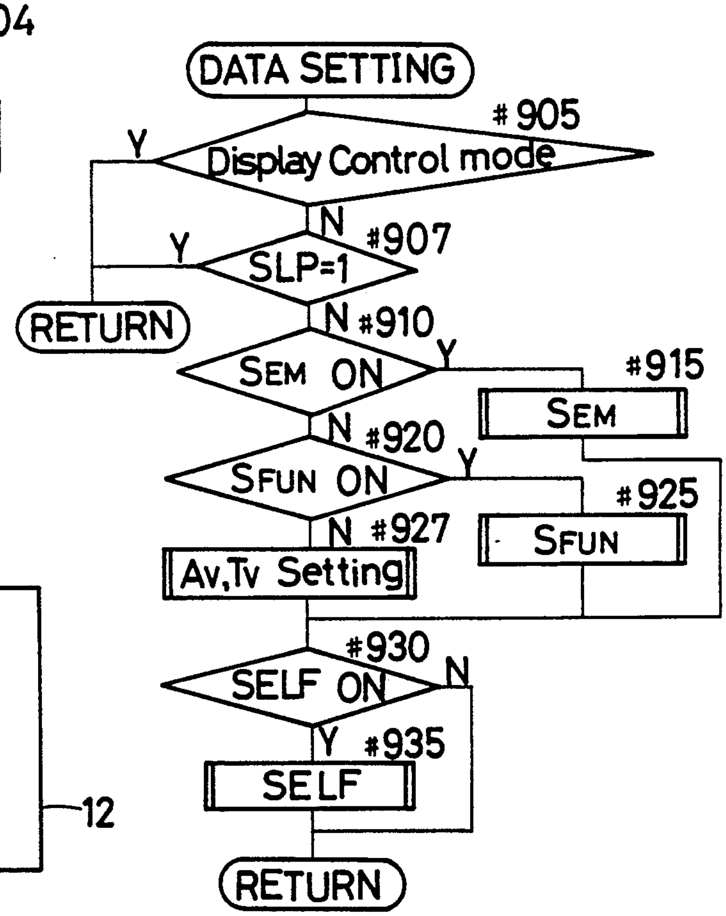
FIG. 15 is a flowchart showing a routine of data setting.

This is shown in FIG. 15 to be explained. Based on data inputted from the card, it is judged from data inputted through the communication(II) whether or not the set mode is the display control mode (data is under setting) (#905), and when the set mode is the mode of display control from the card (data is under setting), processing returns. When the set mode is not the display control mode, judgment is made on whether or not a flag SLP, showing that time is being counted in the self mode, has been set (#907). If the flag has been set, processing returns. If the flag has not been set, judgment is made on whether or not the exposure mode changing switch $S_{EM}$ has been turned to ON (#910), and when the switch is in the ON state, processing proceeds to a subroutine of this change (#915), and returns (detailed description is made later). When the above-mentioned switch $S_{EM}$ has not been turned to ON, processing proceeds to step #920, and the micro-computer μC judges whether or not the function changing switch $S_{FUN}$ has been turned to ON. Then, when this switch $S_{FUN}$ has been turned to ON, processing proceeds to a subroutine of this change (#925).

Figure 16:
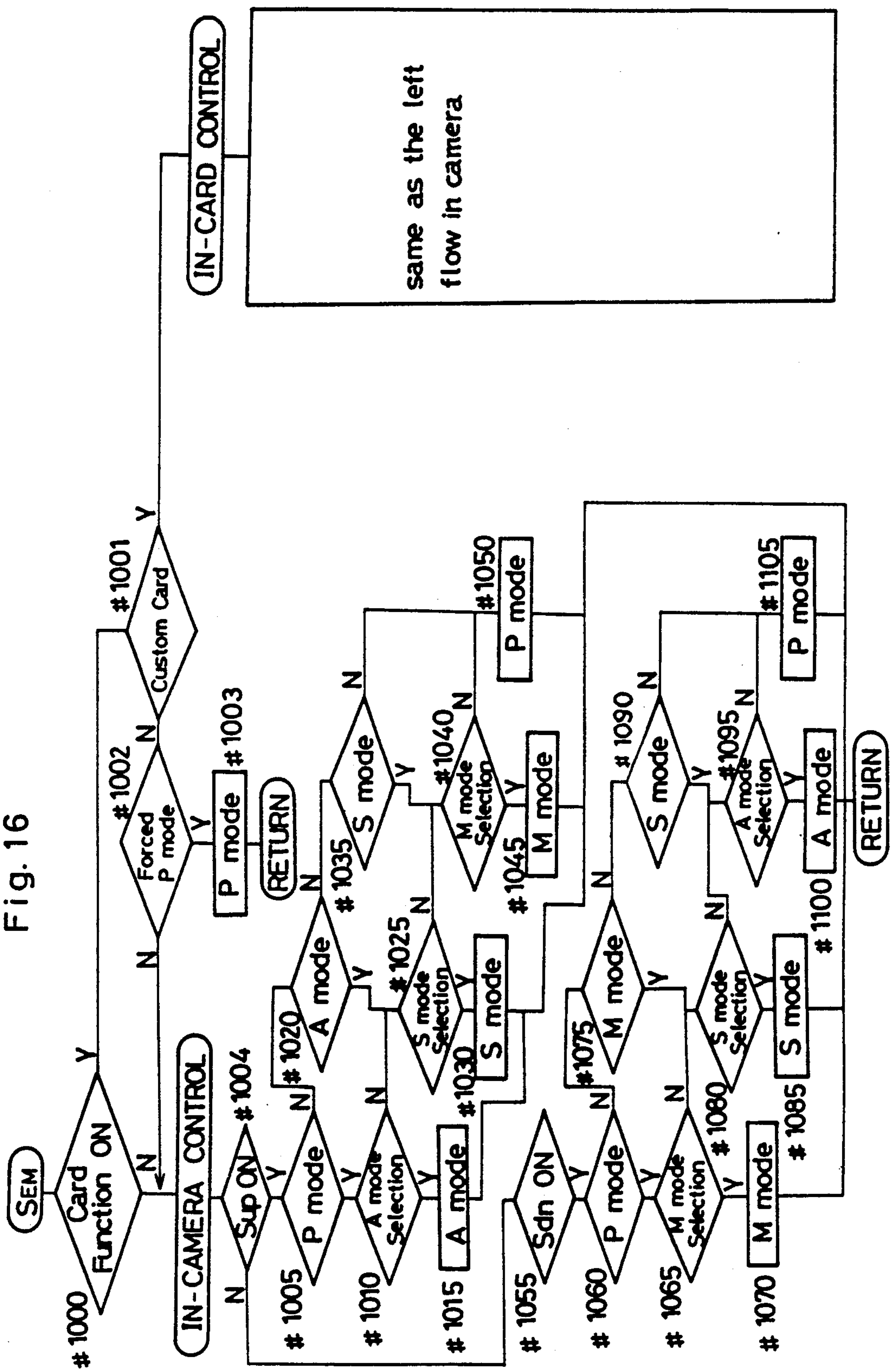
FIG. 16 is a flowchart showing a routine of exposure mode change.
Figure 18:
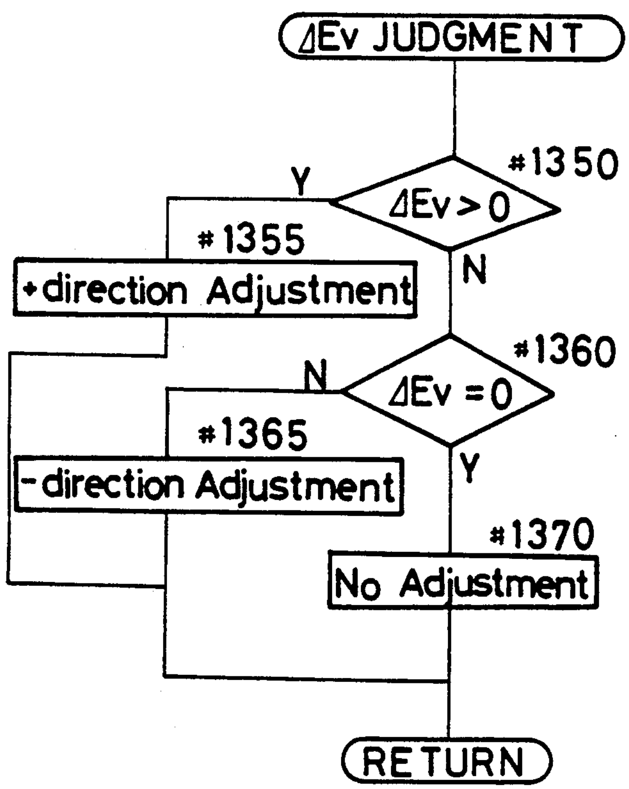
FIG. 18 is a flowchart showing a routine of exposure adjustment.

FIG. 16 and FIG. 18 respectively show the above-mentioned two subroutines, which are described as follows. First, in the case of the exposure mode change, the mode changes in a sequence of P→A→S→M→P (return) cyclically every time the up switch Sup is turned to ON, and changes in a sequence reverse to the above-mentioned upward direction of P←A←S←M←P cyclically every time the down switch Sdn is turned to ON, and the change is made responding to the exposure mode set by the IC card CD, and the mode not selected is skipped. This routine is described in reference to FIG. 16. The micro-computer μC judges whether or not the function of the card is in the ON state by an ON/OFF signal of the card function inputted through the data communication(II) (#1000). When the function is not in the ON state, processing proceeds to in-camera body control. When the function is in the ON state, it is judged whether or not the set card is the custom card (#1001), and when the set card is not the custom card, it is judged in step #1002 whether or not a signal of forced P mode has been inputted, and when the signal is of the forced P mode, the P mode is set (#1003), and processing returns. If the signal is not of the forced mode, processing goes to in-camera body control which decides the AE mode in the AE modes capable of setting stored in the $E^2$PROM in the camera body. On the other hand, when the set card is the custom card, based on data (EECSTM=2, 1) sent through the data communication(IV), the AE mode is decided in the AE modes capable of setting stored in the card. p Controls of selections of the P, A, S and M modes are quite the same except that data to be selected are different (camera body $E^2$PROM, card data), and therefore description is made only on control performed using date of the $E^2$PROM in the camera body. In step #1004, the micro-computer μC judges whether or not the up switch Sup has been turned to ON. When it has not been turned to ON, processing proceeds to step #1055. When it has been turned to ON, processing proceeds to step #1005, and $Fb_0$ and $Fb_1$ of the function data Fbn of the RAM are checked up, and judgment is made on whether or not the P mode has been set at present as the controlled exposure mode. Where it has been set, processing proceeds to step #1010, and it is judged through bits of the $E^2$PROM whether or not the A mode has been selected by the IC card. If it has been selected, the exposure mode is changed from P to A, and the function data $Fb_0$ and $Fb_1$ are also changed from (0, 0) to (0, 1) in step #1015, and thereafter processing returns. In the above-mentioned step #1010, when it is judged that the A mode has not been selected by the IC card, processing proceeds to step #1025, and it is judged whether or not the S mode has been selected. When the S mode has not been selected, processing further proceeds to step #1040, and it is judged whether or not the M mode has been selected. Thus, any mode selected by the card is searched for in sequence. Then, if any selected mode exists, the mode is set. Then, when the A, S and M mode have not been selected, only the P mode has been automatically selected (#1050).

Hereinafter, likewise, when the A mode has been set as the controlled exposure mode ($Fb_0$, $Fb_1$=0, 1), it is judged whether or not the S mode has been selected by the IC card, and when it has not been selected, it is judged whether or not the M mode has been selected, and the exposure mode is changed to the selected mode, and bits $Fb_0$ and $Fb_1$ are changed, and processing returns (#1020 to #1030).

Now, when the S mode has been set as the controlled exposure mode ($Fb_0$, $Fb_1$=1, 1), it is judged whether or not the M mode has been selected by the IC card, and where the M mode has been selected, the M mode is set, and where the M mode has not been selected, the P mode is set, and processing returns (#1035–#1045). When the S mode is not set as the exposure mode in step #1035, that is, when the M mode is set, next the P mod is set (#1050). This is because the P mode has been selected without fail in this embodiment.

When the down switch Sdn has been turned to ON in step #1055, control is performed like the above-described up switch Sup except that the changing direction of the exposure mode differs, and therefore description thereon is omitted.

When both of the switches Sup and Sdn are in the OFF state, processing returns without performing anything.

Figure 17:
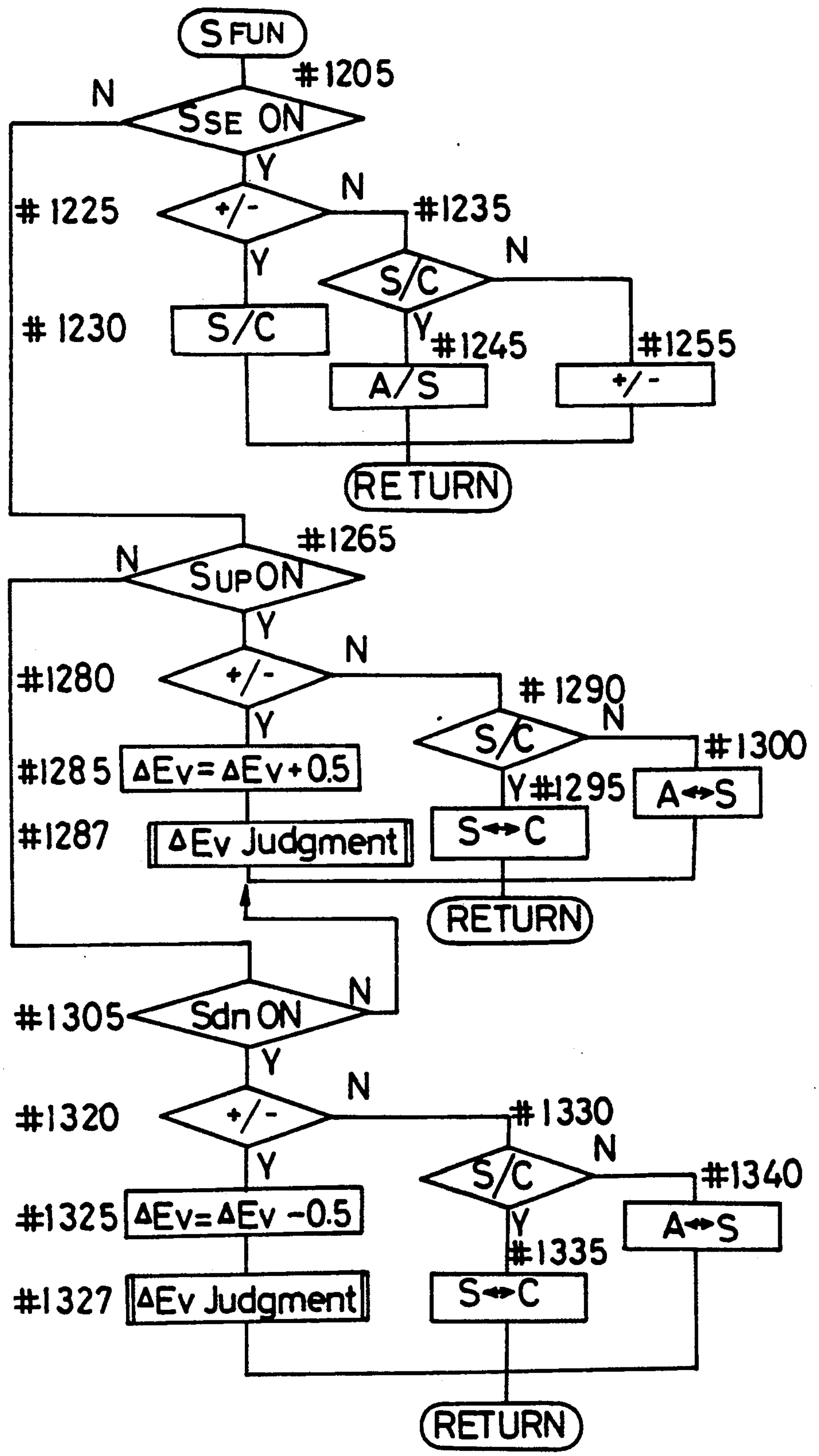
FIG. 17 is a flowchart showing a routine of function mode selection.

Next, description is made on the process when the function changing switch $S_{FUN}$ has been turned ON referring to FIG. 17. The micro-computer μC executes a flow of step #1205 and the subsequent steps wherein data is to be changed. The micro-computer μC judges whether or not the switch $S_{SE}$ showing the function to be changed has been turned on (#1205), and when the switch $S_{SE}$ has been turned on, judgment is made on the function to be changed from bits $Fb_9$ and $Fb_{10}$ shown on Table 3 (#1225), and processing proceeds cyclically in a sequence of ±→S/C→S/A→± (return), changing the data of the bits $Fb_9$ and $Fb_{10}$.

In step #1205, where the switch $S_{SE}$ has not been turned to ON, processing proceeds to step #1265. In step #1265, it is judged whether or not the up switch Sup has been turned to ON, and when it has been turned to ON, what is the function to be changed now is judged based on data $Fb_9$ and $Fb_{10}$ (#1280). If the function to be changed is of ±, 0.5 is added to a quantity ΔEv of exposure adjustment in step #1285, and processing proceeds to a subroutine for judging the magnitude thereof. FIG. 18 shows this subroutine. In FIG. 18, if the quantity ΔEv of adjustment is positive, data $Fb_4$, $Fb_5$=0, 1 is set as a positive side adjustment, and if it is a negative side adjustment, data $Fb_4$, $Fb_5$=1, 0 are set, and further if the adjustment value is zero, data $Fb_4$, $Fb_5$=0, 0 are set as no adjustment, and processing returns (#1350–#1370).

Reverting to FIG. 17, in the case of the S/C function, whether or not the present function is of one-frame advancing (S) or continuous-advancing is judged based on data $Fb_3$, and the data is changed so that the function becomes the other function (#1295), and processing returns. When the function is not any of the above-mentioned two functions the ±, and the S/C, that is, when present function is the A/S function, it is judged through data $Fb_2$ whether the present function is of spot AF (S) or multi-spot AF (A), and the data $Fb_2$ is changed so that the function becomes the other function (#1300), and processing returns.

When the up switch Sup has not been turned to ON in step #1265, processing proceeds to step #1305, and it is judged whether or not the down switch Sdn has been turned to ON, and when it has not been turned to ON, processing returns. Where it has been turned to ON, the flow is like the flow when the above-described up switch Sup has been turned to ON except that if the function is ±, 0.5 Ev is subtracted from the quantity ΔEv of exposure adjustment (#1310–1340). Accordingly, description thereon is omitted.

Referring to FIG. 15, both of the exposure mode changing switch $S_{EM}$ and the function changing switch $S_{FUN}$ ware in the OFF state, processing proceeds to step #927 and executes a subroutine of changing the diaphragm aperture value Av and the shutter speed Tv by the up switch Sup and the down switch Sdn.

Figure 22:
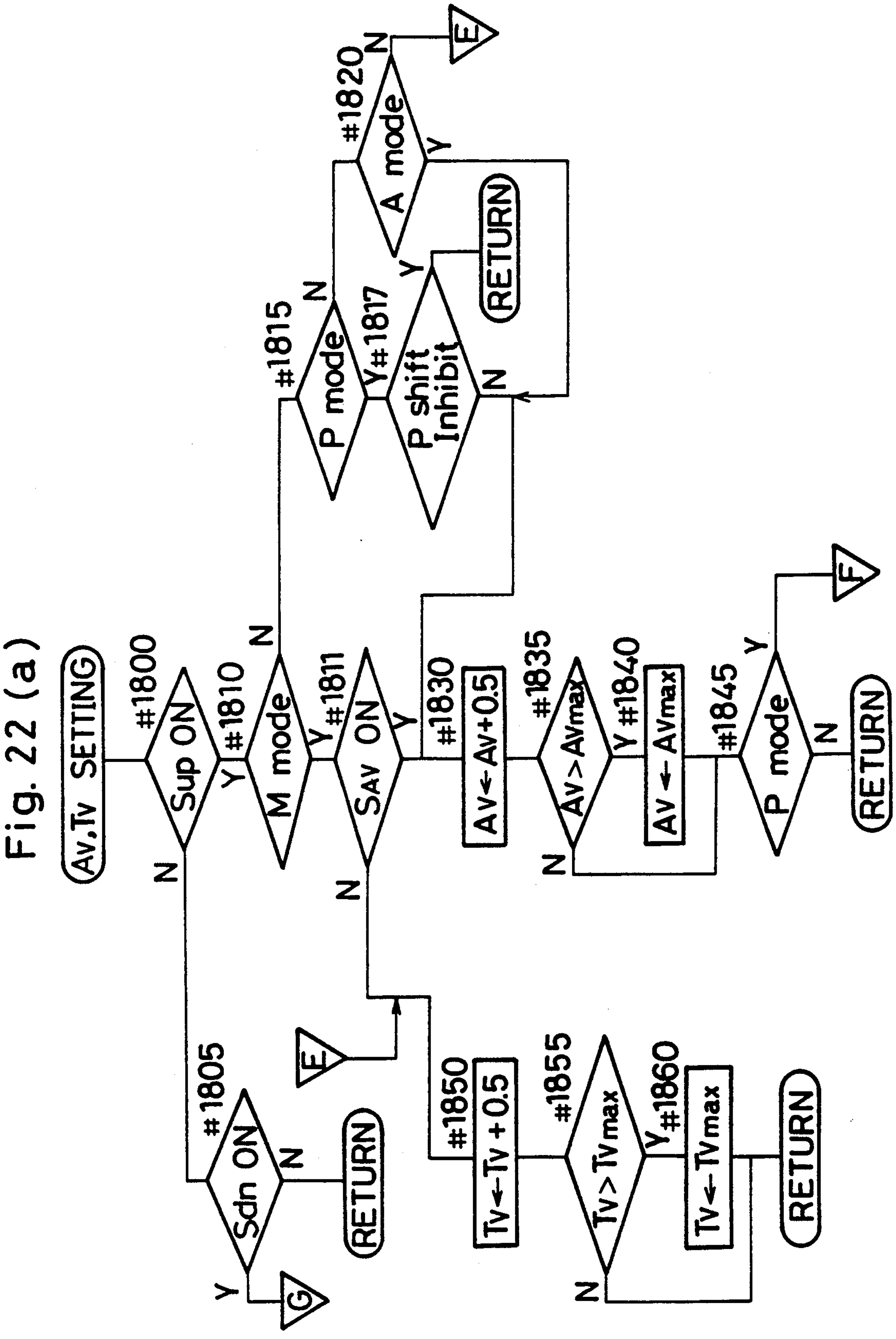
FIGS. 22(*a*) and 22(*b*) are flowcharts showing a routine setting a diagram aperture value and a shutter speed.
Figure 22:
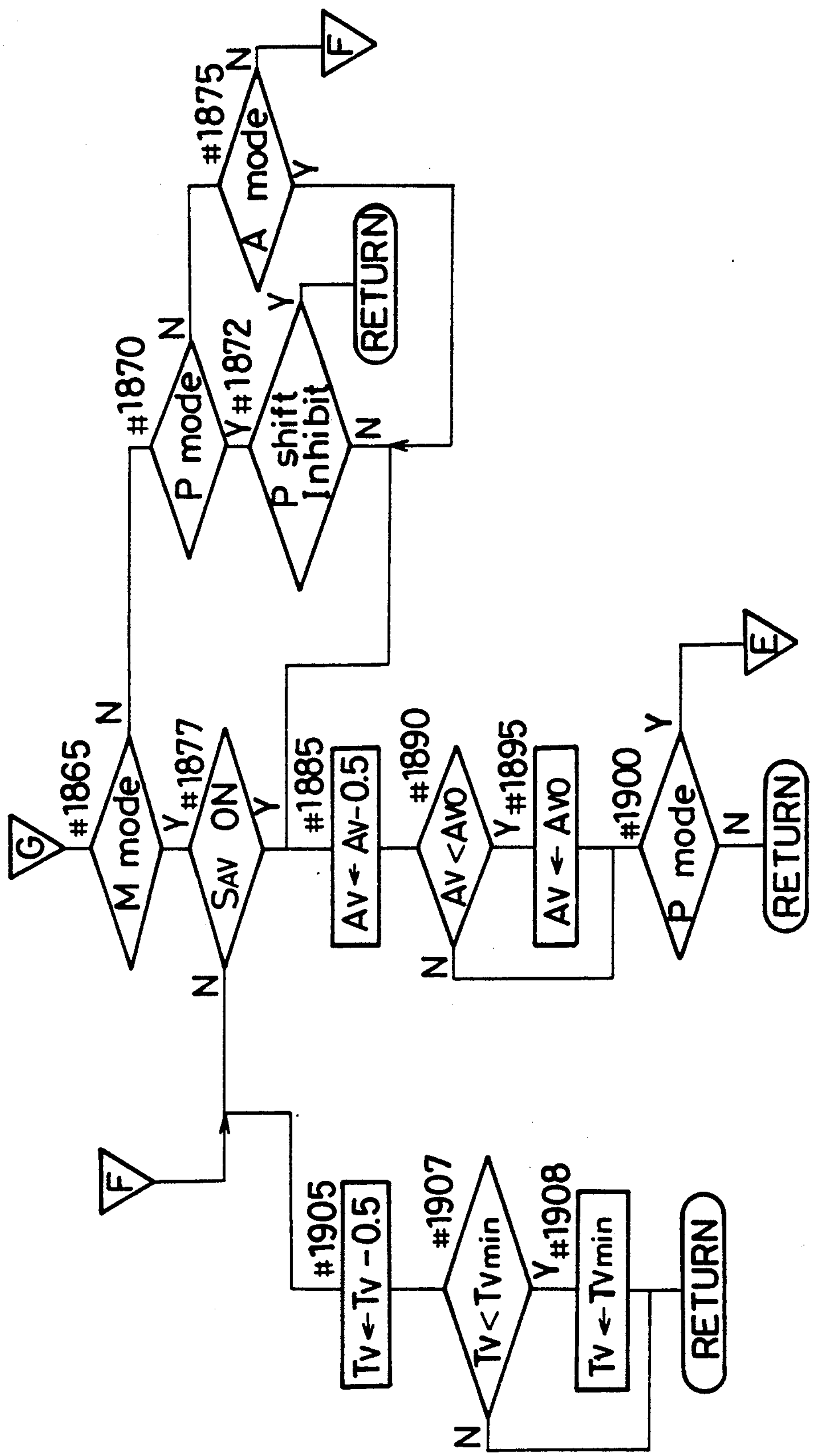
Figure 23:
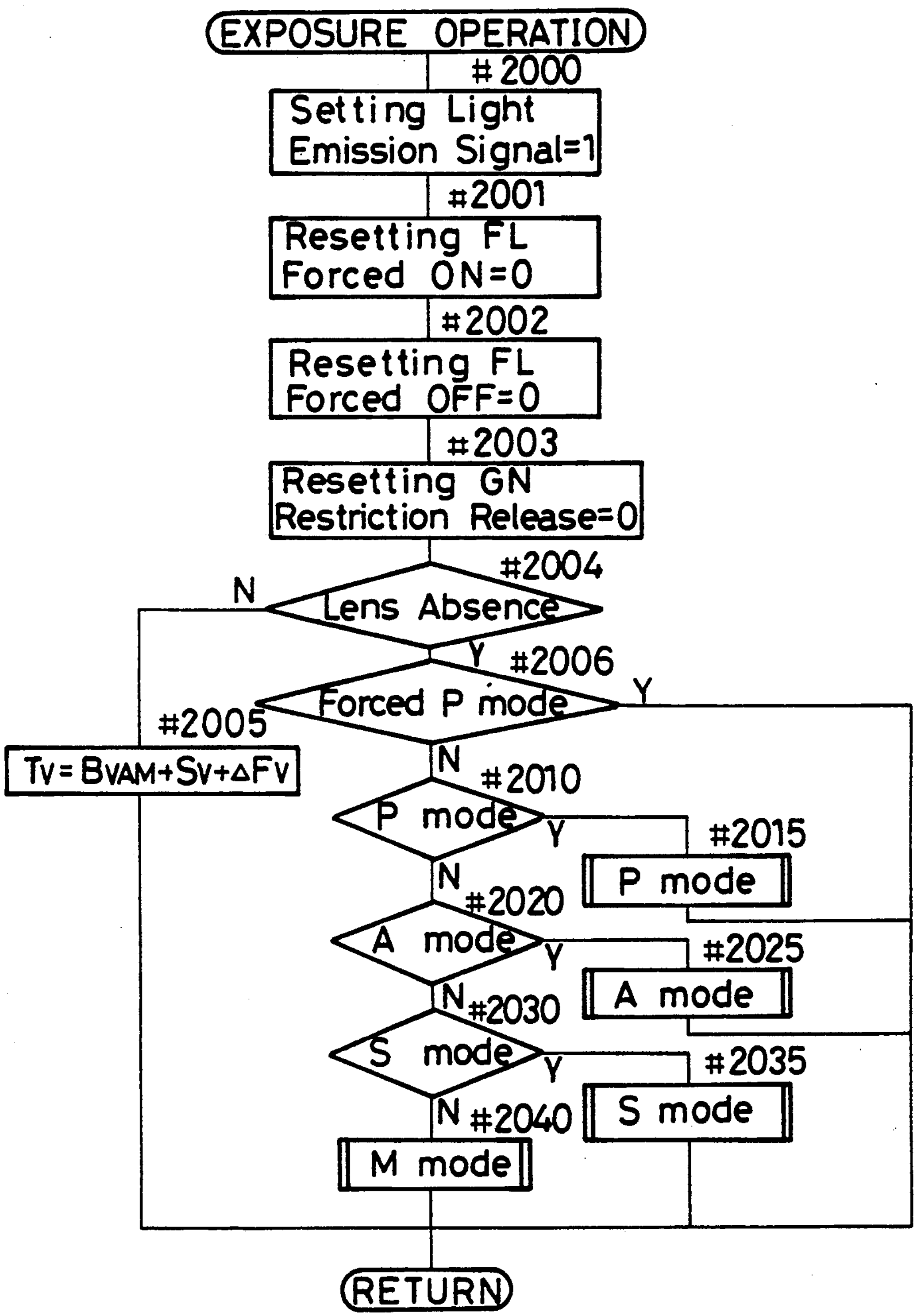
FIG. 23 is a flowchart showing a routine of an exposure operation, and FIGS. 24(*a*) to 24(*c*)

FIGS. 22(*a*) and 22(*b*) show this subroutine. In this subroutine, first, the micro-computer μC judges whether or not the up switch Sup has been turned to ON in step #1800, and when it has not been turned to ON, processing proceeds to step #1805, and it is judged whether or not the down switch Sdn has been turned to ON, and when it has not been turned to ON, processing returns. When the up switch Sup has been turned to ON, processing proceeds from step #1800 to step #1810, and it is judged whether or not the M mode has been set. When the M mode has been set ($Fb_0$, $Fb_1$=1, 0), processing proceeds to step #1811 and judgment is made on whether the diaphragm aperture value changing switch $S_{AV}$ has been turned to ON. When it has been turned to ON, processing proceeds to step #1830 and the subsequent steps as described later, and when it has not been turned to ON, processing proceeds to step #1850 to change the shutter speed.

First, description is made on changing the shutter speed. In step #1850, 0.5 Ev is added, and processing proceeds to #1855. In step #1855, judgment is made on whether or not the set shutter speed Tv exceeds the maximum shutter speed (Tvmax), and only when it exceeds, the shutter speed is limited to the maximum shutter speed (#1860), and processing returns. When it does not exceed, processing skips over step #1860 and returns.

When the set mode is not the M mode in step #1810, it is judged in steps #1815 and #1820 whether or not the set mode is the P mode or the A mode in sequence. When the set mode is the P mode ($Fb_0$, $Fb_1$=0, 0), it is judged whether or not P shift is inhibited (#1817), and when it is inhibited, processing returns. When it is not inhibited, processing proceeds to step #1830. In step #1830, 0.5 Ev is added to the diaphragm aperture value Av, and judgment is made on whether or not this value exceeds the maximum diaphragm aperture value Avmax which can be controlled (#1835). When this value exceeds Avmax, the maximum diaphragm aperture value Avmax is set as the diaphragm aperture value Av (#1840), and when it does not exceed Avmax, processing proceeds to step #1845 without performing anything, and it is judged whether or not the set mode is the P mode, and when the set mode is the P mode, processing proceeds to step #1905 of a flowchart in FIG. 22(*b*). When the set mode is not the P mode, processing returns. When the set mode is not the P mode ($Fb_0$, $Fb_1$≠0, 0) in step #1815, it is judged whether or not the set mode is the A mode (#1820), and when the set mode is the A mode ($Fb_0$, $Fb_1$=0, 1), processing proceeds to step #1830, and performs control of increasing the diaphragm aperture value Av, and when the set mode is neither of them, that is, the S mode ($Fb_0$, $Fb_1$=1, 1), processing proceeds to step #1850, performing control of increasing the shutter speed Tv.

In step #1805, when the down switch Sdn has been turned on, processing proceeds to step #1865 in FIG. 22(*b*), and judges whether or not the set mode is the M mode, and when the set mode is the M mode ($Fb_0$, $Fb_1$=1, 0), judges whether or not the diaphragm aperture changing switch $S_{AV}$ has been turned on (#1877), and if it has been turned on, in order to change the diaphragm aperture, proceeds to step #1885, and if it has not been turned on, in order to change the shutter speed, proceeds to step #1905. In step #1905, 0.5 Ev is subtracted from the set shutter speed, and judgment is made on whether or not this value is lower than the minimum shutter speed Tvmin of the camera (#1907), and when this value is lower, the speed is limited to the minimum shutter speed (#1908), and if not so, processing returns without performing anything. When the judgment in step #1877 results in the diaphragm aperture changing mode ($S_{AV}$ON), in step #1885, in order to decrease the diaphragm aperture value Av, 0.5 Ev is subtracted, and subsequently in step #1890, judgment is made on whether or not the value is smaller than the open diaphragm aperture value Avo, and when this value is smaller, the diaphragm aperture value is set to the open diaphragm aperture value Avo (#1895).

In the above-mentioned step #1890, when the diaphragm aperture value Av is not smaller than the open diaphragm aperture value Avo, processing skips over step #1895, proceeding to step #1900. If the judgment in this step #1900 results in the P mode, processing proceeds to a flow of control of increasing the diaphragm aperture value in FIG. 22(*a*) (#1850 to #1860), and if not the P mode, processing returns. When the M mode has not been set in step #1865, it is judged whether or not the P mode has been set, and if the P mode has been set ($Fb_0$, $Fb_1$=0, 0), judgment is made on whether or not P shift is inhibited (#1872), and when it is inhibited, processing returns. When it is not inhibited, processing proceeds to step #1885. When the set mode is not the P mode in step #1870 ($Fb_0$, $Fb_1$≠0, 0), processing proceeds to step #1875, and judgment is made on whether or not the set mode is the A mode, and if it is the A mode, processing proceeds to a flow of control for decreasing the diaphragm aperture value of step #1885 and the subsequent steps, and if not so, assuming the S mode, processing proceeds to step #1905, performing control of decreasing the shutter speed.

If FIG. 15, on completing control of setting Av and Tv, judgment is made on whether or not the normally opened self switch $S_{SELF}$ has been turned on. When the switch is in the OFF state ($IP_{12}$="H"), processing returns immediately.

Figure 19:
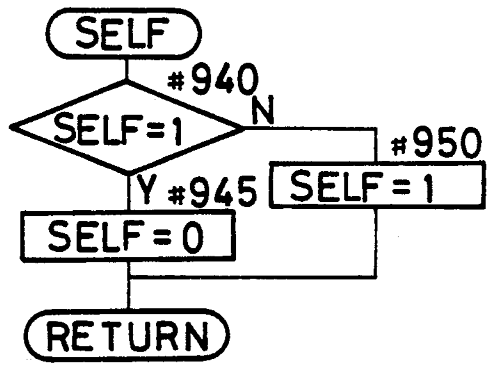
FIG. 19 is a flowchart showing a self routine.

A subroutine self for the mode when the switch $S_{SELF}$ is in the ON state ($IP_{12}$="L") is shown in FIG. 19 to be explained. When a flag SELF showing self mode has been set, processing resets this flag (#945) to get out of the self mode, and when the flag SELF has not been set, processing sets a flag SELF to execute the self mode (#950), and returns, respectively.

On completing control of data setting as shown in FIG. 15 as described above, the micro-computer μC proceeds from step #440 to step #445 in FIG. 6, and inputs photometric data from the photometric circuit LM, and prepares the spot photometric value used for exposure. Here, description is made for the photometric value in reference to the photometric range as shown in FIG. 14 and the flowchart about photometric data of the micro-computer as shown in FIG. 20.

Figure 20:
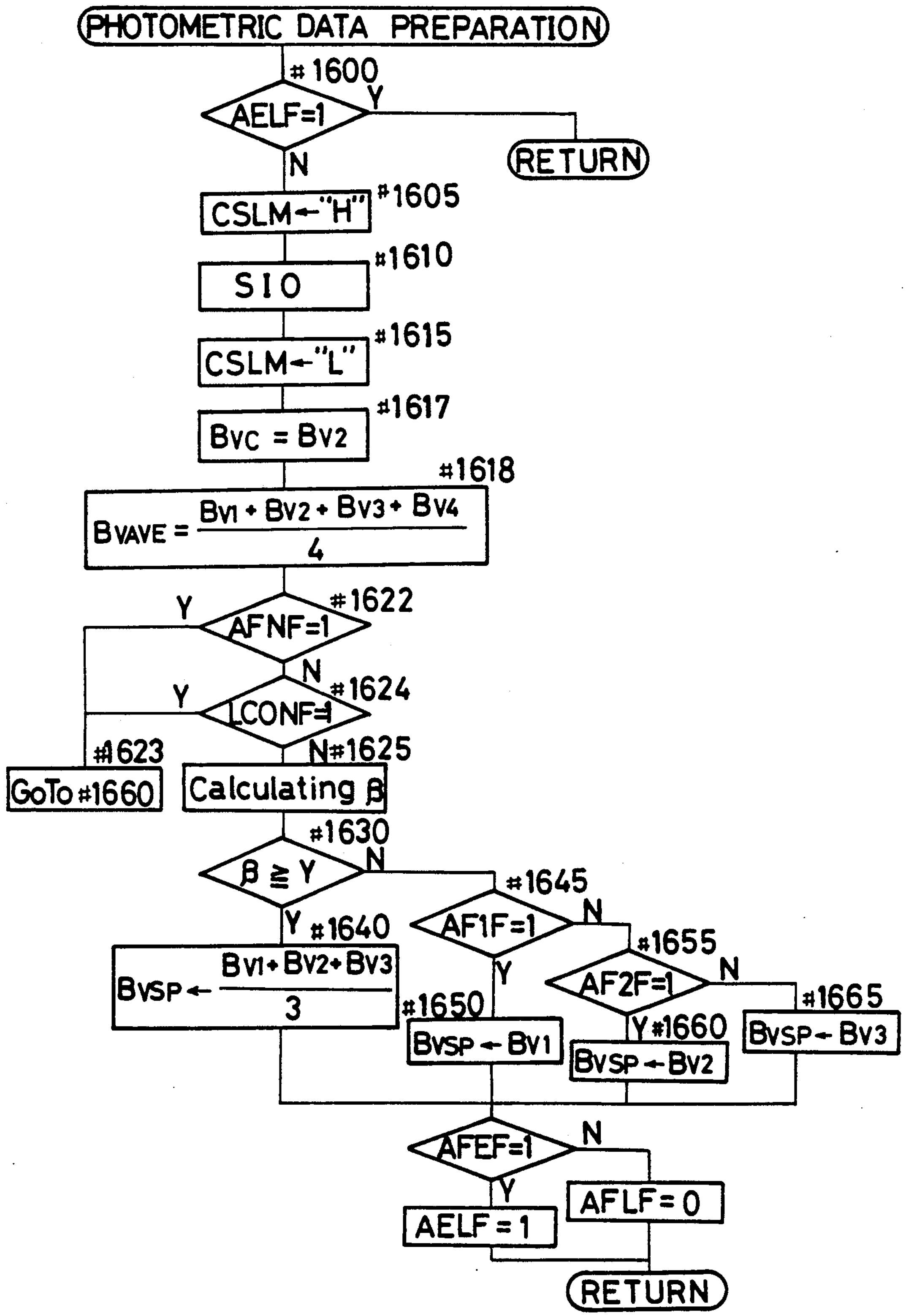
FIG. 20 is a flowchart showing a routine of preparation of a photometric data.

In FIG. 20, first, the micro-computer μC judges whether or not the flag AELF showing AE lock has been set in step #1600, and when the flag AELF has been set, processing returns without performing renewal of the photometric value. When the flag AELF has not been set, a terminal CSLM is set to the "H" level, and an instruction of output of photometric data is given to the photometric circuit LM, and serial communication is performed (#1605, #1610).

Luminance values $Bv_1$ to $Bv_4$ representative of four photometric ranges $LM_1$ and $LM_4$ as shown in FIG. 14 are inputted into the micro-computer μC by this communication. On completing the communication, the terminal CSLM is set to the "L" level (#1615). Then, in the following step #1617, the luminance value $Bv_2$ is set as Bvc and in step #1618, $B_{VAVE}$ is evaluated from the following equation:

$$B_{VAVE} = \frac{Bv_1 + Bv_2 + Bv_3 + Bv_4}{4}$$

Therefore, processing proceeds to step #1622, and judgment is made on whether or not the flag AFNF showing that the mode is not the AF mode has been set. Further, in step #1624, judgment is made on whether or not the flag LCONF showing that focus detection is impossible has been set, and when either or the above-mentioned two flags has been set, processing proceeds to the above-mentioned step #1660, and the small or narrow photometric range $LM_2$ at the center part is set as the spot value $B_{VSP}$. When neither of the flags AFNF and LCONF has been set, the distance is calculated from the number of pulses for shifting-out the lens, and an image magnification β is calculated from focal length information inputted from the lens wherein β is ratio of focal length/distance based on the calculated distance information (#1625). Then, in the next step #1630, judgment is made on whether or not this image magnification β is not less than a predetermined value Y, and the magnitude of the subject occupying the photographing image plane is determined. If the calculated value is not less than the predetermined value Y, the subject is assumed to be large, and in step #1640, an average value of the luminance values $Bv_1$, $Bv_2$ and $Bv_3$ of the respective photometric ranges $LM_1$, $LM_2$ and $LM_3$ is regarded as a spot photometric value $B_{vsp}$, and processing returns.

When the above-mentioned image magnification β is less than the predetermined value Y, the photometric range including the focus detection range used for detection of focus condition is set as the photometric value $B_{vsp}$ of the main subject. In this embodiment, the focus detection range is discriminated by that which of the flag AF1F to AF3F showing the focus detection ranges has been set. So, if the flag AF1F has been set, the luminance value $Bv_1$ of the photometric range $LM_1$ is set, and if the flag AF2F has been set, the luminance value $Bv_2$ of the photometric range $LM_2$ is set, and if the quantity of defocus of the third island $AF_3$ has been selected, the luminance value $Bv_3$ of the photometric range $LM_3$ is set respectively as the spot photometric value $B_{vsp}$ (#1645–1665).

Figure 21:
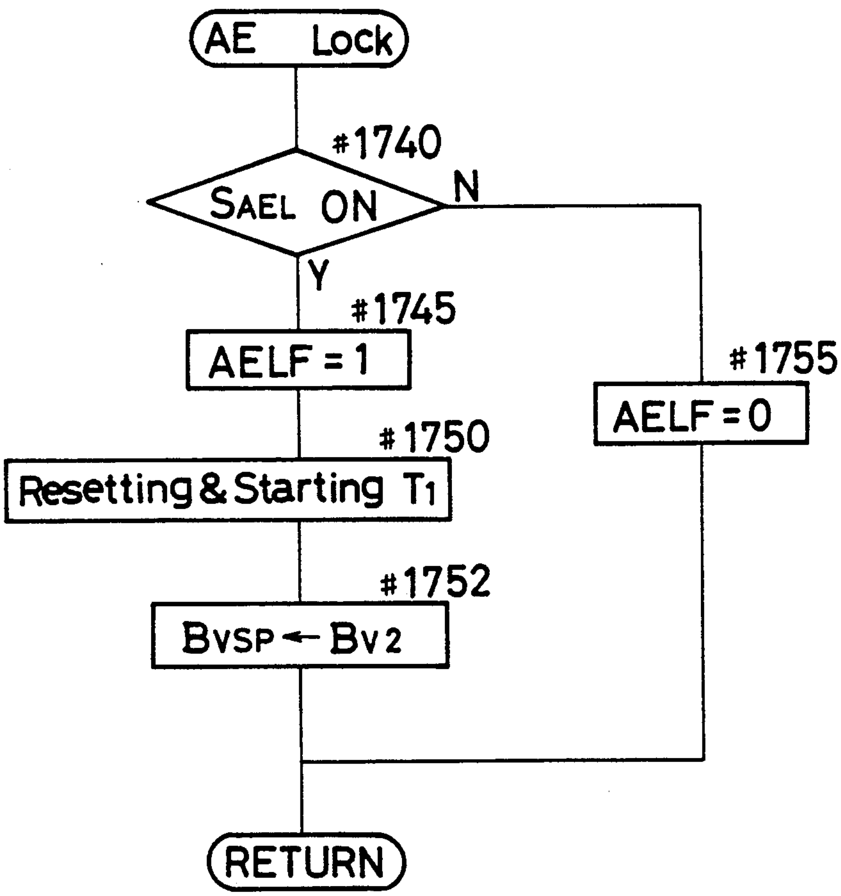
FIG. 21 is a flowchart showing a routine of AE lock.

On determining the spot photometric value in such a manner, in FIG. 6, processing proceeds to step #450, and performs the control relating to AE lock. This control is described in reference to a flowchart as shown in FIG. 21.

First, in step #1740, judgment is made on whether or not the AE locking switch $S_{AEL}$ has been turned to ON, and when it has not been turned to ON, the flag AELF is reset (#1755). When it has been turned to ON, a flag AELF is set (#1745), and the timer $T_1$ for holding power is reset and started (#1750), the luminance value $Bv_2$ is set as the spot photometric value $B_{vsp}$ (#1752), and processing returns. Thus, when the AE locking switch $S_{AEL}$ has been turned to ON, power is held for a certain time period.

In FIG. 6, on completing the control of this AE lock, the micro-computer μC performs a third time communication with the card in step #455. This data communication is described in reference to FIG. 5(*c*). The micro-computer μC judges whether or not the communication (III) exists based on a signal inputted from the card, and when it is judged that the communication (III) does not exist, processing returns. When the card has not been attached to the camera body, it is regarded as no communication (III). When the communication (III) exists, the terminal CSCD is set to the "H" (#350), and data is set (#352), which is outputted to the IC card CD (#355).

Next, the micro-computer μC performs communication once (#357), waits (#360), executes a subroutine of data output (#362), and after completing data output, turns the terminal CSCD to the "L" level (#365), and processing returns.

This subroutine of data output is shown in FIG. 5(*g*) to be explained. First, it is judged from the data obtained through the communication (II) whether or not the set mode is group specifying (#362-1). In the case of group specifying (in the sport card, the auto-depth card or the like), control of outputting data of groups $G_0$, $G_1$, $G_2$ and $G_3$ of group specifying is performed. First, the address of the group $G_0$ is set (#362-2), and serial communication is performed 15 times (#362-3).

Data of the groups $G_0$, $G_1$, $G_2$ and $G_3$ are for lens drive and AE operation as described below.

| Group | Item | Description |
|---|---|---|
| $G_0$ | Bvc | — luminance photometric value $Bv_2$ + Avo |
| | $B_{VAVE}$ | — average photometric value + Avo |
| | $B_{VA}$ | — luminance photometric value $Bv_4$ + Avo |
| | Bvs | — luminance value of main subject determined by camera body + Avo |
| | Avo (or Avmin) | — open (minimum) diaphragm aperature value of interchangeable lens |
| | Avmax | — maximum diaphragm aperature value of interchangeable lens |
| | f | — focal length of interchangeable lens |

-continued

| | | |
|---|---|---|
| | Sv | — film speed |
| | Iv | — quantity of light emission of electric flash apparatus |
| | Tvx | — synchronizing shutter speed |
| | AEFLAG | — $b_0$ 1—FLON ($STS_1 = 1$), 0—FLOFF ($STS_1 = 0$)<br>$b_1$ 1—$\beta$ usable, 0—$\beta$ unusable<br>$b_2$ 1—negative film, 0—positive film<br>$b_3$ to $b_7$ absence |
| | Dv | — subject distance |
| | $\beta$ | — image magnification |
| | Tvmin | — minimum shutter speed |
| | Tvmax | — maximum shutter speed |
| $G_1$ | K | — coefficient converting quantity of defocus into quantity of lens drive |
| | Lp | — quantity of move-out lens |
| | FLGO | — $b_0$ 1—infocus, 0—out of focus<br>$b_1$ to $b_7$ absence |
| $G_2$ | Tvc | — control shutter speed |
| | Avc | — control diaphragm aperature value |
| $G_3$ | Lpmax | — maximum quantity of move-out lens |

Next, it is judged from the data obtained by the communication (II) whether or not the data of the group $G_1$ is required (#362-4). When the data is not required, processing returns. When it is required, an address $G_1$ of the data $G_1$ is set (#362-5), and serial communication is performed three times (#362-6). Next, it is judged whether or not data of $G_2$ is required, and when it is required, an address $G_2$ is set, and serial communication is performed twice. Next, it is judged whether or not data of $G_3$ is required, and if it is required, an address $G_3$ is set, and serial communication is performed once, and processing returns. When the set mode is not group specifying, an address is set based on the address where the required data inputted from the card is stored (#362-7), and serial communication is performed by the number of times of serial communication inputted from the card (#362-8). In addition, in the communication (III), the address specifying type does not exist.

In FIG. 6, on completing the above-described data communication (III), processing proceeds to step #460, and the micro-computer $\mu C$ performs exposure operation.

Description is made for the flow of this control according to FIG. 23–FIG. 27 together with Table 6. First, in FIG. 23, the micro-computer $\mu C$ initializes light emission signal (output data to the electric flash apparatus)=1, forced flash ON=0), forced flash OFF=0 and GN restriction release=0 (#2000 to #2003). Next, in step #2004, the micro-computer $\mu C$ judges whether or not the lens has been attached based on the inputted lens data. When the lens has not been attached, the micro-computer $\mu C$ adds the film speed Sv and the exposure adjustment value $\Delta Ev$ to the photometric value $B_{VAM}$ of the photometric range $LM_4$ (in place of this, a value averaging the whole may be used), and thereby calculates the shutter speed Tv, and processing returns (#2005). Where the lens has been attached, it is judged by data inputted from the card whether or not forced P mode has been set (#2006), and in the case of the forced P mode, processing returns without performing exposure operation. Where the mode is not the forced P mode, an exposure operation is performed corresponding to each exposure mode (#2010 to #2040).

Figure 24:
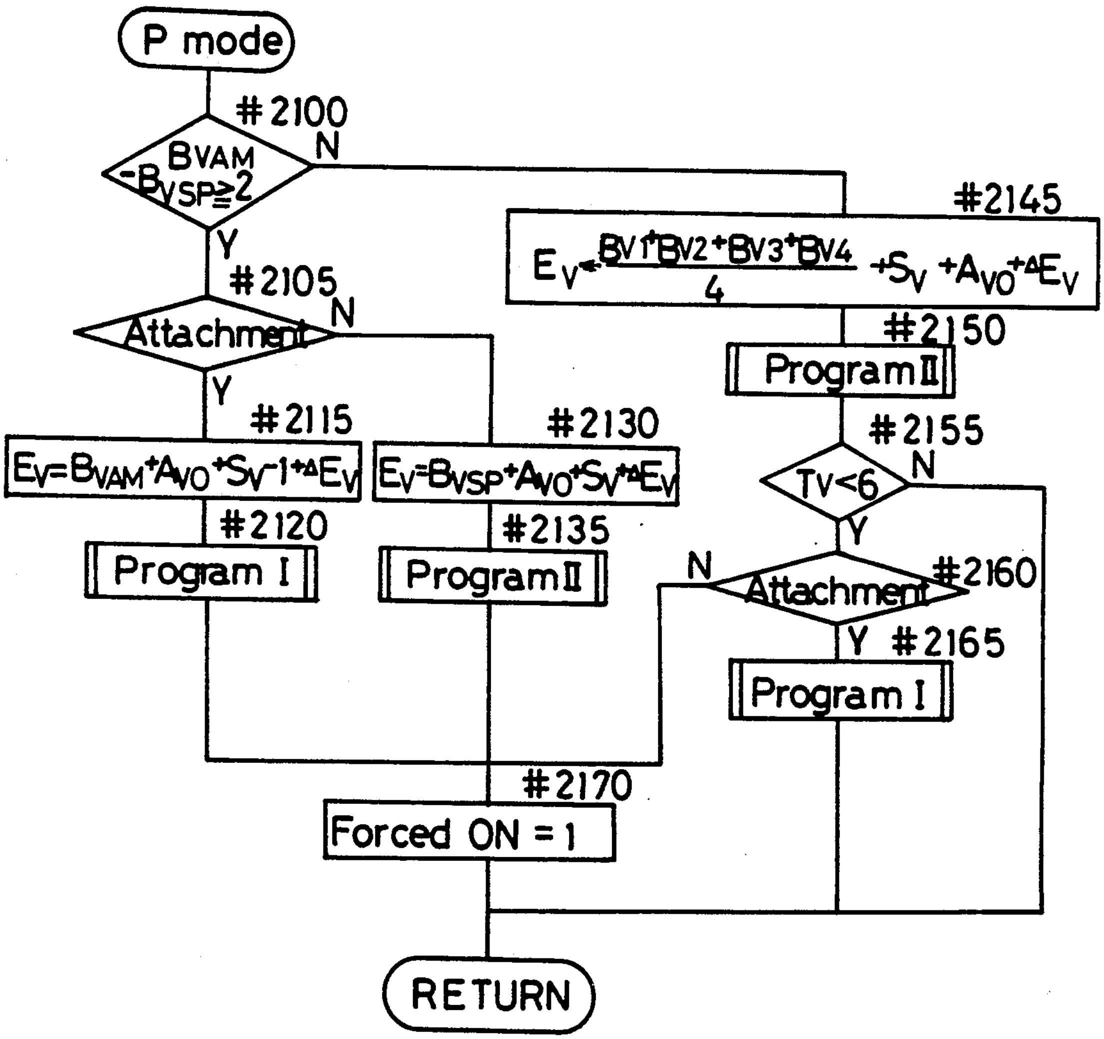
Figure 24B:
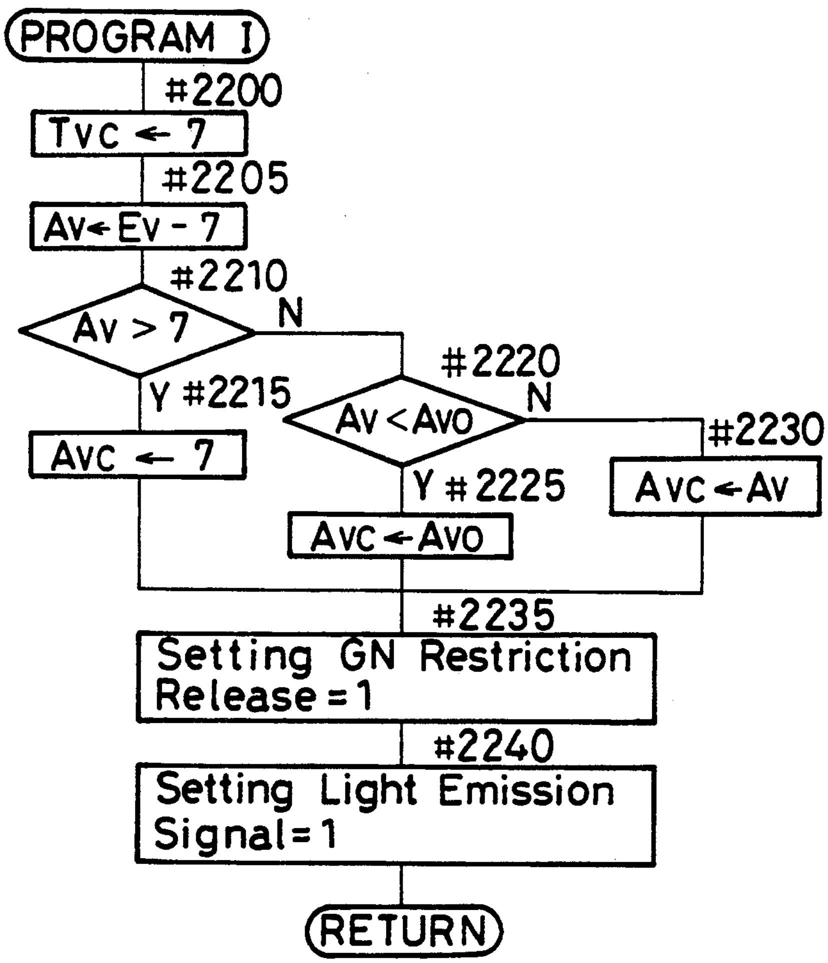
Figure 24C:
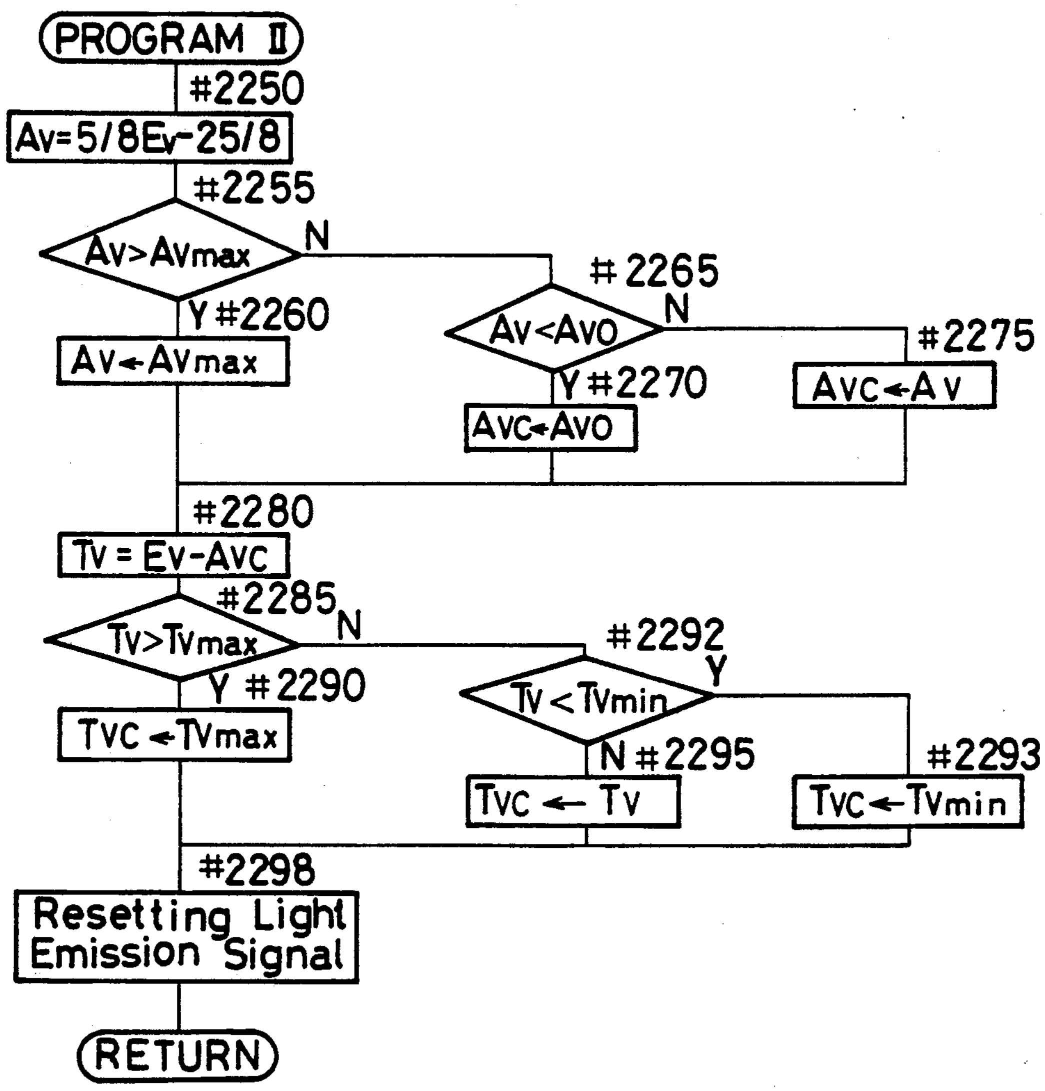

Then, an exposure operation of the P mode is shown in FIG. 24(*a*) to 24(*c*) to be explained. In step #2100 of FIG. 24(*a*), the micro-computer $\mu C$ judges the against the-light state by whether or not the difference between the photometric value $B_{VAM}$ of the photometric range $LM_4$ and the spot photometric value $B_{VSP}$ evaluated in step #445 is 2 Ev or more. If the difference is 2 Ev or more, in step #2105, judgment is made on whether or not the electric flash apparatus has been attached to the camera body (data $STS_1=1$), and when it has been attached, a control exposure value Ev is evaluated from the photometric value $B_{BAM}$ of the photometric range $LM_4$ and the like using $Ev=B_{BAM}+Avo+Sv-1-+\Delta Ev$ (#2115). Here, the reason why 1 is subtracted is because the background is raised by 1 Ev to pretend the counter light. The main subject is intended to be exposed properly by a flashlight from the electric flash apparatus. Then, processing proceeds to a subroutine (#2120) of a program 1 for determining the diaphragm aperture value Av and the shutter speed Tv, and further forced ON is set in step #2170, and returns. The above-mentioned program 1 is explained according to FIG. 24(*b*). A control value $T_{vc}$ of the shutter speed is set to a x-synchronizing speed of Tv=7 (ss=1/125) in step #2200, and the diaphragm aperture value Av is calculated by subtracting 7 (shutter speed) from the exposure value Ev (#2205). And then whether or not this diaphragm aperture value is larger than 7 (F=11) is judged in step #2210), and when this value Av is larger, the control diaphragm aperture value Avc is limited to 7 (#2215), and processing returns. When the diaphragm aperture value Av is 7 or less, it is judged whether or not the calculated diaphragm aperture value Av is smaller than the open diaphragm aperture value Avo (#2220). When the calculated value Av is smaller, the open diaphragm aperture value Avo is set as the control diaphragm aperture value Avc (#2225). When the calculated value Av is not smaller, the calculated value Av is set as the control diaphragm aperture value Avc (#2230). Then, to release GN restriction of the electric flash apparatus, a GN restriction release flag is set to 1 (#2235), and a light emission signal is set (#2240), and processing returns. This is because, in the against-the-light state or the like, the diaphragm aperture is narrowed, and if GN is restricted, sometimes the main subject is not exposed properly by an electric flashlight. Then, this is also because the photographer selects the P mode without assumption of a certain photographic scene or a certain photographic effect.

Reverting to FIG. 24(*a*), in step #2105, where the electric flash apparatus FL has not been attached, in order to achieve a proper exposure of the main subject, the control exposure value Ev is evaluated by $Ev=Bvsp+Avo+Sv+\Delta Ev$ using the spot value Bvsp of the photometric range and the like (#2130), and processing proceeds to a subroutine (#2135) of a program II for evaluating the diaphragm aperture value Av and the shutter speed Tv, and returns through step #2170 where forced ON is set.

This subroutine is shown in FIG. 24(*c*) to be explained. First, in step #2250 of FIG. 24(*c*), the diaphragm aperture value Av is evaluated by Av=5/8 Ev-25/8, and judgment is made on whether or not this diaphragm aperture value Av is larger than the maximum diaphragm aperture value Avmax of the lens (#2255). When the value Av is larger, the maximum diaphragm aperture value Avmax is set as the control diaphragm aperture value Avc (#2260), and processing proceeds to step #2280. When the diaphragm aperture value Av is not larger than the maximum diaphragm aperture value Avmax in step #2255, judgment is made on whether or not the diaphragm aperture value Av is smaller than the open diaphragm aperture value Avo (#2265), and when the value Av is smaller, the open diaphragm aperture value Avo is set as the control diaphragm aperture value Avc (#2270), and when the value Av is not smaller, the diaphragm aperture value Av is set as the control diaphragm aperture value Avc (#2275), and processing proceeds to step #2280.

In step #2280, the shutter speed Tv is calculated by subtracting the control diaphragm aperture value Avc from the exposure value Ev, and in the next step #2285, judgment is made on whether or not this value Tv is larger than a highest shutter speed Tvmax. When the value Tv is larger, the control shutter speed Tvc is limited to Tvmax (#2290), and when the value Tv is not larger, judgment is made on whether or not the value Tv is smaller than a lowest shutter speed Tvmin. When the value is smaller, the lowest shutter speed Tvmin is set as the control shutter speed Tvc (#2293), and when the value Tv is not smaller, the calculated shutter speed Tv is set as the control shutter speed Tvc (#2295). Thereafter, the light emission signal is reset (=0) in order to inhibit light emission (#2298), and processing returns.

Reverting to FIG. 24(*a*), in step #2100, when the difference $B_{VAM}-Bvsp$ is less than 2, it is assumed not to be the against-the-light state, and processing proceeds to step #2145, and the exposure value Ev is calculated from the average photometric value $(Bv_1+Bv_2+Bv_3+Bv_4)/4$ of the photometric ranges $LM_1$ to $LM_4$, diaphragm aperture value Av and the shutter speed Tv are determined by the above-mentioned program II (#2150), and thereafter judgment is made on whether or not this shutter speed Tv is less than the blurring warning speed (Tv=6, 1/60) (#2155). Then, when the speed Tv is less than the blurring warning speed, judgment is made on whether or not the electric flash apparatus has been attached (#2160), and when it has been attached, the program I of flashlight emission is executed (#2165), and processing returns. When it has not been attached (including turn-OFF of power in the electric flash apparatus), processing sets forced ON in step #2170 and returns. Where the shutter speed Tv is not less than the blurring warning speed, processing returns without performing anything.

Figure 25:
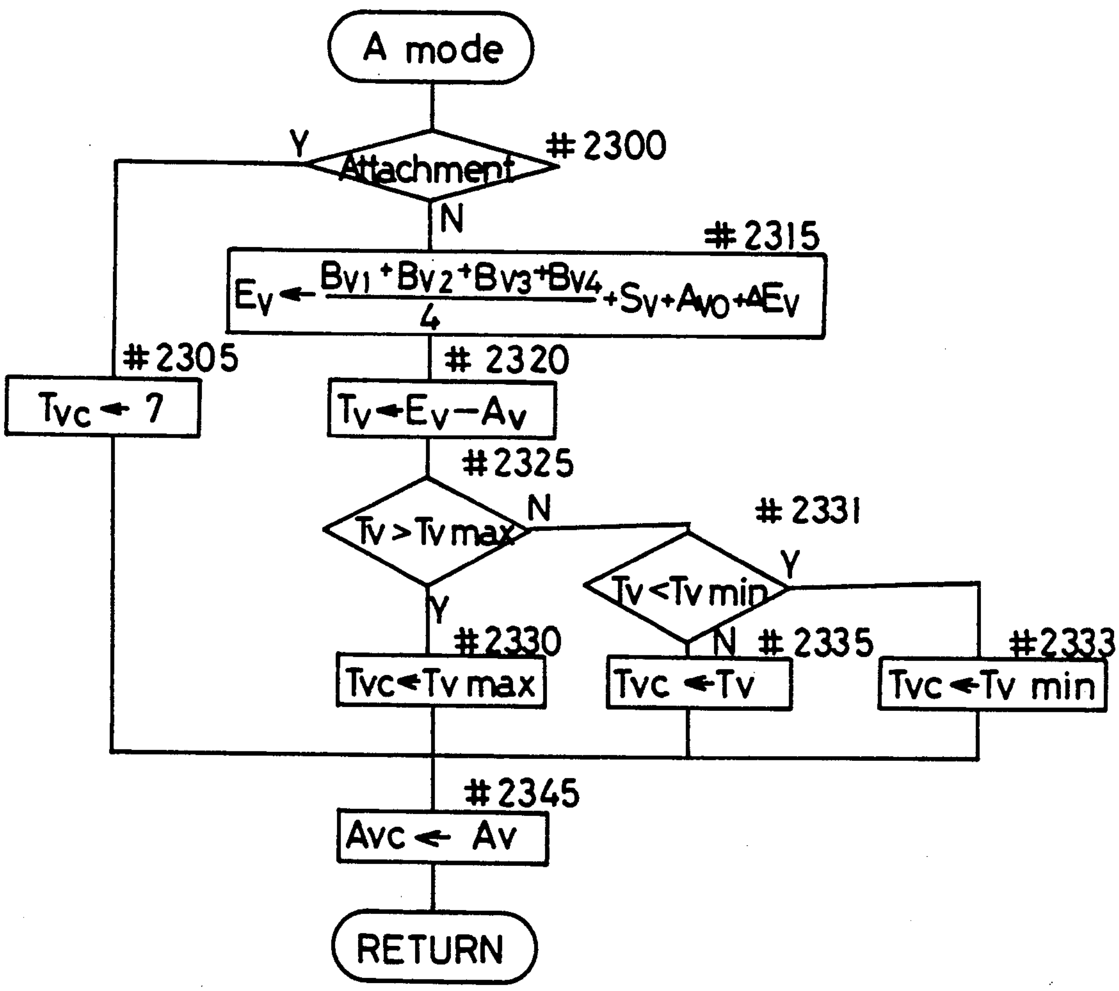
FIG. 25, FIG. 26 and FIG. 27 are flowcharts showing routines of the respective modes therein.

Next, description is made for a flowchart of determining the diaphragm aperture value Av and the shutter speed Tv in the A mode according to FIG. 25. First, judgment is made on whether or not the electric flash apparatus has been attached, and where it has been attached, the control shutter speed Tvc is set to 7 (1/125), and the set diaphragm aperture value Av is set as the control diaphragm aperture value Avc (#2300, #2305, and #2345), and processing returns. Where it has not been attached, the exposure value Ev is calculated from the average photometric value (#2315), and the value obtained by subtracting the set diaphragm aperture value Av from this exposure value Ev is set as the shutter speed Tv(#2320). Then, in the next step #2325, judgment is made on whether or not this shutter speed Tv is larger than the maximum controllable shutter speed Tvmax. When the speed Tv is higher, the maximum shutter speed Tvmax is set as the control shutter speed Tvc (#2330), and processing proceeds to step #2345. When the speed Tv is not higher, judgment is made on whether or not it is lower than the minimum controllable speed Tvmin in step #2331, and when the shutter speed Tv is lower, the minimum shutter speed Tvmin is set as the control shutter speed Tvc in step #2333, on the other hand, when the speed Tv is not lower, the calculated shutter speed Tv is set as the control shutter speed Tvc in step #2335, and processing proceeds to step #2345 respectively. In step #2345, the set diaphragm aperture value Av is set as the control diaphragm aperture value Avc.

Figure 26:
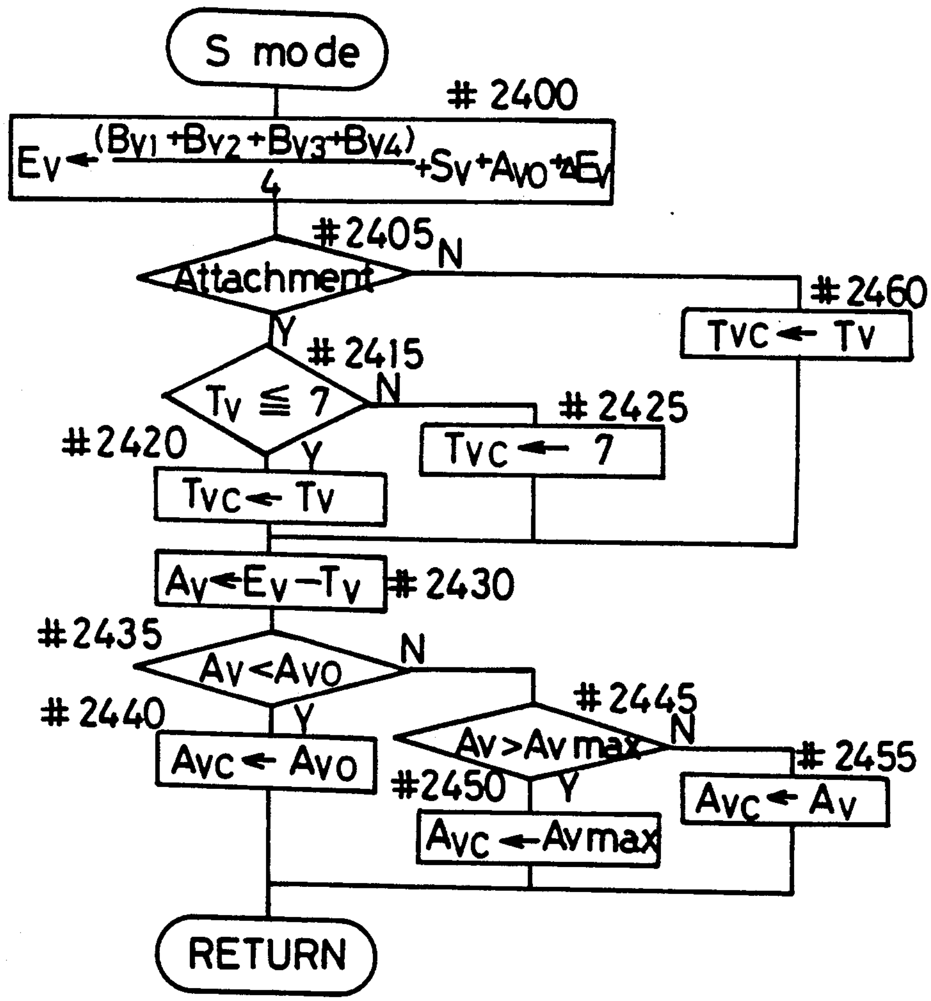
Figure 27:
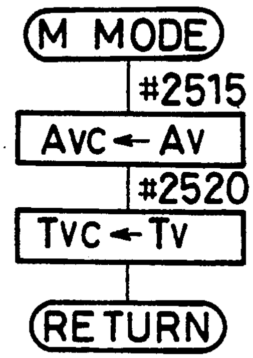

Next, description is made on control in the S mode based on FIG. 26. First, in step #2400, the exposure value Ev is evaluated from the average photometric value and the like, and in step #2405, judgment is made on whether or not the electric flash apparatus has been attached. Where it has been attached, in step #2415, it is judged whether or not the shutter speed Tv is 7 or less, and if it is 7 or less, the set shutter speed Tv is set as the control shutter speed Tvc (#2420), and if it exceeds 7, the synchronizing speed 7 is set as the control shutter speed Tvc (#2425), and processing proceeds to step #2430, respectively.

In step #2430, the diaphragm aperture value Av is calculated by subtracting the control shutter speed Tvc from the calculated exposure value Ev, and judgment is made on whether or not this diaphragm aperture value Av is smaller than the smallest aperture value Avo (#2435). When the value Av is smaller, the smallest diaphragm aperture value Avo is set as the control diaphragm aperture value Avc (#2440), and processing returns. On the other hand, where the diaphragm aperture value Av is not smaller than the smallest aperture value Avo, it is judged whether or not it is larger than the maximum diaphragm aperture value Avmax (#2445), and when it is larger, the maximum diaphragm aperture value Avmax is set as the control diaphragm aperture value Avc (190 2450), and when it is not larger, the calculated diaphragm aperture value Av is set as the control diaphragm aperture value Avc, and processing returns.

In step #2405, when the electric flash apparatus has not been attached, the set shutter speed Tv is set as the control shutter speed Tvc (#2460), and processing proceeds to step #2430, executing the flow of this step and the subsequent steps.

Next, when the mode is the M mode (refer to FIG. 27), in step #2515, the diaphragm aperture value Av set in advance is set as the control diaphragm aperture value Avc, and in the following step #2520, the shutter speed Tv is set as the control shutter speed Tvc, and processing returns.

Reverting to FIG. 6, on completing exposure operation (#460), the micro-computer μC judges whether or not a signal of requesting extension of the required time before the communication(IV) is being sent from the card (#461), and when the signal has been sent, it waits for 10 msec (#463), and when the request signal is not being sent, it performs nothing, and performs a fourth data communication with the IC card CD, respectively (#465). In the case of the defocusing card, the operating time is extended, and therefore, this request signal is sent. A flowchart of this control is shown in FIG. 5(*d*) to be explained. First, it is judged based on the signal obtained by the communication (II) whether or not the communication(IV) is required, and when it is not required, processing returns. When it is required, the terminal CSCD is turned to the "H" level (#367), and serial communication is performed with the IC card CD (#375), and the IC card is informed that the IC card is the output side. Here, processing waits for a time (#377), and inputs data from the IC card by performing serial communication with the camera body set as the input side (#382), and on completing this data communication, turns the terminal CSCD to the "L" level, and returns.

A subroutine of data input in the above-mentioned step #382 is shown in FIG. 5(*b*) to be explained. First, in step #382-1, it is judged whether or not the set mode is group specifying, and when not group specifying, the address for inputting data in the communication(IV) is taken as the address inputted from the card (#382-11), and serial communication is performed by the number of times of input from the card (#382-12), and processing returns.

In the case of group specifying, the address of the register for input in the camera body is set responding to the number $G_0$, $G_1$ or $G_2$ of each communication, and serial communication of a predetermined number of times is performed. The contents of that data in the case of the address specifying type are as follows:

(i) In the case of the custom card, the data comprises two-byte data including data for selecting the above-mentioned functions, as shown in the following table.

| | | $b_0$ | $b_1$ | $b_2$ | $b_3$ | $b_4$ | $b_5$ | $b_6$ | $b_7$ |
|---|---|---|---|---|---|---|---|---|---|
| EECSTM 0 | | | | | Blur | Continuous AF | Spot AF | Focus lock | |
| | 0 | | | | exisit | exist | exist | exist | |
| | 1 | | | | not exist | not exist | not exist | not exist | |
| EECSTM 1 | | A mode | M mode | S mode | | | | | |
| | 0 | exist | exist | exist | | | | | |
| | 1 | not exist | not exist | not exist | | | | | |

(ii) Bracket card and H/S card

ΔAv—quantity of deviation of diaphragm aperture value

ΔTv—quantity of deviation of shutter speed

Next, description is made for the case of group specifying.

$G_0$—Display data during setting —serial communication $G_1$ (Serial communication of four times):
- *Av* — Control diaphragm aperature value
- *Tv* — Control shutter speed
- *Sv* — Film speed
- $C_{TRLB}$ — $b_0$ 1—*FL* emission
  2—*FL* emission inhibit
  $b_1$-$b_7$—Missing numbers $G_2$—$\Delta Lp$—Lens drive pulses —Serial communication of one time Reverting to FIG. 6, on completing the data communication (IV) with the card, the micro-computer μC outputs data to the electric flash apparatus ST (#467). This is shown in FIG. 11(*b*) to be explained. First, the micro-computer μC judges based on the data inputted from the card whether or not the card function is in the ON state (#467-1), and when it is not in the ON state, processing proceeds to step #467-10. When it is in the ON state, based on the control signal of the electric flash apparatus inputted from the card, judgment is made on forced ON, forced OFF, GN restriction release, and light emission respectively in steps #467-2, #467-4, #467-6, and #467-8, and when the control signal shows forced ON, forced OFF, GN restiction release and non-emission of light respectively, they are set in steps #467-3, #467-5, #467-7 and #467-9, and when the above-mentioned four are not shown respectively, the signal is reset in steps #467-3', #467-5', #467-7' and #467-9' respectively, and processing proceeds to step #467-10. In step #467-10, a terminal CSFL is turned to the "H" level for a certain time $T_2$, showing to the electric flash apparatus that the set mode is the output mode of data from the camera body. The micro-computer μC of the camera body sets the input-output switching circuit I/OCG to the output side ("H"), and performs serial communication once after completion of a predetermined processing in the electric flash apparatus (#467-11 to #467-13).

Figure 28:
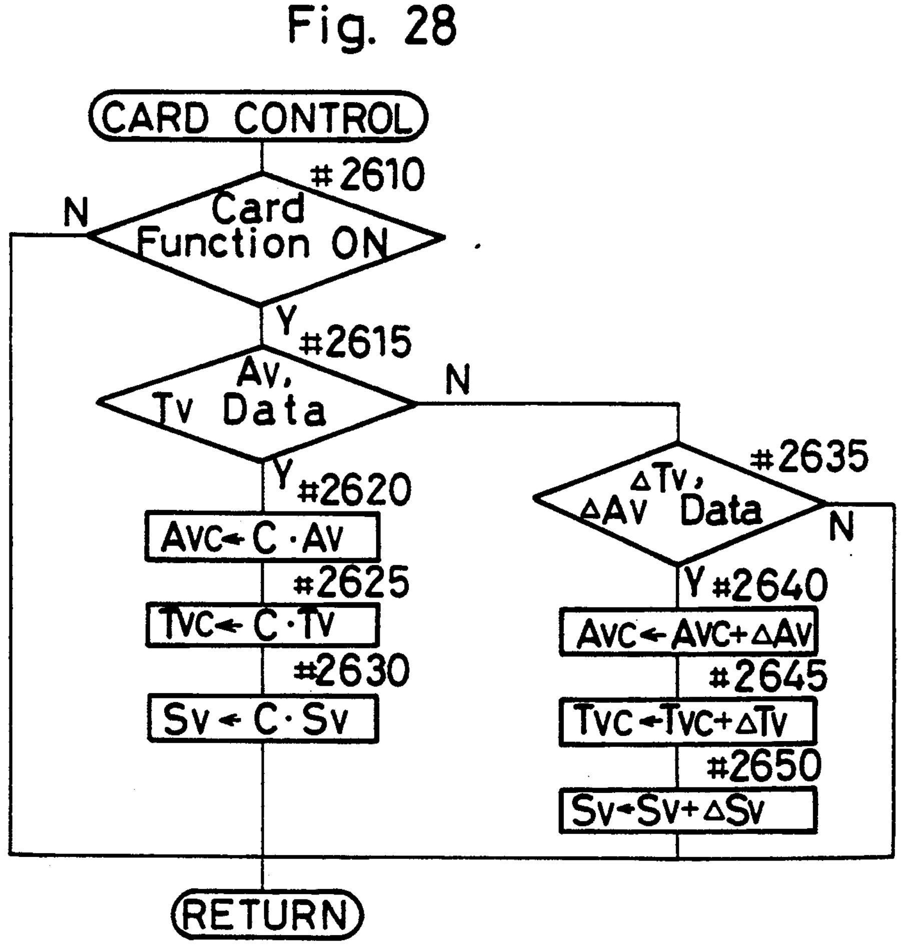
FIG. 28 is a flowchart showing a routine or control by the IC card.

In FIG. 6, on completing this card data communication(III), the micro-computer μC executes the flow of the card control in step #470. Based on the inputted data, this flow shows judgment on whether or not control of the camera body the IC card (in this case, the program card) is to be performed and operation of the camera in performing this control. This is shown in FIG. 28 to be explained. First, in step #2610, the micro-computer μC judges whether or not the camera body is controlled by the IC card based on the date inputted from the IC card CD, and when the camera is not controlled by the IC card, processing returns.

When it is judged that the camera is controlled by the IC card, judgment is made based on data of CS II-3-$b_0$, $b_3$ on whether or not the data inputted by the communication(IV) are of the diaphragm aperture value Av and the shutter speed Tv, and when the data are of Av and Tv, the control diaphragm aperture value Avc, the control shutter speed Tvc and the film speed Sv are determined from the data inputted from the IC card, respectively (#2615 to #2630).

When the above-mentioned data are not of Av and Tv, it is judged whether or not the data are of ΔAv and ΔTv (#2635). Then, when the data are not of ΔAv and ΔTv, processing returns. When the data are of ΔAv and ΔTv, ΔAv is added to the control diaphragm aperture value Avc, ΔTv is added to the control shutter speed Tvc, and processing returns (#2640 to #2645).

On completing the judgment of control of the camera by the IC card and a routine (#470) of control thereof as described above in FIG. 6, processing moves to control of display (#471).

Table 5 shows the contents of data sent from the micro-computer μC to the display controlling circuit, and description is made thereon.

Concerning the display, the following two modes exist;

(i) mode performing display based on display data sent from the camera body;

(ii) mode performing display based on display data sent from the IC cards;

Display data such as the shutter speed, diaphragm aperture value, number of film frames and the like are normally encoded and thereafter sent from the camera body to the display controlling circuit in which these data are decoded, and lighting and putting out of predetermined segments for display is controlled. And thereby, the number of display data can be reduced. For example, the shutter speed is displayed by using four-digit display elements consisting of 7 segments respectively. If this display is intended to be controlled relative to the individual display element, data of 28 bits are necessary for that. On the other hand, if the display data of the shutter speed is encoded by setting the numerical values thereof to 1/4000 ("4000" is displayed) through 30 S ("30"" is displayed) by the 0.5 Ev, 35 kinds of data, in other words, data of only 5 bits are required. Accordingly, in the case of display control on the camera body side, data of numerical values are sent after code conversion, which advantageously results in reduction of the number of data used for data transfer.

For this code conversion, it is required to provide an interpreter. In this embodiment, in the camera body, encoded display data is generated for using the interpreter, and in the IC cards, display data is generated for controlling the segments of the displays directly without using the interpreter.

Here, among the data memorized in the display controlling circuit as shown in Table 5, first, description is made for display data on the camera body side.

First, concerning $DISP_1$,

Shutter speed ($DP_{1H}$)—Encoded data of the shutter speed is memorized.

Diaphragm aperture value ($DP_{2H}$)—Encoded data of the diaphragm aperture value is memorized.

AE mode ($DP_{3H}$)—Among the P, A, S and M modes, the mode set at present is set.

Number of film frames ($DP_{4H}$)—Encoded data of the number of film frames is memorized, and bits $b_0$, $b_1$ are control data of lighting, putting out and blinking of this data display.

Film rewinded state display ($DP_{5H}$)—Data of displaying the mark which represents a patrone and the mark which represents that an end portion of a film is out of the patrone like a tongue (hereinafter, this is referred to as tongue), and a bit $b_0$ is a control data showing lighting and putting out of this data display.

Card display ($DP_{6H}$, $DP_{7H}$)—Bits $b_1$ and $b_2$ (address $DP_{6H}$) are data of lighting and putting out of the respective displays of +/− of exposure adjustment, bits $b_5$ and $b_6$ (address $DP_{6H}$) show control of selection of one shot/continuous shot and putting-out of display thereof, bits $b_0$ and $b_1$ (address $DP_{7H}$) are control data of blinking, lighting and putting out of card mark display, and bits $b_4$ and $b_5$ (address $DP_{7H}$) show control of switch-over of display of multi-spot AF/spot AF and putting out thereof, respectively.

Data change display ($DP_{8H}$)—Location showing data change and control of lighting and putting out are shown.

Control data ($DP_{9H}$, $DP_{AH}$)—Data showing the sequence of the camera.

$b_0$—Putting out all display segments (the main switch $S_M$ OFF)

$b_1$—Standby (the main switch ON, and $S_1$ OFF)

$b_2$—Card display $b_3$—During initial load $b_4$—$S_1$ ON $b_5$—During rewinding $b_6$—One-shot AF $b_7$—M. AF (Manual AF)

$b_0$ of $DP_{AH}$—Self mode

Next, concerning $DISP_{II}$ by LED $b_0$—Presence/absence of infocus display $b_1$—Presence/absence of focus condition detection impossible $b_2$—Presence/absence of the follow mode $b_3$—Presence/absence of multi-spot AF $b_4$—AF/M Hereinafter, description is made for display data on the card side.

$DP_{1H}$—7-segment data ($b_0$ to $b_6$) in the first position for the shutter speed, which is displayed on the left end side in the top area $b_7$—| (vertical line) of display "+"

$DP_{2H}$—7-segment data in the second position for the shutter speed, which is displayed in the second element from the left end $b_7$—− (horizontal line) of display "+"

$DP_{3H}$—7-segment data in the third position for the shutter speed, which is displayed in the third element from the left end $b_7$—control of card display $DP_{4H}$—7-segment data in the fourth position for the shutter speed, which is displayed in the fourth element from the left end $DP_{5H}$—7-segment data ($b_0$ to $b_6$) in the first position for the diaphragm aperture value, which is displayed in the second element from the right end side $b_7$—control of decimal point display for the aperture value $DP_{6H}$—7-segment data in the second position for the diaphragm aperture value, which is displayed on the right end side $DP_{7H}$—14-segment data: the number in the double figure in the position for the number of film frames, which is located on the right end in the middle area $DP_{8H}$—

$b_0$—missing $b_1$—missing $b_2$—A $b_3$—M $b_4$—S $b_5$—P $b_6$—patrone $b_7$—tongue When display is performed based on data from the cards, a bit $b_2$ of data $DP_{9H}$ is set to "1".

Figure 98:
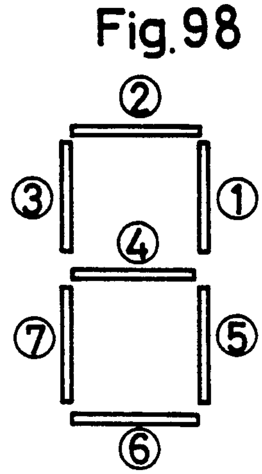
FIG. 98 is a view showing an example of an element of display consisting of 7 segments.

When numbering each segment as shown in FIG. 98, segments ① to ⑦ correspond to bits $b_0$ to $b_6$ respectively, and in the case of displaying "3", segments ①, ②, ④, ⑤ and ⑥ are lit by a signal, bits "$b_7$–$b_0$" of which are set to "*0111011" ("1" represents lighting, "0" represents putting out and bit $b_7$ is wild).

In order to perform display in a blinking way, display data has only to be set to "1→0→1" cyclically. Relating to this blinking, needless to say, the above-described display control is performed, so that description on data change on the card side is omitted, and only the contents of display are illustrated.

Figure 29:
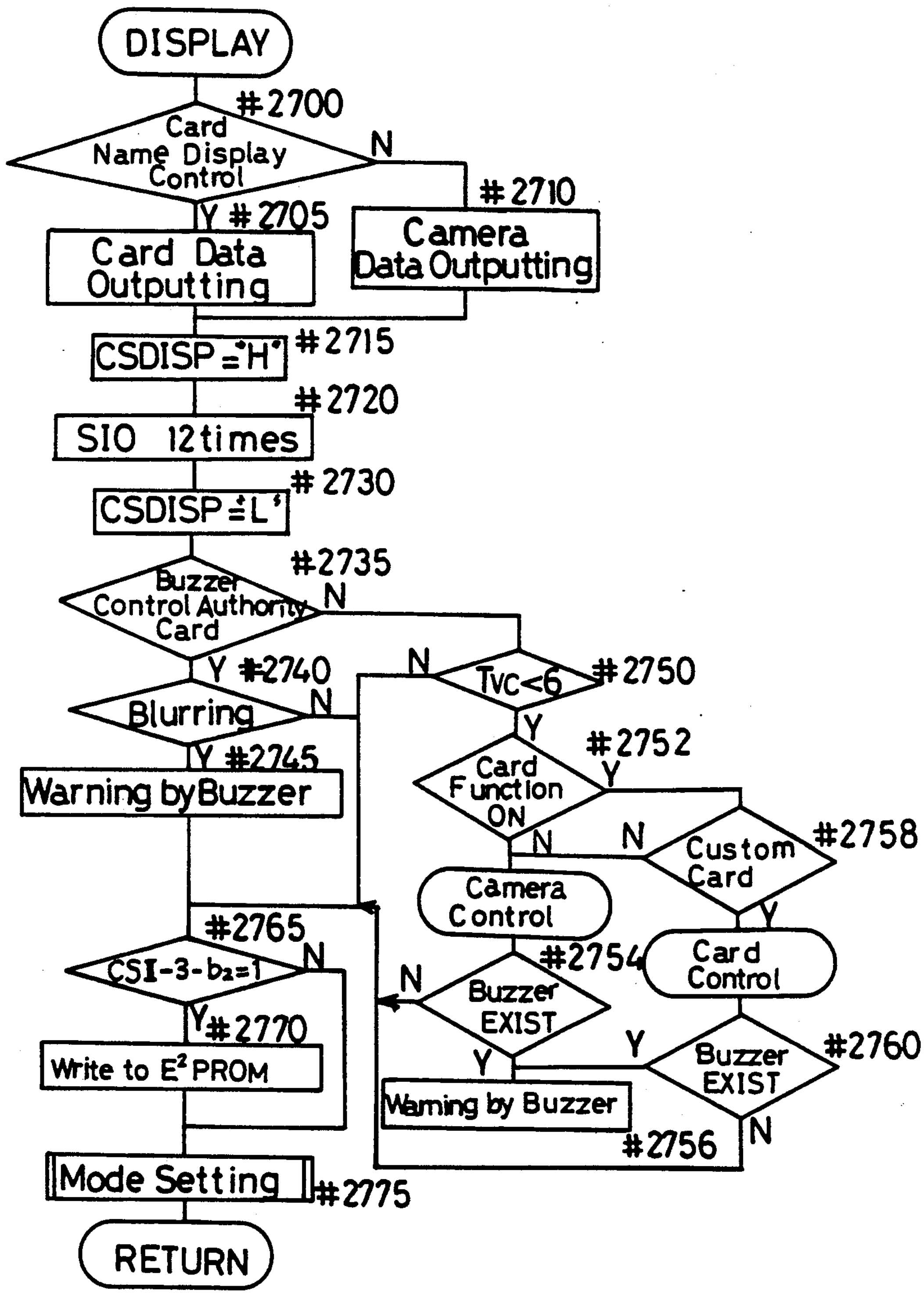
FIG. 29(*a*) is a flowchart showing a routine of display, FIG. 29(*b*) is a flowchart showing a routine of interrupt relating thereto, FIGS. 29(*c*) to 29(*e*) are views showing examples of display, and FIG. 29(*f*) is a flowchart showing a routine of mode setting in the routine shown in FIG. 29(*a*).
Figure 29B:
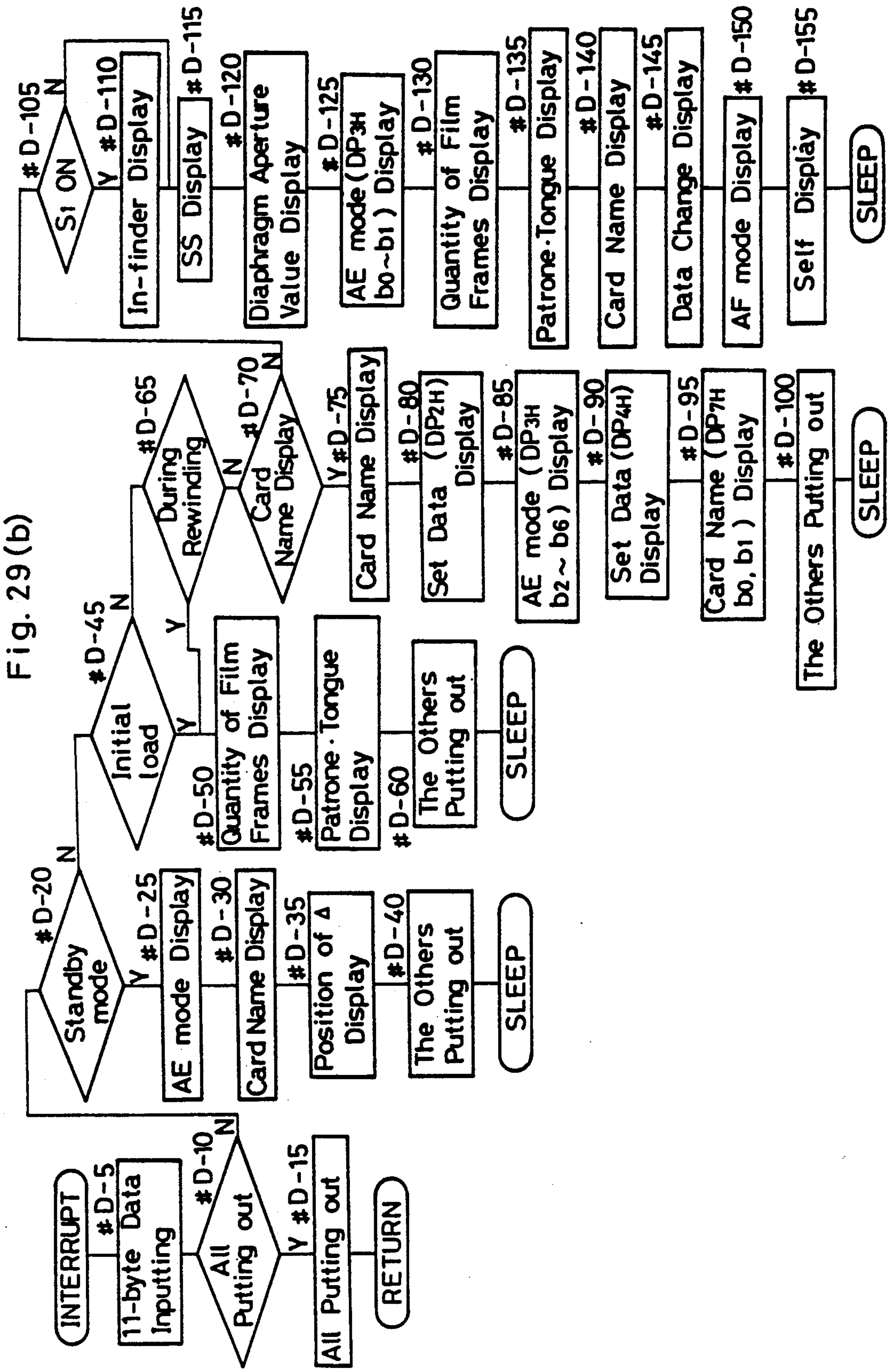
Figure 29:
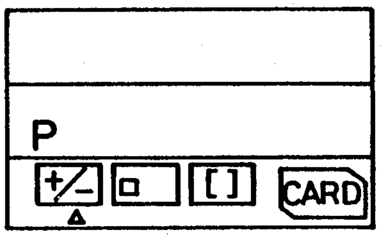
Figure 29:
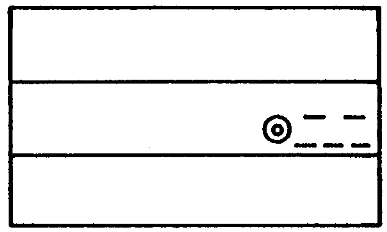
Figure 29:
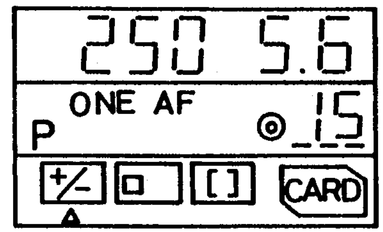
Figure 29:
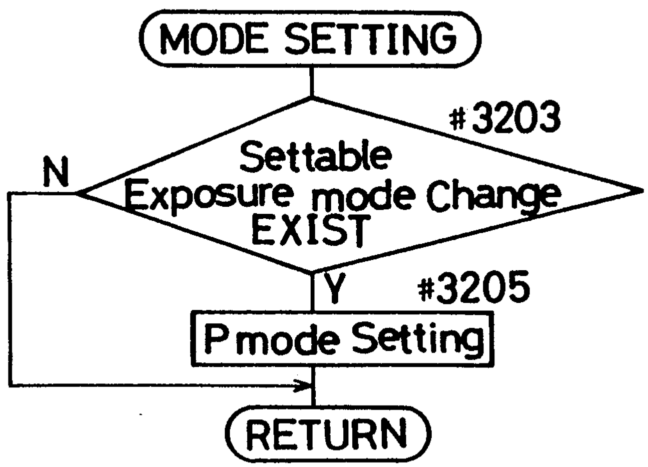

A flowchart of the micro-computer for display controlling this display is shown in FIG. 29(*b*) to be explained. When a signal changing from "L" to "H" is inputted from a terminal CSDISP of the micro-computer μC of the camera body to the display controlling circuit DISPC, an interrupt as shown in FIG. 29I*b*) is executed, and display data from the camera body (refer to Table 5) is inputted by an amount of 12 bytes by performing serial communication (#D-5). It is judged from the inputted control data whether or not the set mode is the all erase mode (#D-10), and when the set mode is the all erase mode ($DP_{9H}$, $b_0=1$), all erase is set which displays nothing (#D-15). When the set mode is not the all erase mode ($DP_{9H}$, $b_0=0$), it is judged whether or not the set mode is the standby mode (#D-20), and when the set mode is the standby mode ($DP_{9H}$, $b_1=0$), display of the AE mode set at present is performed based on bits $b_0$ and $b_1$ of $DP_{3H}$(#D-25). The card is displayed based on information of $DP_{6H}$ and $DP_{7H}$, and the position of the triangle cursor is displayed based on data of data change display of $DP_{8H}$, and the other lights are put out. FIG. 29(*c*) shows an example thereof. FIG. 29(*c*) represents display of the P mode, presence of the card function, the cursor mark Δ at the position of exposure adjustment, absence of exposure adjusting function, the one-shot mode and the multi-spot AF mode.

When the set mode is not the standby mode in the above-mentioned step #D-20, it is judged whether or not the state is initial load (#D-45). When the state is initial load ($DP_{9H}$, $b_3=1$), only display of number of film frames ($DP_{5H}$) and marks of patrone and tongue are displayed, and the other lights are put out (#D-50 to #D-60). FIG. 29I*d*) shows the display of $DIS_I$ while a film is loaded and the state is under initial load. During rewinding ($DP_{9H}$, $b_5=1$), a display "——" in FIG. 29*d*) shows the state under rewinding at that time.

When the film is not under rewinding, it is judged whether or not the set mode is card display (#D-70). In the case of card display ($DP_{9H}$, $b_2=1$), data of $DP_{1H}$ is decoded, card name display is performed, and the numerical value is displayed based on data or $DP_{2H}$, display of "during selection" representing selection by the IC card is performed using bits $b_2$ to $b_6$ of $DP_{3H}$, and further numerical value display is performed based on data of $DP_{4H}$, and control of display of the card is performed based on bits $b_0$ and $b_1$ of $DP_{7H}$ (#D-57 to #D-95). Detailed description is made later for display of this card. When the judgment in step #D-70 results in that the set mode is not the card display mode, processing proceeds to step #D-105, and judges whether or not the switch $S_1$ has been turned to ON, and when it has been turned to ON, performs in-finder display based on in-finder information (#D-110), and when it has not been turned to ON, does not perform in-finder display, proceeds to step #D-115, respectively.

Thereafter, display of the shutter speed as is performed based on information of $DP_{1H}$, display of the diaphragm aperture value is performed based on information of $DP_{2H}$, display of the AE mode is performed based on bits $b_0$ and $b_1$ of $DP_{2H}$, display of the number of film frames is performed based on $DP_{3H}$, display of patrone is performed based on $DP_{4H}$, display of data relating to the card is performed based on information of $DP_{6H}$, and $DP_{7H}$, display of data change (Δ) is performed based on information of $DP_{8H}$, and display of the AF mode and self is performed based on bits $b_6$ and $b_7$ of $DP_{9H}$, and a bit $DP_{1OH}$, (#D-115 to #D-155).

Next, description is made for one example thereof in reference to FIG. 29(*a*) showing a flowchart of display control of the camera body side (preparation of display data). First, in step #2700, it is judged based on the data obtained by the communication (II) with the card whether or not the set mode is card display control, and when the set mode is card display control, the mode of outputting the information inputted from the card at it is set, and serial communication is performed 12 times (#2705 to #2730). On the other hand, when the set mode is not the card display control, the mode of outputting encoded data prepared by the camera body [the shutter speed, the diaphragm aperture value, the number of film frames and the like—refer to FIG. 29(*e*)] is set (#2710), and serial communication is performed 12 times (#2710). Next, in step #2735, it is judged based on the data inputted from the card whether or not the card side has authority to control a buzzer, and when the card side has the authority of control, judgment is made on whether or not a blurring warning signal has been given from the card (#2740). When the blurring warning signal has been given, warning by buzzer is performed (#2745), and processing proceeds to step #2765. When the blurring warning has not been given, processing proceeds to step #2765 without giving warning by buzzer. That is, the set of presence or absence of a warning-by the buzzer based on the custom card is ignored. When the card has no authority of controlling the buzzer, judgment is made on whether or not the shutter speed determined by the camera body is less than 6 (#2750), and when it is not less than 6, processing proceeds to step #2765. When the speed is less than 6, it is judged based on the data inputted through the communication(II) whether or not the card function has been turned to ON, and when it has not been turned to ON, it is judged by the data of the $E^2PROM$ in the camera body whether presence or absence of warning by buzzer has been set (#2754), and when the presence has been set, warning by buzzer is performed, and when the absence has been set, no warning by buzzer is performed, and processing proceeds to step #2765.

When the card function has been turned to ON, judgment is made on whether or not the set card is custom card (#2758), and when the set card is not the custom card, processing proceeds to camera control, performing the above-described control. When the set card is the custom card, it is judged based on data of the communication(IV) inputted from the card whether or not warning by buzzer is present (#2760), and when it is present, a warning by the buzzer is performed (#2756), and processing proceeds to step #2765. On the other hand, when it is not present, processing proceeds to step #2765 without performing a warning by the buzzer. In step #2765, judgment is made on whether or not a signal of control of writing to the $E^2PROM$ has been inputted from the custom card, and when it has been inputted, two byes of data EECSTM from the custom card through the communication(IV) are written (#2770), and processing proceeds to step #2775. When the signal of write control has not been inputted, processing skips over the step #2770 and proceeds to step #2775. Step #2775 is a subroutine of performing mode setting.

Here, a subroutine of the above-mentioned mode setting is shown in FIG. 29(*f*) to be explained. Here, judgment is made on whether or not the mode set at present in the camera body is among modes set anew, and if not, it is moved to another set mode. For example, where the A mode has been set at present, but the A mode has been excluded from selection of the exposure mode by the IC card, it is improper to perform the A mode display and control thereof as before, and therefore this is prevented.

Now, in the flow of FIG. 29(*f*), first the micro-computer μC judges by comparing the data of the $E^2$PROM with the data inputted from the IC card CD whether the exposure mode capable of setting has been changed (#3202), and when they differ from each other (that is, when a change has been made), data ($Fb_0$, $Fb_1$) is set to (0, 0) to set the exposure mode forcedly to the P mode (#3205), and processing returns.

On completing the above-described display control (#471) in FIG. 6, the micro-computer μC proceeds to step #472, and judges whether or not self time counting is being made, and when time counting is being made (SPL=1), it judges whether or not 10 seconds have elapsed (#474). When 10 seconds have elapsed, processing proceeds to step to control exposure (#490).

When 10 seconds have not elapsed, it returns to step #180. When self time counting is not being made (SPL=0), processing proceeds to step #473, and judgment is made on whether or not the release witch $S_2$ has been turned to ON, and when the switch $S_2$ has not been turned ON ($IP_7$="H"), processing proceeds to step #520, and permits all interrupts, and returns. When the switch $S_2$ has been turned to ON ($IP_7$="L"), the micro-computer μC judges whether or not the data of release inhibit obtained by the communication (II) has been set (#475), and when the data has been set, processing proceeds to step #520. On the other hand, when the data has not been set, the micro-computer μC judges whether or not the self mode has been selected, an if not selected (SELFF=0), processing proceeds to step #481.

When the self mode has been selected (SELFF=1), the flag SLP showing self time counting is set (#477), and time counting timer (separate from power hold timer) is reset and started (#478). Then, to perform power hold, the flag OPF is set (#479), an AE lock flag AELF is set (#480), the measured value is fixed, and processing proceeds to step #180.

In step #481 whereto processing proceeds when the set mode is not the self mode ($IP_{12}$="H") in step #476 of FIG. 6, judgment is made on whether or not the set mode is the manual focus mode [MFF=1 (focus lock, or manual focus condition adjustment only for focus condition detection], and if the set mode is the manual focus mode, processing proceeds to step #490. When the set mode is not the manual focus mode, processing proceeds to step #485. In step #485, judgment is made on whether or not the flag AFEF showing the infocus state has been set, and when the flag has not been set, processing passes through the step #520 and returns. When the flag AFEF has been set, processing proceeds to step #490 likewise the above-mentioned case where the set mode is not the AF mode, inhibits all interrupts, and susequentially performs the communication (V) with the card in step #492.

This is shown in FIG. 5(*e*) to be explained. First, the micro-computer μC judges presence or absence of the communication (V), and when it is absent, returns, and when it is present, turns the terminal CSCD to the "H" level (#390), sets data showing the communication (V) (#391), sets the camera body as output side (#392), and performs serial communication once (#393). Next, processing waits for a predetermined time (#394), and the camera body is set as input side (#395), serial exchange is performed eight times (#396), the terminal CSCD is turned to the "L" level (#397), and processing returns. This data is data for memory of the memory card.

Here, description is made for the contents of data as shown on Table 6.

(i) Number of film frames
(ii) Open F value Avo
(iii) Control F value Avc
(iv) Control shutter speed Tvc
(v) Exposure adjustment value
(vi) Exposure mode
(vii) Exposure mode
(viii) Film speed On completing the communication (V), processing proceeds to step #495, and performs exposure control (as described later). Thereafter one-frame winding of the film (as described later) is performed in step #500, and judgment is made on whether or not the release switch $S_2$ is in the ON state in step #505, and when the switch $S_2$ is in the ON state ($IP_7$="L"), the micro-computer ηC judges whether or not a signal of forced continuous advancing has been inputted from the card. When the signal has been inputted, processing proceeds to step #515, and when the signal has not been inputted, it is judged in step #510 whether or not the mode is the continuous-advancing mode. Here, in the case of the continuous-advancing mode ($Fb_3$=1), all interrupts are permitted in step #515, and processing proceeds to the routine S0. When the mode is not in continuous-shot mode ($Fb_3$=0), processing returns to step #505, and waits until the release switch $S_2$ is turned to OFF. And when it is turned to OFF, processing permits all interrupts in step #520, and returns.

Figure 30A:
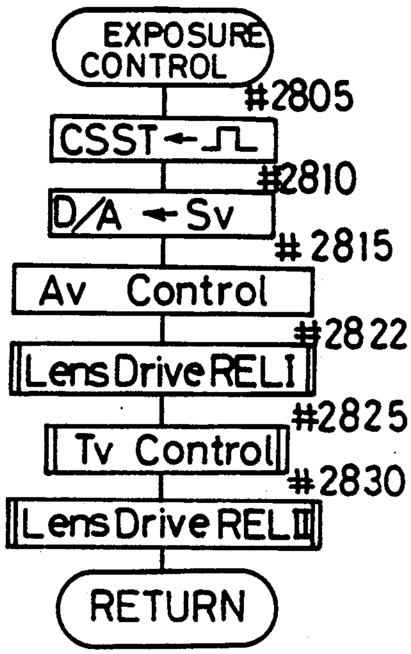
FIG. 30(*a*) is a flowchart showing a routine of exposure control, FIGS. 30(*b*) and 30(*c*) are flowcharts showing routines of lens drive therein, and FIG. 30(*d*) is a flowchart showing a routine of shutter speed control in the routine shown in FIG. 30(*a*).
Figure 30B:
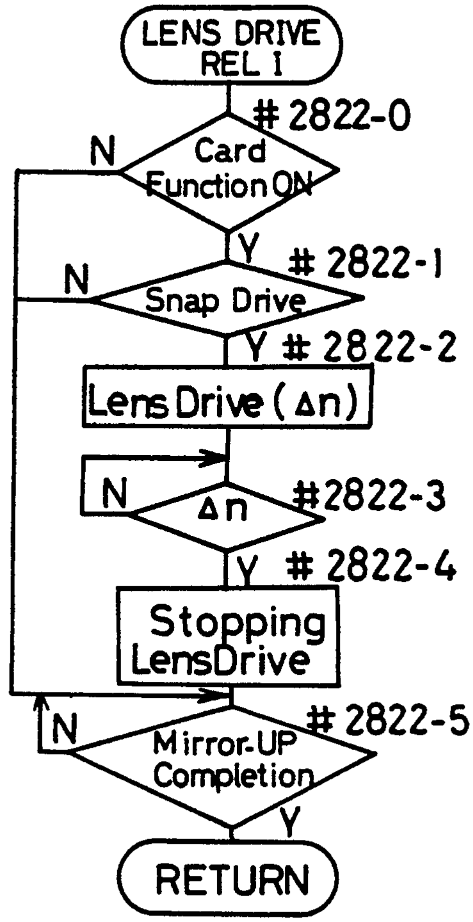
Figure 30C:
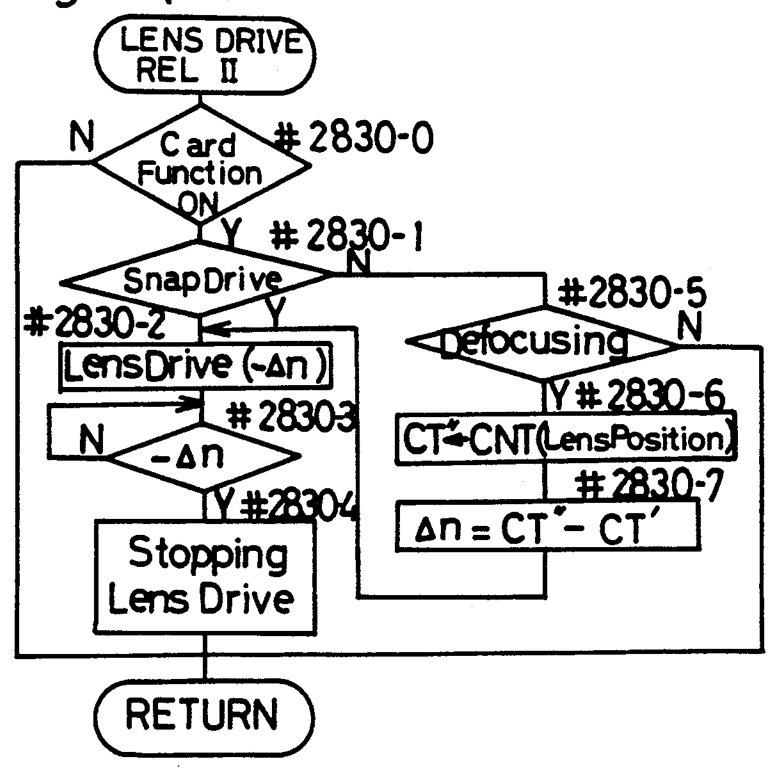
Figure 30:
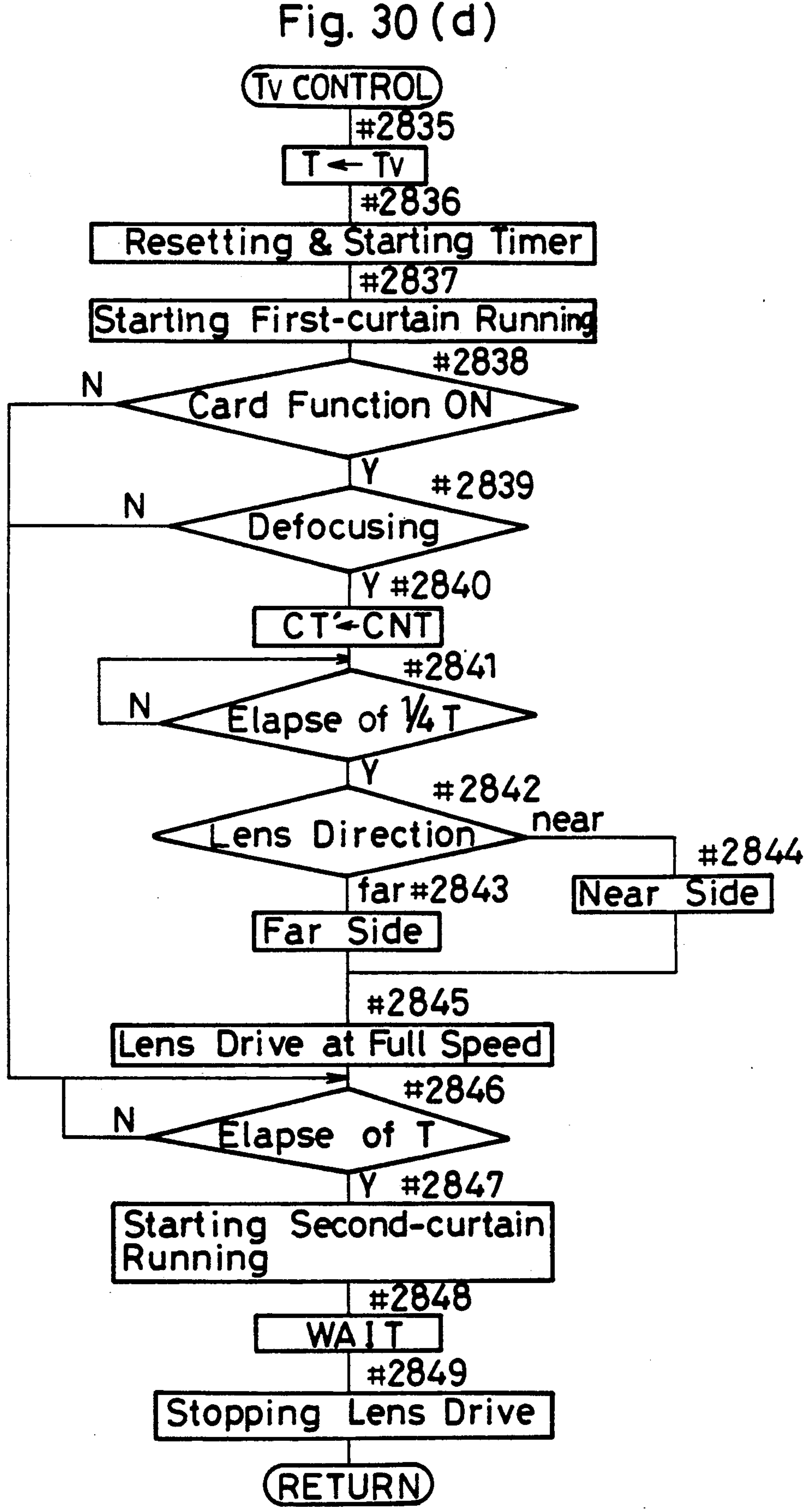

Next, a subroutine of exposure control in the above-mentioned step #495 is shown in FIG. 30(*a*) to be explained. First, in step #2805, the terminal CSST is turned to the "H" level for a time $t_3$, and it is shown to the electric flash apparatus ST that the set mode is the exposure mode. Then, the film speed Sv is outputted to the light adjusting circuit STC after D/A conversion into analog data (#2810). In the next step #2815, diaphragm aperture control is performed based on the control diaphragm aperture value Avc, and mirror-up control is performed. Next, lens drive is performed during release. This is shown in FIG. 30(*b*) to be explained. First, judgment is made on whether or not the card function is in the ON state (#2822-0), and in the case of ON, judgment is made on whether or not a signal of snap drive bit showing lens drive during release inputted from the IC card has been inputted in step #2822-1, and when the signal showing the card function OFF on snap drive has not been inputted, processing proceeds to step #2822-4, and waits until completion of mirror-up. And when the mirror-up is completed ($IP_{20}$="L"), processing returns. When the above-mentioned signal has been inputted, the lens is driven by a quantity Δn of lens drive inputted from the card (#2822-3), and is stopped (#2822-4), and processing waits until completion of the mirror-up (#2822-5). On completing the mirror-up ($IP_{20}$="L"), processing returns.

Reverting to FIG. 30(*a*), control of the shutter speed is performed (#2825), and control of lens drive REL II during release is performed (#2830), and processing returns. This is shown in FIG. 30(*c*) to be explained.

First, judgment is made on whether or not the card function is in the ON state (#2830-0), and in the case of OFF, processing returns. In the case of ON judgment is made on whether or not the signal of snap drive bit has been inputted (#2830-1), and when it has been inputted, the lens is driven by a quantity $-\Delta n$ which is reverse to the above-mentioned quantity (#2830-2), and is stopped (#2822-4), and processing returns. When the above-mentioned signal of bit has not been inputted, judgment is made on whether or not the defocusing card has been inserted (#2830-5). If the set card is not the defocusing card, processing returns. When the set card is the defocusing card, the number CNT of counted pulses of the present position of the driven lens is taken as CT″ (#2830-6), and the difference $\Delta n$ between CT″ and CT′ at the position before lens drive is calculated (#2830-7), and processing proceeds to step #2830-2, performs control like the above-described, and returns.

A routine of Tv control in the above-mentioned step #2825 of FIG. 30(*a*) is shown in FIG. 30(*d*) to be explained. First, the micro-computer μC changes Tv to a exposure time T(#2835), and resets and starts a timer for measuring exposure time (#2836), and starts first-curtain (not illustrated) running of the shutter. Then, judgment is made on whether or not the card function is in the ON state (#2838), and in the case of OFF, processing moves to a flow (#2846) of waiting the exposure time T to elapse. On the other hand, in the case of ON, judgment is made on whether or not the set card is the defocusing card (#2839). When the set card is the defocusing card, pulse count of the present position of the lens is stored as CT′ (#2840), and processing is performed so that the exposure time T becomes T/4 (#2841). When the exposure time T becomes T/4, the direction of lens drive toward the far side or the near side is detected based on information of $\Delta Lp$ inputted from the card (#2842), and the direction is set responding thereto, and the lens is driven at a highest speed (#2845). A counter monitoring the position of move-out of the lens is operated also at this time. Then, at this time, or when the set card is not the defocusing card, processing is performed so that the exposure time becomes T (#2846), and when T is reached, second-curtain (not illustrated) running of the shutter is started (#2847), and the time when the running will be completed is waited (#2848), and the motor for driving the lens is stopped (#2849), and processing returns.

Figure 31B:
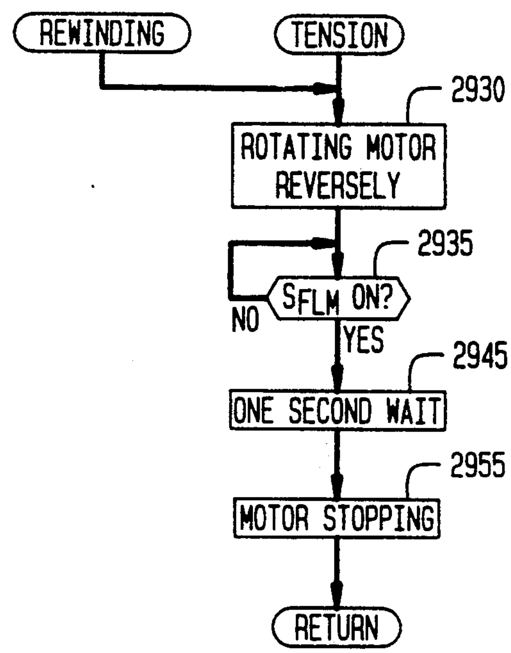
FIGS. 31(*a*) and 31(*b*) are flowcharts showing routine relating to one-frame winding-up of a film.
Figure 31A:
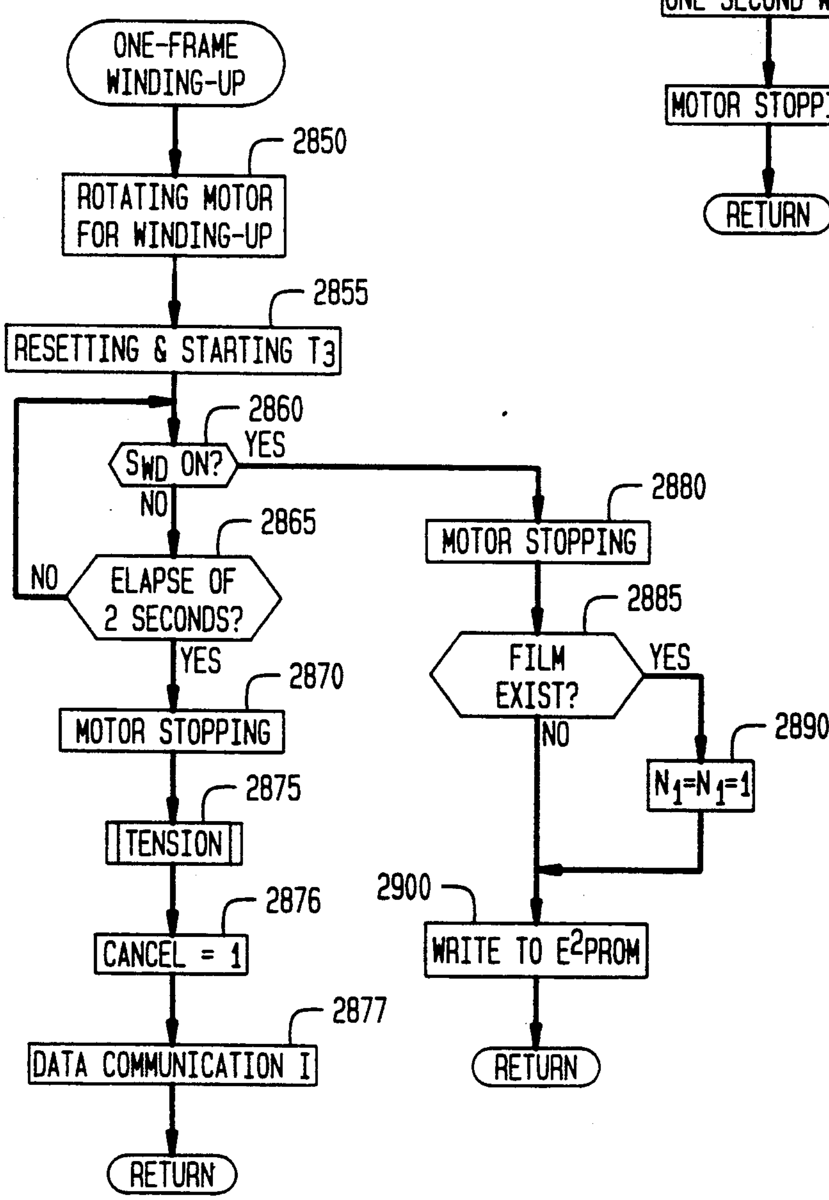

FIGS. 31(*a*) and 31(*b*) show flowcharts of control of one-frame winding-up of the film as shown in step #500 in FIG. 6. Description thereon is made as follows. In FIG. 31(i a), the micro-computer μC outputs a film wind-up signal to a motor controlling circuit MD, and resets and starts a timer $T_3$ (#2850, #2855). This timer is for detecting that the film is wound up to the final frame and the film tenses up. In step #2860, the micro-computer μC judges whether or not the switch $S_{WD}$ showing that one frame has been wound up has been turned to ON. Here, where it has not been turned to ON, the micro-computer μC judges whether or not two seconds has elapsed in this state in step #2865. And where two seconds has elapsed, it performs control of stopping the motor (#2870), and assumes that the film tenses up, and performs control for this tension of the film (#2875). Next, a cancel signal for cancelling the bracket or auto-shift function for continuous photographing is set to 1 (#2876), and data communication (I) is performed once (#2877), and processing returns. A subroutine for the above-mentioned tension is shown in FIG. 31(*b*) to be explained. In step #2930, a signal of reverse rotation of the motor is outputted, and processing waits until the film detecting switch $S_{FLM}$ is turned to OFF (#2935). Subsequently, when the switch $S_{FLM}$ is turned to OFF, processing performs motor stop control to wind the film into the patrone chamber (#2955), and returns.

Reverting to FIG. 31(*a*), in step #2860, when a one-frame switch $S_{WD}$ is turned to ON, control of stopping the motor is performed in step #2880. And thereafter, it is judged in step #2885 whether or not the film has been attached, and when the film has been attached, the count number $N_1$ of a counter showing the number of exposed film frames is increased by 1 (#2890) and processing proceeds to step #2900. When the film has not been attached, processing proceeds to step #2900 without changing the count number $N_1$. In step #2900, this number $N_1$ of film frames is written to the $E^2$PROM.

Figure 32:
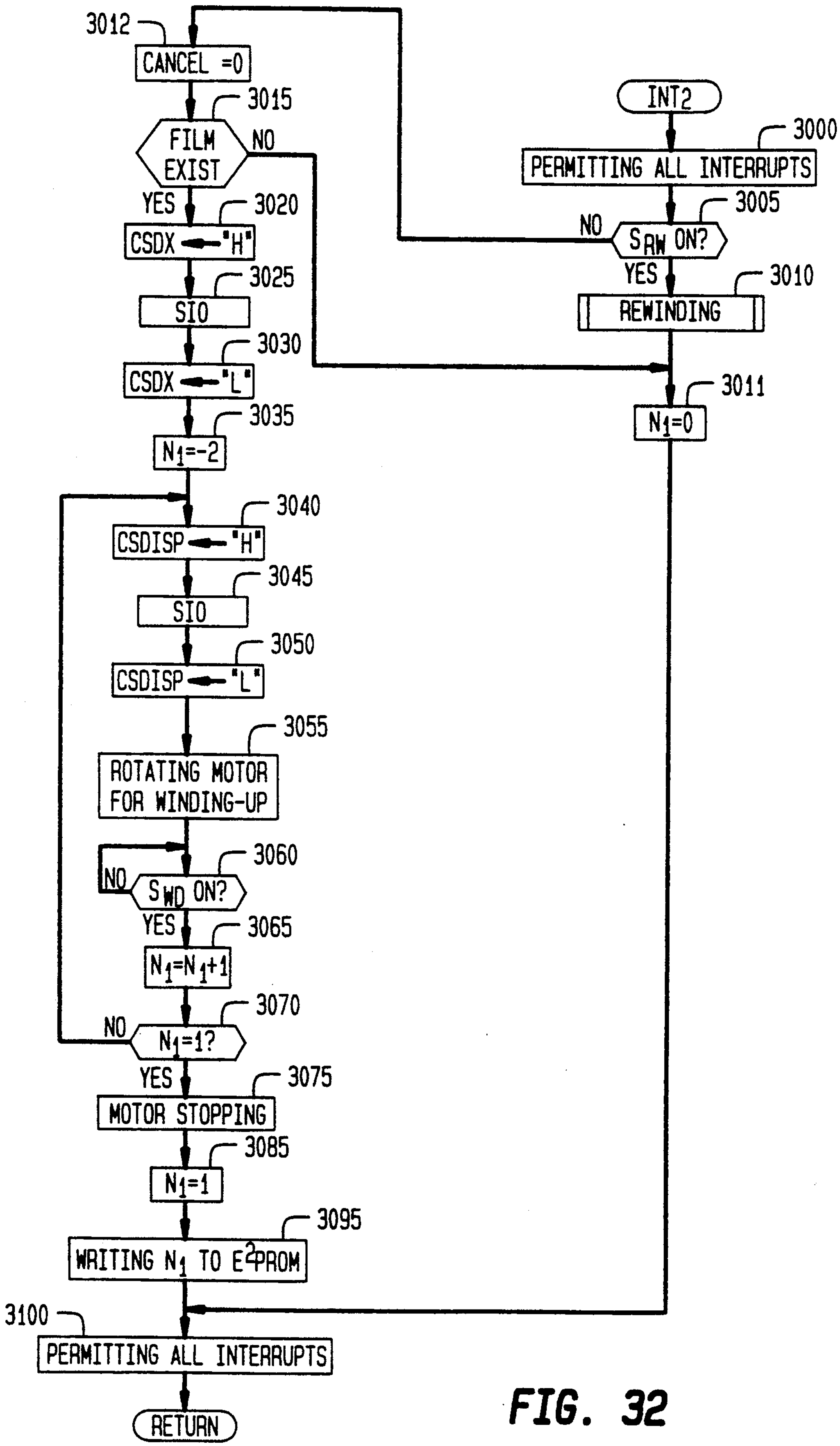
FIG. 32 is a flowchart showing a routine of interrupt relating to closing a rear lid.

Next, when the rear lid close detecting switch $S_{RC}$ or the rewinding switch $S_{RW}$ is operated, a pulse signal is inputted to a terminal $INT_2$, and the micro-computer μC executes an interrupts $INT_2$ as shown in FIG. 32. In the flow in FIG. 32, first, the micro-computer μC inhibits an interrupt to this flow (#3000), and thereafter in step #3005, detects whether or not the rewinding switch $S_{RW}$ has been turned ON. Where it has been turned to ON, the micro-computer μC executes a routine of rewinding as shown in FIG. 31(*b*) to perform a rewinding operation (#3010). And further, processing sets the $N_1$ to zero (#3011), permits an interrupt (#3100), and returns. When the rewinding switch $S_{RW}$ has not been turned to ON, the rear lid close detecting switch $S_{RD}$ is assumed to be turned to ON, and further the cancel signal (used in the communication (I)) is set to 0 for returning the bracket or autoshift function (#3012), and processing proceeds to step #3015. In step #3015, judgment is made on whether or not the film exists. Where no film exists, accordingly where the film detecting switch $S_{FLM}$ is in the OFF state, processing proceeds to step #3100 via the above-mentioned step #3011. On the other hand, where the film exists (that is, where the switch $S_{FLM}$ is in the ON state), a terminal CSDX is set to the "H" level, and serial communication is performed with a film speed reading circuit DX and thereby film speed data Sv and the number N of exposed film frames are inputted into the micro-computer μC, and on completing the communication, the terminal CSDX is set to the "L" level (#3020–#3030). Then, the number $N_1$ is set to $-2$ (#3035). Subsequently the terminal CSDISP is set to the "H" level, and serial communication is performed with the display controlling circuit DISPC (#3045), and a signal showing the initial loading ($DP_{9H}$, $b_3=1$) and data of the number of film frames are outputted, and thereby only the data showing the number $N_1$ of film frames is displayed. On completing the serial communication, the terminal CSDISP is set to the "L" level (#3050). The numeric value of the number $N_1$ of film frames is displayed using two seven-segment digits.

Next, the micro-computer μC outputs a signal instructing winding-up of the film to a wind-up controlling circuit (#3055), and waits until winding-up of one frame ends (#3060). Here, when the one-frame switch $S_{WD}$ is turned to ON, the micro-computer μC adds 1 to the number $N_1$ of film frames (#3065), and judges whether or not the numeric value has become 1 (#3070), and if it has not become 1, returns to step #3040. If it has become 1, processing proceeds to step #3075, and the motor is stopped, and proceeds to step

#3095. Then, in step #3095, the above-mentioned $N_1$ and the film speed are written to predetermined adresses of the $E^2$PROM, and after the write has been completed, all interrupts are permitted (#3100), and processing returns.

In the above, description has been made on the operation of the micro-computer μC of the camera body of this embodiment using various flowcharts, and next, description is made on controls of the IC cards attached to this camera using flowcharts. Description for control operations of the respective IC cards is made in a separate manner. The micro-computer $\mu C_2$ incorporating the $E^2$PROM is incorporated in the IC card CD.

(1) Custom Card

First, description is made on operation of the custom card.

Hereinafter, micro-computers of the respective cards are designated as $\mu C_2$.

Figure 33:
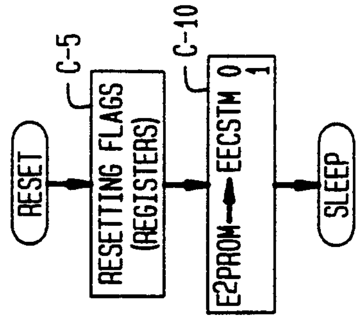

The micro-computer $\mu C_2$ of the custom card executes a routine of resetting as shown in FIG. 33 when the card is attached to the camera. First, it resets all of the flags and the registers (RAM) (C-5), and moves information stored in the $E^2$PROM to the RAM ($EECSTM_{01}$) (C-10). Thereafter processing sleeps.

Figure 34:
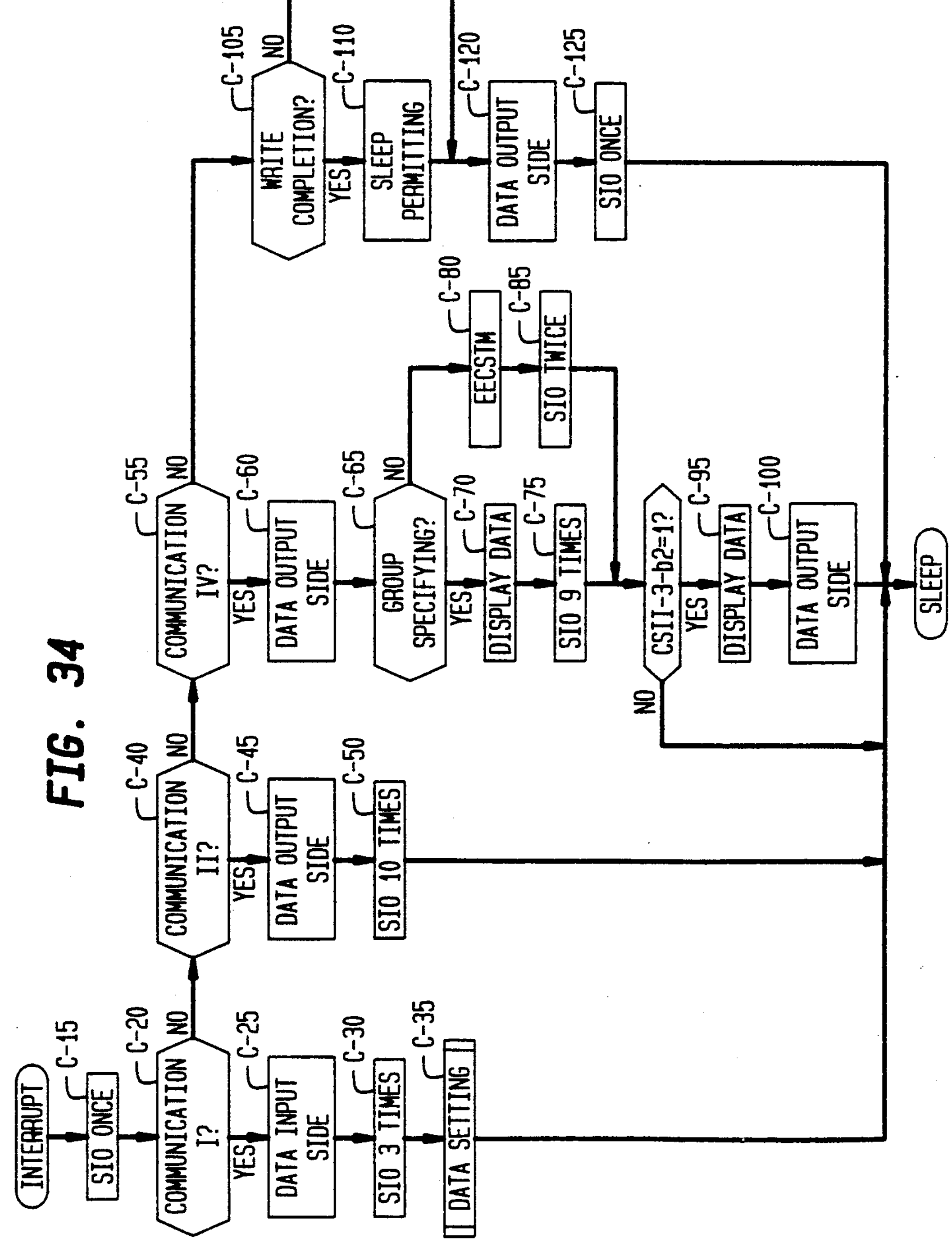
FIG. 33, FIG. 34 and FIGS. 35(*a*) to 35(*c*) are flowcharts showing operation flows of a custom card.

Next, when signal changing from "L" to "H" is sent from the camera body to the terminal CSCD of this card, the micro-computer $\mu C_2$ of the custom card executes a routine of an interrupt as shown in FIG. 34. Here, in synchronism with clock pulses sent from the camera body, serial communication is performed one (C-15) to input data showing the kind of communication into the micro-computer $\mu C_2$.

The kind of communication to be done is judged from the data obtained by this communication (C-20), and when the kind is the communication (I), the card is set as the data input side (C-25), and serial communication is performed three times (C-30) to receive data (refer to table 6 and table 12) from the camera body. Based on this data, the micro-computer $\mu C_2$ executes a subroutine of data setting (C-35), and processing sleeps.

Here, prior to description on the above-mentioned subroutine, description is made on what types of data are outputted from the card in response to the communications.

In the communication(II), all signals other than the following signals are set to "0".

| | |
|---|---|
| Card performs display control | CS II -1-$b_4$ |
| Card function ON/OFF | CS II -1-$b_5$ |
| Communication (V) NO (=0) | CS II -2-$b_2$ |
| Release inhibit | CS II -2-$b_3$ |
| AF inhibit | CS II -2-$b_7$ |
| $E^2$P write | CS II -3-$b_2$ |
| Tv · Av/display data (=0) | CS II -3-$b_3$ |
| Communication (IV) EXIST (=1) | CS II -3-$b_4$ |
| Communication (III) NO (=0) | CS II -3-$b_5$ |
| Communication type | CS II -3-$b_6$ |
| Photometric loop repeat | CS II -3-$b_7$ |
| Card is custom card (=1) | CS II -3-$b_5$ |

Signals marked with ❖ on the tables are set to "1" or "0" in response to the respective cases, and the control thereof is put the ON state at "1", and put in the OFF state at "0". The determined signals are set to "0" or "1" in a fixed manner. In the communication (II), in addition to the above signals, the number (twice) of communication data of direct address type in the communication (IV) and the address thereof (CS II-7,8) exist. Since in the communication (III) the group communication does not exist, CS II-9-($b_1$,$b_2$)=0,0 is set. Since the communication (IV) needs only of display data, CS II-10-$b_1$=1 is set. The others are set to "0".

In addition, any data can be entered in blank spaces on the above-mentioned table.

In the communication (IV), data ($EECSTM_{0,1\ 1}$) of two bytes which indicate the functions capable of change are outputted.

In the communication (VI), a signal of sleep for $\mu C_2$ possible/no is sent.

Figure 35A:
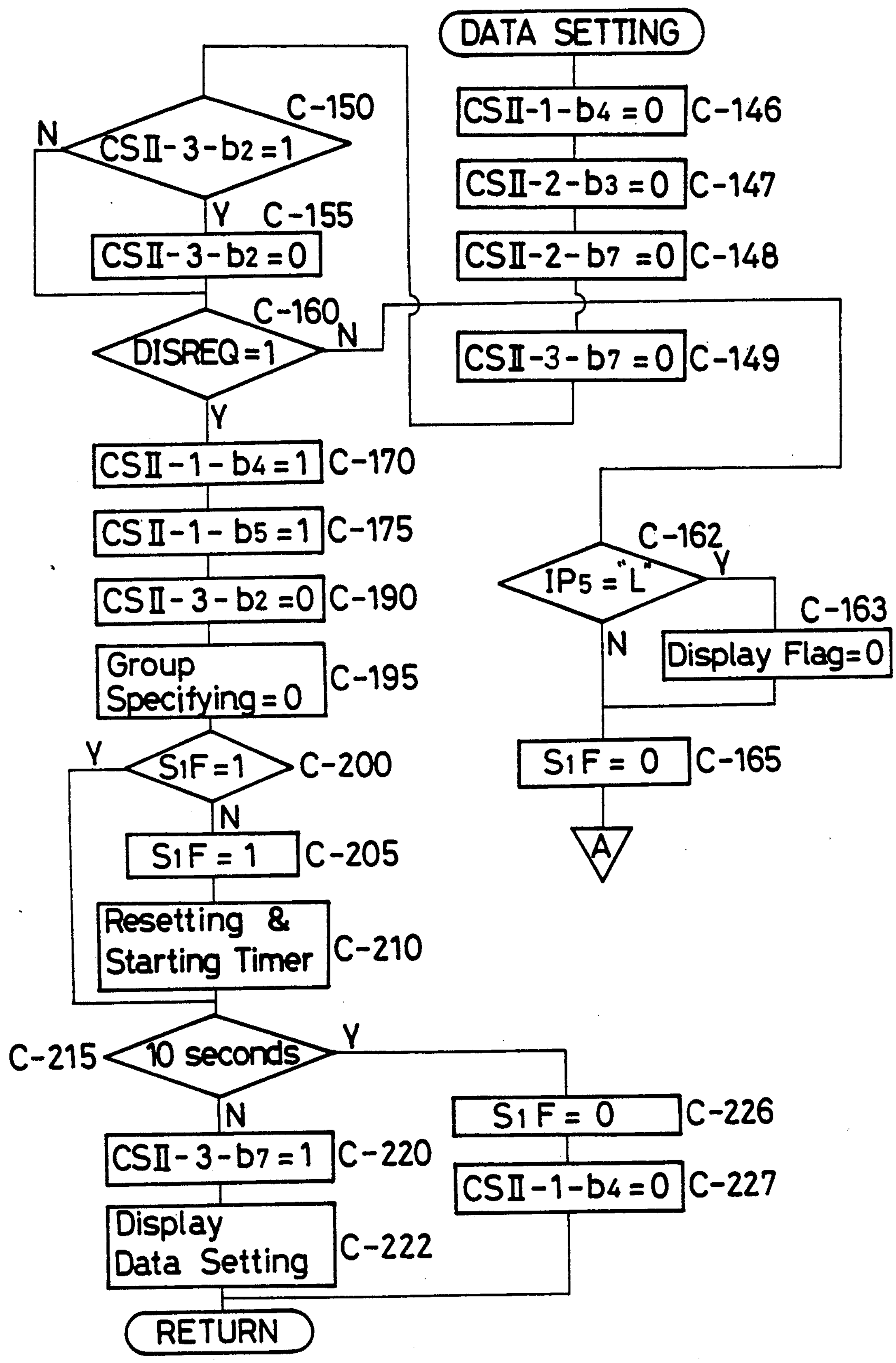
Figure 35B:
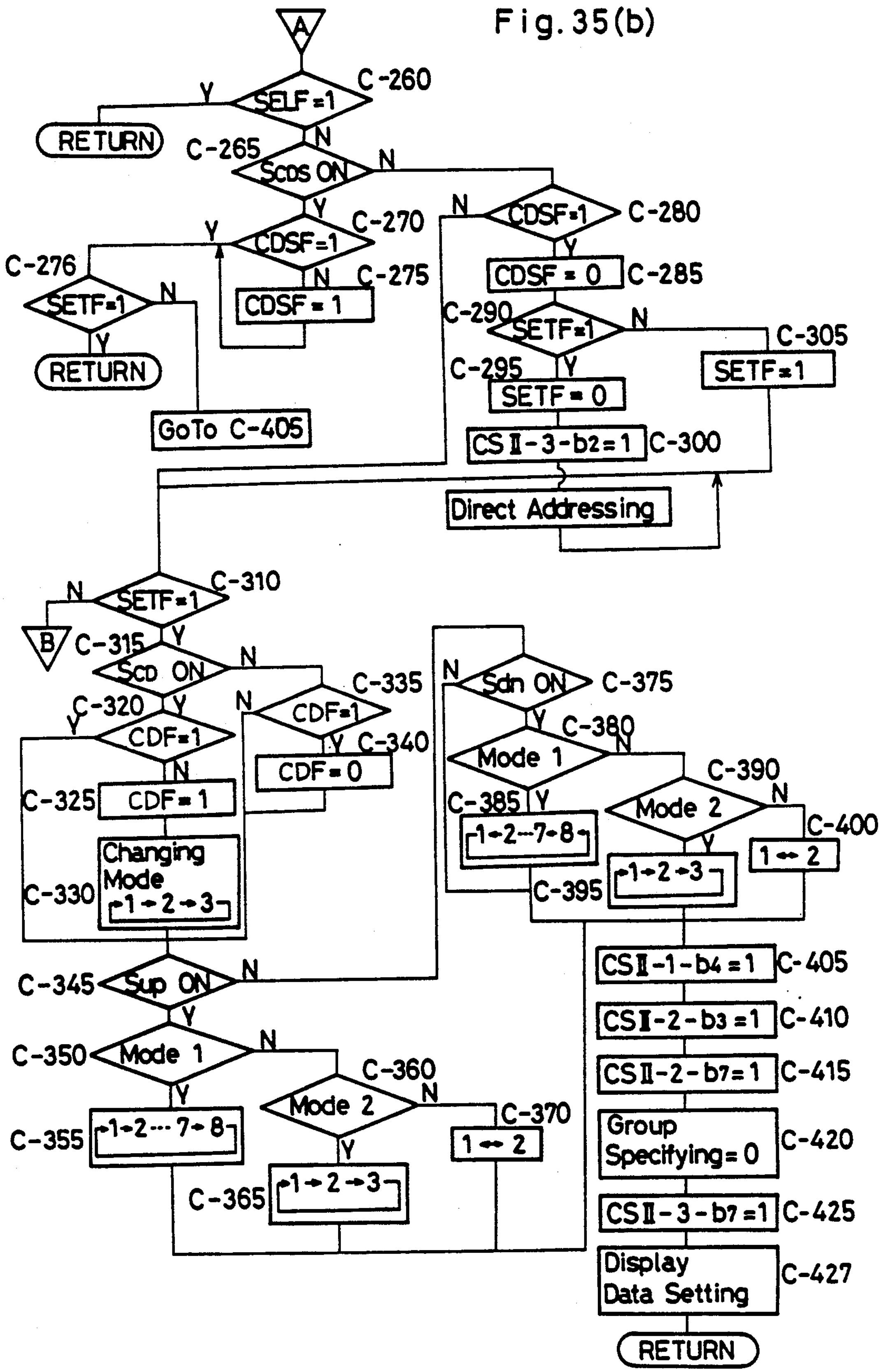
Figure 35C:
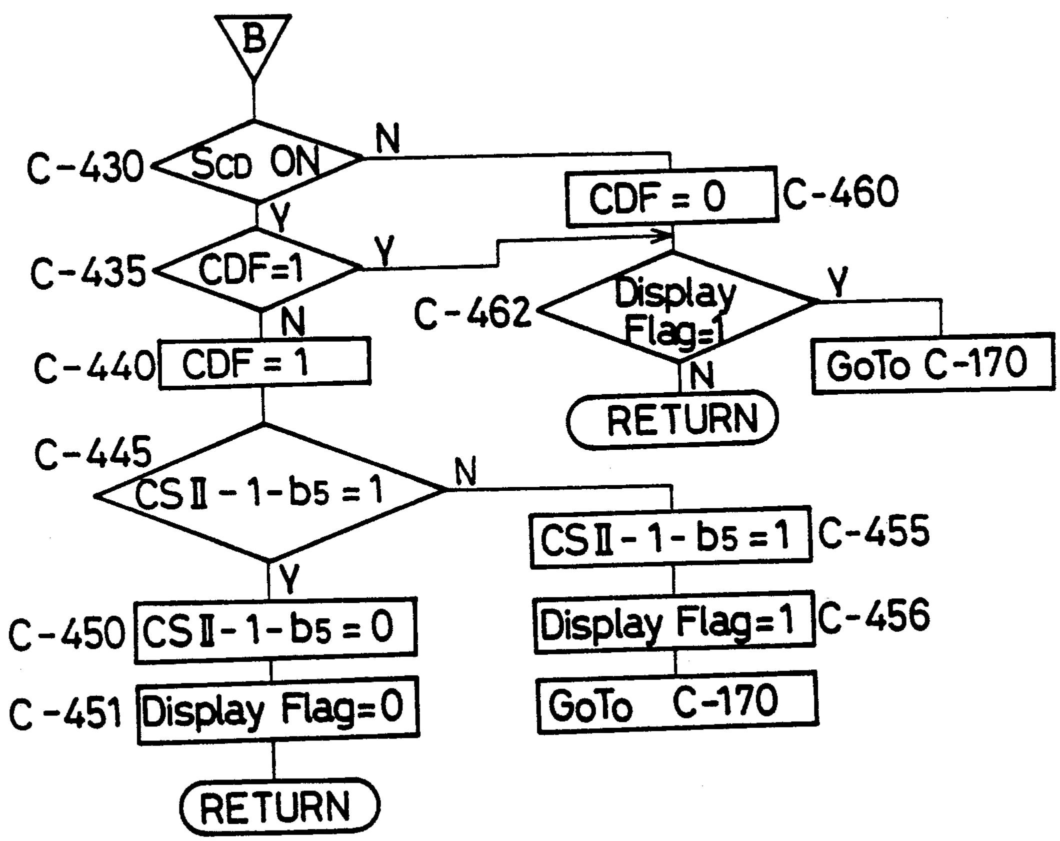
Figure 37:
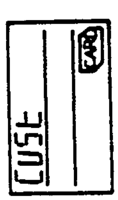
FIG. 37 is a view showing an example of a display.

Next, a subroutine of data setting is shown in FIG. 35(*a*) to be explained. First, in steps C-146 to C-149, display control data (CS II-1-$b_4$) is initialized to "0", release inhibit (CS II -2-$b_3$) to "0", AF inhibit (CS II -2-$b_7$) to "0", and photometric loop repeat (CS II -3-$b_7$) to "0", and subsequently in step C-150, judgment is made on whether or not the write signal (CS II -3-$b_2$) to the $E^2$PROM in the communication (II) (this signal corresponds to $b_2$ of CS II-3) is 1, and where the signal is "1", it is assumed that the write data has been already outputted to the camera body the last time, and this is set to "0" (C-155), and processing proceeds to step C-160. Where the signal is "0", processing proceeds to step C-160 without performing anything. Next, in step C-160, judgment is made on whether or not a signal DISREQ (request of card name display) obtained by the communication (I) is "1", and where the signal is "1", display control data is set to "1", card display function ON/OFF (CS II -1-$b_5$) to ON (1), $E^2$P write to NO (0), and data of group specifying to (0) (C-170~C-195). Subsequently, judgment is made on whether or not the flag $S_1F$ had been set (C-200), and where the flag has not been set, assuming that processing passes through this flow for the first time, the flag $S_1F$ is set (C-205), and the timer is reset and started (C-210), and processing proceeds to step C-215. When the flag $S_1F$ has been set, processing jumps directly to step C-215. In step C-215, judgment is made on whether or not 10 seconds has elapsed from the start of the above-mentioned timer, and where 10 seconds has not elapsed, the photometric loop repeat signal (CS II-3-$b_7$) is set to "1" (C-220), and data performing only display of the card name and display of showing ON state of the card function are set (C-222), and processing returns. FIG. 37 shows this display. On the other hand, where 10 seconds has elapsed, the flag $S_1F$ is reset (C-226), and display control data is set to "0" (C-227), and processing returns.

If DISREQ=0 in the above-mentioned step C-160, processing proceeds to step C-162, and judgment is made on whether or not $IP_5$ is "L" (that is, any of the switches $S_{EM}$, $S_{FUN}$, $S_{CDS}$, $S_{CDS}$ and $S_1$ is in the ON state), and when $IP_5$ is "L", the display flag showing control performing card name display is reset (C-163), and when $IP_5$ is not "L", processing proceeds to C-165 respectively without performing anything. After resetting the flag $S_1F$ in this step C-165, processing proceeds to step C-260 in FIG. 35(*b*), and judgment is made on whether or not the signal SELF (CS II -1-$b_3$) obtained by the communication (II) is "1".

Here, when the signal is "1", processing returns to inhibit control by operation of the switches of the camera body (relating to the card). When the signal SELF is not "1", judgment is made on whether or not the card setting switch $S_{CDS}$ has been turned to ON (C-265).

When the switch has been turned to ON, in step C-270, judgment is made on whether or not the flag (CDSF) showing that processing has passed herethrough has been set, and if the flag has been set, processing proceeds directly to step C-276, and if the flag has not been set, this flag is set (C-275) and thereafter processing proceeds to step C-276. In this step C-276, judgment is made on whether or not data is under setting, and if not under setting, processing jumps to step C-405, and performs display control entering the setting mode. If data is under setting (SETF=1), processing returns without performing display control because operation has been made to release under-setting when the switch is in the OFF state in step C-265, processing proceeds to step C-280, and judges whether or not the flag (CDSF) has been set, and when it has not been set, proceeds to step C-310. When it has been set, this is reset (C-285), and judgment is made on whether or not the flag SETF showing that data is under setting has been set in step C-290, and when the flag has been set, this is reset (C-295), and $E^2$PROM write signal (a signal of write to the $E^2$PROMs in the camera and the card) is set to 1 (C-300), and direct addressing=1 is set, and processing proceeds to step C-310. Thereby, processing releases under-setting, and causes the camera body to write data from the card to the $E^2$PROM in the camera body. When the flat SETF showing under-setting has not been set, processing sets this flag (C-305), enters the data setting mode, and proceeds to step C-310. In step C-310, if data is under-setting (SETF-1), judgment is made on whether or not the card switch $S_{CD}$ has been turned to ON from data by the communication (II) (C-315), and where it has been turned to ON ($S_{CD}$=1), judgment is made on whether or not the flag CDF showing that processing has passed herethrough has been set (C-320), and when it has been set, processing proceeds to step C-345, and when the flag has not been set, processing sets this flag (CDS=1) in step C-325, advances the changing mode in a sequence of 1→2→3→1, and proceeds to step C-345.

Here, the changing modes are as follows:

1—Selection of combination of the AE mode
2—Selection of the AF mode
3—Blurring warning by buzzer EXIT/NO In the above-mentioned step C-315, where the card switch $S_{CD}$ has not been turned to ON, in step C-335, judgment is made on whether or not the flag CDF has been set, and where it has not been set, assuming that nothing has been operated, processing proceeds to step C-345, and when it has set, assuming that the switch $S_{CD}$ has turned from ON to OFF, this flag is reset in step C-340, and then processing proceeds to step C-345. In step C-345, judgment is made on whether or not the up switch Sup has been turned to ON, and when it has been turned to ON (Sup-1), it is judged whether or not the mode is 1 (C-350), and when the mode is 1, processing proceeds in sequence of 1→2→7→8→—, and after 8, returns to 1 (C-355)

Here, in the mode 1,

1—PAMS
2—PAMS
3—PA S
4—PA
5—P MS
6—P M
7—P S
8—P

In the mode 2, processing proceeds in a sequence of 1→2→3, and after 3, returns to 1 (C-365).

Here, 1—focus lock
2—continuous AF
3—spot AF where the mode is 3, processing proceeds in a sequence of 1⟷2 (C-370).

Here, 1—blurring warning by buzzer
2—No blurring warning by buzzer

On completing change in each mode, processing proceeds to step C-405. When the up switch Sup is in the OFF state, judgment is made on whether or not the down switch Sdn has been turned to ON (C-375), and when it has not been turned to ON, processing proceeds to step C-405. The case where it has been turned to ON differs from the case of the above-mentioned up switch Sup only in that the changing direction is reverse, and therefore description thereon is omitted.

On completing processing of the up switch Sup or the down switch Sdn, processing proceeds to step C-405 and the subsequent steps, and performs the following setting:display control=1, release inhibit=1, AF inhibit=1, group specifying=0, and photometric loop repeat=1, and sets data of display of under-data-setting, and returns. In addition, this display of under-setting is described later. Thereby, the micro-computer μC of the camera body executes the functions of display control by the card, release inhibit, AF inhibit, and continuing display irrespective of the power holding timer of the camera.

In the above-mentioned step C-310, if judgment is made not to be "under-setting" (SETF=0), processing proceeds to step C-430 in FIG. 35(*c*), and it is judged whether or not the card switch $S_{CD}$ has been turned to ON, and when the card switch $S_{CD}$ is in the OFF state, in step C-460, this flag CDF is reset, and judgment is made on whether or not the display flag has been set (C-462), and when it has not been set, processing returns. When it has been set, processing proceeds to step C-170 in FIG. 35(*a*), and performs control of display of the card name. In the above-mentioned step C-430, when the card switch $S_{CD}$ is in the ON state, judgment is made on whether or not the flag CDF showing that processing has passed herethrough has been set (C-435), and when it has been set, assuming that the switch is kept operated, processing proceeds to step C-462. When the flag CDF has not been set, this flag is set (C-440), and in the following step C-445, judgment is made whether or not the card function is in the ON state based on data CS II -1-$b_5$ at present, and where it is in the ON state (CS II -1-$b_5$=1), it is set to OFF (data of the communication II) (C-450), and the display flag is reset (C-451), and processing returns. Conversely, where the function is in the OFF state (CS II -1-$b_5$=0), it is turned to ON (data of the communication II) in step C-455, and the display flag is set in step C-456, and processing proceeds to step C-170, performing control of display of the card name.

Reverting to FIG. 34, when communication is not (I) in step C-20, judgment is made on whether or not the communication is (II) in step C-40, and when the communication is (II), serial communication is performed ten times (C-50) with the card set as the output side (C-45) to output the above-mentioned set data to the camera body, and processing sleeps.

When communication is not (II), whether or not the communication is (IV) is judged in step C-55, and when the communication is (IV), the card is set as the output side (C-60), and whether or not data is of group specifying is judged in step C-65, and when the data is of group specifying, display data is outputted (C-70), address is set, and serial communication is performed nine times (C-75), and processing proceeds to step C-90. When the result is not group specifying (direct addressing), the function change data (EECSTM is addressed (C-80), and serial communication is performed twice (C-85), and processing proceeds to step C-90. In step C-90, it is judged whether or not an $E^2PROM$ write signal has been set, and when it has been set, a write control signal is outputted to write two-byte data of EECTSM to predetermined addresses of the $E^2PROM$ (C-95). Write to the $E^2PROM$ is performed by the hardware, and the micro-computer $\mu C_2$ has only to send a control signal. Then, a write end signal (on completing to write, this signal is set automatically by the hardware) is reset (C-100), and processing sleeps. When the write signal is not inputted, processing sleeps immediately. When the communication is not (IV) in step C-55, assuming that it is the communication (VI), first, it is judged by the above-mentioned end signal whether or not write has been completed (C-105), and when write has been completed, a sleep-permitting signal is set (C-110), and when it has not been completed, a sleep-inhibiting signal is set (C-115), and processing proceeds to step C-120 respectively. In step C-120, the card is set as the data output side, and serial communication is performed in response to clock pulses from the camera body (C-125), and processing sleeps.

Figure 36:
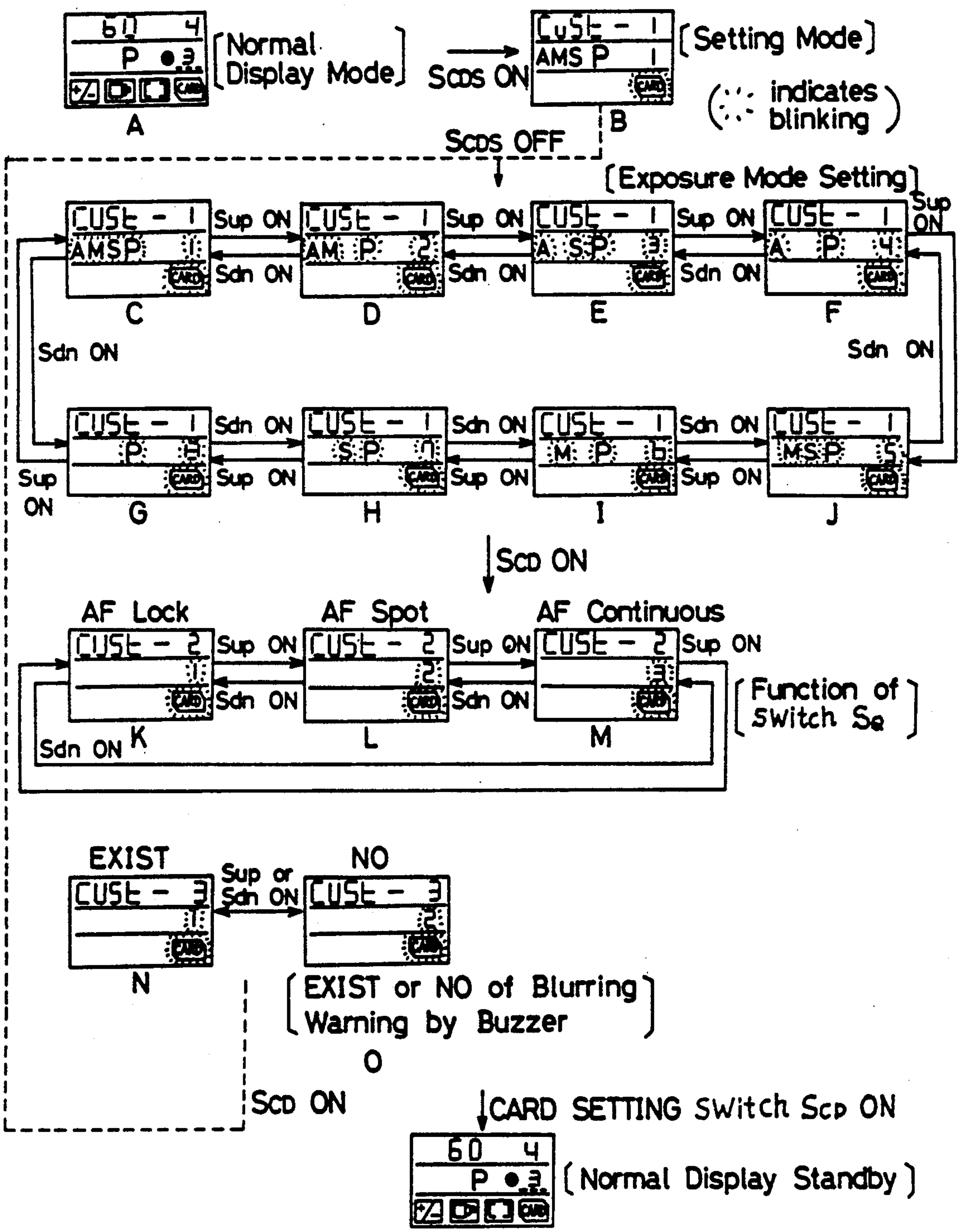
FIG. 36 is a view showing mode setting thereof.

FIG. 36 shows the content of display at setting. When the mode is the normal display mode (A), by depressing the card setting key $S_{CDS}$, as shown in (B), "CuSt-1" indicating the custom card are displayed in the upper portion and "1" is displayed at the position for normally displaying the number of film frames in the middle portion and blinking of the card mark is performed in the lower portion. When the card setting key is turned to OFF in this state, setting of combination of the exposure modes is performed. As shown in (C)-(J), out of the above-mentioned exposure modes, the selected exposure mode is displayed in a blinking fashion, and the numerical value in the position normally for the film frames is displayed in a blinking fashion, and by turning the up-down key to ON, display proceeds in the direction as shown in the figure, and the combination of the exposure modes and the value of the number of film frames are varied.

Furthermore, when the card key is turned to ON, as shown in (K)-(M), the display turns to "CuSt-2" to show the mode by the switch $S_Q$. By turning the up-down key to ON, the numerical value at the position for the number of film frames changes as follows; 1⟷2⟷3 ⟷1. Next, when the switch $S_{CD}$ is turned to ON, as shown in (N) and (O), the display turns to "CuSt-3", and by turning on the up-down key, the numerical value at the position for the number of film frames changes as follows: 1⟷2. By the next turn-on of the switch $S_{CD}$, processing goes to exposure mode setting. By depressing the switch $S_{CDS}$ in this state, the display turns to the normal display.

(2) Data memory card

Next, description is made on operation of the data memory card.

Figure 38:
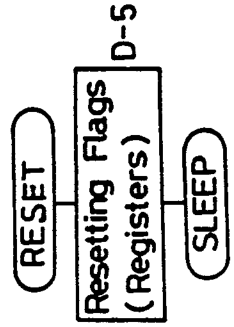
Figure 40A:
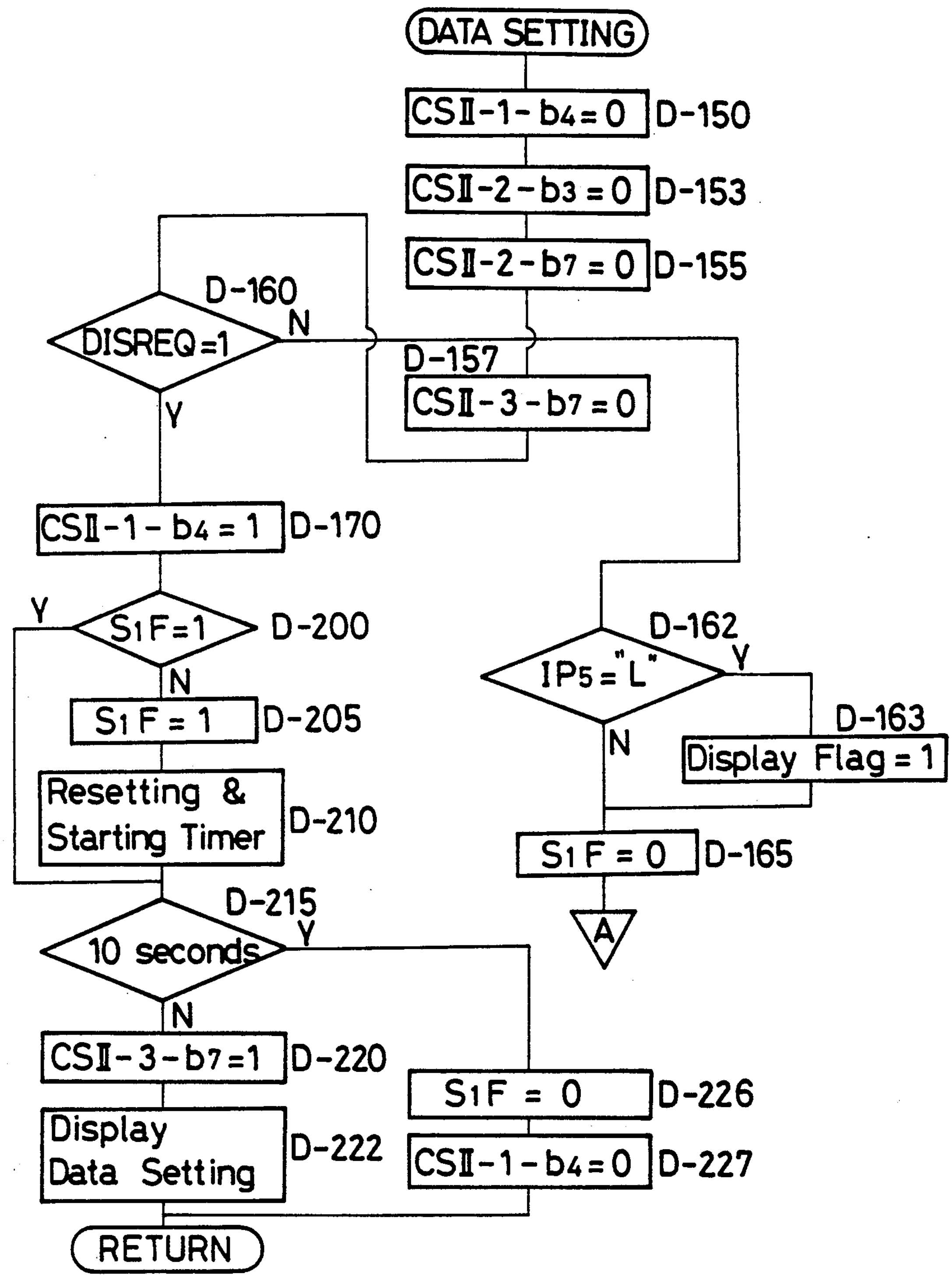
Figure 40B:
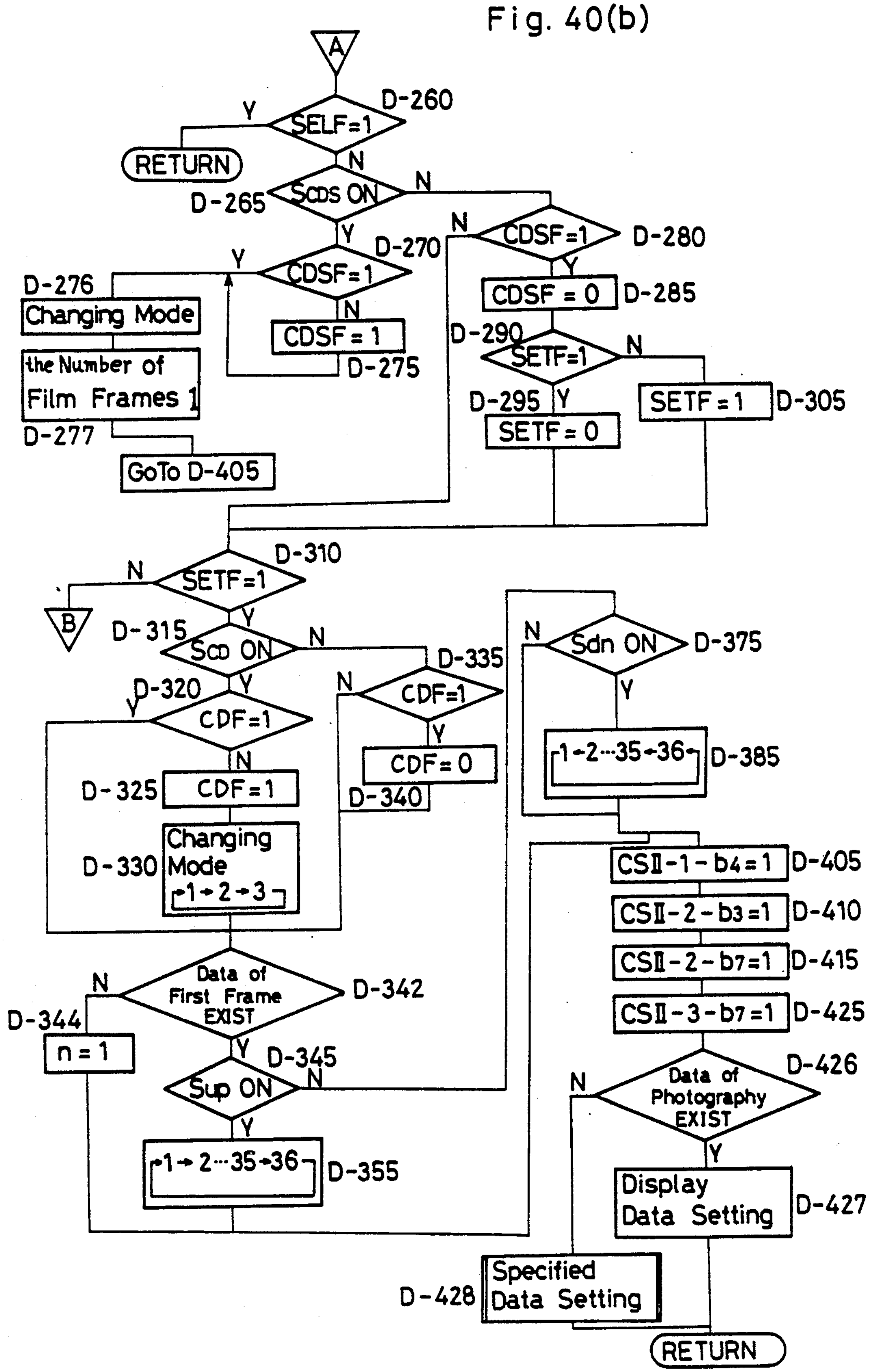
Figure 40C:
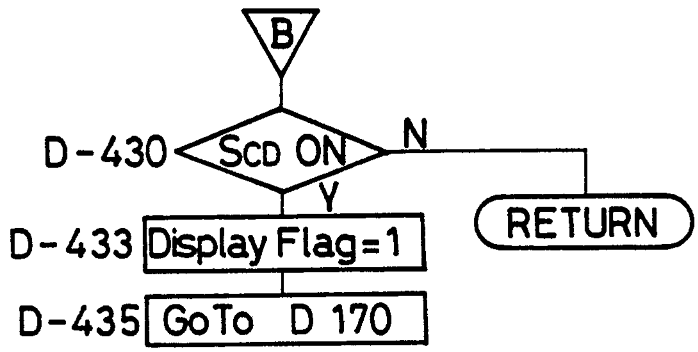
Figure 40D:
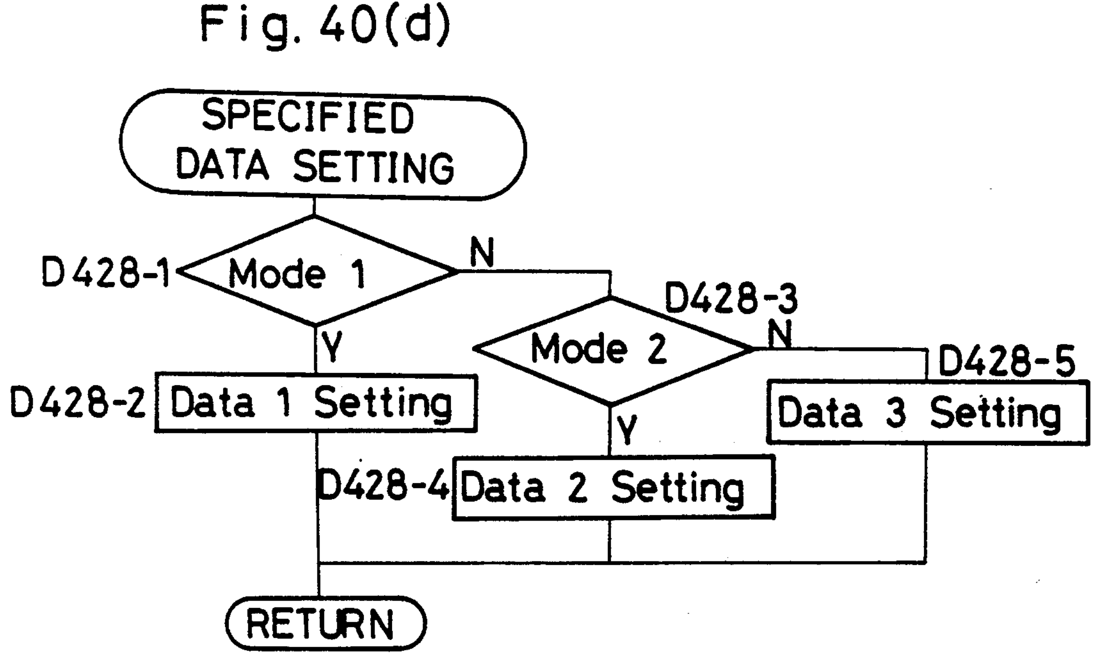
Figure 41B:
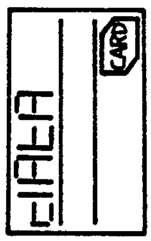
FIG. 41(*f*) shows the sequence at exposures according to the invention.
Figure 41A:
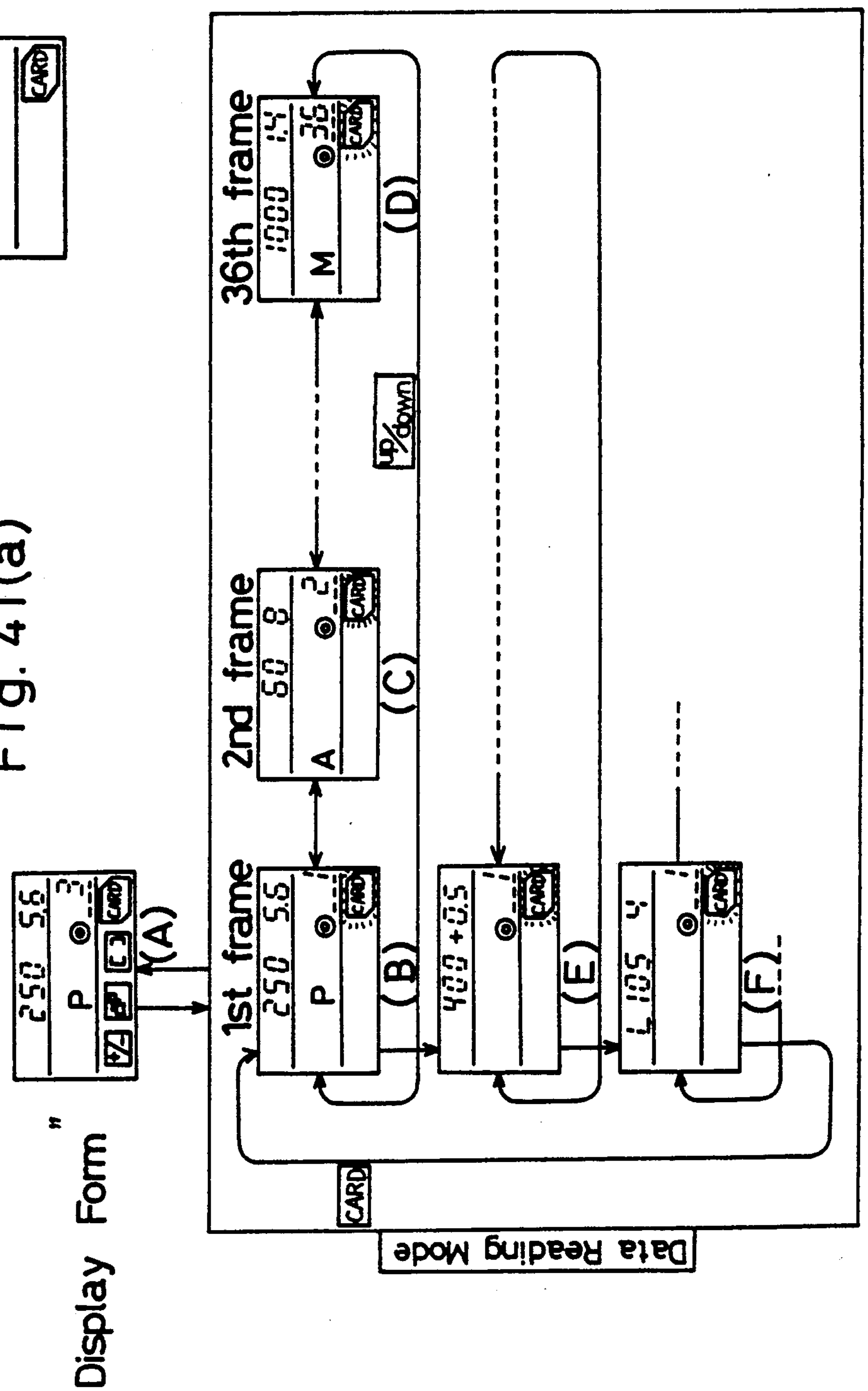
Figure 41C:
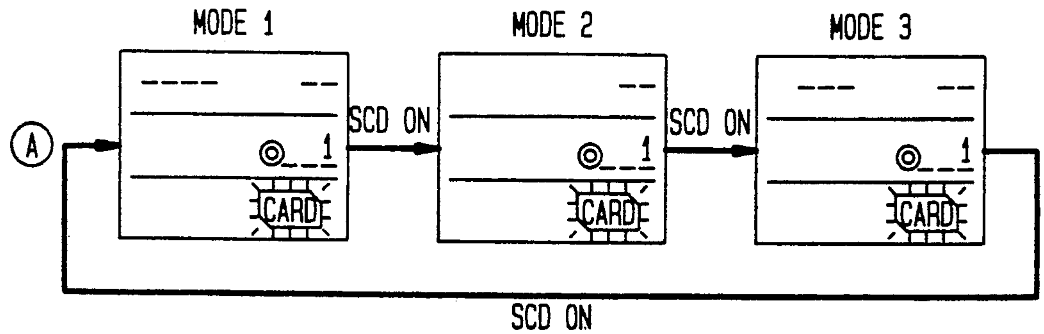
Figure 41D:
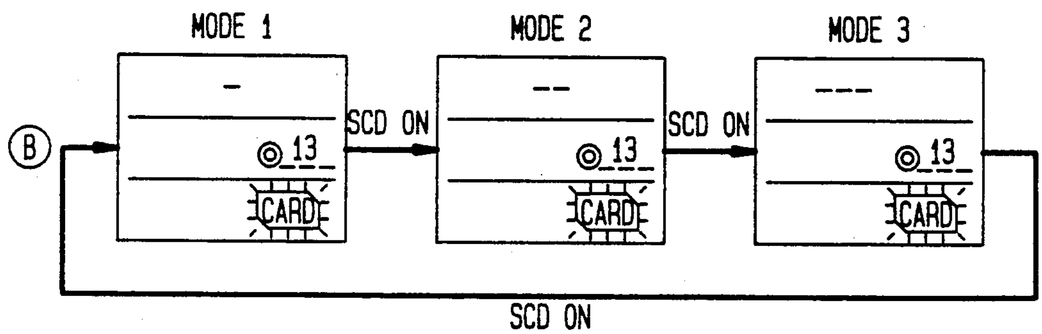
Figure 41E:
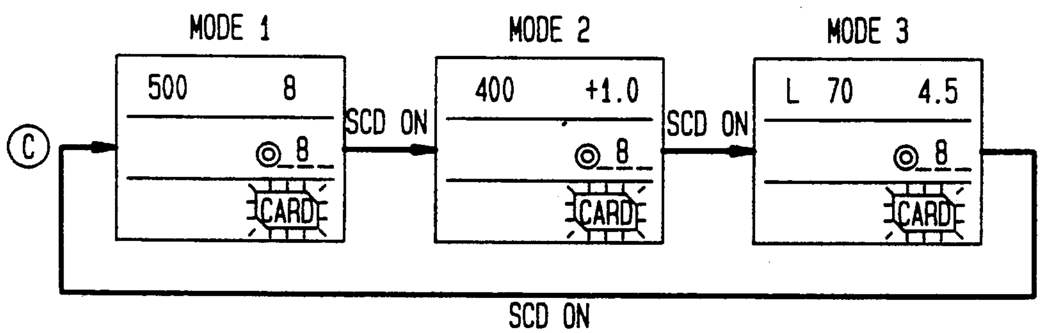
Figure 41F:
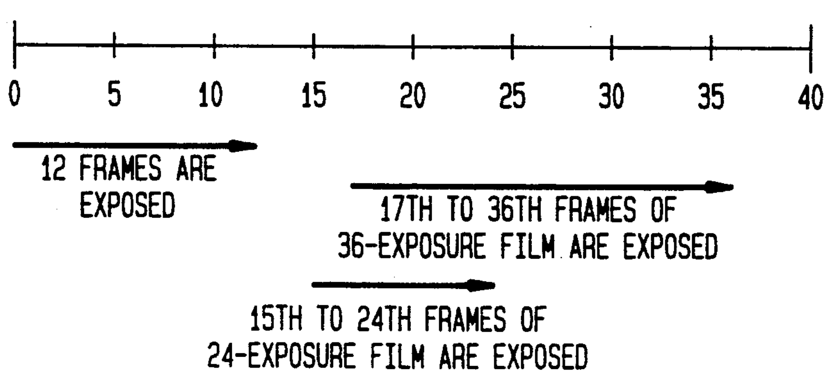

The micro-computer $\mu C_2$ of the data memory card executes a routine of resetting in FIG. 38 when this card is attached to the camera body, resets all of the flags and the registers (RAM) (D-5), and processing sleeps.

Figure 39:
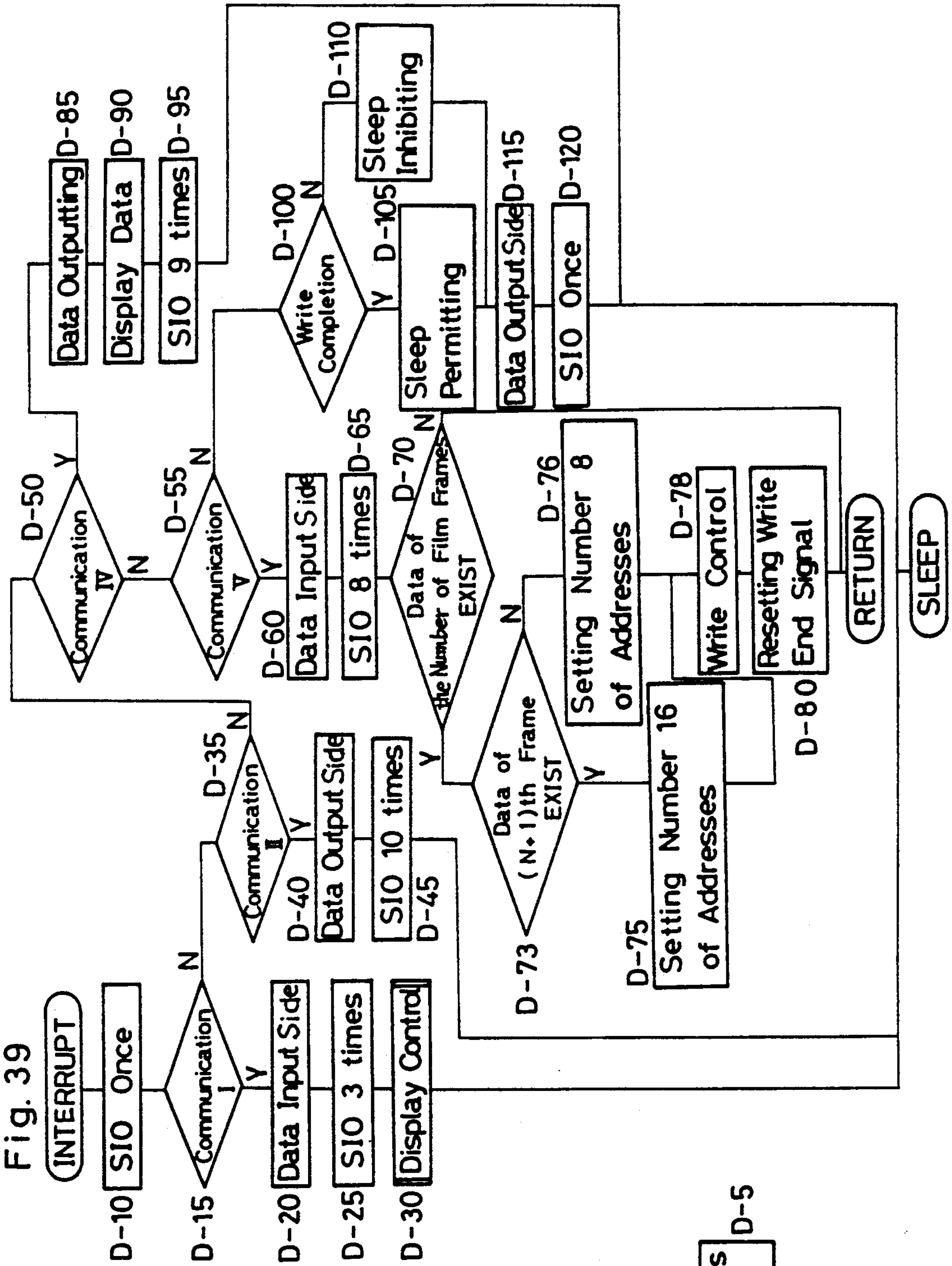
FIG. 38, FIG. 39 and FIGS. 40(*a*) to 40(*d*) are flowcharts showing operation flows of a data memory card, FIGS. 41(*a*) and 41(*c*) to 41(*e*) are views showing examples of display, and FIGS. 41(*b*) is an explanatory view thereof.

Next, when a signal changing from "L" to "H" is sent from the camera body to the terminal CSCD of this card, the micro-computer $\mu C_2$ of the data memory card executes a routine of an interrupt as shown in FIG. 39.

Here, in synchronism with clock pulses sent from this camera body, serial communication is performed once to input data showing the kind of communication into the micro-computer $\mu C_2$ (D-10).

The kind of communication to be done is judged in step D-15 from the data obtained by this communication, and when the kind is the communication (I), the card is set as the data input side (D-20), and serial communication is performed three times (D-25) to receive data (refer to Table 6 and Table 13) from the camera body. Based on this data, the micro-computer $\mu C_2$ executes a subroutine of display control in step D-30, and processing sleeps.

Here, prior to description on the above-mentioned subroutine, description is made on what sorts of data are outputted from the card in response to communication while using a data memory card table.

In communication (II), all signals other than the following signals are set to "0".

| | |
|---|---|
| Card performs display control | CS II -1-$b_4$ |
| Card function ON/OFF | CS II -1-$b_5$ |
| Communication (V) EXIST (=1) | CS II -2-$b_2$ |
| Release inhibit | CS II -2-$b_3$ |
| AF inhibit | CS II -2-$b_7$ |
| Tv · Av/display data (=0) | CS II -3-$b_3$ |
| Communication (IV) | CS II -3-$b_4$ |
| Communication (III) NO (=0) | CS II -3-$b_5$ |
| Group specifying | |
| Communication type (=0) | CS II -3-$b_6$ |
| Photometric loop repeat | CS II -3-$b_7$ |

Signals marked with ✦ on the table are set to "1" or "0" in response to the respective cases, and the control thereof is put in the ON state at "1", and put in the OFF state at "0". Since the communication (III) in group communication does not exist, CS II -9- ($b_1$, $b_2$)=0,0 is set. Since only display data are transmitted in the communication (IV), CS II -10-$b_0$=1 is set.

In addition, any data can be entered in blank spaces on the above-mentioned table.

In the communication (VI), a signal of sleep possible/no is sent.

In the communication (V), memory data is sent from the camera body.

Next, a subroutine of data setting is shown in FIG. 40 to be explained. First, in steps D-150 to D-155, display control data (CS II -1-$b_4$) is initialized to "0", release inhibit (CS II -2-$b_3$) to "0", AF inhibit (CS II -2-$b_7$) to "0", and judgment is made on whether or not a signal DISREQ (request of card name display) obtained by the communication (I) is "1", in step D-160, and where the signal is "1", display control data is set to "1", display control data is set to "1", performing card name display (D-170). Subsequently, it is judged whether or not the flag S1F has been set in step D-200, and where the flag has not been set, assuming that processing passes through this flow for the first time, the flag S1F is set (D-205), and the timer is reset and started (D-210), and thereafter processing proceeds to step D-215. When the flag S1F has been set, processing jumps directly to step D-215. In step D-215, judgment is made on whether or not 10 seconds has elapsed from the start of the above-mentioned timer, and where 10 seconds has not elapsed, the photometric loop repeat signal (CS II -3-$b_7$) is set to "1" (D-220), and data performing only the card name display and the card mark display is set (D-222), and processing returns. FIG. 41(*b*) shows this display. On the other hand, where 10 seconds has elapsed, the flag S1F is reset (D-226), and display control data is set to "0" (D-227), and processing returns.

If DISREQ=0 in the above-mentioned step D-160, processing proceeds to step D-162, and judgment is made on whether or not $IP_5$ is "L" (that is, any of the switches $S_{EM}$, $S_{FUN}$, $S_{CD}$, $S_{CDS}$ and $S_1$ is in the ON state), and when $IP_5$ is "L", the display flag showing control performing card name display is reset (D-163), and when $IP_5$ is not "L", processing proceeds to D-165 respectively without performing anything. After resetting the flag S1F in this step D-165, processing proceeds to step D-260 in FIG. 40(*b*), and judgment is made on whether or not the signal SELF obtained by the communication (II) is "1". Here, when the signal is "1", processing returns. When the signal SELF is not "1", judgment is made on whether or not the card setting switch $S_{CDS}$ has been turned to ON (D-265). When the signal has been turned to ON (signal=1), in step D-270, judgment is made on whether or not the flag (CDSF) showing that processing has passed herethrough has been set, and if the flag has been set, processing proceeds to step D-276, and if the flag has not been set, this flag is set (D-275) and thereafter processing proceeds to step D-276. In this step D-276, the changing mode is set to 1 (described later), further in step D-277, the number of film frames is initialized to 1 (described later), and processing proceeds to step D-405 to perform display control entering the setting mode.

When the switch $S_{CDS}$ is in the OFF state in step D-265, processing proceeds to step D-280. Here, it is judged whether or not the flag (CDSF) has been set, and when it has not been set, processing proceeds to step D-310. When it has been set, this is reset (d-285), and then judgment is made on whether or not the flag SETF showing that data is under setting has been set (D-290), and when the flag has been set, this is reset (D-295), and processing proceeds to step D-310. When the flag SETF showing under-setting has not been set, processing sets this flag (D-305), enters the data setting mode, and proceeds to step D-310. In step D-310 if data is under-setting (SETF−1), in the following step D-315 judgment is made on whether or not the card switch $S_{CD}$ has been turned to ON from data by the communication (II), and where it has been turned to ON, judgment is made on whether or not the flag CDF showing that processing has passed herethrough has been set (D-320), and when it has been set, processing proceeds to step D-342, and when the flag has not been set, processing sets this flag (CDF=1) in step D-325, advances the changing mode in a sequence of 1→2→3→1, and proceeds to step D-342.

Here, the changing modes are as follows:

1—display of shutter speed, diaphragm aperture value, mode display, number of film frames, blinking of the card mark 2—display of film speed, exposure adjusted value, number of film frames, blinking of the card mark 3—display of focal length of an interchangeable lens, open F number of the interchangeable lens, number of film frames, blinking of the card mark Where the card switch $S_{CD}$ has not been turned to ON, in step D-335, judgment is made on whether or not the flag CDF has been set, and where it has not been set, assuming that nothing has been operated, processing proceeds directly to step D-342, and when it has been set, assuming that the switch $S_{CD}$ has turned from ON the OFF, this flag is reset in step D-340, and then processing proceeds to step D-342. In step D-342, judgment is made on whether or not data of address (for example, shutter data) showing a first frame of the number of film frames among data memoried in the $E^2$-PROM of this card is present. Where it is not present, assuming that a new memory card has been inserted, n=1 (the first frame) is set in step D-344, and processing proceeds to step D-405. Where the above-mentioned data is present, processing proceeds to step D-345. In step D-345, it is judged whether or not the up switch Sup has been turned to ON, and when it has been turned to ON (Sup−1), and in step D-355, the number of film frames is increased by one in a sequence of 1→2→—35→36→1. After such change of the number of film frames, processing proceeds to step D-405.

When the up switch Sup is in the OFF state by the judgment in step D-345, processing proceeds to step D-375 and it is judged whether or not the down switch Sdn has been turned to ON. The case where it has been turned to ON differs from the case of the above-mentioned up switch Sup only in that the changing direction is reverve, and therefore description thereon is omitted.

On completing processing of the up switch Sup or the down switch Sdn, processing proceeds to step D-405 and the subsequent steps, and performs the following setting: display control=1, release inhibit=1, AF inhibit −1, and photometric loop repeat=1, and thereafter processing proceeds to step D-426. In this step D-426, judgment is made on whether or not data for the number of film frames to be displayed is present by whether or not data of address (for example, shutter speed data) in the $E^2$PROM corresponding to the number of film frames is present. Here, where this data is present, in step D-427, display data (description for display thereof is described later) is set corresponding to the contents stored in the $E^2$PROM, which correspond to the quantity of film frames and the changing mode. Where the data of the number of film frames is not present in step D-426, specified data is set (D-428).

Description is made for setting of this specified data and the contents of display thereof in reference to FIG. 40(*f*) and (A) of FIG. 41(*c*) respectively. First, in step D-428-1, it is judged which changing mode has been set, and when it is the mode 1, display data (data 1) performing display "" is prepared for six 7-segment elements for display by numerical values (D-428-2). Where the judgment results in the mode 2, display data (data 20 which performs display "" for two 7-segment elements from the right side and puts out the other contents of display is prepared (D-428-4). Where the judgment results in the mode 3, display data which performs display "L" showing the lens information for an element located on the left end and performs display by bars for the remaining five 7-segment elements as shown by display "L " as a whole is prepared (D-428-5). After setting of the above-described respective display data, processing returns respectively. While, the micro-computer $\mu C$ of the camera body continues display irrespective of display control by the data card, release inhibit, AF inhibit and the power holding timer of the camera body.

In the above-mentioned step D-310, if judgment is made not to be "under-setting" (SETF=0), processing proceeds to step D-430 in FIG. 40(*c*), and it is judged whether or not the card switch $S_{CD}$ has been turned to ON, and when the card switch $S_{CD}$ is in the OFF state, processing returns. When the card switch is in the ON state, the display flag is set (D-433) and processing proceeds to step D-170, performing display of the card name.

In the data memory card, ON/OFF of the card function is neglected (when the card is attached, the data is memorized certainly), and in place of this, when the card switch $S_{CD}$ is operated, display of the card name is designed to be performed.

Reverting to FIG. 39, when communication is not (I), it is judged whether or not the communication is (II) in step D-35, and when the communication is (II), serial communication is performed ten times (D-45) with the card side set as the output side (D-40) to output the above-mentioned set data to the camera, and processing sleeps.

When communication is not (II), processing proceeds to step D-50 and judgment is made on whether or not the communication is (IV),and when the communication is (IV), the card is set as the output side (D-85), and display data is outputted (D-90), address is set, and serial communication is performed nine times (D-95), and processing sleeps.

When communication is not (IV), judgment is made on whether or not the communication is (V) (D-55), and when the communication is (V), the card is set as the input side (D-60) and serial communication is performed eight times (D-65) to input the data for memory from the camera. In the following step D-70, judgment is made on whether data showing the number of film frames is present ($N \neq 0$) or absent ($N \neq 0$) among the data input by the above-mentioned communication (V), and when the data as to the number of film frames is absent, assuming that the film has not been loaded, processing returns without storing the data for photography. On the other hand, when the data is present, processing proceeds to step D-73, and it is judged whether or not data showing $(N+1)$th frames (address of $N \times 8$ bytes) in the $E^2$PROM is present. Where it is not present, the number of $(N-1) \times 8$ bytes is set as head address for write and 8 is set as the number of data to be written in order to write only the inputted 8-byte data (D-76), a control signal for writing this data is outputted (D-78), and thereafter a write end signal is reset (D-80). In the above-mentioned step D-73, where data showing $(N-1)$th frames is present, head address of the $E^2$-PROM is set by $(N-1) \times 8$ bytes (input byte of SI0) and 16 is set as the number of data to be written in order to write both the above-mentioned inputted 8-byte data and the predetermined 8-byte data into the following 8 bytes (D-75), and a write control signal is outputted (D-80). Data is prepared for performing display "" as shown in Ⓑ of FIG. 41(*c*) by the display element of the right end among four display elements (each comprises 7-segments for display) which normally display the shutter speed. In addition, relating to the film speed, among four elements (same portions as in the case of the above-described shutter speed) for normally displaying this, data performing display "" is prepared for only two elements from the right side. For the lens data, among four elements for normally displaying focal length, data performing display "—" is prepared with three elements on the right side for the open diaphragm aperture value normally. For the number of film frames, data showing the value $N+1$ is prepared. This is, for example, because in the case of completing the photographing by using a 12-exposure film, a photographer should be informed of this. Thereby, it can be prevented that data are written to the same address for the same frame, and also write can be distinguished between old data and new data.

Ⓐ and Ⓑ of FIG. 41(*c*) show the contents of display thereof. When data does not exist in the next address of a number of film frames (for example, when a new IC card is attached), display as shown in Ⓐ is performed. When the above-mentioned data exists, display responding to the mode as shown in Ⓑ is performed. Ⓒ shows a normal data display and description thereon is described later.

Here, relating to the contents of display as shown in FIG. 41(*c*), description is made for an example of a data memory card.

As shown in FIG. 41(*d*), it is assumed that first, only 12 frames in a new film are exposed by the card, next, and thereafter frames of 17th to 36th in another film loaded anew and further frames of 15th to 24th in a new film further loaded are exposed. In this case, display data become as follows:

| | |
|---|---|
| 1st to 12th frames — | display Ⓒ (normal display) |
| 13th and 14th frames — | display Ⓐ |
| 15th to 24th frames — | display Ⓒ |
| 25th frame — | display Ⓑ |
| 26th to 36th frames — | display Ⓒ |

When the communication is not (V) in step D-55, assuming that it is the communication (VI), first, it is judged whether or not write has been completed by the above-mentioned end signal (D-100), and when write has been completed, a sleep-good signal is set in step D-105, and when it has not been completed, a sleep-no signal is set in step D-110, and processing proceeds to step D-115 respectively and the card is set as the data output side. Subsequently, serial communication is performed in response to clock pulses from the camera body (D-120), and processing sleeps.

For example, FIG. 41(*a*) shows the contents of display at setting. When the mode is the normal display mode (A), by depressing the card setting switch $S_{CDS}$, as shown in (B), the shutter speed, diaphragm aperture value and AE mode of the firs-frame are displayed, and "1" is displayed at the position of the number of film frames to indicate the first frame, and further blinking of the card mark is performed. As shown in (C), (D), by turning the up-down key to ON, display proceeds in the direction as shown in this figure, the number of film frames goes down (36) or up (2), and the shutter speed, diaphragm aperture value and AE mode, responding to the frame number is displayed in order.

Furthermore, when the card switch $S_{CD}$ is turned to ON, as shown in (E), 400 (film sensitivity) and +0.5 (exposure corrected value) are displayed, and by operating the up-down key, the film sensitivity and exposure corrected value are displayed in response to the frame number.

Next, when the card switch $S_{CD}$ is turned to ON, as shown in (F), the focal length and open $F_{NO}$ are displayed in response to the frame number like L105 (focal length), 4 (open $F_{NO}$), and further by turning the up-down key to ON, the number of film frames is varied and the focal length and open $F_{NO}$ are displayed in response to this number.

Then, by the next ON operation of the card switch $S_{CD}$, the display returns to (B). By processing the card setting switch $S_{CDS}$ in this state, the display turns to the normal display.

(3) Sports card

Next, description is made on operation of the sports card.

Figure 42:
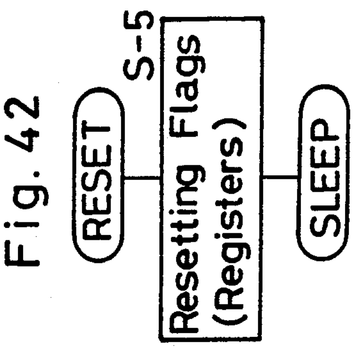
FIG. 42, FIG. 43, FIGS. 44(*a*) to 44(*c*) and FIG. 45 are flowcharts showing operation flows of a sports card.

The micro-computer $\mu C_z$ of the sports card executes a routine of resetting as shown in FIG. 42 when this card is attached to the camera body, resets all of the flags and the registers (RAM) (S-5), and processing sleeps.

Figure 43:
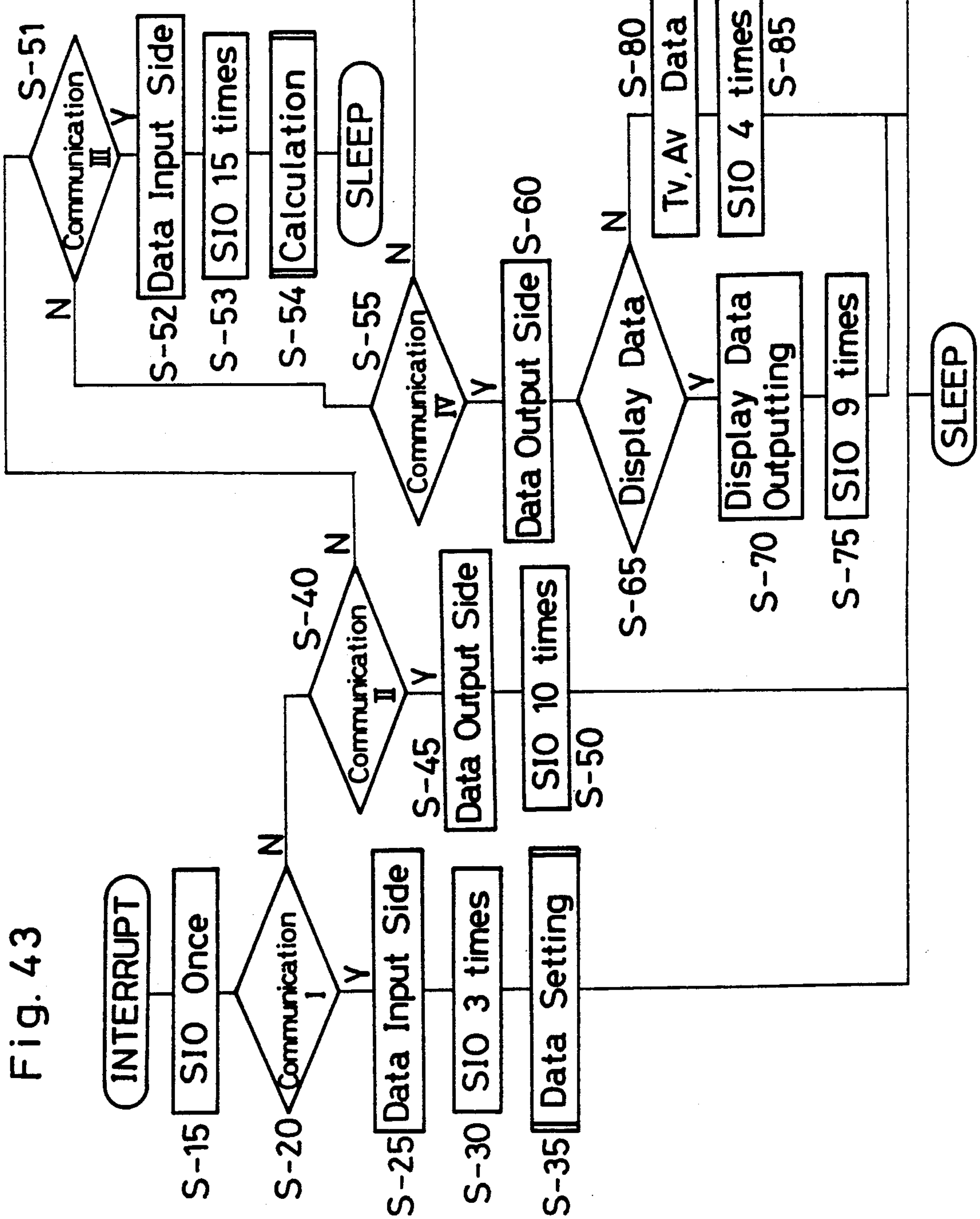

Next, when a signal changing from "L" to "H" is sent from the camera body to the terminal $C_{SCD}$ of the sports card, the micro-computer $\mu C_z$ of the sports card executes a routine of an interrupt as shown in FIG. 43. Here, in synchronism with clock pulses sent from the camera body, serial communication is performed once (S-15) to input data showing the kind of communication into the card.

The kind is judged in step S-20 from the data obtained by this communication, and when the kind is the communication (I), the card is set as the data input side (S-25), and serial communication is performed three times (S-30) to receive data (refer to Table 6 and Table 14) from the camera body. Based on this data, the micro-computer $\mu C_z$ executes a subroutine of data setting (S-35), and processing sleeps.

Here, prior to description on the above-mentioned subroutine, description is made on what sorts of data are outputted from the card in response to communication.

In the communication (II), all signals other than the following signals are set to "0".

| | |
|---|---|
| Auxiliary light inhibit (=1) | CS II -1-$b_0$ |
| FL forced OFF (=1) | CS II -1-$b_2$ |
| GN restriction release (=1) | CS II -1-$b_3$ |
| Card performs display control ? | CS II -1-$b_4$ |
| Card function ON/OFF | CS II -1-$b_5$ |
| Blurring warning buzzer EXIST/NO | CS II -1-$b_7$ |
| P shift inhibit (=1) | CS II -2-$b_0$ |
| Forced P mode (=1) | CS II -2-$b_1$ |
| Communication (V) NO (=0) | CS II -2-$b_2$ |
| AF continuous (=1) | CS II -2-$b_5$ |
| Forced AF (=1) | CS II -3-$b_1$ |
| Tv Av/display data | CS II -3-$b_3$ |
| Communication (IV) EXIST (=1) | CS II -3-$b_4$ |
| Communication (III) EXIST (=1) | CS II -3-$b_5$ |
| Group specifying (=0) | CS II -3-$b_6$ |
| Photometric loop repeat | CS II -3-$b_7$ |
| Blurring warning buzzer control (=1) | CS II -4-$b_0$ |

Signals marked with ※ on the table are set to "1" or "0" in response to the respective cases, and the control thereof is put in the ON state at "1", and put in the OFF state at "0". The determined signals are set to "0" or "1" in a fixed manner. In the communication (II), in addition to the above signals, CS II-9-$b_1$=1 is set to specify group 1 of the communication (III). Since the communication (IV) is of two display control data, CS II -10-$b_1$, $b_2$=1, 1 is set. The other are set to "0".

In addition, any data can be entered in blank spaces on the above-mentioned table.

In the communication (VI), a signal of sleep-possible is sent. This is because write control to $E^2PROM$ does not exist.

Figure 44A:
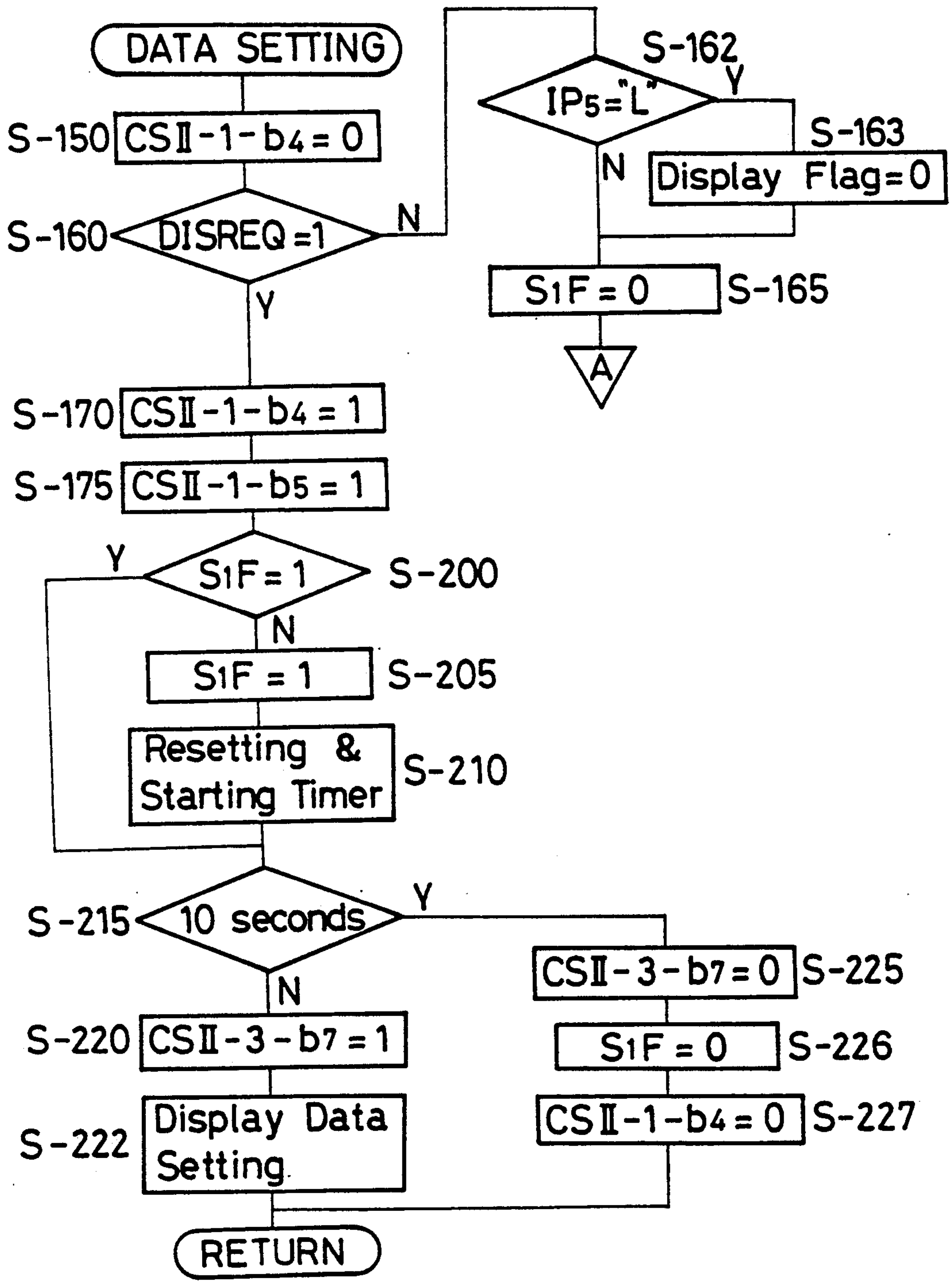
Figure 44B:
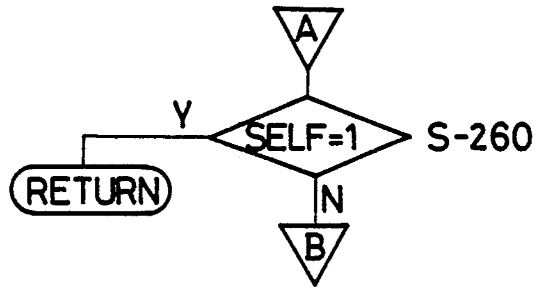
Figure 44C:
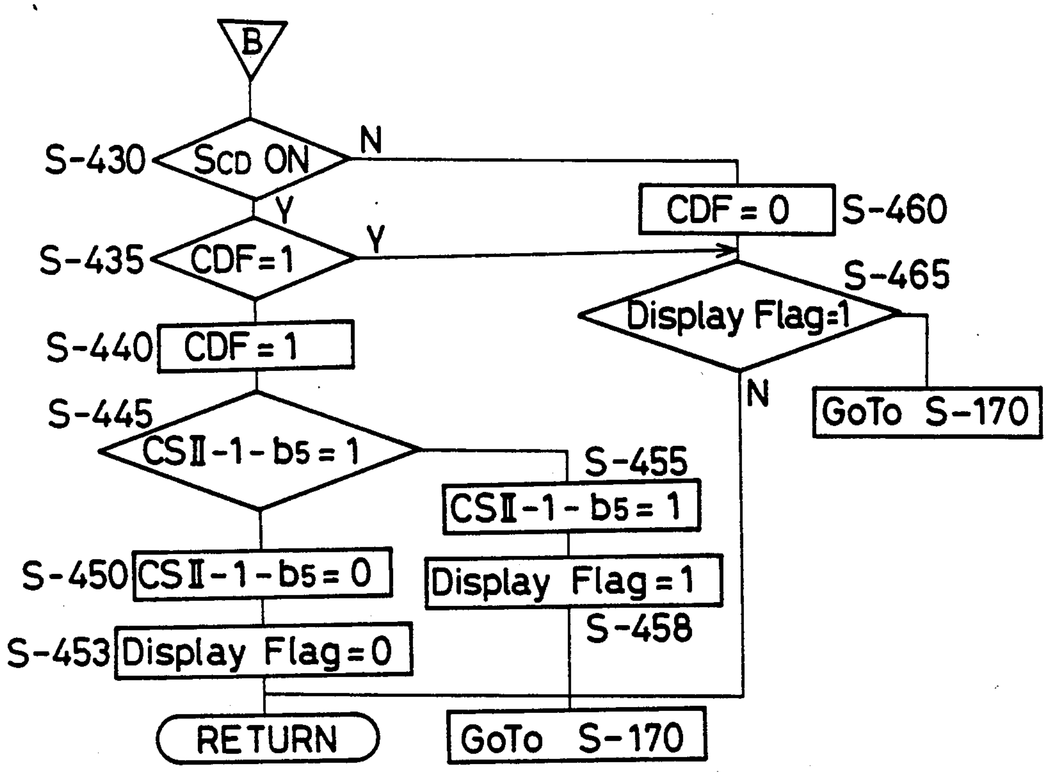
Figure 47:
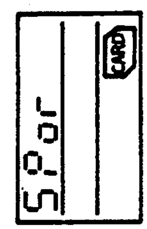
FIG. 47 is a view showing an example of display.

Next, a subroutine of data setting is shown in FIG. 44(*a*) to be explained. First, in step S-150, display control data is initialized to "0", and then in the next step S-160, judgment is made on whether or not a signal DISREQ (request of card name display) obtained by the communication (I) is "1". Here, where the signal is "1", display control data is set to "1" (S-170), card display function ON/OFF to ON (1) (CS II-1-$b_5$=1) (S-175). Subsequently, it is judged whether or not the flag S1F has been set (S-200), and where the flag has not been set, assuming that processing passes through this flow for the first time, the flag S1F is set (S-205), and the time is reset and started (S-210), and processing proceeds to step S-215. When the flag S1F has been set, processing proceeds directly to step S-215. In step S-215, it is judged whether or not 10 seconds has elapsed from the start of the above-mentioned timer, and where 10 seconds has not elapsed, the photometric loop repeat signal is set to "1" (S-220), and data performing only the card name display and the card mark display is set (S-222), and processing returns. FIG. 47 shows this display. On the other hand, where 10 seconds has elapsed, the photometric loop repeat signal is set to "0" (S-225), the flag S1F is reset (S-226) and display control data is set to "0" (S-227), and processing returns.

If DISREQ=0 in the above-mentioned step S-160, judgment is made in step S-162 on whether or not $IP_5$ is "L" (that is, any of the switches $S_{EM}$, $S_{FUN}$, $S_{CD}$, $S_{CDS}$ and $S_1$ is in the On state), and when $IP_5$ is "L", the display flag showing control performing card name display is reset (S-163), and when $IP_5$ is not "L", processing proceeds to S-165 respectively without performing anything. After resetting the flag S1F in this step S-165, processing proceeds to step S-260 in FIG. 44(*b*), and judgment is made on whether or not the signal SELF obtained by the communication (II) is "1".

Here, when the signal is "1", processing returns to inhibit control by operation of the switches of the camera (relating to the card). When the signal SELF is not "1", processing proceeds to step S-430 in FIG. 44(*c*). Here, it is judged whether or not the card switch $S_{CD}$ has been turned to ON, and when the card switch $S_{CD}$ is in the OFF state, this flag CDF is reset in step S-460, and it is judged whether or not the display flag has been set (S-465), and when it has not been set, processing returns. When it has been set, processing proceeds to step S-170 to perform control of display of the card name. In the above-mentioned step S-430 when the card switch $S_{CD}$ is in the ON state, judgment is made on whether or not the flag CDF showing that processing has passed herethrough has been set (S-435), and when it has been set, assuming that the switch is kept operated, processing proceeds to step S-465. When the flag CDF has not been set, this flag is set (S-440), and in the following step S-445, judgment is made on whether or not the card function is in the ON state based on data CS II-1-$b_5$ at present. And where it is in the ON state (CS II-1-$b_5$), it is set to OFF (data of the communication II) (S-450), and the display flag is rest (S-453) and processing returns. Where the function is in the OFF state (CS II-1-$b_5$=0), it is turned to ON (data of the communication II) in step S-455, and the display flag is set in step S-458 and processing proceeds to step S-170 to perform control of display of the card name.

Reverting to FIG. 43, when communication is not (I), it is judged in step S-40 whether or not the communication is (II) and when the communication is (II), serial communication is performed ten times (S-50) with the card side set as the output side (S-45) to output the above-mentioned set data to the camera body, and processing sleeps.

When communication is not (II), it is judged in step S-51 whether or not the communication is (III), and when the communication is (III), the card is set as the input side (S-52), and serial communication is performed fifteen times (S-53) to input the data of the camera. In the following step S-54, data for controlling the camera is calculated (including exposure calculation) and processing sleeps. This calculation is described later.

When communication is not (III), it is judged in step S-55 whether or not the communication is (IV), and when the communication is (IV), the card is set as the output side (S-60), and in step S-65 it is judged whether or not data is for display control, and when the data is the display control, display data is outputted (S-70), the address is set and serial communication is performed nine times (S-75), and there after processing sleeps. When the result is not display control (TV, AV data), TV, AV data is addressed, and serial communication is performed four times (S-85), and processing sleeps. When the communication is not (IV) in step S-55, assuming that it is the communication (VI), first, the card is set as the output side (S-120), serial communication is performed once in response to clock pulses from the camera body (S-125), and processing sleeps.

Figure 45:
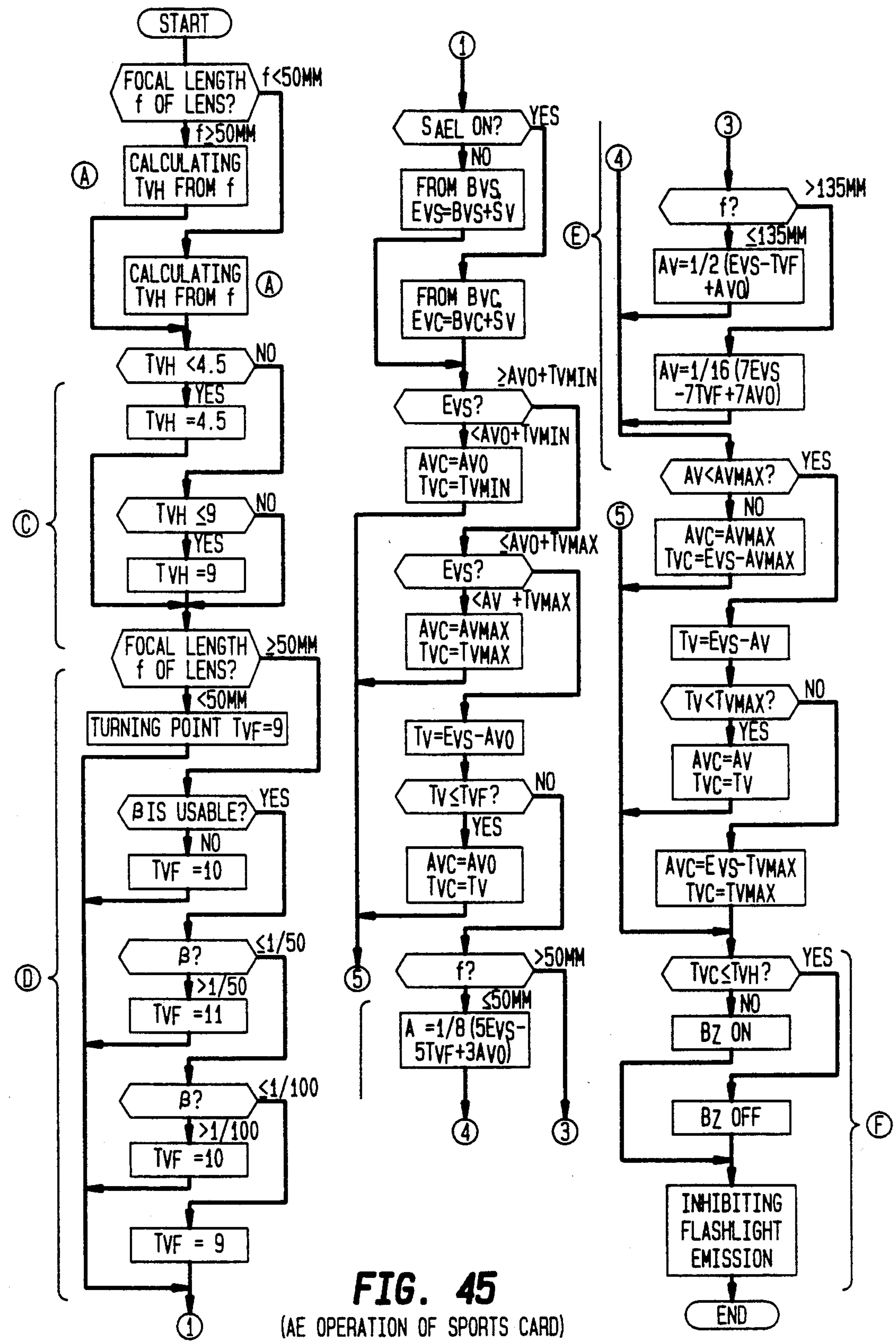

Next, description is made on AE (exposure) calculation in step S-54 in FIG. 43 in reference to FIG. 45.

In step Ⓐ, the standard value $T_{VH}$ of the shutter speed is calculated with equations as follows to sound the blurring warning buzzer.

In lens having a longer focal length it is easier to cause blurring of the picture and therefore where the focal length is made longer, $T_{VH}$ is made faster.

$$T_{VH}=1.25\times(zFz-56)/16+5.875$$

$$zFz=16\times\log_2(f/50)+56$$

(f: focal length of a lens in mm)
For example,
$f=105$ mm $T_{VH}\approx7.2(ss\approx1/143)$
$f=210$ mm $T_{VH}\approx8.5(ss\approx1/353)$ In step Ⓑ, as similar to the case of Ⓐ, $T_{VH}$ is calculated. This is because a warning is given when TV becomes extremely slow even in the case of a wide-angle lens.

$$zFz=16\times\log_2(f/50)+56$$

$$T_{VH}=1.125\times(zFz-56)/16+5.875$$

For example,
$f=35$ mm $T_{VH}\approx5.3(ss\approx1/37)$ $F=2.8$

In step Ⓒ, even if the focal length f of a lens is short, when the shutter speed is extremely slow, the blurring warning buzzer BZ is sounded. Conversely, where the focal length f is long, $T_{VH}$ is limited so as not to sound the buzzer Bz when the shutter speed is increased over a certain amount.

$$\left.\begin{array}{ll}\text{If } T_{VH} < 4.5 & T_{VH} = 4.5\\ \text{If } T_{VH} \geqq 9 & T_{VH} \geqq 9\end{array}\right\}\text{are set.}$$

In step Ⓓ, the shutter speed at the bending point of the line of AE calculation is calculated. If the focal length f is $f<50$ mm, the possibility of blurring is low, and therefore the line of diaphragm aperture is set on as small side as possible. If $f\geqq50$ mm, when a subject is near and taken in a large size, presuming a moving subject, to set a line making the shutter speed faster, the line is changed depending on the image magnification.

Then, when the image magnification data cannot be used ($b_1$ of AEFLAG of input data at the communication (III), $b_1=0$), $T_{VF}$ of the turning point is set uniformly to $T_{VF}=10$. When the data can be used ($b_1=1$), setting is made as follows:

$$\begin{array}{lll} & \beta > 1/50 & T_{VF} = 11\\ 1/100 \leqq & \beta < 1/50 & T_{VF} = 10\\ & \beta < 1/100 & T_{VF} = 9\end{array}$$

When the switch $S_{AEL}$ is in the ON state (CS I -1-$b_7$), the exposure value EVS is calculated from the luminance BVC of spot — luminance of $BV_2$—, and when CS I-1-$b_7$ is set by the OFF state of the switch $S_{AEL}$, the exposure value EVS is calculated from the luminance BVS — luminance of main subject —.

Then, when the above-mentioned EVS evaluated from the maximum diaphragm aperture value AVMAX and the minimum diaphragm aperture value AVMin or AVO and the maximum shutter speed TVmax and the minimum shutter speed TVmin is the control limit (more than AVmax+TVmax or less than AVO+TVmin), EVS is set to the above-mentioned limit value, and processing proceeds to judgment of blurring.

When EVS is the above-mentioned limit value, TV=EVS−AVO, TVC=TV, and AVC=AVO are set, and processing proceeds to judgment of blurring, and if the shutter speed is less than the turning point $T_{VF}$ of the program line diagram, when this TV exceeds the turning point $T_{VF}$, the inclination of AE calculation is changed depending on the focal length of the lens.

Where the focal length is long, a line making the shutter speed faster is set to prevent the camera from a blurring.

Where the focal length is short, considering portrayal, a line making the diaphragm aperture a little smaller is set.

Figure 46:
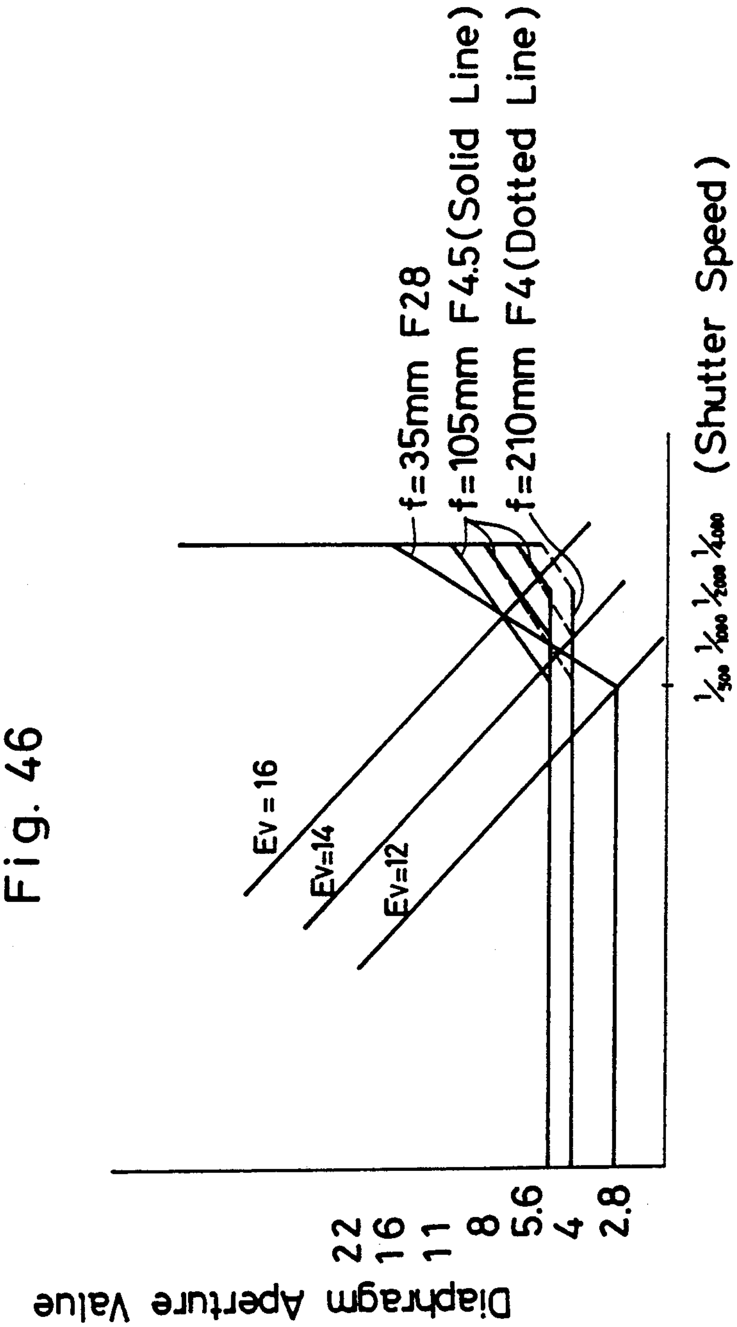
FIG. 46 is a view relating to setting of an exposure value thereof.

FIG. 46 shows the above-described program lines written for the following three lenses for example;

$f = 38$ mm $F = 2.8$
$f = 105$ mm $F = 4.5$
$f = 210$ mm $F = 4$

When the diaphragm aperture value AV thus evaluated exceeds AVmax, assuming AVC=AVmax, the shutter speed TVC=EVS−AVmax is set.

When the calculated diaphragm aperture value AV does not exceed AVmax, judgment is made on whether or not TV calculated from TV=EVS−AV exceeds TVmax, and when it does not exceed, TVmax, AVC=AV and TVC=TV are set, and when it exceeds, TVmax, TVC=TVmax is set, and the control diaphragm aperture value AVC is re-evaluated from AVC=EVS−TVmax.

Ⓕ when a blurring occurs, to give a blurring warning, a signal (CS II-1-$b_7$) of the communication (II) is set to 1, a nd when a blurring does not occur, this signal (CS II-1-$b_7$) is set to 0.

Then, a bit $b_0$ of a signal CTRLB of the communication (IV) is set to 0, and flashlight emission is inhibited.

(4) Auto depth card

Next, description is made on operation of the auto depth card.

The auto depth card is designed so that not only a main object but also the background is placed in a focused state by placing them in the depth of field.

Figures 48, 49:
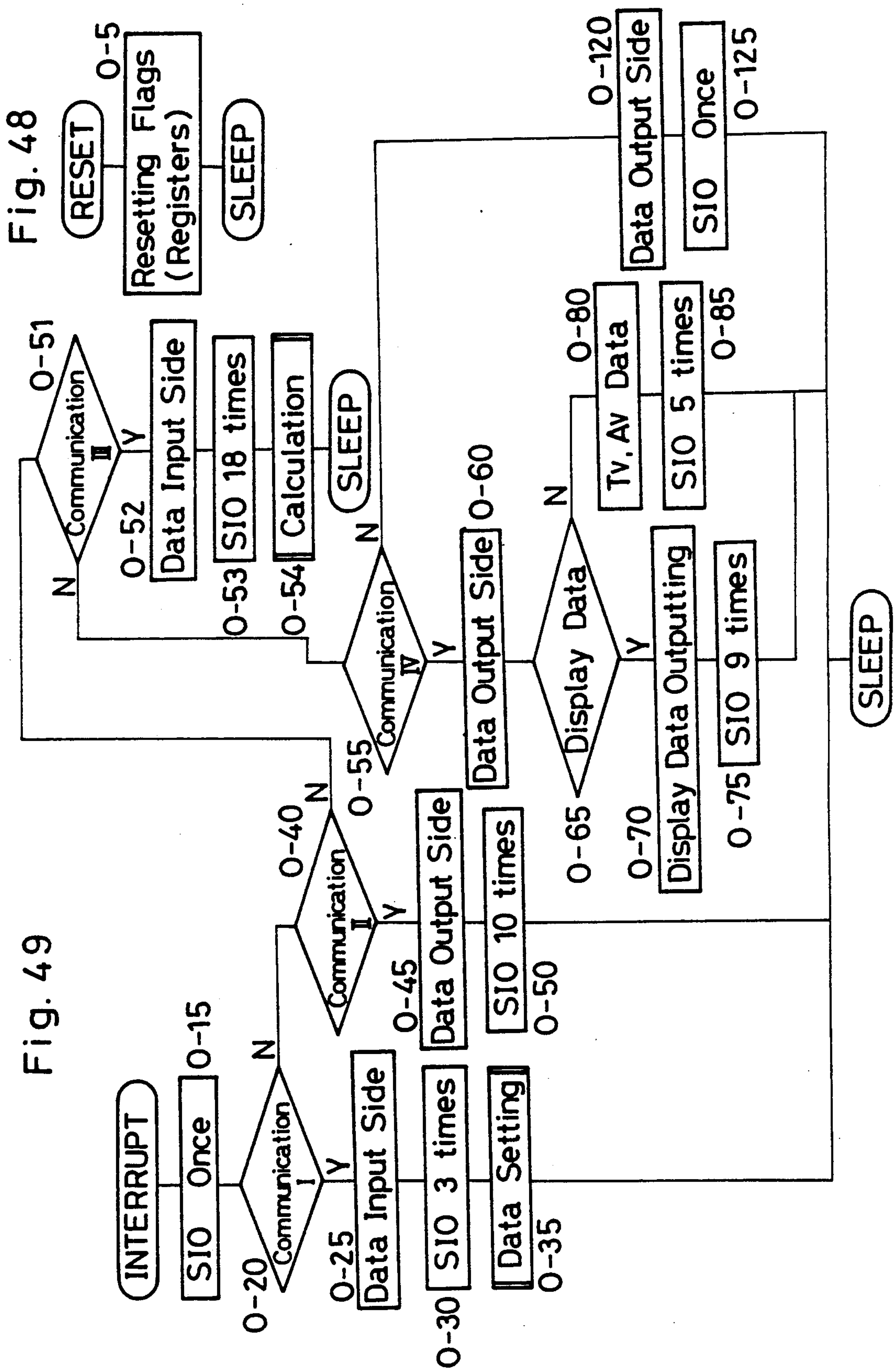
FIG. 48, FIG. 49, FIGS. 50(*a*) and 50(*c*) and FIGS. 51(*a*) to 51(*c*) are flowcharts showing operation flows of an auto depth card.

The micro-computer $\mu C_z$ of the auto depth card executes a routine of resetting as shown in FIG. 48 when this card is attached tot he camera body, resets all of the flags and the registers (RAM) (0-5), and then processing sleeps.

Next, when a signal changing from "L" to "H" is sent from the camera body to the terminal $C_{SCD}$ of this card, the micro-computer $\mu C_z$ of the auto depth card executes a routine of an interrupt as shown in FIG. 49. Here, in synchronism with clock pulses sent from the camera body, serial communication is performed once (0-15) to input data showing the kind of communication into the card.

The kind is judged (0-20) from the data obtained by this communication, and when the kind is the communication (I), the card is set as the data input side (0-25), and serial communication is performed three times (0-30) to receive data (refer to table 6 and table 15) from the camera body. Based on this data, the micro computer $\mu C_z$ executes s subroutine of data setting (0-35), and processing sleeps.

Here, prior to description on the above-mentioned subroutine, description is made on what kinds of data are outputted from the card in response to a communication.

In the communication (II), all signals other than the following signals are set to "0".

| | |
|---|---|
| FL forced ON | CS II -1-$b_1$ |
| GN restriction release (=1) | CS II -1-$b_3$ |
| Card performs display control | CS II -1-$b_4$ |
| Card function ON/OFF | CS II -1-$b_5$ |
| Snap driving bit | CS II -1-$b_6$ |
| Blurring warning buzzer EXIST/NO | CS II -1-$b_7$ |
| P shilt inhibit (=1) | CS II -2-$b_0$ |
| Forced P mode (=1) | CS II -2-$b_1$ |
| Communication (V) NO (=0) | CS II -2-$b_2$ |
| AF one-shot (=1) | CS II -2-$b_5$ |
| Forced AF (=1) | CS II -3-$b_1$ |
| Tv · Av/display data | CS II -3-$b_3$ |
| Communication (IV) EXIST (=1) | CS II -3-$b_4$ |
| Communication (III) EXIST (=1) | CS II -3-$b_5$ |
| Group specifying (=0) | CS II -3-$b_6$ |
| Photometric loop repeat | CS II -3-$b_7$ |
| Blurring warning buzzer control (=1) | CS II -4-$b_0$ |

Signals marked with ♦ on the table are set to "1" or "0" in response to the respective cases, and the control thereof is put in the ON state at "1", and put in the OFF state at "0". The determined signals are set to "0" or "1" in a fixed manner. In the communication (II), in addition to the above signals, CS II-9-($b_0$, $b_1$)=1, 1 is set to specify specify groups $G_0$, $G_1$ of the communication (III) in group communication. Further, since the communication (IV) is of three data types of display control data and lens driving data, CS II-10-$b_1$, $b_2$, $b_3$—1, 1, 1 is set. The others are set to "0".

In addition, any data can be entered in blank spaces on the above-mentioned table.

In the communication (VI), a signal of sleep-good is sent.

Figure 50A:
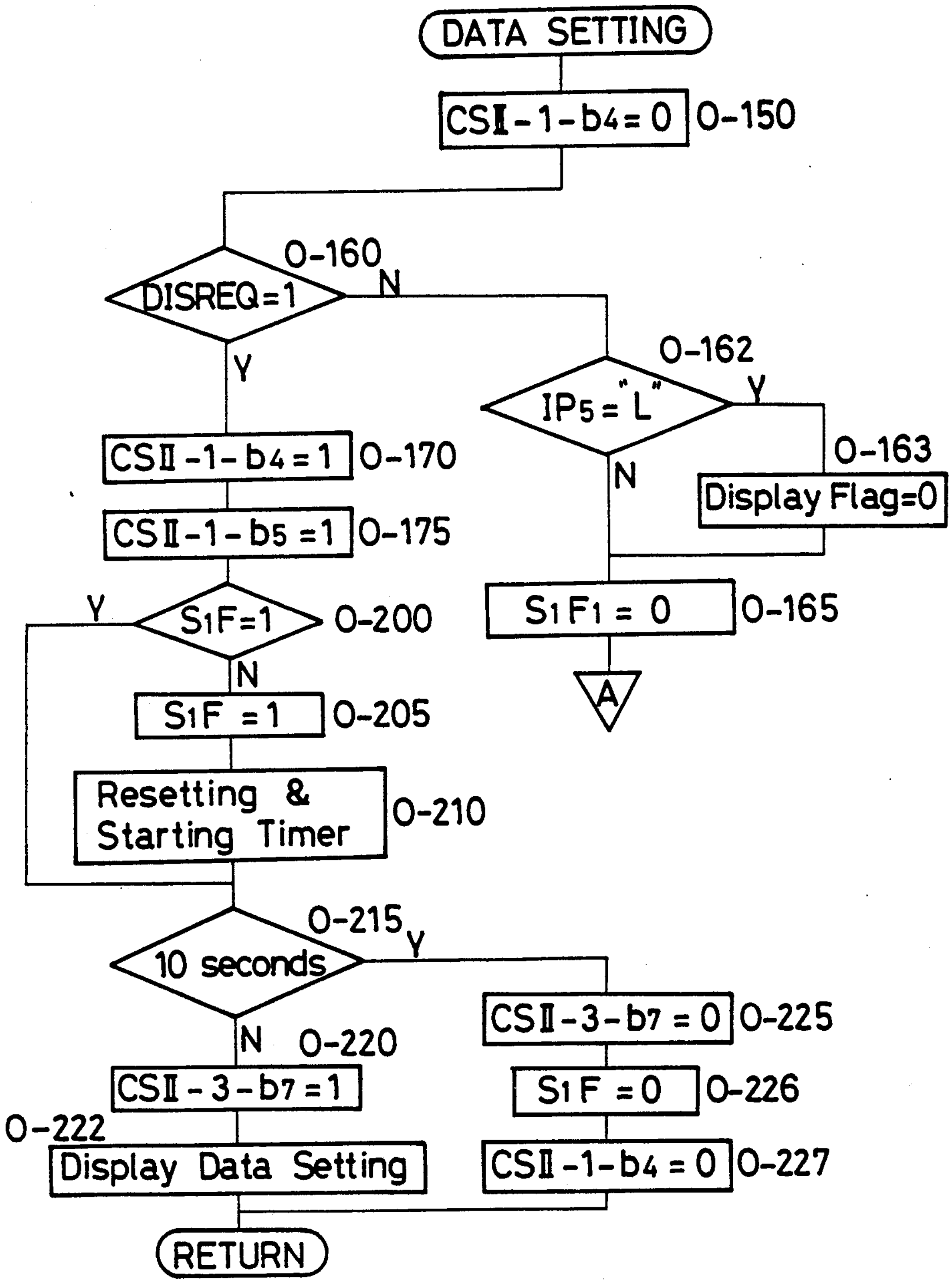
Figure 50B:
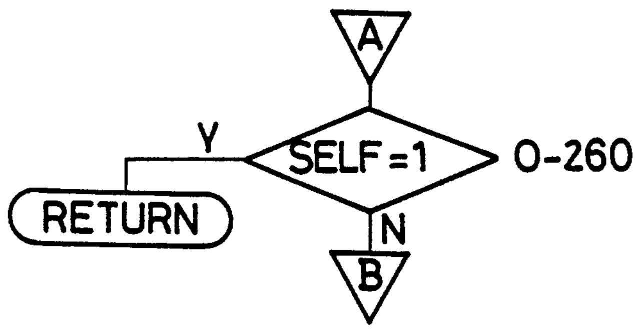
Figure 50C:
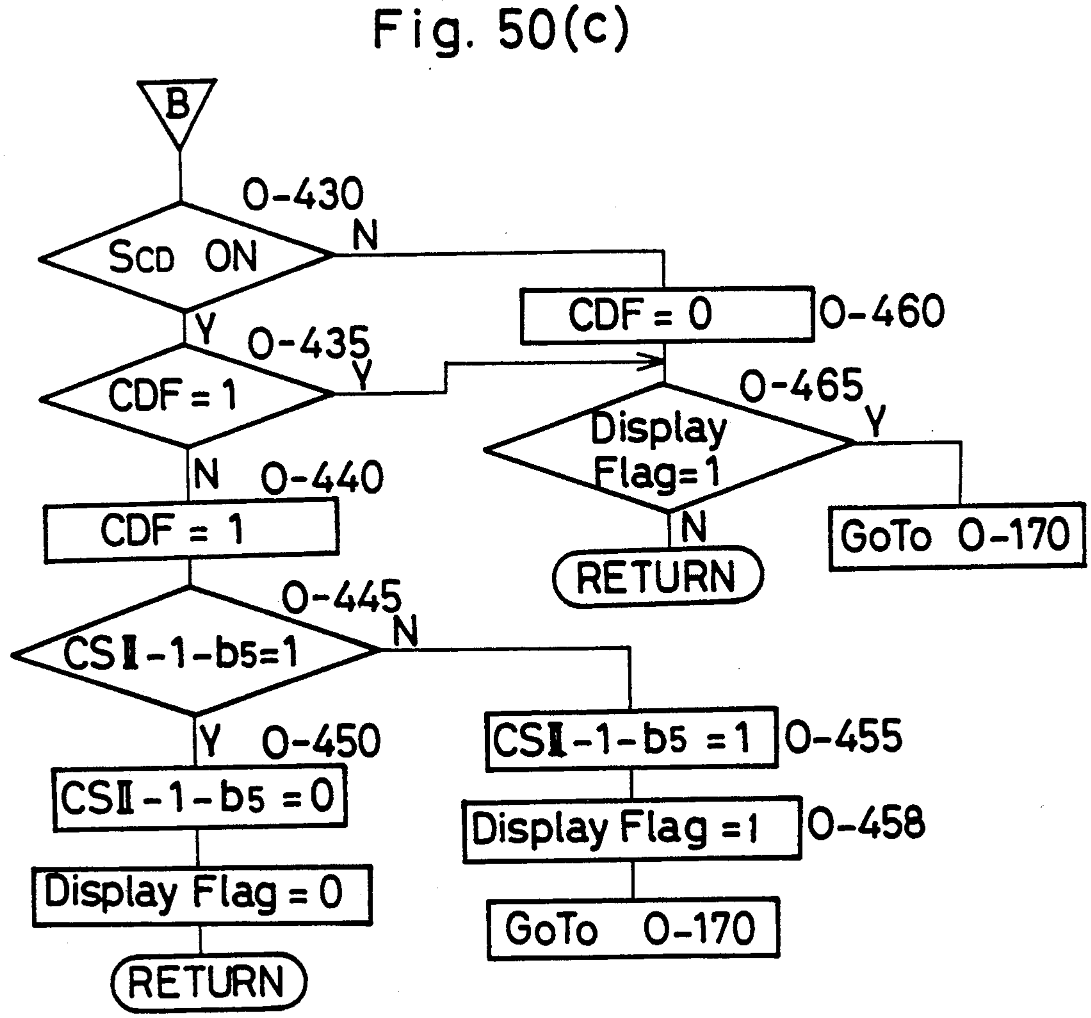
Figure 52:
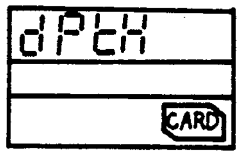
FIG. 52 is a view showing an example of display.

Next, a subroutine of data setting is shown in FIG. 50(*a*) to be explained. First, in step 0-150, display control data is initialized to "0" (CS II-1-$b_4$=0), and in the following step 0-160, judgment is made on whether or not a signal DISREQ (request of card name display) obtained by the communication (I) is "1", and where the signal is "1", display control data is set to "1" (0-170), and card display function ON/OFF to ON (CS II-1-$b_5$—1) (0-175). Subsequently, it is judged in step 0-200 whether or not the flag S1F has been set, and where the flag has not been set, assuming that processing passes through this flow for the first time, the flag S1F is set (0-205), and the timer is reset and started (0-210), and processing proceeds to step 0-215. When the flag S1F has been set, processing proceeds directly to step 0-215. In step 0-215, it is judged whether or not 10 seconds has elapsed from the start of the above-mentioned timer, and where 10 seconds has not elapsed, the photometric loop repeat signal is set to "1" (CS II-3-$b_7$=1) (0-220), and data performing only the card name display and the card mark display is set (0-222), and processing returns. FIG. 52 shows this display. On the other hand, where 10 seconds has elapsed, the photometric loop repeat signal is set to "0" (0-225); the flag S1F is reset (0-226), and display control data is set to "0" (0-227), and processing returns.

If DISREQ=0 in the above-mentioned step 0-160, judgment is made on whether or not $IP_5$ is "L" (that is, any of the switches $S_{EM}$, $S_{FUN}$, $S_{CD}$, $S_{CDS}$ and $S_1$ is in the ON state) (0-162), and when $IP_5$ is "L", the display flag showing control performing card name display is reset (0-163), and when $IP_5$ is not "L", processing proceeds to 0-165 respectively without performing anything. After resetting the flag S1F in this stp 0-165, processing proceeds to step 0-260 in FIG. 50(*b*), and judgment is made on whether or not the signal SELF obtained by the communication (II) is "1".

Here, when the signal is "1", processing returns to inhibit controlling by operation of the switches of the camera (relating to the card). When the signal SELF is not "1", processing proceeds to step 0-430 in FIG. 50(*c*), and it is judged whether or not the card switch $S_{CD}$ has been turned to ON, and when the card switch $S_{CD}$ is in the OFF state, in step 0-460, this flag CDF is reset, and in step 0-465 it is judged whether or not the display flag has been set, and when it has not been set, processing returns. When it has been set, processing proceeds to step 0-170, and performs control of display of the card name as shown in FIG. 52. In the above-mentioned step 0-430, when the card switch $S_{CD}$ is in the ON state, judgment is made on whether or not the flag CDF showing that processing has passed herethrough has been set (0-435), and when it has been set, assuming that the switch is kept operated, processing proceeds to step 0-465.

When the flag CDF has not been set, this flag is set (0-440), and in the following step 0-445, judgment is made on whether or not the card function is in the ON state based on data CS II-1-$b_5$ at present, and where it is in the ON state (CS II-1-$b_5$—1), it is set to OFF (data of the communication II) (0-450), and the display flag is reset and processing returns. Conversely, where the function is in the OFF state (CS II -1-$b_5$=0), it is turned to ON (data of the communication II) in step 0-455, and the display flag is set in step 0-458 and then processing proceeds to step 0-170 to perform control of display of the card name.

Reverting to FIG. 49, when communication is not (I), it is judged in step 0-40 whether or not the communication is (II) is judged, and when the communication is (II), serial communication is performed ten times (0-50)

with the card set as the output side (0-45) to output the above-mentioned set data to the camera body, and processing sleeps.

When communication is not (II), whether or not the communication is (III) is judged (0-51), and when the communication is (III), serial communication is performed eighteen times (0-53) with the card set as the input side (0-52). In the following step 0-54, data for controlling the camera is calculated (including exposure calculation), and processing sleeps. This calculation is described later.

When communication is not (III), judgment is made in step 0-55 on whether or not the communication is (IV), and when the communication is (IV), the card is set as the output side (0-60), and it is judged in step 0-65 whether or not data is of display control, and when the data is of display control, display data is outputted (0-70), address is set, serial communication is performed nine times (0-75), and processing sleeps. When the result is not display control (that is, in the case of TV, AV data), TV, AV data is addressed (0-80), and serial communication is performed five times (0-85), and processing sleeps.

When the communication is not (IV), assuming that it is the communication (VI), first, the card is set as the output side (0-120), and serial communication is performed once in response to clock pulses from the camera body (0-125), and processing sleeps.

Figure 51A:
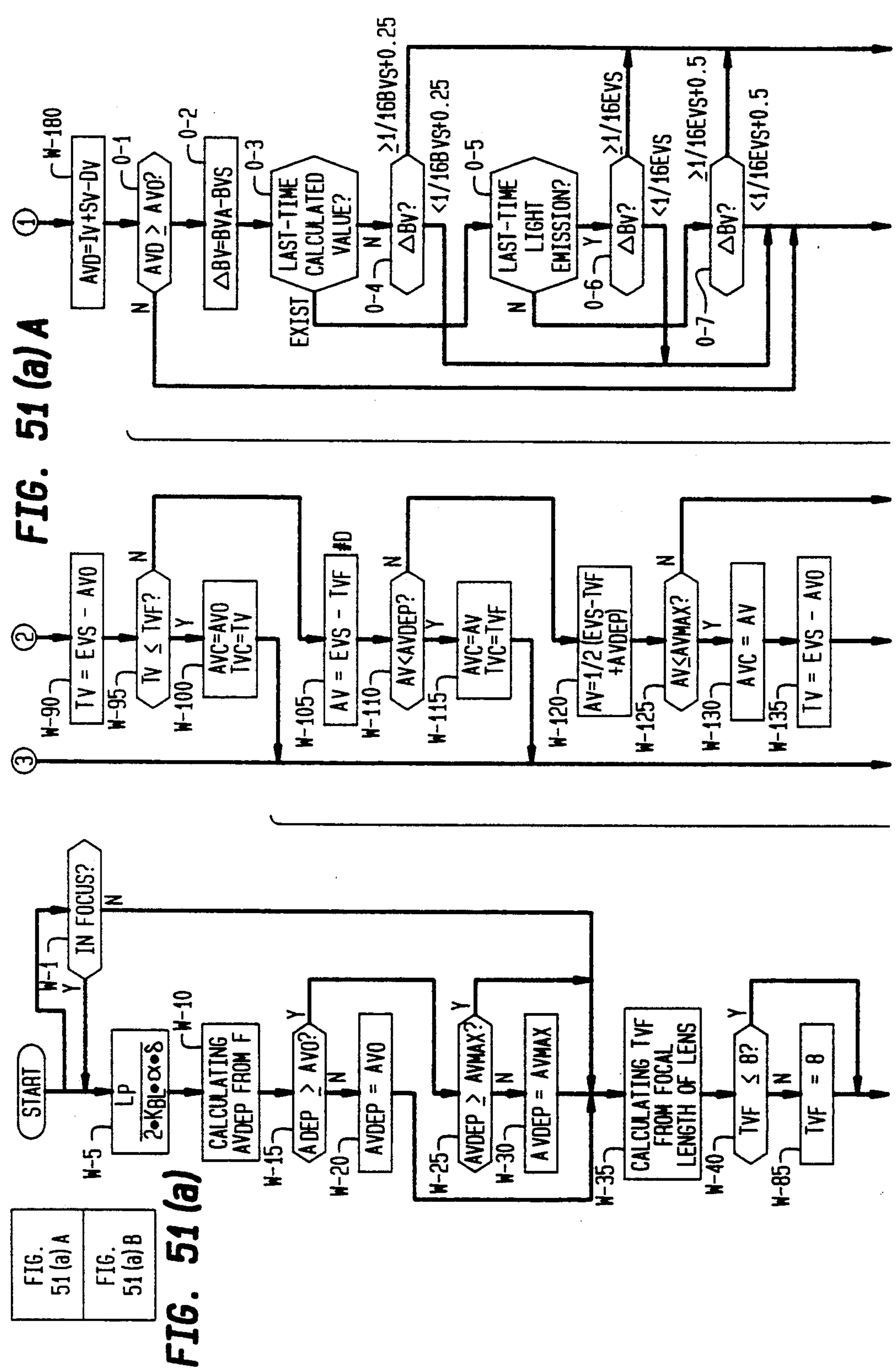
Figure 51:
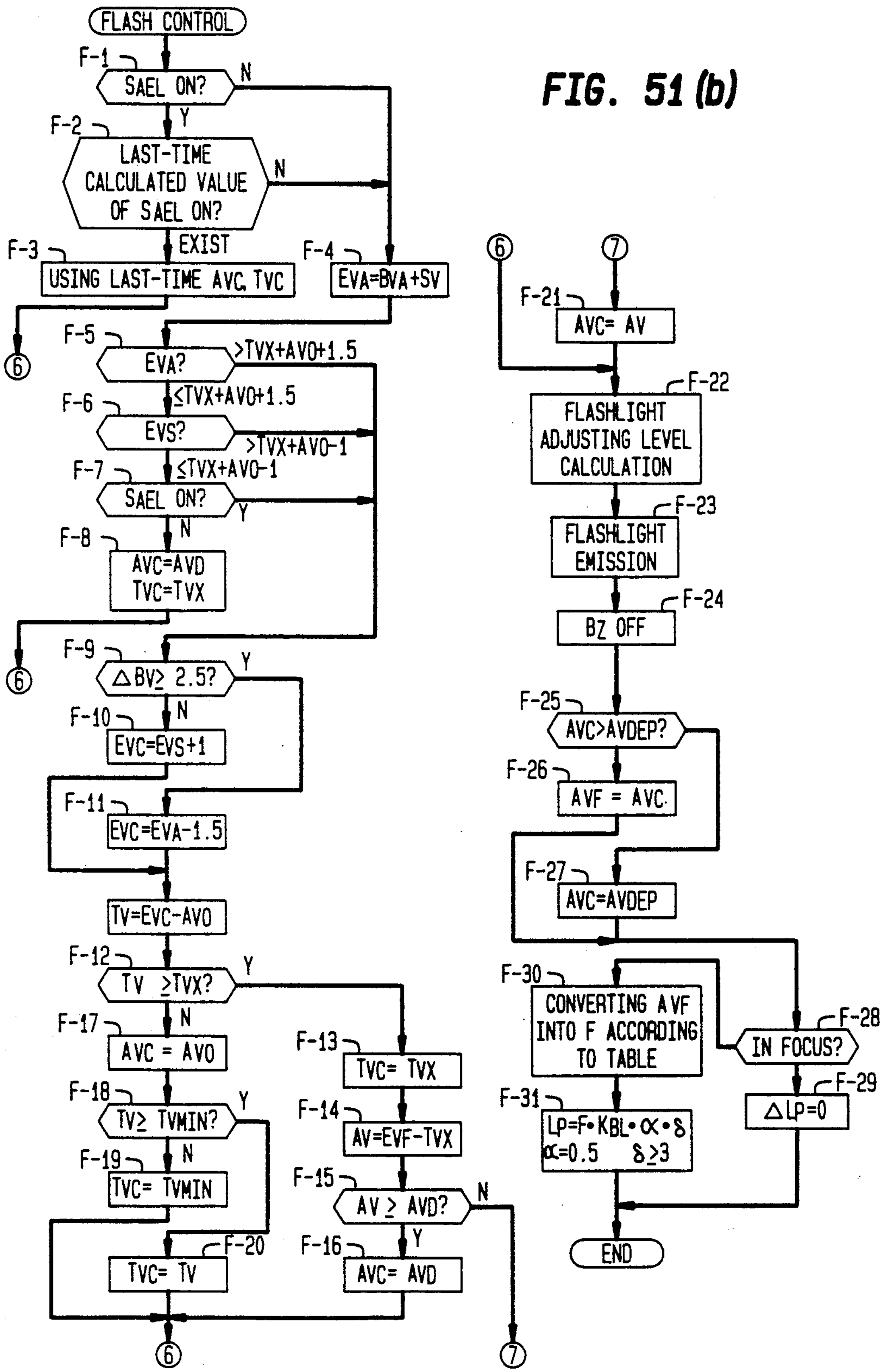
Figure 51C:
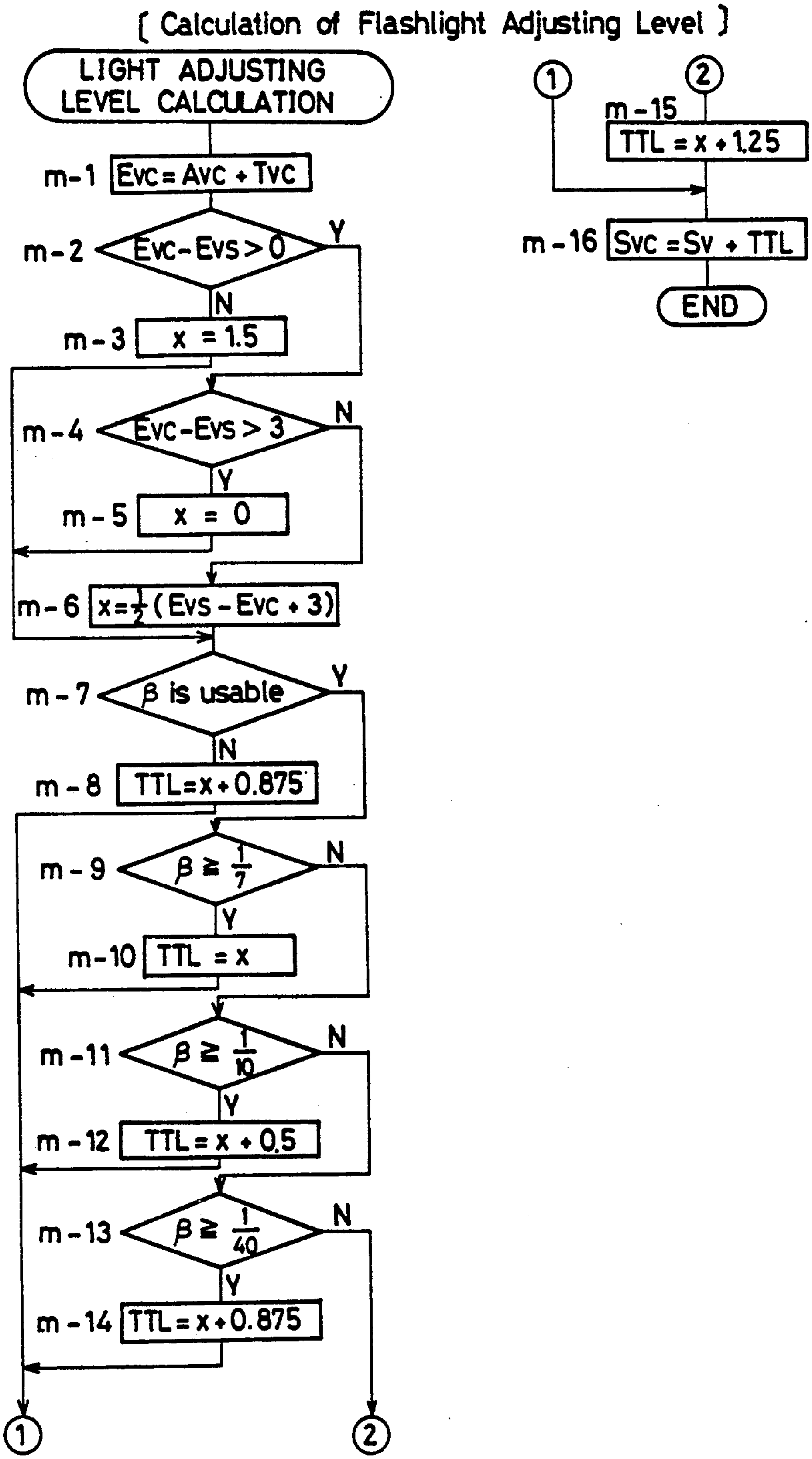

Next, description is made on a flowchart of performing AE (exposure) calculation of the auto depth card based on FIGS. 51(*a*) and 51(*b*). First, it is judged whether or not a subject is in-focus based on a bit $b_0$ of FLGO inputted by the communication (II). In the case of out-of-focus ($b_1=0$), the diaphragm aperture $A_{VDEP}$ is set to the open F number AVO of the shallowest depth, and processing proceeds to step W-35. This card is so designed that both the subject and the background are focused, and therefore these distance information cannot be obtained unless the subject is in focus. Then, considering the open F number showing the shallowest value of depth, by placing the subject at the front of this depth (camera side), the subject is focused at any diaphragm aperture value. When the subject is in focus ($b_0=1$), this diaphragm aperture value is calculated in step W-5 by $$F = \frac{Lp}{2K_{BL} \cdot \alpha \cdot \delta}$$

where, α and δ represent constants relating to the depth,

This F number is a diaphragm aperture value for covering the subject and the position of ∞ with its depth, where the lens which is shifted of value Lp is located on the half position between the subject position and ∞.

This F number is set as an apex value $A_{AVDEP}$(W-10).

In step W-5, the diaphragm aperture value for satisfying the present lens position; i.e., subject position and the position of ∞ with its depth is calculated.

The lens shifting adjustment value ΔLp with respect to the lens position of in-focusing a main subject is calculated based on this value.

The value Lp is 0 at infinity, and becomes larger as the distance becomes nearer. At infinity, the lens is not required to be shifted, so that shifting adjustment value ΔLp is set to 0. As the subject comes nearer, the lens with a small aperture value has to be moved greatly also for focusing the background, and therefore the F number should become larger. When the evaluated $A_{VDEP}$ is not more than the open diaphragm aperture value AVO of the lens and not less than the maximum diaphragm aperture value AVmax, the limit value thereof is set to AVO or AVmax (W-15∼W-30).

Figure 53:
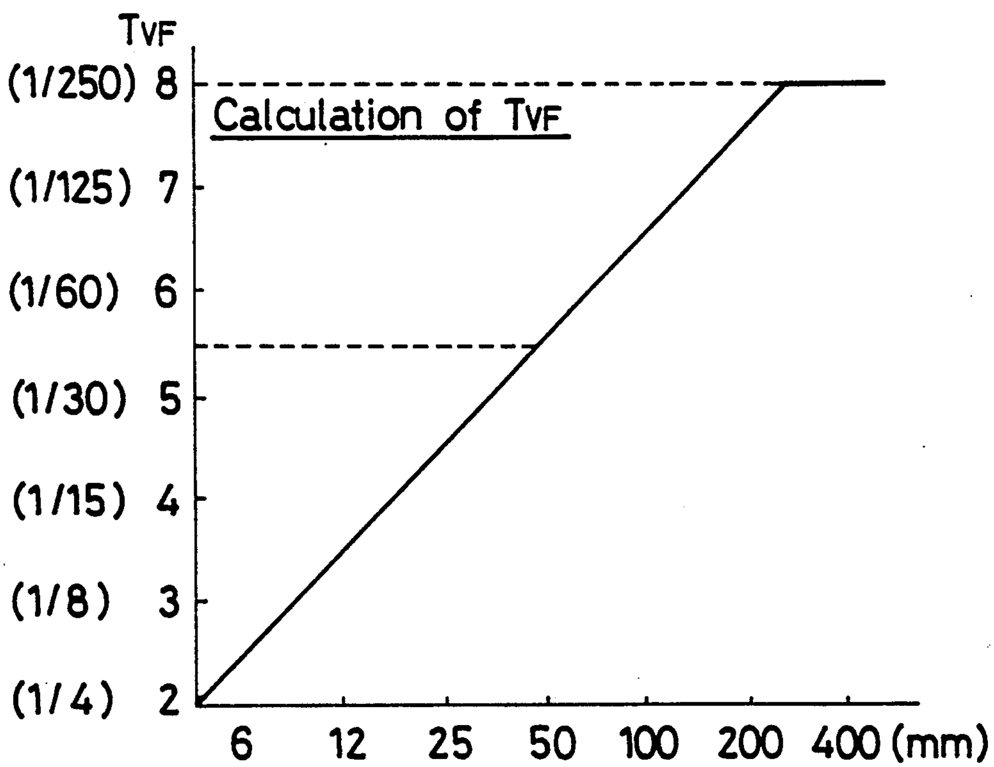
FIG. 53, FIG. 54 and FIG. 55 are explanatory views thereof.

In step W-35, the standard value $T_{VF}$ of the shutter speed is calculated to sound the blurring warning buzzer. A lens having a longer focal length is easier to cause a blurring, and therefore, the value $T_{VF}$ is fixed to prevent blurring for such a lens. (Refer to FIG. 53).

$$zFz = 16 \times \log_2(f/50) + 56$$

(f: focal length of a lens in mm)

$$T_{VF} = \frac{1}{8}(\frac{1}{2} \times zFz + 16)$$

When the shutter speed becomes faster over a certain degree ($T_{VF}>8$), $T_{VF}=8$ is set so as not to sound the blurring warning buzzer (W-40, W-45).

When the flash switch is not in the ON state, the exposure value $E_{VS}$ is calculated in step W-65 from the spot luminance BVC (luminance of $BV_Z$) if the switch $S_{AEL}$ is in the ON state (CS I-1-$b_7-1$), and the control exposure value EVS is calculated in step W-60 from the photometric luminance BVS: luminance of main subject, if the switch $S_{AEL}$ is in the OFF state (CS I -1-$b_7=0$), respectively.

Figure 54:
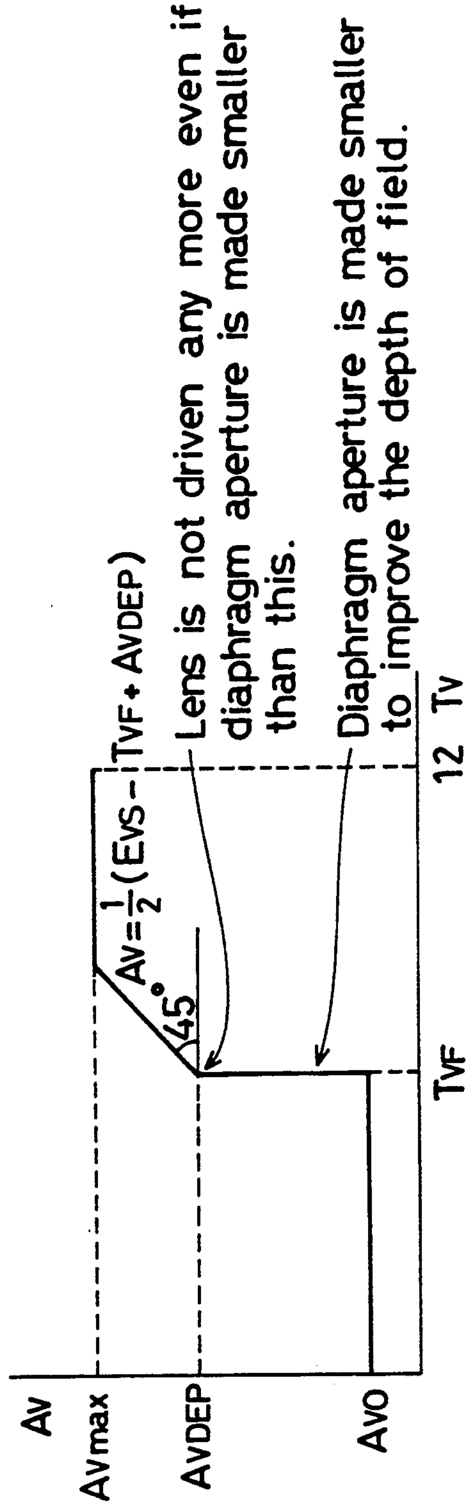

Then, when the above-mentioned exposure value EVS evaluated from the maximum AVmax and the minimum AVmin (or AVO) of the diaphragm aperture value and from the maximum TVmax and the minimum TVmin of the shutter speed is the control limit (more than AVmax+TVmax or less than AVO+TVmin), it is set to the above-mentioned limit value (W-75, W-85), and processing proceeds to judgment of blurring. When it is within the above-mentioned limit range. TV=EVS−AVO is set (W-90). Further in step W-100, TVC=TV and AVC=AVO are set if the shutter speed is not more than the blurring speed $T_{VF}$, and processing proceeds to judgment of blurring (W-160). And when the value TV exceeds the blurring speed $T_{VF}$, in step Ⓓ, non-blurring has priority if EVS>AVO+$T_{VF}$, and a line making the diaphragm aperture smaller is set to improve the depth of field (#D). If EVS≦$A_{VDEP}$+$T_{VF}$, the control diaphragm aperture value AVC is set to TV, and the control shutter speed TVC is set to TV in step W-115. If EVS>$A_{VDEP}$+$T_{VF}$, the effect is the same even if the diaphragm aperture value is more reduced than this ($A_{VDEP}$), and therefore a line diagram that AV and TV are increased at the same rate is set (refer to FIG. 54) in step W-120.

When the calculated AV exceeds the maximum diaphragm aperture value AVmax, the control diaphragm aperture value AVC is set to AVmax, and the control shutter speed TVC to EVS−AVmax in step W-155. When the calculated diaphragm aperture value AV does not exceed the maximum diaphragm aperture value AVmax, this is set as the control diaphragm aperture value AVC in step W-130, and the operated TV is evaluated by TV=EVS−AV in step W-135, and it is judged whether or not this exceeds TVmax in step W-140, and when this exceeds, the control shutter speed TVC is set to TVmax, and the control diaphragm aperture value AVC is re-evaluated by AVC=EVS-TVmax in step W-150. When the calculated shutter speed TV does not exceed TVmax, the calculated shutter speed TV is set as the control shutter speed TVC in step W-145.

In the case of (F) (that is, when the calculated shutter speed TVC is less than $T_{VF}$), a signal (S II-1-$b_7$) of the communication (II) is set to 1 to give a blurring warning, and in the case on non-blurring, this signal S II-1-$b_7$) is set to 0.

Then, a bit $b_0$ of a signal CTRLB of the communication (IV) is set to 0, and flashlight emission is inhibited.

When the flash switch is in the ON state in step W-50, processing proceeds to step W-180 and here, the diaphragm aperture value $A_{VD}$ at that time is calculated by $$A_{VD}=IV+SV-D_v$$

IV: quantity of light emission (guide number)
SV: film speed
DV: apex value converted from the subject distance Next, description is made on routine (E).

| | |
|---|---|
| 0-1 | —It is judged whether or not $A_{VD}$ is not less than Avo (open F-value Avo) ($A_{VD} \geqq$ Avo). |
| 0-2 | —A luminance difference ΔBv from background is evaluated from $B_{VA}$ (luminance of $B_{V4}$)-Bvs (luminance of main subject). |
| 0-3 | —It is judged whether or not the last-time calcuated value ΔBv exists. |
| 0-4 | —Where the value ΔBv does not exist, it is judged whether or not ΔBv ≧ 1/16Bvs + 0.25 is satisfied. As the subject becomes brighter, the leve of the judgment thereof is made higher, and thereby the increase of the effect of the light straying from the background to the subject is reduced. If ΔBv ≧ 1/16 + 0.25, processing proceeds to flash control routine. |
| 0-5 | —When the last-time calculated value ΔBv exists, it is judged by the result of the last-time calculation whether or not the mode is the light emission mode (flash control). |
| 0-6 | —When the mode is the light emission mode, it is judged whether or not ΔBv ≧ 1/16Bvs holds. By reducing ΔBv from the value of 0-4 by 0.25Ev, light is made easier to emit. If ΔBv ≧ 1/16Bvs, processing proceeds to flash control routine. |
| 0-7 | —When the mode is not the last-time light emission mode, it is judged whether or not ΔBv ≧ 1/16Bvs + 0.5 holds. By increasing ΔBv from the value of 0-4 by 0.25Ev, light is made harder to emit. |
| 0-8 ∫ 0-12 | —If $A_{VD} \leqq$ Avo (when $A_{VD}$ is not more than the open F value), if ΔBv < 1/16Bvs + 0.25 in 0-4, if ΔBv < 1/6Bvs in 0-6, and if ΔBv < 1/16Bvs + 0.5 in 0-7, processing proceeds to these steps. |

Hereinafter, judgment is made on whether or not the main subject EVS is less than the low luminance judging level ($T_{VF}$+AVO+ΔEV), and when it is less than this level, flash control is performed. When the last-time calculated value does not exist. ΔEV=−0.25 is set. And when the last-tie calculated value exists, ΔEV=0 is set when the last-time light emission exists, and ΔEV=−0.5 is set when the last-time light emission does not exist, and thereby light is made easier to emit when light was emitted the last time. Light is hard to emit when light was not emitted the last time, and in the case under conditions of non-light-emission, processing proceeds to step 0-13 to perform control of non-flashlight emission.

Next, description is made on flash control. When the switch $S_{AEL}$ is in the ON state (CS I-1-$b_7$=1), judgment is made on whether or not calculation of the switch $S_{AEL}$ ON has been performed the last time, and when calculation of the switch $S_{AEL}$ has been performed the last time, processing proceeds to flashlight adjustment calculation using the control diaphragm aperture value AVC and control shutter speed TVC (F-1 to F-3). Where the switch $S_{AEL}$ is not in the ON state, or where the calculation of switch $S_{AEL}$ ON has not been performed the last time, the exposure value $E_{VA}$ is calculated from the background luminance $V_{VA}$ (F-4).

When this exposure value $E_{VA}$ is not more than the synchronizing speed TVX+the open F value AVO+1.5 and the main subject exposure value EVS is not more than the synchronizing speed+the open F value −1.0, both the background and the main subject are assumed to be dark. Then, judgment is made on whether or not the switch $S_{AEL}$ has been turned to ON (F-7), and when it has not been turned to ON, the control diaphragm aperture value AVC is set to $A_{VD}$, and the control shutter speed TVC is set to TVX. Thereafter the main subject is controlled to be exposed properly by a flashlight, and the depth of field is improved insofar as possible. Then, processing proceeds to light adjustment calculation with the control shutter speed taken as the synchronizing speed.

When the exposure value $E_{VA}$ of the background satisfies the equation $E_{VA}$>TVX+AVO+1.5, or the main subject exposure value EVS satisfies EVS>TVX+AVO−1, or the switch $S_{AEL}$ is in the ON state, it is judged whether or not ΔBV:$B_{VA}$−BVS is not less than 2.5, and when it is not less than 2.5 assuming the against-the-light state, the exposure control value EVC is set to $E_{VA}$−1.5 in step F-11, and the background is over-exposured to look like a counter light condition, and the main subject is exposed properly by a flashlight. When it is less than 2.5, assuming that the camera is not in the against-the-light state, the background is under-exposed by one step (F-10), and thereby the background and the main subject are intended to be exposed properly by natural light and the background light. Judgment is made on whether or not the shutter speed at open F number AVO is not less than the synchronizing speed (F-12), and when it is not less than the synchronizing speed, the control shutter speed TVC is set to the synchronizing speed TVS, (F-13) and the diaphragm aperture value AV is calculated from EVC−TVX (F-14), and it is judged whether or not this diaphragm aperture value AV is not less than $A_{VD}$ (F-15), and when it is not less than $A_{VD}$, the control diaphragm aperture value AVC is set to $A_{VD}$ (F-16), and this prevents the main subject from being under-exposed.

If AV<$A_{VD}$, the control diaphragm aperture value AVC is set to AV (F-21). Then, the flashlight adjusting level is calculated in the respective cases. If TV<TVX in step F-12, the control diaphragm aperture value AVC is set to the open F number AVOZ (F-17), and judgment is made on whether or not TV is not less than the minimum shutter speed TVmin (F-18), and when it is not less than TVmin, the control shutter speed TVC is set to TV (F-20), and when it is less than TVmin, the control shutter speed TVC is set to TVmin (F-19), and processing proceeds to calculation of (F-22) the flashlight adjusting level, respectively.

This calculation of the light adjusting level is shown in FIG. 51(*c*) to be explained. The exposure value EVC is evaluated in step m-1 from AVC+TVC, and it is judged in m-2 whether or not EVC−EVS (exposure value of main subject )>0 is satisfied. If EVC- $-EVS \leqq 0$, the quantity of correction is set to $x-1.5$ in step m-3, and the quantity of light emission (quantity of adjusted light) is set under so that the main subject is not over-exposed, and processing proceeds to step m-7.

If $EVC-EVS>0$, it is judged in step m-4 whether or not $EVC-EVS>3$ holds, and if $EVC-EVS>3$, the quantity of correction x is set to 0 in step m-5, and processing proceeds to stem m-7. If $EVC-EVS \leqq 3$, $x=\frac{1}{2}(EVS-EVC+3)$ is set in step m-6, and processing proceeds to step m-7. It is judged in step m-7 whether or not the image magnification $\beta$ can be used with the bit $b_1$ of AEFLAG in communication (III), and when it can be used, $$\beta \geqq 1/7 \rightarrow TTL=x$$

$$1/7>\beta \rightarrow TTL=x+0.5$$

$$1/10>\beta \geqq 1/40 \rightarrow TTL=x+0.875$$

$$1/40>\beta TTL=x+1.25$$

are set (m-9 to m-15), and when the rate of occupation of the subject in the image plane becomes small ($\beta$ is small), the quantity of light reflected back from the subject becomes small, and output of a light adjust end signal is delayed, so the quantity of light emission is increased, resulting in an over-exposure. To correct this, the quantity of light emission is decreased with decrease of $\beta$.

When $\beta$ cannot be used in step m-7, assuming that many subjects of $1/10>\beta \geqq 1/40$ are present, $TTL=x+0.875$ is set. Then, for the control quantity of adjusted light SVC, TTL is added to the film speed SV.

Then, after completing calculation the light adjusting level, a signal of flashlight emission is set (F-23), and the blurring warning buzzer Bz is turned off (F-24). Then, judgment is made on whether or not the control diaphragm aperture value satisfies $AVC>A_{VDEP}$ (F-25), and if $AVC>A_{VDEP}$, $A_{VF}$ (the diaphragm aperture value for evaluating the adjustment value $\Delta Lp$ of focus shift) is set to $A_{VDEP}$ (F-27). Thereby, the background (up to $\infty$) and the main subject enters a focused state.

If $AVC \leqq A_{VDEP}$, $A_V=AVC$ is set (F-26), and the main subject moves to be positioned at the near end of the depth, and the farther background approaches toward the opposite end or moves into the depth, it is judged in step F-28 whether or not the subject is in focus. In the case of out-of, the value $\Delta Lp$ of focus shift is set to 0 in step F-29. In the case of in-focus, $A_{VF}$ is converted into apex value (F-30), and this apex value is utilized to calculate the quantity of focus shift $\Delta Lp$ by $\Delta Lp=F\times K_{BL}\times\alpha\times\delta$ in step F-31. This is shown in FIG. 55, and brief description is made thereon.

Figure 55:
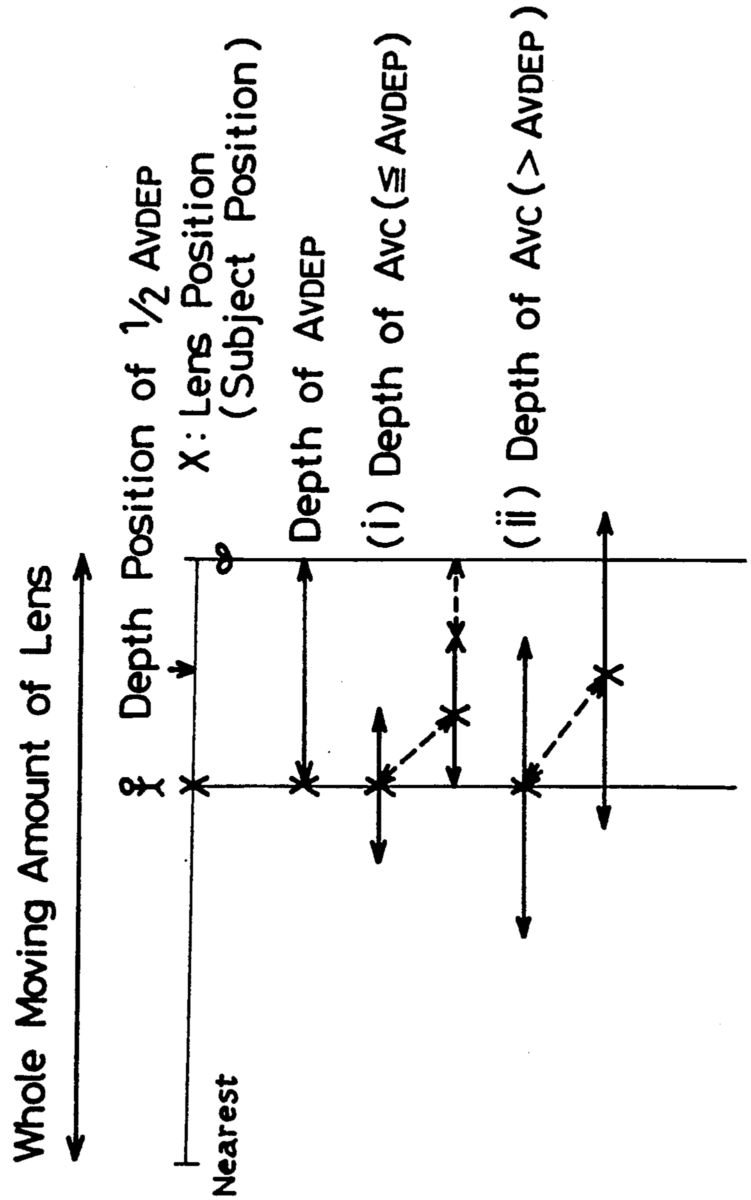

In FIG. 55, a mark X shows the lens position (subject position). For the depth of $A_{VDEP}$, the depth when AVC is not more than $A_{VDEP}$ becomes narrower and the subject and the background become nearer to the depth. At this time, control of driving the lens is performed so that the main subject is positioned at the near end of the depth. In addition, a dotted line shows the portion in the out-of-focus state ($\neq A_{VDEP}$). Next, for the depth when AVC exceeds $A_{VDEP}$, the both come near and the range is extended. At this time, the lens is controlled to be located at the position determined by $A_{VDEP}$. In this case, the subject and the background at the infinity are focused.

(5) Bracket card

Next, description is made on operation of the bracket card.

Here, the bracket card is a card used for continuously photographing by the predetermined number N of film frames while the exposure is shifted so as to be set over or under by a predetermined value $\Delta EV$ from a correct exposure.

Figure 56:
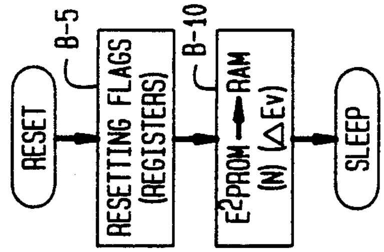
FIG. 56, FIG. 57, FIGS. 58(*a*) to 58(*c*) and FIG. 60 are flowcharts showing operation flows of a bracket card.

The micro-computer $\mu C_z$ of the bracket card executes a routine of resetting as shown in FIG. 56 when this card is attached to the camera body, resets all of the flags and the resisters (RAM) (B-5), moves information including the number N of film frames and the value $\Delta EV$ of exposure shift in the $E^2PROM$ to the RAM (B-10), and processing sleeps.

Figure 57:
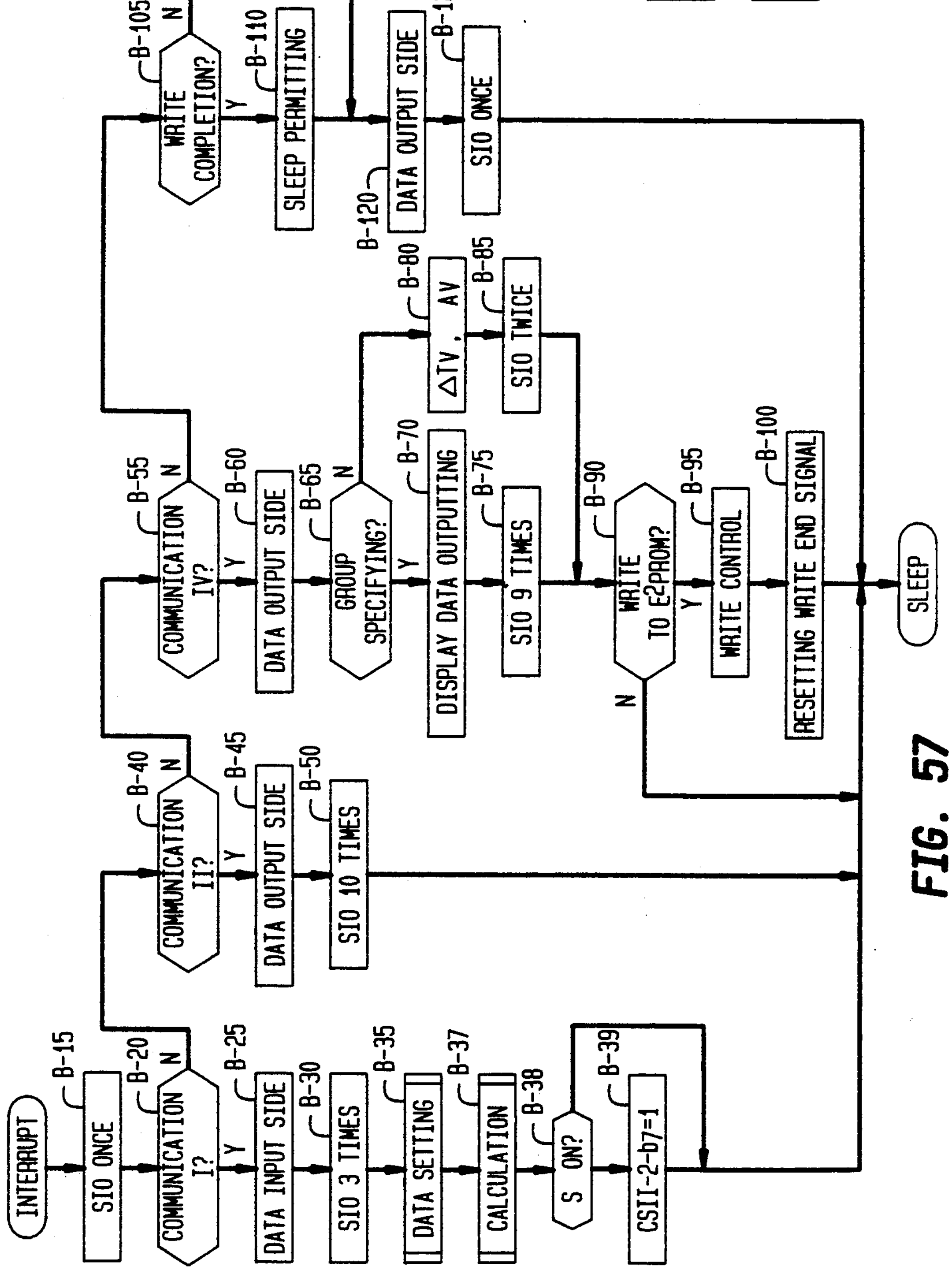

Next, when a signal changing from "L" to "H" is sent from the camera body to the terminal $C_{SCD}$ of this card, the micro-computer $\mu C_z$ of the bracket card executes a routine of an interrupt as shown in FIG. 57. Here, in synchronism with clock pulses sent from the camera body, serial communication is performed once (B-15) to input data showing the kind of communication into the bracket card.

The kind is judged (B-20) from the data obtained by this communication, and when the kind is the communication (I), the card is set as the data input side (B-25), and serial communication is performed three times (B-30) to receive data (refer to Table 6 and Table 16) from the camera body. Based on this data, the micro-computer $\mu C_z$ executes a subroutine of data setting (B-35) and exposure calculation (B-37). Next, judgment is made on whether or not the release switch $S_z$ has been turned to ON (B-38), when it has been turned to ON, AF is set to inhibit (=1) (B-39), and processing sleeps.

Here, prior to description on the above-mentioned subroutine, description is made on what kinds of data are outputted from the card in response to a communication.

In the communication (II), all signals other than the following signals are set to "0".

| | |
|---|---|
| FL forced OFF (=1) | CS II -1-$b_2$ |
| Card performs display control | CS II -1-$b_4$ |
| Card functlon ON/OFF | CS II -1-$b_5$ |
| Communication (V) | CS II -2-$b_2$ |
| Release inhibit | CS II -2-$b_3$ |
| Forced continuous-shot (=1) | CS II -2-$b_4$ |
| AF inhibit | CS II -2-$b_7$ |
| $\Delta$Av, $\Delta$Tv data (=1) | CS II -3-$b_0$ |
| Tv · Av/display data (=0) | CS II -3-$b_3$ |
| Communication (IV) EXIST (=1) | CS II -3-$b_4$ |
| Communication (III) NO (=0) | CS II -3-$b_5$ |
| Communication type | CS II -3-$b_6$ |
| Photometric loop repeat | CS II -3-$b_7$ |

Signals marked with ♣ on the table are set to "1" or "0" in response to the respective cases, and the control thereof is put in the ON state at "1", and put in the OFF state at "0". The determined signals are set to "0" or "1" in a fixed manner. In the communication (II), in addition to the above signals, the number (switch) of communication data of direct address type in the communication (IV) and the address thereof (CS II- 7, 8) exist. Since the communication (III) in group communication does not exist, CS II-9-($b_1$, $b_2$)=0, 0 is set. Since the communication (IV) is only of display data, CS II-10-$b_1$=1 is set. The others are set to "0". In addition, any data can be entered in blank spaces on the above-mentioned table. In the communication (IV), $\Delta AV \cdot \Delta TV$ data is outputted, which is stored in the RAM. In the communication (VI), a signal of sleep possible/no is sent.

Figure 58A:
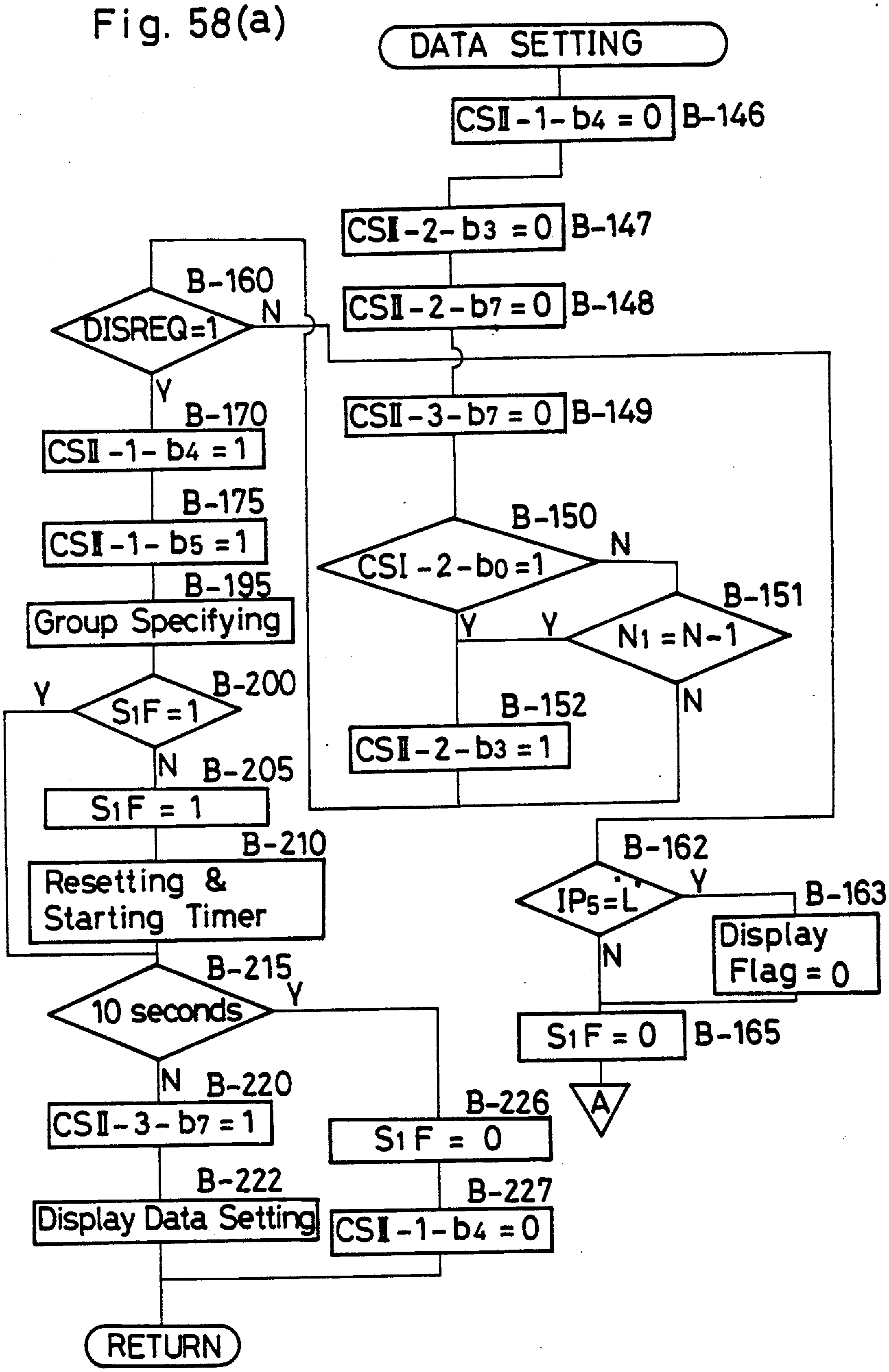
Figure 58B:
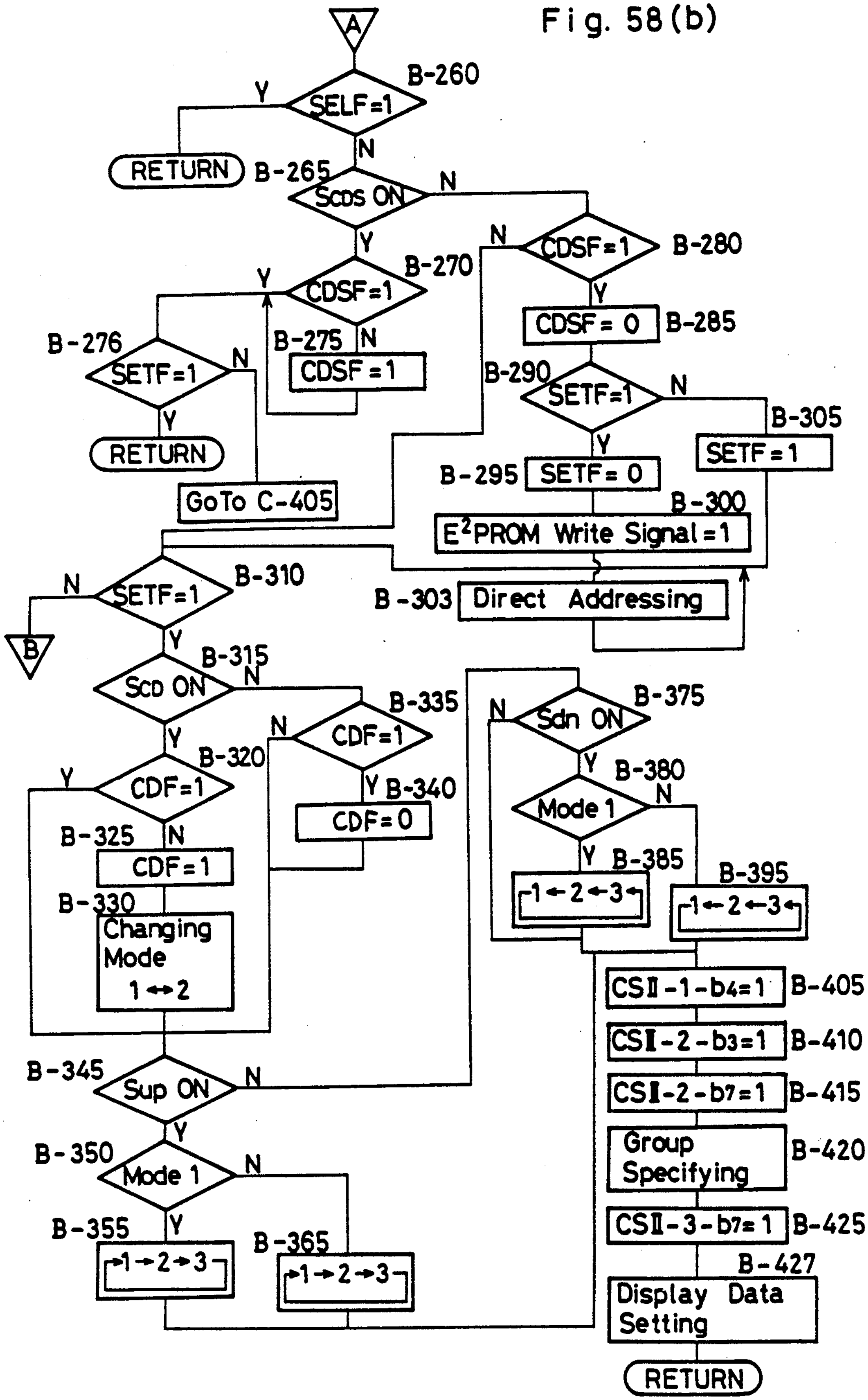

Next, a subroutine of data setting is shown in FIG. 58(*a*) to be explained. First, in steps B-146 to B-149, display control data (CS II-1-$b_4$) is initialized to "0", release inhibit (CS II-2-$b_3$) to "0", AF inhibit (CS II-2-$b_7$) to "0", and photometric loop repeat (CS II-3-$b_7$) to "0".

Subsequently, in step B-150, judgment is made on whether or not the cancel signal (CS I-2-$b_0$) is "1", and where the signal is "1", release inhibit is set (B-152). Where the signal is not "1", judgment is made in step B-151 on whether or not under-described $N_1$ equals $(N-1)$, and when it is $(N-1)$, assuming that the set number of film frames has been completed, release inhibit is set (B-152). Conversely when it is not $(N-1)$, processing proceeds to step B-160 respectively without performing anything.

Figure 59:
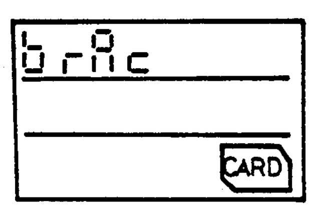
FIG. 59 is a view showing an example of display.

Next, in step B-160, judgment is made on whether or not a signal DISREQ (request of card name display) obtained by the communication(I) is "1", and where the signal is "1", display control data (CS I-1-$b_4$) is set to "1", card display function ON/OFF (CS II-1-$b_5$) to ON (1), and data of group specifying to (0) (B-170~B-195). Subsequently, in step B-200, it is judged whether or not the flag S1F has been set, and where the flag has not been set, assuming that processing passes through this flow for the first time, the flag S1F is set (B-205), and the timer is reset and started (B-210), and processing proceeds to step B-215. Also, when the flag S1F has been set, processing proceeds directly to step B-215. In step B-215, it is judged whether or not 10 seconds has elapsed from the start of the above-mentioned timer, and where 10 seconds has not elapsed, the photometric loop repeat signal (CS II-3-$b_7$) is set to "1" (B-220), and data performing only the card name display and the card mark display is set (B-222), and processing returns. FIG. 59 shows this display. On the other hand, where 10 seconds has elapsed, the flag S1F is reset (B-226), and display control data is set to "0" (B-227), and processing returns.

If DISREQ-0 in the above-mentioned step B-160, processing proceeds to step B-162, and judgment is made on whether or not $IP_5$ is "L" (that is, any of the switches $S_{EM}$,$S_{FUN}$,$S_{CD,SCDS}$ and $S_1$ is in the ON state), and when $IP_5$ is "L", the display flag showing control performing card name display is reset (B-163), and processing proceeds to B-165. And when $IP_5$ is not "L", processing proceeds to B-165 without performing anything. After resetting the flag S1F in this step B-165, processing proceeds to step B-260 in FIG. 58(*b*), and judgment is made on whether or not the signal SELF obtained by the communication(II) is "1".

Here, when the signal is "1", processing returns to inhibit control by operation of the switches of the camera (relating to the card). When the signal SELF is not "1", judgment is made on whether or not the card setting switch $S_{CDS}$ has been turned to ON (B-265). When the switch has been turned to ON (signal=1), judgment is made in step B-270 on whether or not the flag CDSF showing that processing has passed herethrough has been set. If the flag has been set, processing proceeds directly to step B-276, and if the flag has not been set, this flag is set (B-275) and thereafter proceeds to step B-276. In this step B-276, judgment is made on whether or not data is under setting, and if not under setting, processing proceeds to step B-405, and performs display control entering the setting mode. If it is already in the setting mode (SETF=1), processing returns without performing display control because operation has been made to release under-data-setting. When the switch is in the OFF state in step B-265, processing proceeds to step B-280, and judges whether or not the flag (CDSF) has been set, and when it has not been set, proceeds to step B-310. When it has been set, this is reset (B-285), and judgment is made in step B-290 on whether or not the flag SETF showing that data is under setting has been set, and when the flag has been set, this is reset (B-295), and an $E^2$PROM write signal (a signal sent to the camera body is set to 1 (B-300), and direct addressing is set to output the ΔAv, ΔTv data (B-303) and processing proceeds to step B-310. Thereby, processing releases under-setting, and write of data to the $E^2$-PROM in the IC card is performed. When the flag SETF showing under-setting has not been set, processing sets this flag (B-305), enters the data setting mode, and proceeds to step B-310. In step B-310, if data is under-setting (SETF=1), it is judged in step 315 whether or not the card switch $S_{CD}$ has been turned to ON from data sent by the communication(II), and where it has been turned to ON, judgment is made on whether or not the flag CDF showing that processing has passed herethrough has been set (B-320). And when it has been set, processing proceeds to step B-345, and when the flag has not been set, processing sets this flag (CDF=1) in step B-325, advances the changing mode in a sequence of 1←→2 in the following step B-330, and proceeds to step B-345.

Here, the changing modes are as follows:

1—Setting of the value (ΔEv) of exposure shift

2—Setting of the number (N) of film frames

In the above-mentioned step B-315, where the card switch $S_{CD}$ has not been turned to ON, it is judged in step B-335 whether or not the flag CDF has been set. And where it has not been set, assuming that nothing has been operated, processing proceeds to step B-345, and when it has been set, assuming that the switch $S_{CD}$ has turned from ON to OFF, this flag is reset in step B-340, and then processing proceeds to step B-345. In step B-345, it is judged whether or not the up switch Sup has been turned to ON, and when it has been turned to ON, it is judged whether or not the mode is 1, and when the mode is 1, processing proceeds in a sequence of 1→2→3 and after 3, returns to 1(B-355). Here, in the mode 1, relating to the value setting for the bracket exposure 1—ΔEv=0.3 [Ev], 2—ΔEv=0.5 [Ev], 3—ΔEv=1.0 [Ev].

Also in the case of the mode 2, processing proceeds in a sequence of 1→2→3, and after 3, returns to 1 (B-365).

Here, relating to the number of film frames.

1—three frames

2—five frames

3—seven frames

On completing change in each mode, processing proceeds to step B-405. When the up switch Sup is in the OFF state, it is judged whether or not the down switch Sdn has been turned to ON (B-375), and when it has not been turned to ON, processing proceeds to step B-405. The case where it has been turned to ON differs from case of the above-mentioned up switch Sup only in that the changing direction is reverse, and therefore description thereon is omitted.

On completing processing of Sup or Sdn, processing proceeds to step B-405 and the subsequent steps, and performs the following setting: display control CS II-1-$b_4$=1, release inhibit CS II-2-$b_3$=1, AF inhibit CS II-2-$b_7$=1, group specifying=0, and photometric loop repeat CS II-3-$b_7$=1, and sets data of display of under-data-setting, and returns. In addition, this display of under-setting is described later. Thereby, the microcomputer μC of the camera body continues display irrespective of display control by the card, release inhibit, AF inhibit and the power holding timer of the camera.

Figure 58C:
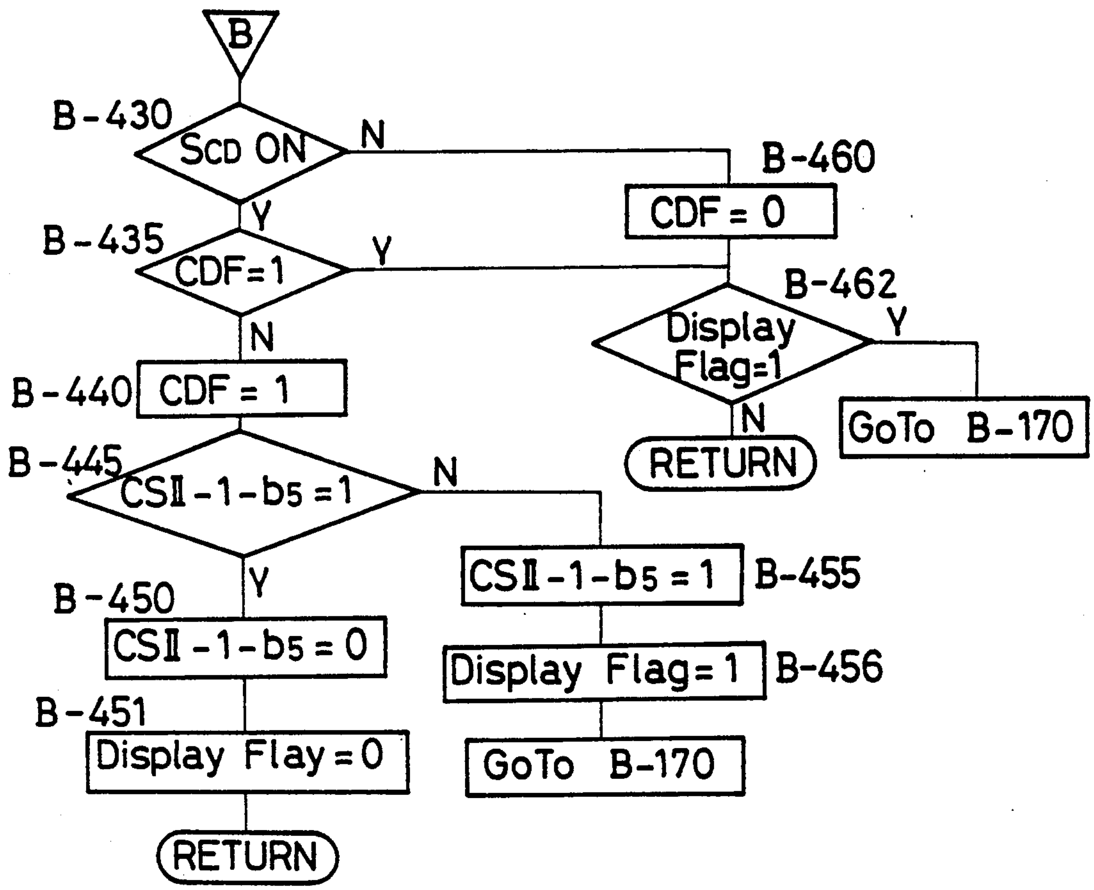

In the above-mentioned step B-310, if judgment is made not to be "under-setting" (SETF=0), processing proceeds to step B-430 in FIG. 58(c), and it is judged whether or not the card switch $S_{CD}$ has been turned to ON, and when the card switch $S_{CD}$ is in the OFF state, the flag CDF is reset (B-460), and whether or not the display flag has been set is judged (B-462), and when it has not been set, processing returns. When it has been set, processing proceeds to step B-170, and performs control of display of the card name. When the card switch $S_{CD}$ is in the ON state, judgment is made on whether or not the flag CDF showing that processing has passed herethrough has been set (B-435), and when it has been set, assuming that the switch is kept operated, processing proceeds to step B-462. When the flag CDF has not been set, this flag is set (B-440), and in the following step B-445, judgment is made on whether or not the card function is in the ON state based on data CS II-1-$b_5$ at present, and where it is in the ON state (CS II-1-$b_5$=1), it is set to OFF (data of the communication II) (B-450), and the display flag is reset (B-451), and processing returns. Conversely, where the function is in the OFF state (CS II-1-$b_5$=0), it is turned to ON (data of the communicationII) in step B-455, and the display flag is set in step B-455, and processing proceeds to step B-170 to perform control of display of the card name.

Reverting to FIG. 57, when communication is not (I), it is judged in step B-40 whether or not the communication is (II), and when the communication is (II), serial communication is performed ten times (B-50) with the card set as the output side (B-45) to output the above-mentioned set data to the camera and processing sleeps.

When communication is not (II), it is judged in step B-55 whether or not the communication is (IV), and when the communication is (IV), the card is set as the output side (B-60), and it is judged in step B-65 whether or not data is of group specifying, and when the data is of group specifying, assuming that display data is outputted (B-70), address is set, and serial communication is performed nine times (B-75), and processing proceeds to step B-90. When the result of the judgment is not group specifying (direct addressing), the change data of ΔTv, ΔAv is addressed (B-80), and serial communication is performed twise (B-85), and processing proceeds to step B-90. In step B-90, it is judged whether or not an $E^2$PROM write signal has been set, and when it has been set, a write control signal is outputted to write one-byte data of Nos. of the mode 1 for the value ΔEv and the mode 2 for the number N to predetermined addresses of the $E^2$PROM (B-95). Write to the $E^2$-PROM is performed by the hardware, and the microcomputer μC has only to send a control signal. Then, a write end signal (on completing the write, this signal is not automatically by the hardware configuration) is reset (B-100), and processing sleeps. When the write signal is not inputted, processing sleeps immediately. When the communication is not (IV) in step B-55, assuming that is it the communication (IV), first, whether or not write has been completed is judged by the above-mentioned end signal (B-105), and when write has been completed, a sleep-possible signal is set (B-110), and when it has not been completed, a sleep-no signal is set (B-115), and processing proceeds to step B-120 respectively, and the card is set as the data output side (B-120), serial communication is performed once in response to clock pulses from the camera body (B-125), and processing sleeps.

Figure 60:
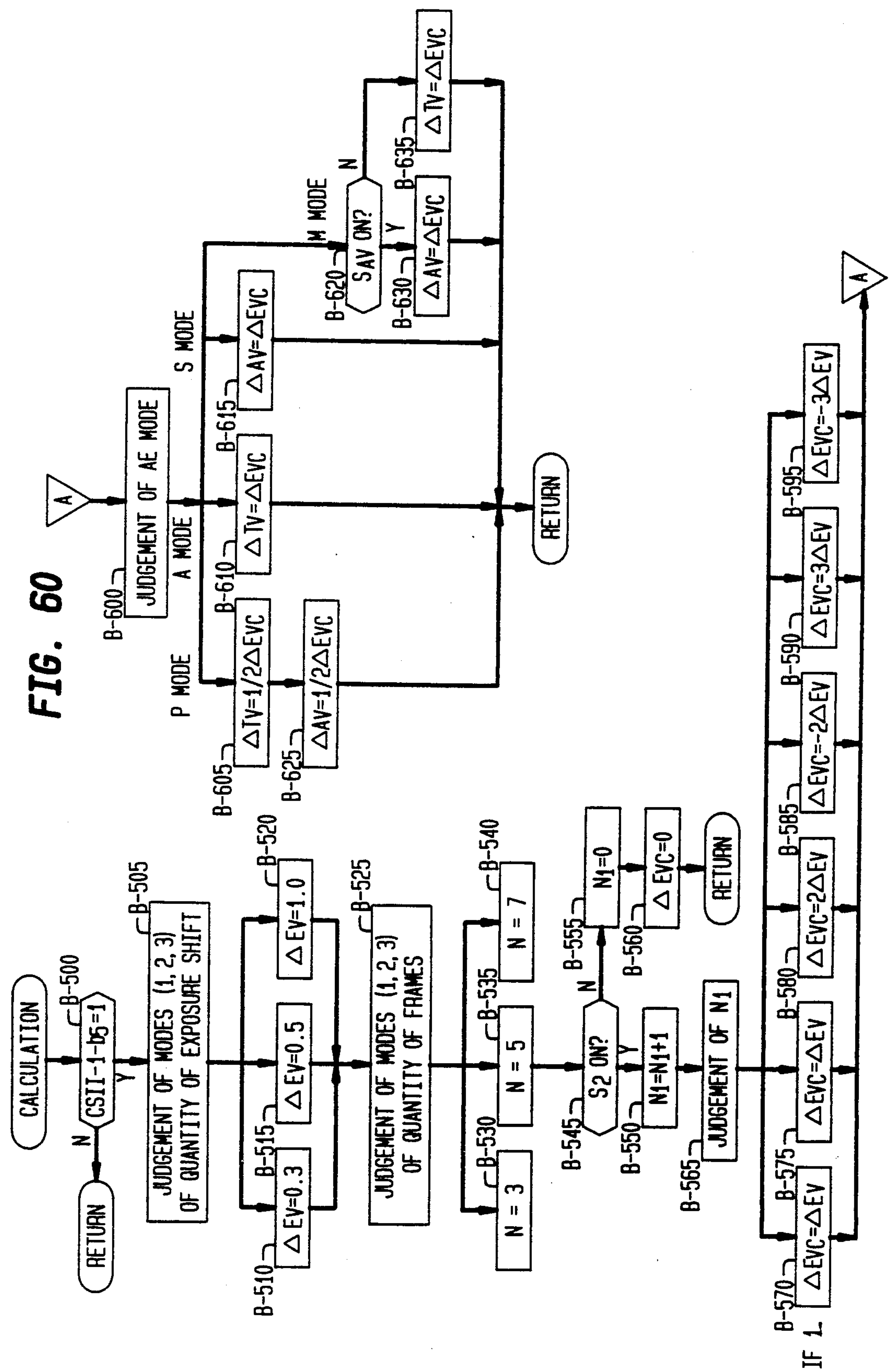

The subroutine of the exposure calculation in the above-mentioned flow is shown in detail in FIG. 60. In FIG. 60, where the card function is in the OFF state (CS II-1-$b_5$=0), processing returns without performing anything. Conversely, where the card function is in the ON state (CS II-1-$b_5$=1), in steps B-505 to B-520, judgment of the mode for the value ΔEv and settings of the value ΔEv thereof are performed, and further in steps B-525 to B-540, judgment of the mode of the number N and settings of the number thereof are performed. After the above-mentioned judgments and settings, in steps B-545, B-555 and B-560, initializations are respectively performed, and the first frame of the frames is exposed correctly. When the release switch $S_2$ is turned to ON, 1 is added to the counter $N_1$ indicating the number of film frames (B-550), judgment of the value of $N_1$ is performed B-565, and the quantity of exposure is varied in response to the value $N_1$ in a sequence of B-570, B-575,—,B-595.

Thereafter, processing proceeds to step B-600, and in this step, judgment of the exposure mode is performed. In the P mode, the diaphragm aperture value and the shutter speed are adjusted respectively by $\frac{1}{2}$ ΔEv. In the A mode and the S mode, the calculated shutter speed and diaphragm aperture value are respectively adjusted by ΔEv. And in the M mode, assuming that the diaphragm aperture value is desired to be changed when the diaphragm aperture changing switch is turned to ON, and conversely, the shutter speed is desired to be changed when the switch is turned to OFF, adjustment is performed by ΔEv in the respective cases. As described above, in steps B-605 to B-635, ΔTv and/or ΔAv are set in response to each mode and processing returns.

Figure 61:
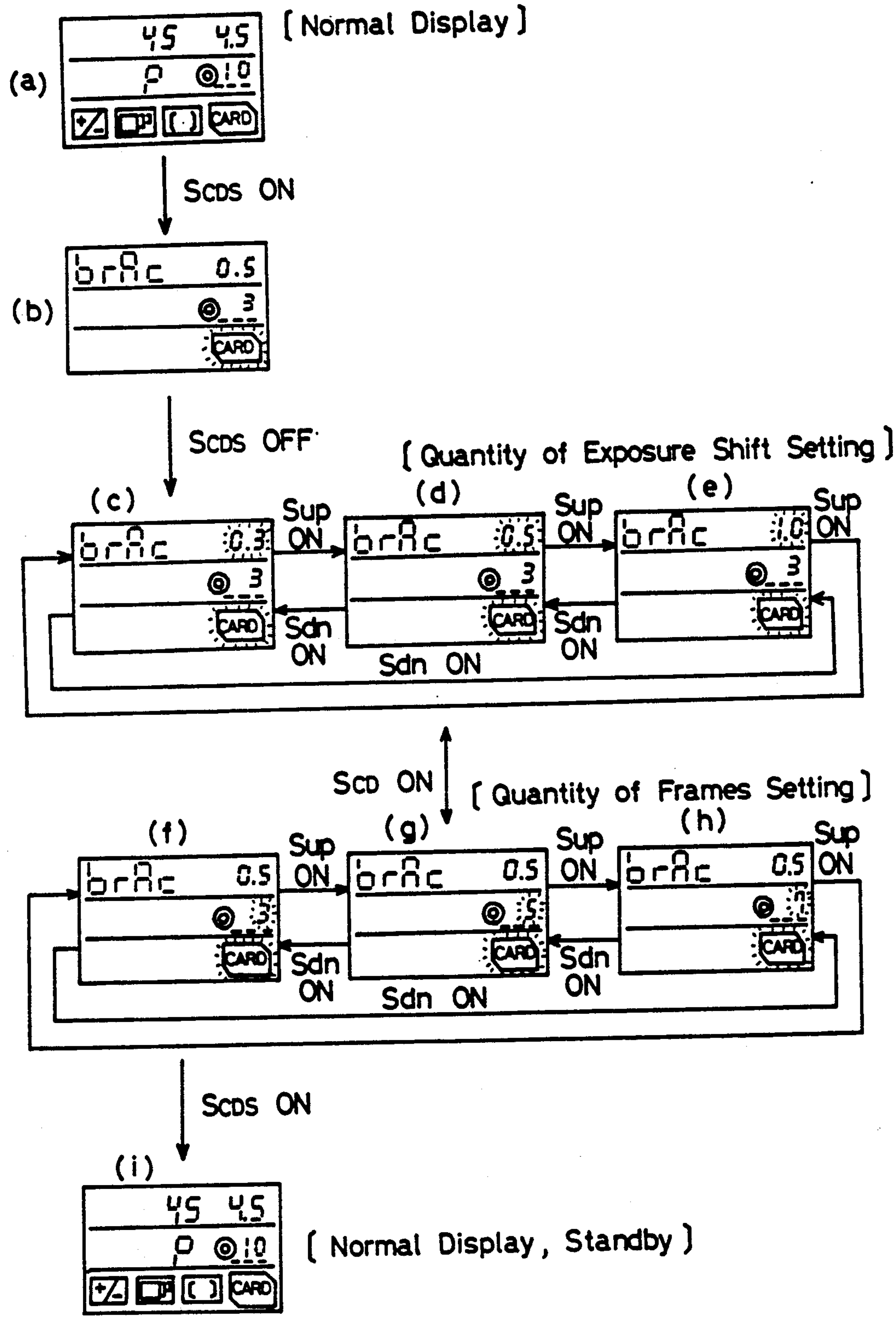
FIG. 61 is a view showing examples of display relating to card data setting.

FIG. 61 shows display at data setting in the case of the bracket card.

In FIG. 61, (a) shows the normal display. When the switch $S_{CDS}$ is turned to ON in this state, the display is changed as shown in (b), and the value ΔEv of exposure and the number N of film frames set at the last time are displayed. When the switch $S_{CDS}$ is turned to OFF, as shown in (c), only the quantity of exposure is displayed with blinking. Here, every time the up switch Sup is turned to ON, the display is varied in a sequence of (c)→(d)→(e)→(c)→—, on the other hand, every time the down switch Sdn is turned to ON, the display is varied in a sequence of (c)→(e)→(d)→(c)—.

For example, by turning on the switch $S_{CD}$ in the state of (d), as shown in (g), the number of film frames is displayed with blinking. Further, by tuning on the up switch Sup in this state of (g), the display is varied in a sequence of (g)→(h)→(f)→(g)→—with every turn-on of the up switch Sup, on the other hand, the display is varied in a sequence of (g)→(h)→(f)→(g)→—with every turn-on of the down switch Sdn.

In addition, for example, when the switch $S_{CDS}$ is turned to ON in the state of (f), the display reverts back to the normal display and enters the stand-by state.

(6) Close-up card

Next, description is made on operation of the close-up card.

Here, the close-up card is a card used in macro photographing close to a subject.

Figure 62:
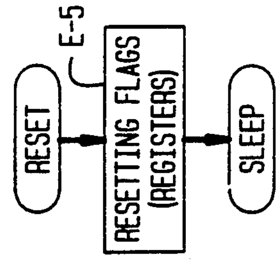

The micro-computer $\mu C_2$ of the close-up card executes a routine of resetting as shown in FIG. 62 when this card is attached to the camera body, resets all of the flags and the registers (RAM) (E-5), and processing sleeps.

Figure 63:
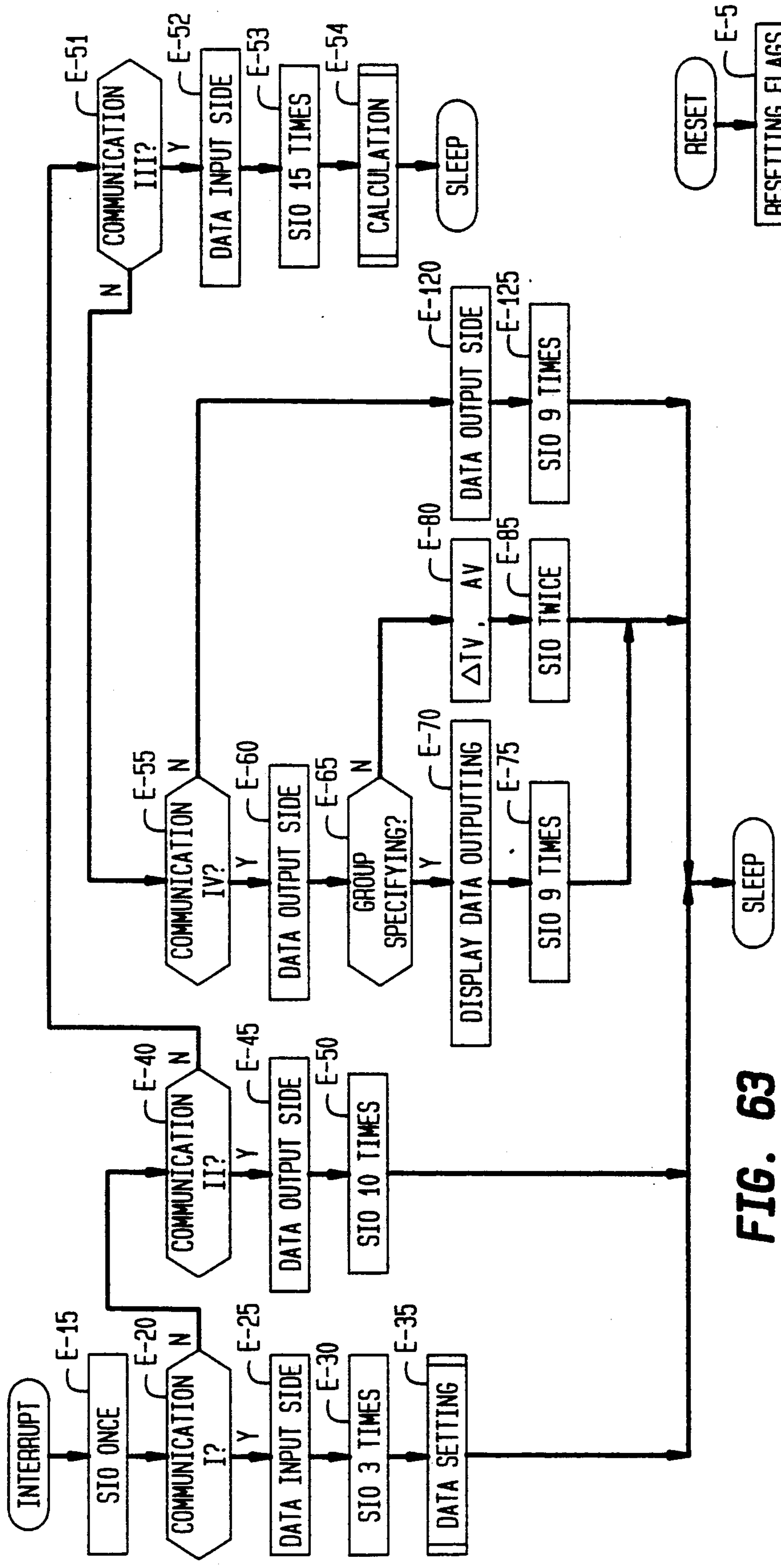
FIG. 62, FIG. 63 and FIGS. 64(*a*) to 64(*c*) are flowcharts showing operation flows of a close-up card.

Next, when a signal changing from "L" to "H" is sent from the camera body to the terminal CSCD of this card, the micro-computer $\mu C_2$ of the close-up card executes a routine of an interrupt as shown in FIG. 63. Here, in synchronism with clock pulses sent from the camera body, serial communication is performed once (E-15) to input data showing the kind of communication.

The kind is judged (E-20) from the data obtained by this communication, and when the kind is the communication(I), the card is set as the data input side (E-25), and serial communication is performed three times (E-30) to receive data (refer to table 6 and table 17) from the camera body. Based on this data, the micro-computer $\mu C_2$ executes a subroutine of data setting (E-35), and processing sleeps.

Here, prior to description on the above-mentioend subroutine, description is made on what kinds of data are outputted from the card in response to a communication.

In the communication(II), all signals other than the following signals are set to "0".

| | |
|---|---|
| FL forced ON (=1) | CS II -1-$b_1$ |
| GN restriction release (=1) | CS II -1-$b_3$ |
| Card performs display control | CS II -1-$b_4$ |
| Card function ON/OFF | CS II -1-$b_5$ |
| Blurring warning buzzer EXIST/NO | CS II -1-$b_7$ |
| P shift inhibit (=1) | CS II -2-$b_0$ |
| Forced P mode (=1) | CS II -2-$b_1$ |
| Communication (V) NO (=0) | CS II -2-$b_2$ |
| Release inhibit (=1) | CS II -2-$b_3$ |
| AF one-shot (=1) | CS II -2-$b_6$ |
| Tv · Av/display data | CS II -3-$b_3$ |
| Communication (IV) EXIST (=1) | CS II -3-$b_4$ |
| Communication (III) EXIST (=1) | CS II -3-$b_5$ |
| Group specifying (=0) | CS II -3-$b_6$ |
| Photometric loop repeat | CS II -3-$b_7$ |
| Blurring warning buzzer control (=1) | CS II -4-$b_0$ |
| AF spot (=1) | CS II -4-$b_1$ |
| Low contrast scan inhibit (=1) | CS II -4-$b_2$ |

Further, in the case of close-up photographing, the focus condition is changed even by a slight motion of the subject due to a large image magnification. When multi-spot distance measurement is performed, as compared with one-spot distance measurement, it is difficult to focus because the information for focus condition is obtained too much. So, single spot AF mode is set. Furthermore, inhibition of scanning for low contrast is based on the reason why the focusing range is narrow in the macro photography.

Signals marked with ✲ on the table are set to "1" or "0" in response to the respective cases, and the control thereof is put in the ON state at "1", and put in the OFF state at "0". The determined signals are set to "0" or "1" in a fixed manner. In the communication(II), in addition to the above signals, CS II-9-$b_1$=1 is set to specify group 1 of the communication III in group communication. And since the display data and the control data are transmitted in communication(IV) CSI-10-$b_1$, $b_2$=1, 1 are set. The others are set to "0".

In addition, any data can be entered in blank spaces on the above-mentioned table.

In the communication(VI), a signal of sleep-good is sent. This is because data of write control to the $E^2$-PROM does not exist.

Figure 64A:
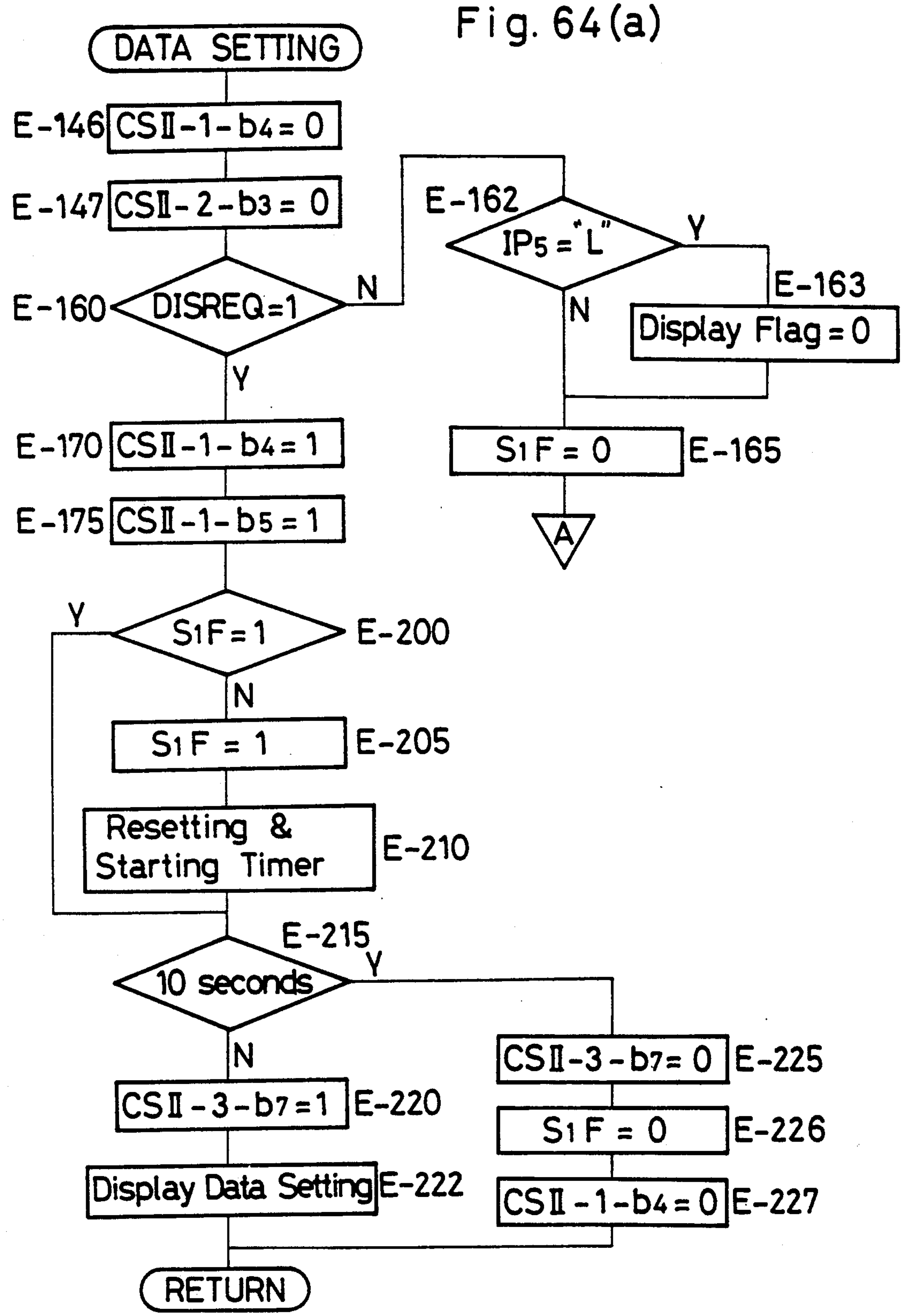
Figure 64B:
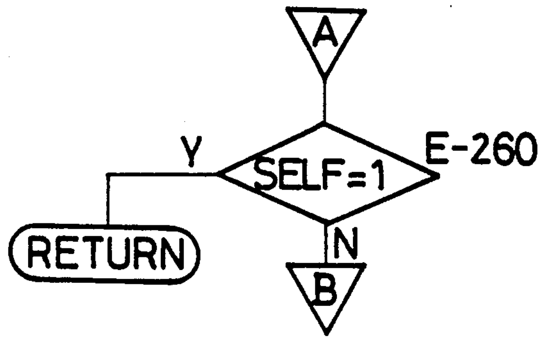
Figure 64C:
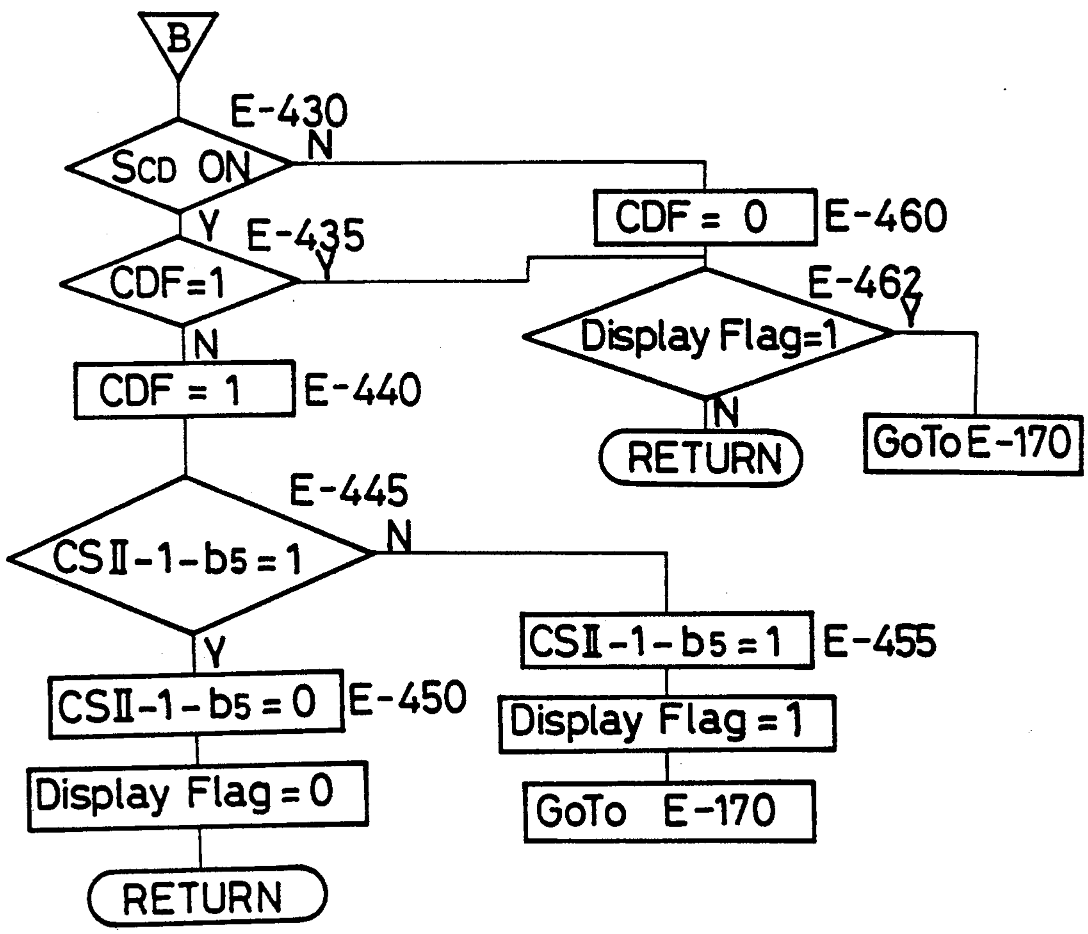

Next, a subroutine of data setting is shown in FIG. 64(*a*) to be explained. First, in steps E-146 and E-147, display control data (CS II-1-$b_4$) and release inhibit data (CS II-2-$b_3$) are initialized to "0", and processing proceeds to step E-160. In step E-160, judgment is made on whether or not a signal DISREQ (request of card name display) obtained by the communication(I) is "1", and where the signal is "1", display control data (CS II-1-$b_4$) is set to "1" (E-170), and card display function ON/OFF (CS II-1-$b_5$) is set to ON (1) (E-175). Subsequently, it is judged in step E-200 whether or not the flag S1F has been set. Here, where the flag has not been set, assuming that processing passes through this flow for the first time, the flag S1F is set (E-205), and the timer is reset and started (E-210), and processing proceeds to step E-215.

Figure 65:
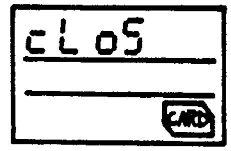
FIG. 65 is a view showing an example of display, FIGS. 66(*a*) to 66(*c*) are flowcharts showing a routine of calculation.

When the flag S1F has been set, processing proceeds directly to step E-215. In step E-215, it is judged whether or not 10 seconds has elapsed from the start of the above-mentioned timer, and where 10 seconds has not elapsed, the photometric loop repeat signal (CS II-3-$b_7$) is set to "1" (E-200), and data performing only the card name display and the card mark display is set (E-222), and processing returns. FIG. 65 shows this display. On the other hand, where 10 seconds has elapsed, the photometric loop repeat signal (CS II-3-$b_7$) is set to "0" (E-225), the flag S1F is reset (E-226), and display control data is set to "0" (E-227), and processing returns.

If DISREQ=0 in the above-mentioned step E-160, processing proceeds to step E-162, and judgment is made on whether or not $IP_5$ is "L" (that is, any of the switches $S_{EM,SRUN}$,$S_{CD}$,$S_{CDS}$ and $S_1$ is in the ON state), and when $IP_5$ is "L", the display flag showing control performing card name display is reset (E-163) and processing proceeds to step E-165, and when $IP_5$ is not "L", processing proceeds to step E-165 without performing anything. After resetting the flag S1F in this step E-165, processing proceeds to step E-260 in FIG. 64(*b*), and judgment is made on whether or not the signal SELF obtained by the communication(II) is "1".

Here, when the signal is "1", processing returns to inhibit the control by operation of the switches of the camera. When the signal SELF is not "1", processing proceeds to step E-430 in FIG. 64(*c*), and it is judged whether or not the card switch $S_{CD}$ has been turned to ON. Here, when the card switch $S_{CD}$ is in the OFF state, the flag CDF is reset in step E-460, and it is judged in step E-462 whether or not the display flag has been set, and when it has not been set, processing returns. When it has been set, processing proceeds to step E-170, and performs control of display of the card name. In the above-mentioned step E-430, when the card switch $S_{CD}$ is in the ON state, judgment is made on whether or not the flag CDF showing that processing has passed herethrough has been set (E-435), and when it has been set, assuming that the switch is kept operated, processing proceeds to step E-462. When the flag CDF has not been set, this flag is set (E-440), and in the following step E-445, judgment is made on whether on not the card function is in the ON state based on data CS II-1-$b_5$ at present, and where it is in the ON state (CS II-1-$b_5$=1), it is set to OFF (CS II-1-$b_5$=0) (E-450), and the display flag is reset (E-452) and processing returns. In reverse, where the function is in the OFF state (CS II-1-$b_5$=0), it is turned to ON (CS II-1-$b_5$=1) in step E-455, and the display flag is set (E-458), and processing proceeds to step E-170 to perform control of display of the card name.

Reverting to FIG. 63, when communication is not(I), it is judged in step E-40 whether or not the communication is (II), and when the communication is (II), serial communication is performed ten times (E-50) with the card set as the output side (E-45) to output the above-mentioned set data to the camera body, and processing sleeps.

When communication is not (II), it is judged in step E-51 whether or not the communication is (III), and when the communication is (III), the card is set as the input side (E-52), and serial communication is performed fifteen times (E-53) to input the data of the camera. In the following step E-54, data for controlling the camera is calculated (including exposure calculation), and processing sleeps. This calculation is described later.

When communication is not (III), it is judged in step E-55 whether or not the communication is (IV), and when the communication is (IV), the card is set as the output side (E-60), and it is judged in step E-65 whether or not data is for display control, and when the data is for display control, display data is outputted (E-70), addresses are set, and serial communication is performed nine times (E-75), and processing sleeps. When the result is not for display control (Tv, Av data), Tv, Av data is addressed (E-80), serial communication is performed four times (E-85), and processing sleeps. When the communication is not (IV), assuming that it is the communication(VI), first, the card is set as the data output side (E-120), and serial communication is performed once in response to clock pulses from the camera body (E-125), and processing sleeps.

Figure 66A:
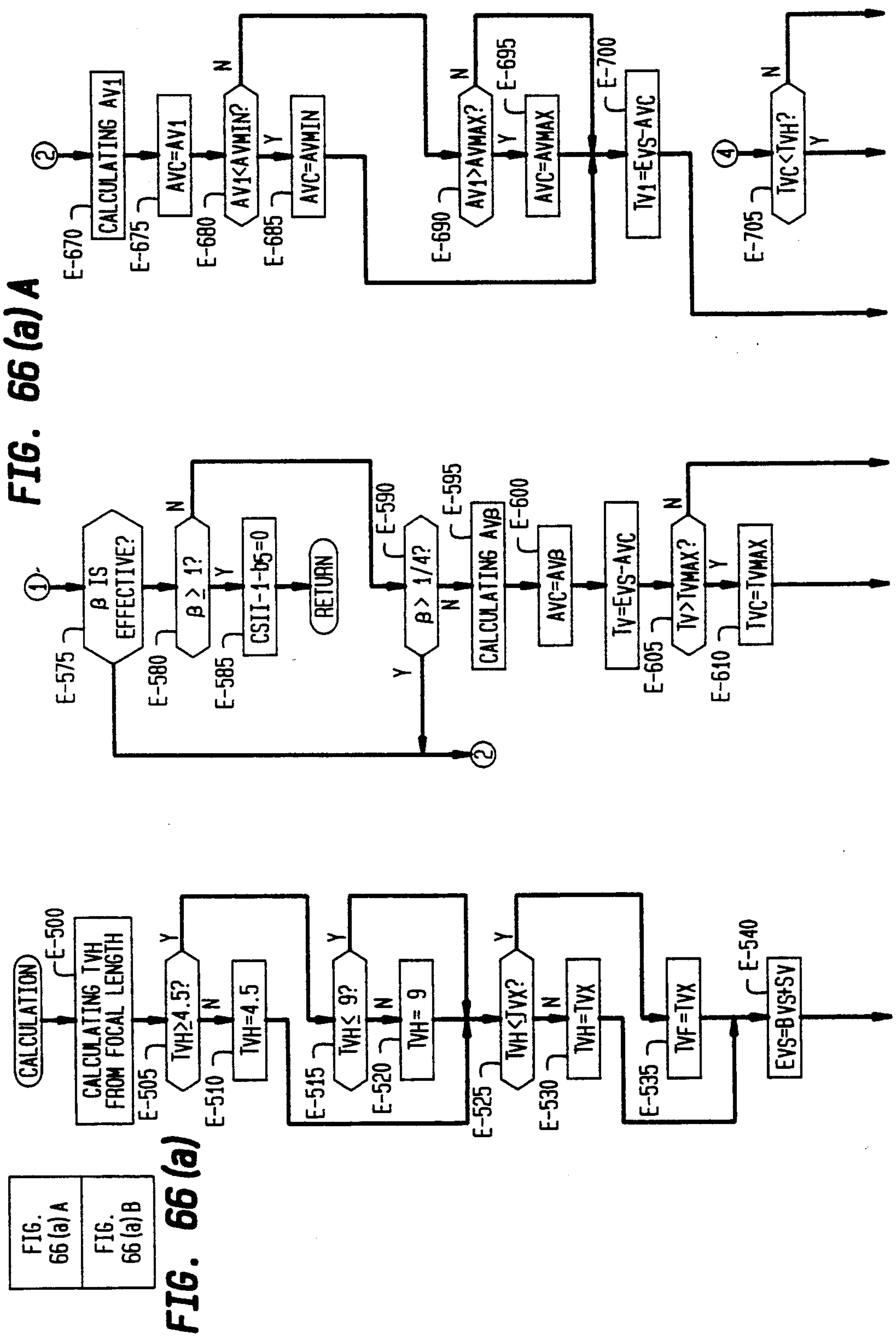
Figure 66B:
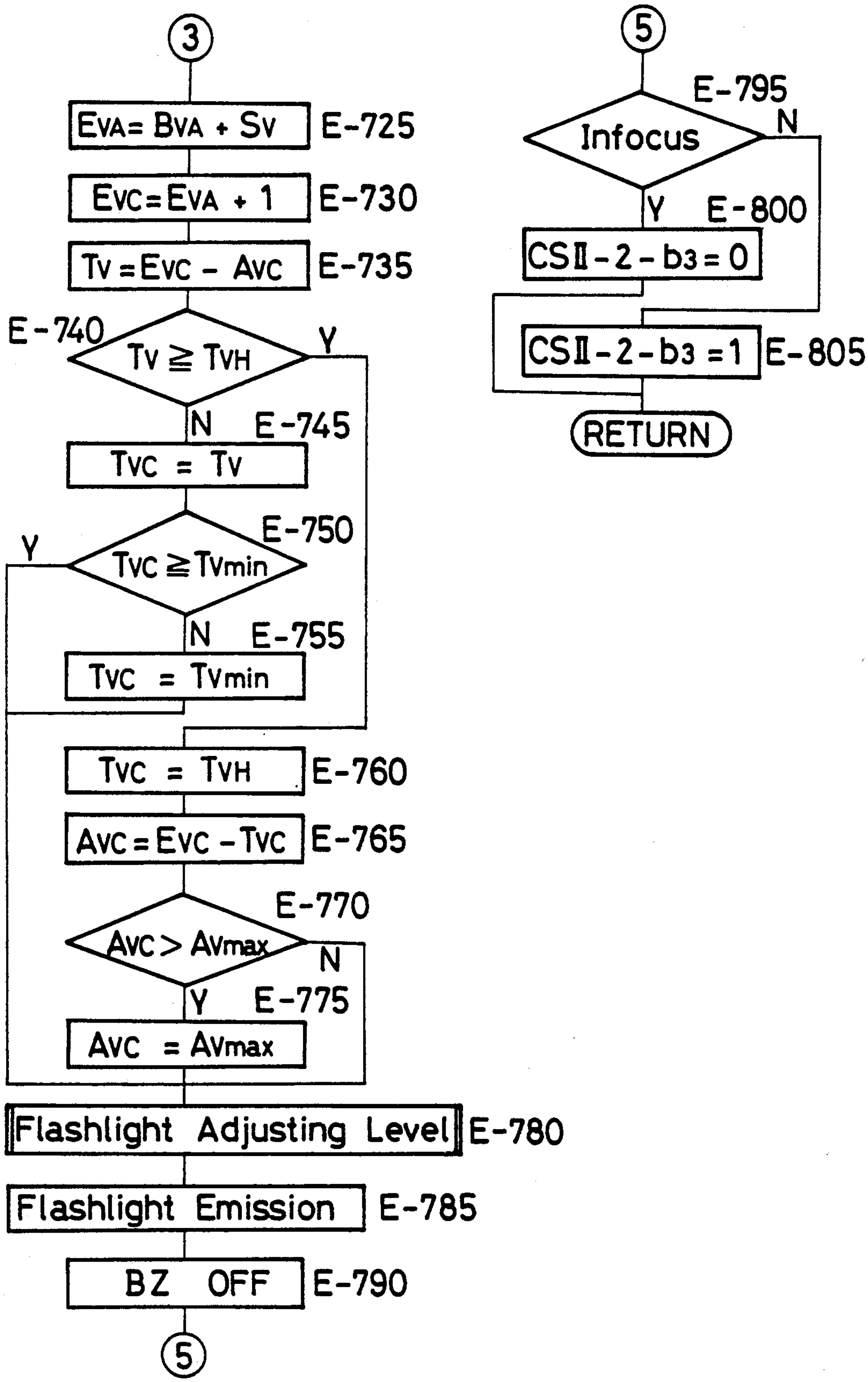
Figure 66C:
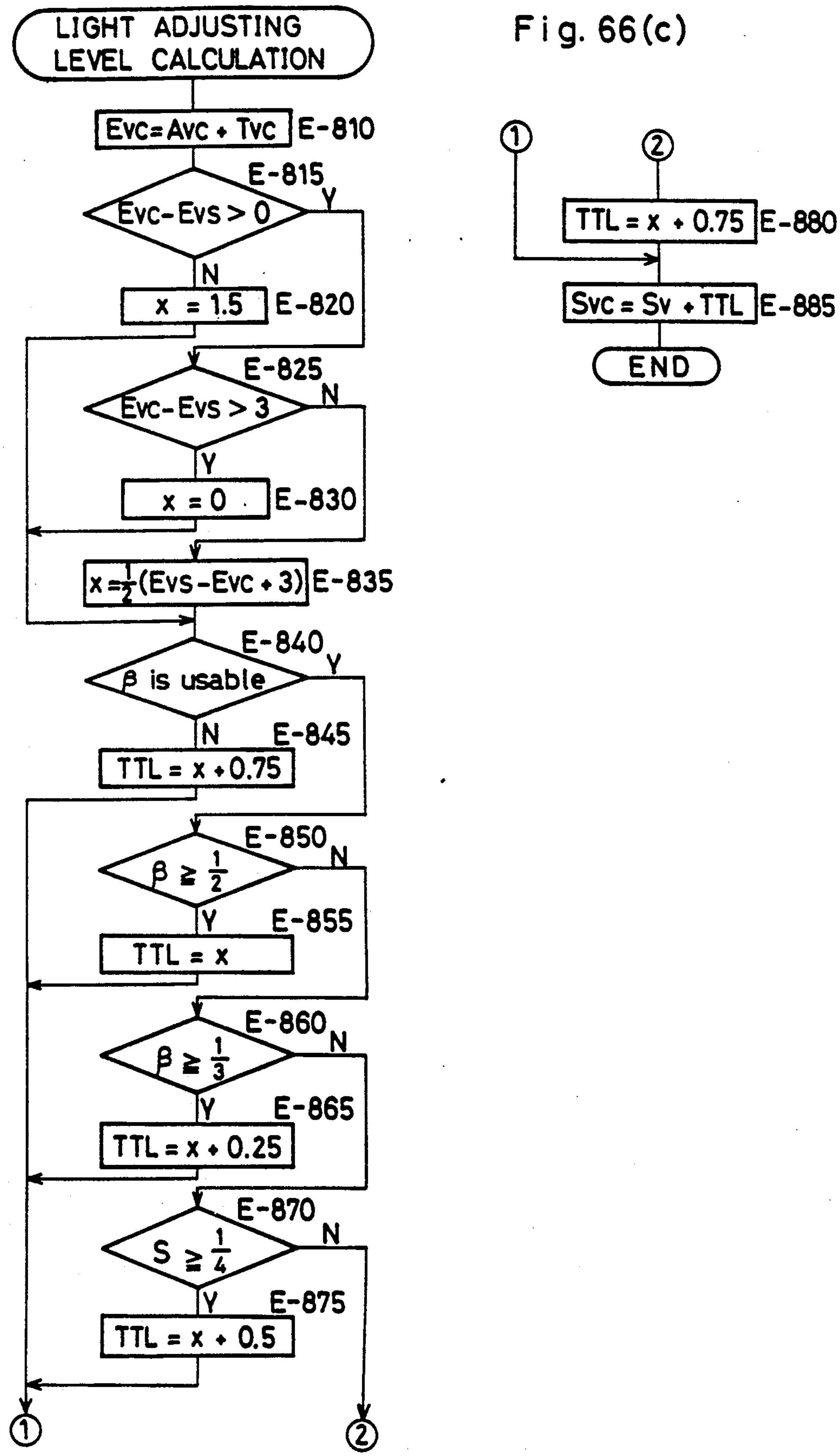

Next, description is made on the subroutine of the calculation in step E-54 in FIG. 63 in reference to FIGS. 66(*a*) and 66(*b*).

First, in step E-500, a blurring limit shutter speed $T_{VH}$ is evaluated from the focal length f from the following equation:

$$T_{VH}=1.25\times\log_2(f/50)+5.875$$

and $T_{VH}$ is limited in steps E-505 to E-520.

Subsequently, in steps E-525 to E-535, in order to photograph by natural light without using flashlight, if possible, processing evaluates a smaller one of $T_{VH}$ and $T_{VX}$ for the shutter speed determining flashlight emission. Here, Tvx represents synchronizing speed.

Next, in steps E-540 to E-570, control limits of the control aperture speed Tvc and the control diaphragm aperture value Avc are determined from the control limit exposure value. In the following step E-575, judgment is made on whether or not the image magnification $\beta$ is effective, and where it is not effective, processing proceeds to step E-670 and the subsequent steps. When the image magnification $\beta$ is effective, whether or not $\beta\geqq1$ is satisfied is judged in step E-580. In the case of $\beta\geqq1$, the features of this close-up card are not made good use of, and therefore the card function is turned to OFF (CS II-1-$b_5$=0) (E-585), and processing returns. In the case of $\beta<$1, processing proceeds to step E-590, and it is judged whether or not $\beta<\frac{1}{4}$. Here, in the case of $\beta<\frac{1}{4}$, processing proceeds to step E-670. If $\beta>\frac{1}{4}$, in step E-595, an aperture value $Av\beta$ is calculated according to the following equation:ps $$Av\beta=7-\log_2(1/\beta)$$

Figure 67:
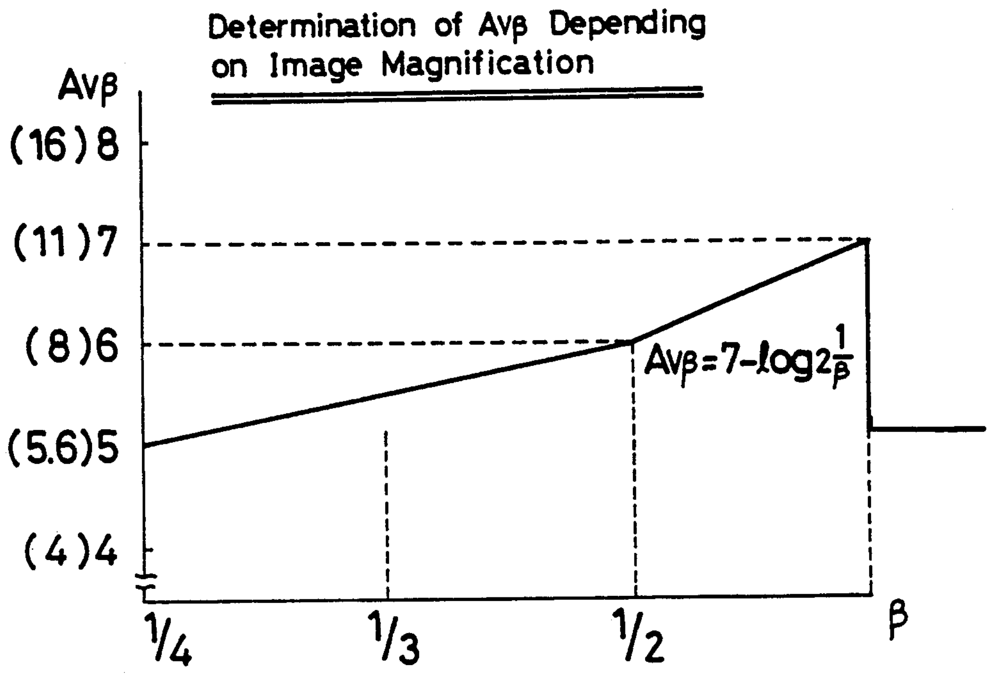
FIG. 67 and FIG. 68 are explanatory views thereof.
Figure 68:
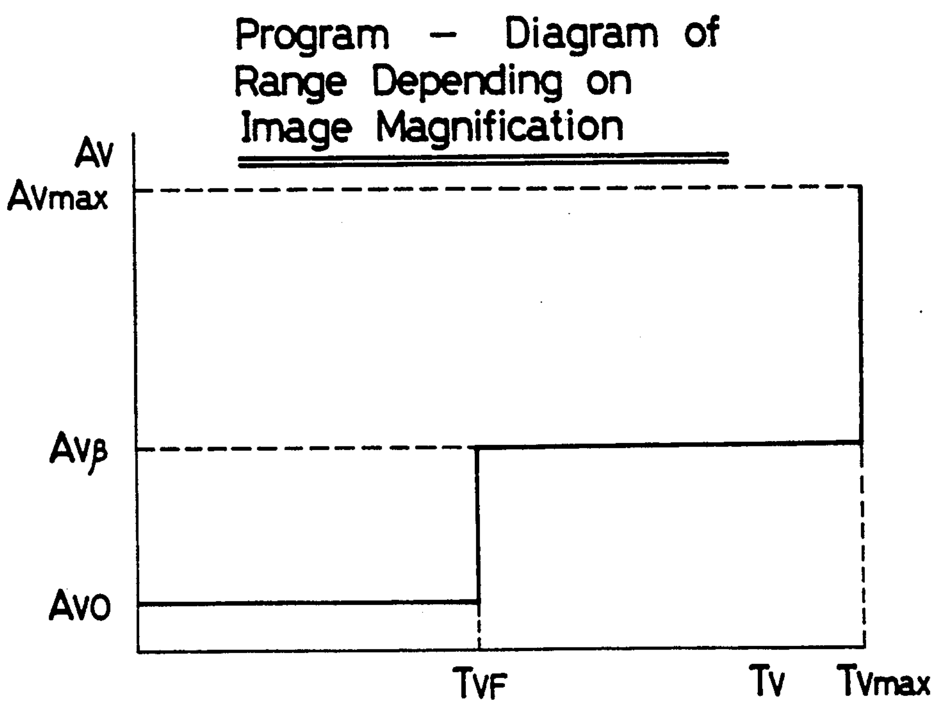

FIG. 67 shows the change in the diaphragm aperture value $Av\beta$ depending on the image magnification $\beta$. The program line diagram thereof is shown in FIG. 68.

Thereafter, the flow of step E-600 and the subsequent steps is executed.

First, Arc is set to Avb, and the calculated shutter speed Tv is evaluated from Evs-Avc. Judgment is made on whether Tv exceeds Tvmax, and where it exceeds Tvmax, the control shutter speed Tvc is set to Tvmax and the control diaphragm aperture value Avc is re-evaluated from Evs-Tvmax, and processing proceeds to #660.

In the case of Tv≦Tvmax, it is judged whether or not $Tv<T_{VF}$, and when $Tv\geqq T_{VF}$, $T_{VC}$ is set to Tv, and processing proceeds to #660. When $Tv<T_{VF}$, the control diaphragm aperture value Avc is evaluated from Evs-$T_{VF}$ and it is judged whether or not Avc<Avmin. When Avc<Avmin, Avc=Avmin is set, and Tvc is re-evaluated from Evs-Avc, and processing proceeds to #660. When Avc≧Avmin, Tvc is set to $T_{VF}$, and processing proceeds to #660. Judgment is made on whether or not the exposure value Evs is not less than $T_{VF}$+Avmin, and when an equation Ev<$T_{VF}$+Avmin is satisfied and also the flash is turned to ON, processing proceeds to flash control.

| | | |
|---|---|---|
| E-725 | — | The exposure value $E_{VA}$ of the background is evaluated from $E_{VA}=B_{VA}+Sv$ |
| E-730 | — | Evc = $E_{VA}$+1 is set so that the background may be under-exposed by 1 Ev. This is because the main subject is designed to be exposed properly by background light and flashlight. |
| E-735 ∫ E-775 | — | The shutter speed Tv is evaluated from TV=Evc−Avc, and judgment is made on whether or not Tv is not less than $T_{VH}$ (the smaller of the blurring limit shutter speed. $T_{VF}$ and the maximum synchronizing speed $T_{VX}$). When Tv ≧ $T_{VH}$, $T_{vc}$=*Tv is set and judgment is made on* whether or not it is not less than the minimum shutter speed Tvmin, and when it is less than Tvmin, Tvc=Tvmin is set for the limit value, and processing proceeds to E-780. When Tv<$T_{VH}$, Tvc=Tvx is set for the synchronizing speed, and the control diaphragm aperture value Avc is evaluated from Avc=Evc−Tvc, and it is judged whether or not Avc exceeds the maximum diaphragm aperture value Avmax. When it exceeds Avmax, Avc is set to Avmax, and processing proceeds to E-780. |
| E-780 | — | The light adjusting level TTL is calculated (described later), a flashlight emitting signal is set, and the blurring warning buzzer is turned to OFF, and processing proceeds to (5). The adjustment level TTL is calculated by: TTL = x, when, $\beta\leqq\frac{1}{8}$; TTL = x + 0.25, $\frac{1}{8}\leqq\beta\leqq\frac{1}{5}$; TTL = x + 0.5, $\frac{1}{5}\leqq\beta\leqq\frac{1}{4}$; TTL = x + 0.75, $\frac{1}{4}<\beta$; wherein x is another adjustment value. |

Because, when the rate of occupation of the image plane by the subject becomes small ($\beta$ is small), the quantity of light reflected back from the subject becomes small, and output of a flashing end signal is delayed, and the quantity of light emission is increased, resulting in an over-exposure. To correct this, the quantity of light emission is decreased with decreasing of $\beta$.

When $\beta$ cannot be used, assuming that it is caused by a subject of $\frac{1}{4}>\beta$, TTL=x+0.75 is set. Then, for the control quantity Svc of adjusted light, TTL is added to film speed $S_V$. This calculation of the light adjusting level is shown in FIG. 66(*c*) to be explained. The exposure value Evc is evaluated from Avc+Tvc in step E-810, and then it is judged in step E-815 whether or not Evc-Evs (exposure value of main subject)>0. If Evc−Evs≦0, the quantity of adjustment is set to x=1.5, thereby the quantity of light emission (quantity of adjusted light) is set under so that the main subject is not over-exposed, and processing proceeds to step E-840.

If Evc−Evs>0, it is judged whether or not Evc−Evs>3, and if Evc−Evs>3, the quantity x of adjustment is set to 0, and processing proceeds to step E-840. If Evc3'Evs≦3, x=(Evs−Evc+3)/2is set, and processing proceeds to step E-840. In step E-840 it is judged whether or not the image magnification $\beta$ can be used, and when it can be used, in the case where Evs≧$T_{Vf}$+Avmin or the flash is in the OFF state (including the case where the flash is not attached), judgment of blurring is performed. Judgment of blurring of this close-up card is similar to that of the sports card.

Reverting to FIG. 66(*b*), in steps E-795 to E-805, release can not be performed without focusing. This means that release inhibit CS II-2-$b_3$1 is set in-focus state and that release inhibit CS II-2-$b_3$=0 is set in out-of-focus state, and thereafter processing respectively returns.

When $\beta$ information is not effective, or when $\beta<\frac{1}{4}$, processing proceeds to E-670, and in this step, calculation of $Av_1$ for Avc is performed according to the equation:

$$Av_1 = Avmin + \tfrac{1}{2}\{Evs - (Avmin + T_{VH})\}$$

In steps E-680 to E-695, adjustment of the limit of the diaphragm aperture value is performed, and the control shutter speed is evaluated from the control diaphragm aperture value, and processing proceeds to #660.

(7) Auto shift card

Next, description is made of the operation of the auto shift card.

Auto shift means to change a combination of Av, Tv with the same exposure automatically at each time of three continuous photographs.

Figure 69:
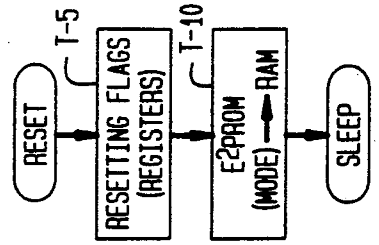
FIG. 69, FIG. 70 and FIGS. 71(*a*) to 71(*c*) are flowcharts showing operation flows of an auto shift card.

The micro-computer $\mu C_2$ of the auto shift card executes a routine of resetting as shown in FIG. 69 when this card is attached to the camera body. First, the micro-computer $\mu C_2$ resets all of the flags and the registers (RAM) (T-5), moves information in the $E^2$PROM to the RAM (T-10), and processing sleeps.

Figure 70:
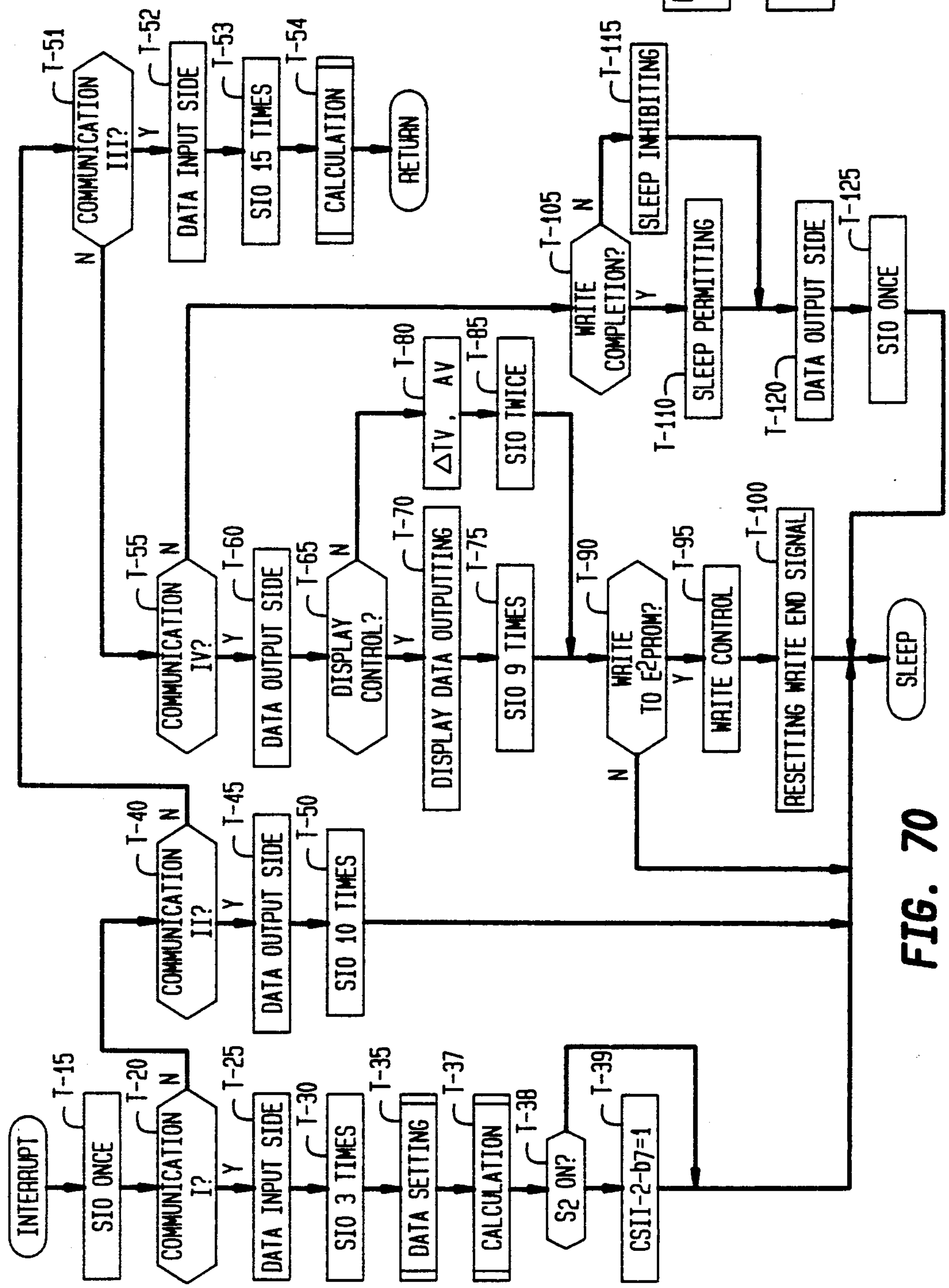

Next, when a signal changing from "L" to "H" is sent from the camera body to the terminal CSCD of this card, the micro-computer $\mu C_2$ of auto shift card executes a routine of an interrupt as shown in FIG. 70. Here, in synchronism with clock pulses sent from the camera body, serial communication is performed once (T-15) to input data showing the kind of communication.

The kind is judged (T-20) from the data obtained by this communication, and when the kind is the communication(I), the card is set as the data input side (T-25), and serial communication is performed three times (T-30) to receive data (refer to Table 6 and Table 18) from the camera body. Based on this data, the micro-computer $\mu C_2$ executes a subroutine of data setting. Next, judgment is made on whether or not the release switch ($S_2$) has been turned to ON (T-38), and when it has been turned to ON, AF is inhibited (CS II-2-$b_7$1) (T-39), and processing sleeps.

Here, prior to description on the above-mentioned subroutine, description is made on what kinds of data are outputted from the card in response to a communication.

In the communication(II), all signals other than the following signals are set to"0".

| | |
|---|---|
| FL forced OFF (=1) | CS II -1-$b_2$ |
| Card performs display control | CS II -1-$b_4$ |
| Card function ON/OFF | CS II -1-$b_5$ |
| Blurring warning buzzer ON/OFF | CS II -1-$b_7$ |
| P shift inhibit (=1) | CS II -2-$b_0$ |
| Forced P mode (=1) | CS II -2-$b_1$ |
| Communication (V) NO (=1) | CS II -2-$b_2$ |
| Release inhibit | CS II -2-$b_3$ |
| Forced continuous-shot (=1) | CS II -2-$b_4$ |
| AF inhibit | CS II -2-$b_7$ |
| Tv · Av/display data | CS II -3-$b_3$ |
| Communication (IV) EXIST (=1) | CS II -3-$b_4$ |
| Communication (III) EXIST (=1) | CS II -3-$b_5$ |
| Communication type (=0) | CS II -3-$b_6$ |
| Photometric loop repeat | CS II -3-$b_7$ |
| Blurring warning buzzer control (=1) | CS II -4-$b_0$ |

Signals marked with ❖ on the table are set to "1" or "0" in response to the respective cases, and the control thereof is put in the ON state at "1", and put in the OFF state at "0". The determined signals are set to "0" or "1" in a fixed manner. In the communication(II), in addition to the above signals, since the communication(III) in group communication is only of $G_1$, CS II-9-($b_1$, $b_2$, $b_3$)=1, 0, 0 are set. Further, since the communication(IV) is of two data of display and control data, CS II-10-$b_1$, $b_2$=1, 1 are set. The others are set to "0".

In addition, any data can be entered in blank spaced on the above-mentioned table.

In the communication(VI), a signal of sleep possible/no is sent.

Figure 71A:
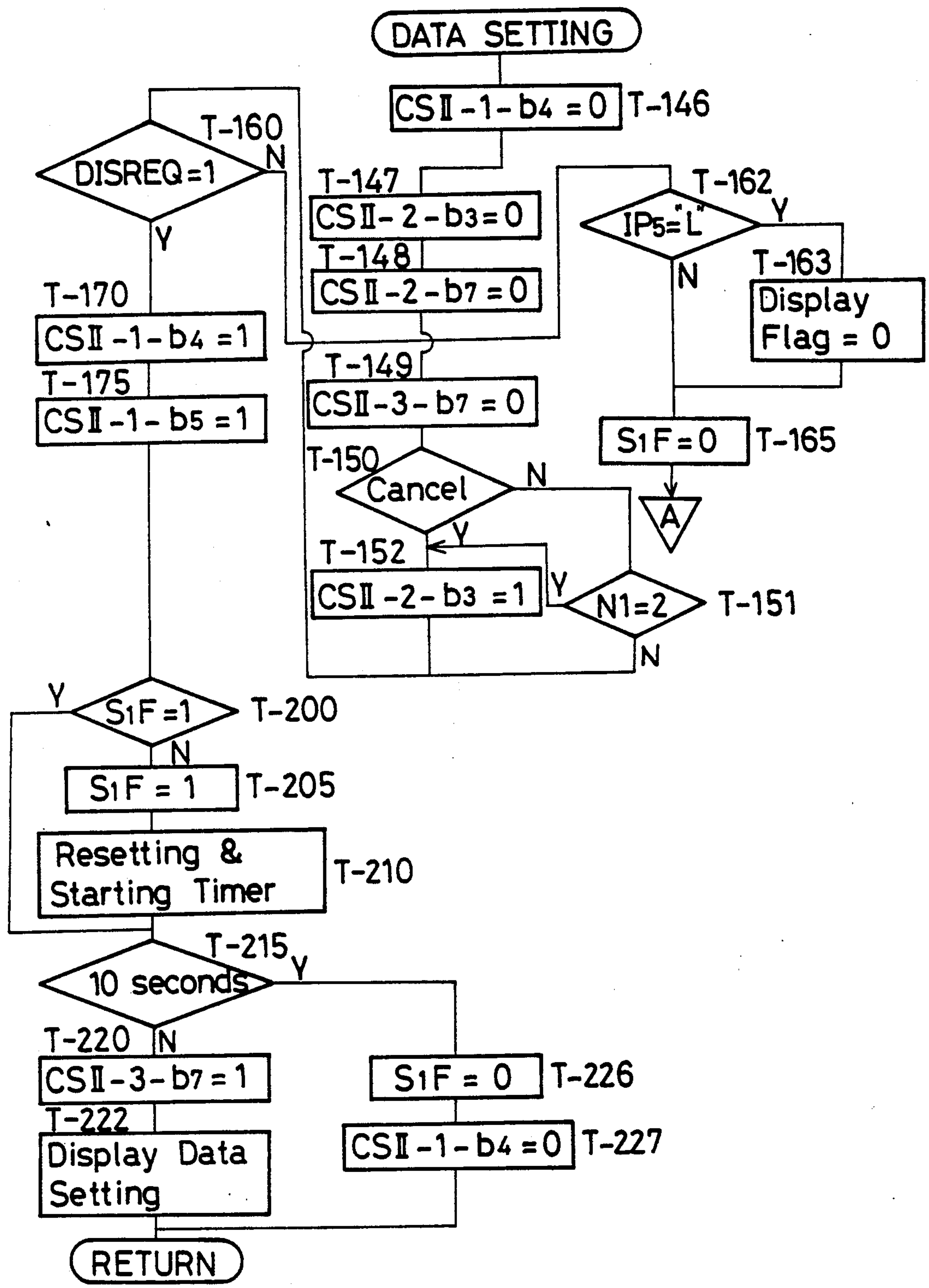
Figure 71B:
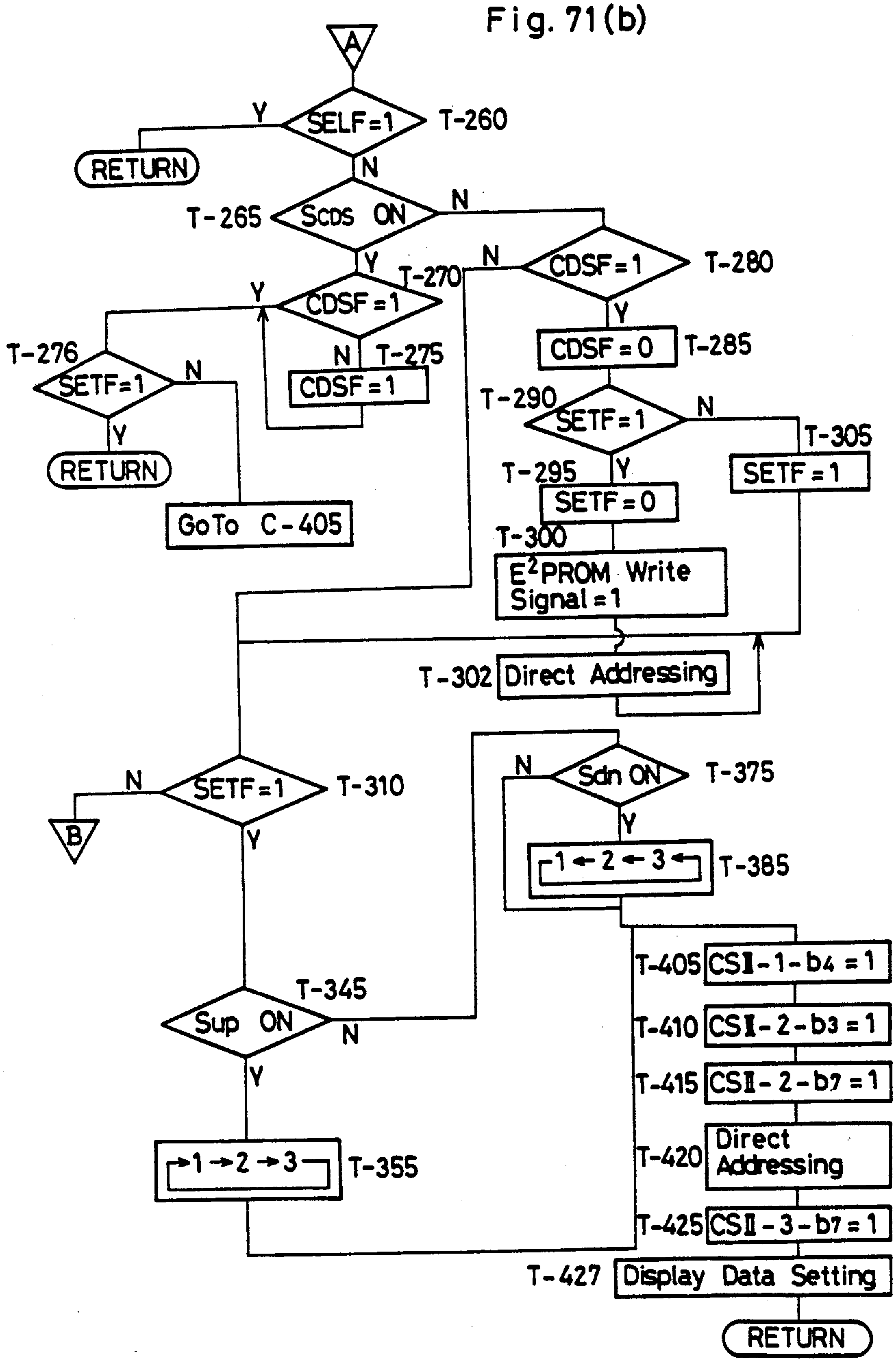
Figure 71C:
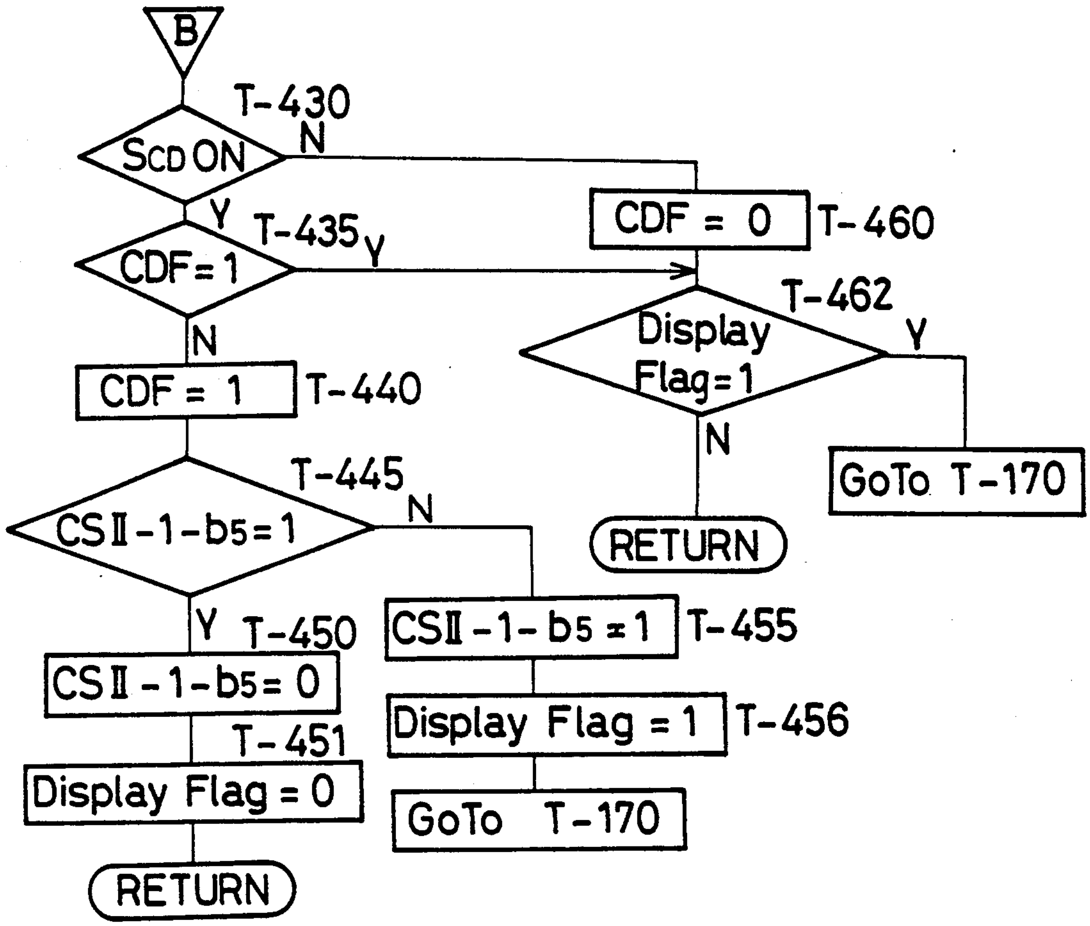

Next, a subroutine of data setting is shown in FIG. 71(*a*) to be explained. First, in steps T-146 to T-148, display control data (CS II-1-$b_4$) is initialized to "0", release inhibit (CS II-2-$b_3$) to "0", AF inhibit (CS II-2-$b_7$) to "0", and further in step T-149, photometric loop repeat (CS II-3-$b_7$) to "0", and subsequently in step T-150, judgment is made on whether or not a cancel signal is "1∞, and where the signal is "1", release inhibit (CS II-2-$b_3$) is set (T-152). Conversely, where the signal is not "1", judgment is made on whether or not $N_1$ representing the number of exposed frame is "2" (T-151), and where it is "2", assuming that three frames have already been exposed, release inhibit is set (T-152). Where $N_1$ is not "2", processing proceeds to step T-160 respectively without performing anything.

In this step T-160, judgment is made on whether or not a signal DISREQ (request of card name display) obtained by the communication (I) is "1", and where the signal is "1", display control data is set to "1" (T-170), card display function ON/OFF is set to ON (1) (CS II-1-$b_5$=1) in step T-175. Subsequently, it is judged in step T-200 whether or not the flag S1F has been set, and where the flag has not been set, assuming that processing passes through this flow for the first time, the flag S1F is set (T-205), and the timer is reset and started (T-210), and processing proceeds to step T-215.

Figure 72:
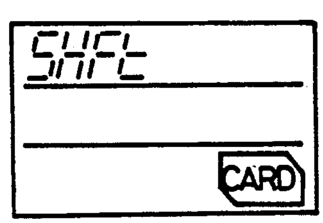
FIG. 72 is a view showing an example of display, FIGS. 73(*a*) and 73(*b*) are flowcharts showing a routine of calculation.

When the flag S1F has been set, processing proceeds directly to step T-215. In step T-215, it is judged whether or not 10 seconds has elapsed from the start of the above-mentioned timer, and where 10 seconds has not elapsed, the photometric loop repeat signal is set to "1" (T-220), and data performing only the card name display and the card mark display is set (T-222), and processing returns. FIG. 72 shows this display. On the other hand, where 10 seconds has elapsed, the flag S1F is reset (T-226), and display control data is set to "0" (T-227), and processing returns.

If DISREQ-32 0 in the above-mentioned step T-160, judgment is made on whether or not $IP_5$ is "L" (that is, any of the switches $S_{EM}$, $S_{FUN}$, $S_{CD}$, $S_{CDS}$ and $S_1$ is in the ON state) in step T-162, and when $IP_5$ is "L", the display flag showing control performing card name display is reset (T-163), and processing proceeds to T-165. When $IP_5$ is not "L", processing proceeds to T-165 without performing anything. After resetting the flag S1F in this step T-165, processing proceeds to step T-260 in FIG. 71(*b*), and judgment is made on whether or not the signal SELF obtained by the communication-(II) is "1". Here, when the signal is "1", processing returns to inhibit the card control by operation of the switches of the camera. When the signal SELF is not "1", judgment is made on whether or not the card setting switch $S_{CDS}$ has been turned to ON (T-265). When the switch has been turned to ON, in step T-270, judgment is made on whether or not the flag CDSF showing that processing has passed herethrough has been set. And if the flag has been set, processing proceeds directly to step T-276, and if the flag has not been set, processing sets this flag (T-275) and thereafter proceeds to step T-276. In this step T-276, judgment is made on whether or not data is under setting, and if not under setting, processing proceeds to step T-405, and performs display control entering the setting mode. If it is already in the setting mode (SETF=1), processing returns without performing display control because operation has been made to release setting mode.

When the card setting switch $S_{CDS}$ is in the OFF state in step T-265, processing proceeds to step T-280, and judges whether or not the flag CDSF has been set, and when it has not been set, proceeds to step T-310. When it has been set, this flag is set (T-285), and judgment is made in step T-290 on whether or not the flag SETF showing that data is under setting has been set. Here, when the flag has been set, this flag is reset (T-295), and an $E^2$PROM write signal is set to 1 (T-300), and direct addressing=1 is set (T-302), and processing proceeds to step T-310. Thereby, processing releases under-setting. When the flag SETS showing undersetting has not been set, this flag is set (T-305) to enter the data setting mode, and processing proceeds to step T-310. In step T-310, it is judged whether or not the flag SETF is "1", and where it is "1", processing proceeds to step T-345.

In step T-345, it is judged whether or not the up switch Sup has been turned to ON, and when it has been turned to ON, processing proceeds in a sequence of 1→2→3, and after 3, returns to 1 cyclically (T-355). Here, relating to the quantity of shift for the combination of the exposure value, 1—1 Ev
2—2 Ev
3—3 Ev On completing change in this mode, processing proceeds to step T-405. When the up switch Sup is in the OFF state, it is judged in step T-375 whether or not the down switch Sdn has been turned to ON, and when it has not been turned to ON, processing proceeds to step T-405. The case where it has been turned to ON differs from the case of the above-mentioned up switch Sup only in that the changing direction is reverse, and therefore description thereon is omitted.

On completing processing of the up switch Sup or the down switch Sdn, processing proceeds to step T-405 and the subsequent steps, and performs the following setting: display control (CS Ii-1-$b_4$)=1, release inhibit (CS II-2-$b_3$)=1, AF inhibit (CS II-2-$b_7$)=1, group specifying=0, and photometric loop repeat (CS II-3-$b_7$)=1, and sets data of display for data-setting, and returns. In addition, this display of under-setting is described later. Thereby, the micro-computer $\mu$C of the camera body executes the function of continuing display irrespective of display control by the card, release inhibit, AF inhibit and the power holding timer of the camera.

In the above-mentioned step T-310, if judgment is made not to be "under-setting" (SETF=0), processing proceeds to step T-430 in FIG. 71(*c*), and it is judged whether or not the card switch $S_{CD}$ has been turned to ON, and when the card switch $S_{CD}$ is in the OFF state, the flag CDF is reset in step T-460, and it is judged in step T-462 whether or not the display flag has been set, and when it has not been set, processing returns. When it has been set, processing proceeds to step T-170, and performs control of display of the card name as shown in FIG. 72. In the above-mentioned step T-430, when the card switch $S_{CD}$ is in the ON state, judgment is made in step T-435 on whether or not the flag CDF showing that processing has passed herethrough has been set, and when it has been set, assuming that the switch is kept operated, processing proceeds to step T-462. When the flag CDF has been set, this flag is set (T-440), and in the following step T-445, judgment is made on whether or not the card function is in the ON state at present, and where it is in the ON state, it is set to OFF (data of the communicationII) (T-450), and the display flag is reset (T-451) and processing returns. Conversely, where the function is in the OFF state, it is turned to ON (data of the communicationII) in step T-455, and the display flag is set in step T-456, and processing proceeds to step T-170 performing control of display of the card name as shown in FIG. 72.

Reverting to FIG. 70, when communication is not (I), whether or not the communication(II) is judged in step T-40, and when the communication is (II), serial communication is performed ten times (T-50) with the card set as the output side to output the abovementioned set data to the camera body (T-45), and processing sleeps.

When communication is not (II), it is judged in step T-51 whether or not the communication is (III), and when the communication is (III), the card is set as the input side (T-52), and serial communication is performed fifteen times (T-53). Further, calculation of $\Delta Tv$, $\Delta Av$ is performed in step T-54 and processing returns. This calculation is shown in FIGS. 73(*a*) and 73(*b*).

When communication is not (III), it is judged in step T-55 whether or not the communication is (IV), and when the communication is (IV), the card is set as the output side (T-60), and it is judged in step T-65 whether or not data is for display control, and when the data is for display control, display data is outputted (T-70), address is set, and serial communication is performed nine times (T-75), and processing proceeds to step T-90.

When the result of judgment in step T-65 is not for display control, control data is addressed (T-80), and serial communication is performed four times (T-85), and processing proceeds to step T-90. In step T-90, it is judged whether or not an $E^2PROM$ write signal has been set, and when it has been set, a write control signal is outputted to write one byte data of the set number of the setting mode to predetermined addresses of the $E^2PROM$ (T-95). Write to the $E^2PROM$ is performed by the hardware, and the micro-computer $\mu C$ has only to send a control signal. Then, a write end signal (on completing the write, this signal is set automatically by the hardware configuration) is reset (T-100), and processing sleeps. When the write signal is not inputted, processing sleeps immediately. When the communication is not (IV), assuming that it is the communication(VI), first, it is judged by the above-mentioned end signal whether or not write has been completed (T-105), and when write has been completed, a sleep-good signal is set (T-110), and when it has not been completed, a sleep-no signal is set (T-115), and processing proceeds to step T-120 respectively. In step T-120, the card is set as the data output side, serial communication is performed once in response to clock pulses from the camera body (T-125), and processing sleeps.

Figure 73A:
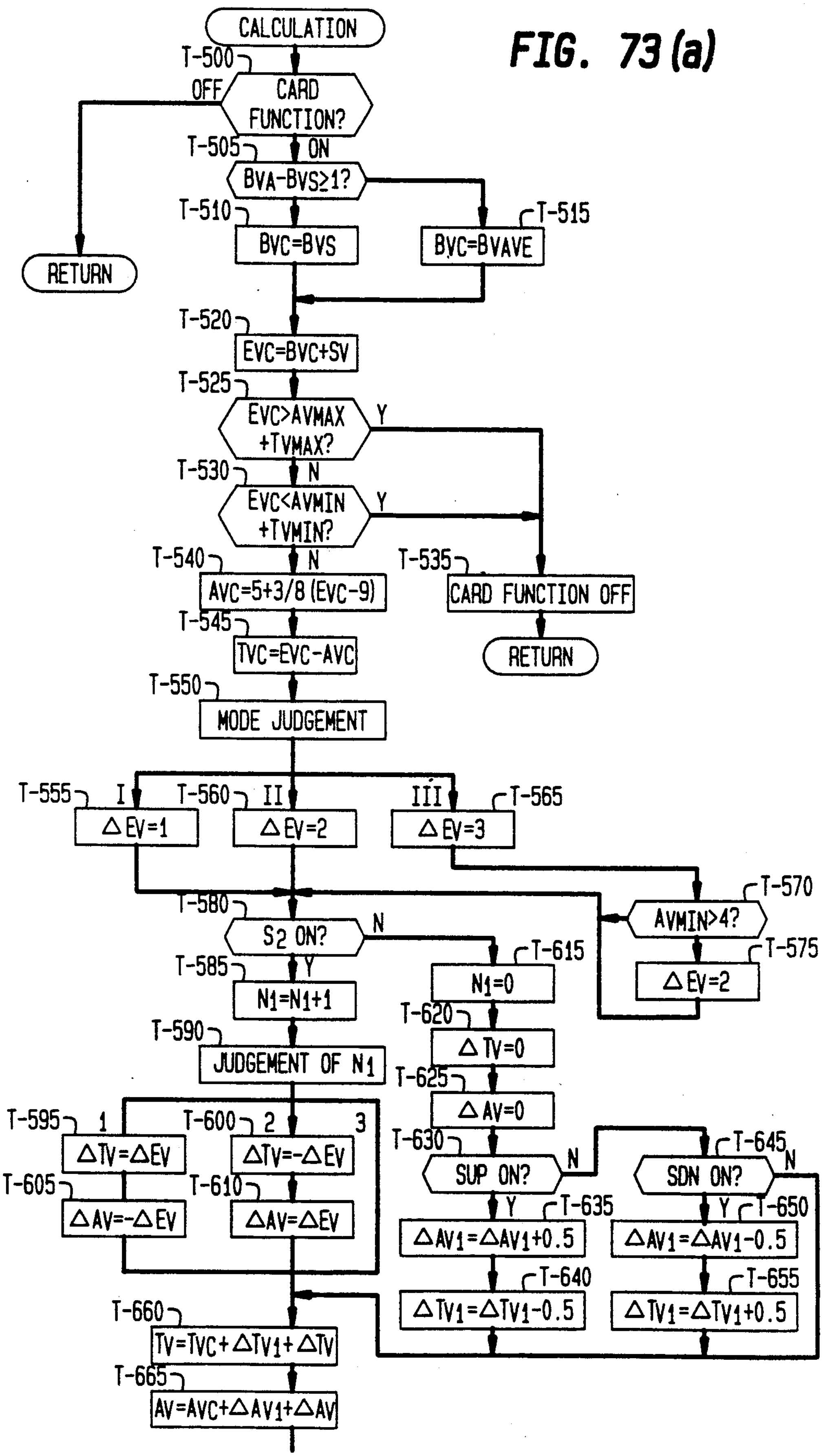
Figure 73B:
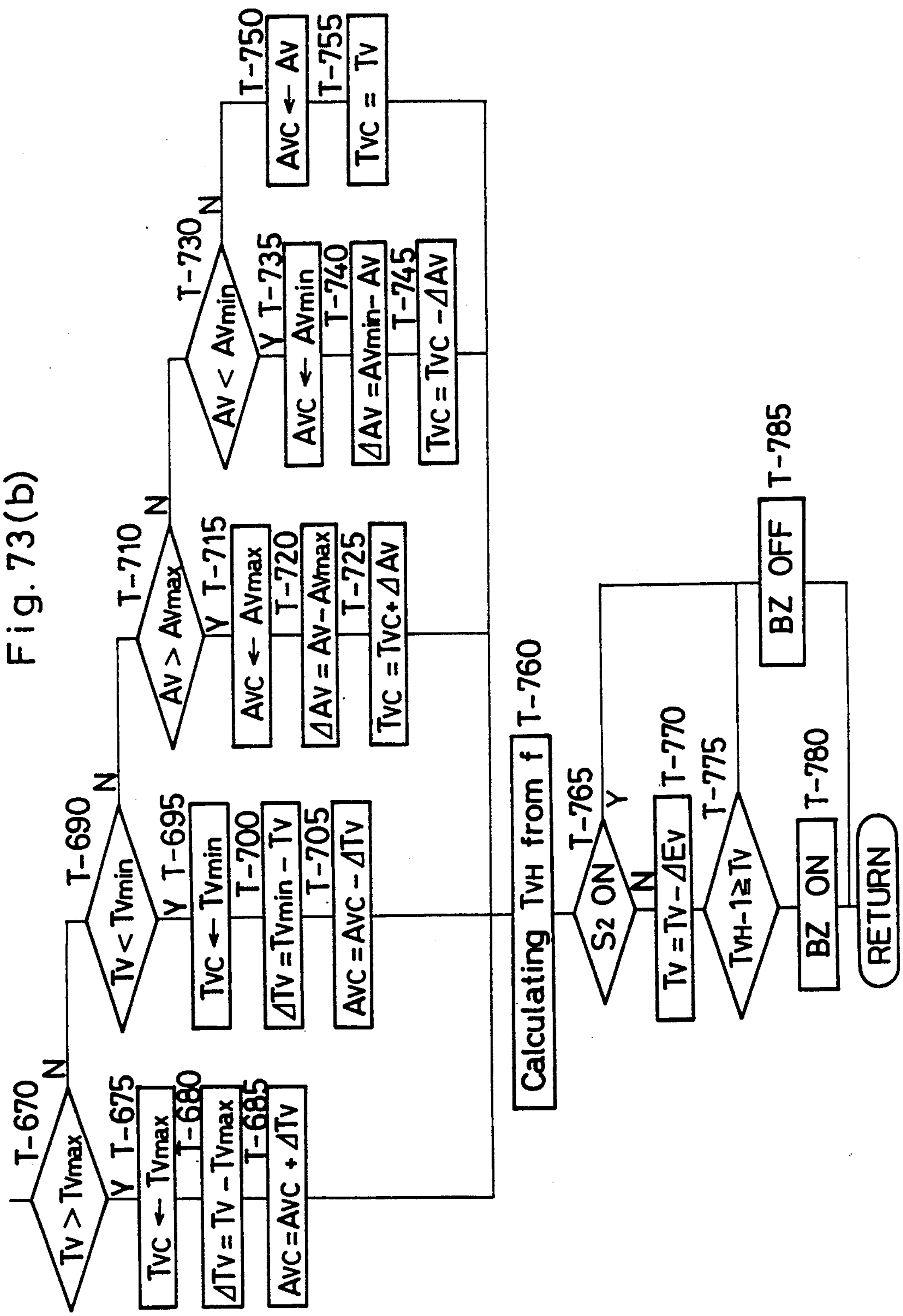

FIGS. 73(*a*) and 73(*b*) show calculation control in step T-54 in FIG. 70. Here, $B_{VA}$ represents a background luminance, $B_{VS}$ represents a main subject luminance, and $B_{VAVE}$ represents an average luminance. When the card function is in the OFF state in step T-500, processing returns. When the card function is in the ON state, it is judged in step T-505 whether or not $B_{VA}-B_{VS}\geqq 1$. If $B_{VA}-Bvs\geqq 1$, $Bvc=B_{DS}$ is set (T-510), and if $B_{VA}-B_{vs}<1$, $Bvd=B_{AVE}$ is set (T-515). This setting is performed so as to make main subject have priority for exposure and also make the whole to be exposed properly. An exposure value Evc is evaluated in step T-520 from Bvc+Sv and this value shows to exceed a control limit value. If YES in judgment of steps T-525, or T-530, shift function is disabled, the card function is turned to OFF (T-535), and processing returns. In step T-540, a control exposure value is calculated in a manner such that it equals neither the limit value of the diaphragm aperture value nor the limit value of the shutter speed.

A control shutter speed Tvc is evaluated in step T-545 from Avc and Evc already determined, and judgment of the mode is performed (T-550). In following steps T-555, T-560, T-565, $\Delta Ev=\mathbf{1}$ is set for the No. 1 of setting mode, $\Delta Ev=\mathbf{2}$ is set for the No. 2, and $\Delta Ev=\mathbf{3}$ is set for the No. 3. After setting of $\Delta Ev=\mathbf{3}$, it is judged in step T-570 whether or not open F value exceeds 4, and when it exceeds 4, since there are many cases where the lens therefor has only Ev steps for aperture value width, $\Delta Ev=\mathbf{2}$ is set forcibly (T-590), and processing proceeds to step T-580.

In step T-580, judgment is made on whether or not a release switch $S_2$ has been turned to ON, and when it has not been turned to ON, $N_1=0$, $\Delta Tv=0$, $\Delta Av=0$ are set in steps T-615, T-620, T-625 and the first frame follows the line in the program diagram. However, since program shift is made possible, 0.5 Ev is added to or subtracted from $\Delta Av_1$ and is subtracted from or added to $\Delta Tv_1$ is response to the turn-on of the up switch or the down switch, and processing proceeds to step T-660.

When the release switch $S_2$ has been turned to ON, 1 is added to $N_1$ and thereafter judgment of $N_1$ is performed. If $N_1=1$, $\Delta Tv=\Delta Ev$, $\Delta Av=-\Delta Ev$ are set, and if $N_1=2$, $\Delta Tv=-\Delta Ev$, $\Delta Av=\Delta Ev$ are set. If $N_1=3$, setting is not performed, and processing proceeds to step T-660. In step T-660, Tv and Av are evaluated from $Tv=Tvc+\Delta Tv_1+\Delta Tv$ and $Av=Avc+\Delta Av_1+\Delta Av$ respectively.

When Tv exceeds either Tvmax or Tvmin, and Av exceeds either Avmax or Avmin, Tv and Av are set for the respective control limit values, while, the control diaphragm aperture value Avc and the control shutter speed Tvc are respectively calculated by feed-back of the exceeding quantity (T-670~T-755). Thereafter, a maximum blurring limit shutter speed $T_{vH}$ is evaluated in step T-760 from the following equation:

$$T_{vH}=1.125\times\log_2(f/50)+5.875$$

wherein, f represents a focal length.

When the release switch $S_2$ has been turned to ON, the blurring warning buzzer is turned to OFF (T-785), and processing returns. When the release switch $S_2$ has not been turned to ON. $\Delta Ev$ is subtracted rom Tv (T-770). Judgment is made in step T-775 on whether or not Tv is not more than the blurring limit shutter speed ($T_{vH}$-1), and if $Tv\leqq T_{vH}$-1, the blurring warning buzzer is turned to ON (T-780), and conversely, if $Tv>T_{vH}$-1, the buzzer is turned to OFF (T-785), and processing returns respectively.

Here, the reason why the blurring limit for two and three frames is set as $T_{vH}$-1 is that the blurring becomes smaller than the first frame photograph without depressing the operation switch.

Figure 74:
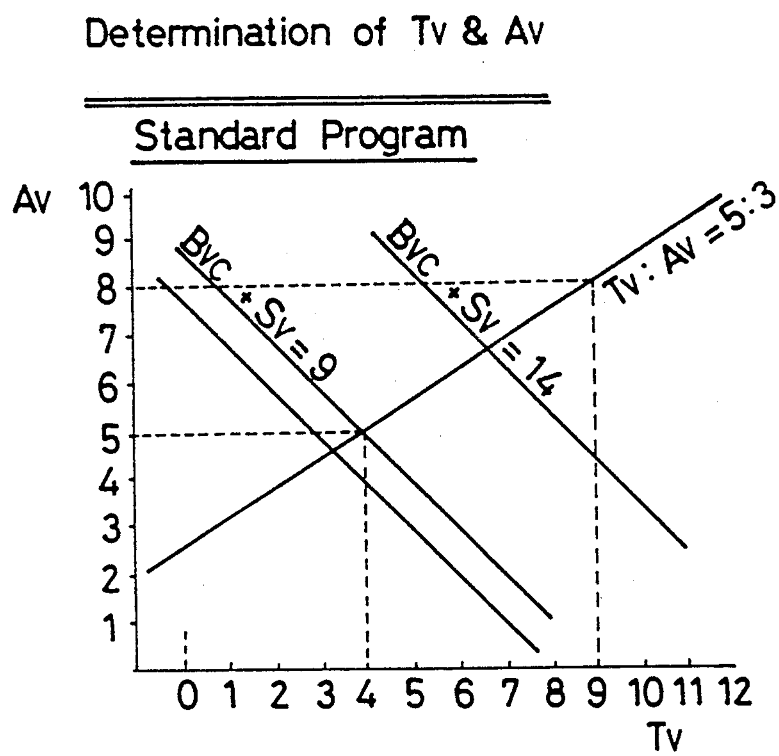
FIG. 74 and FIG. 75 are explanatory views thereof.

FIG. 74 is a standard program diagram of the above-mentioned determination of the combination between Tv and Av.

Figure 75:
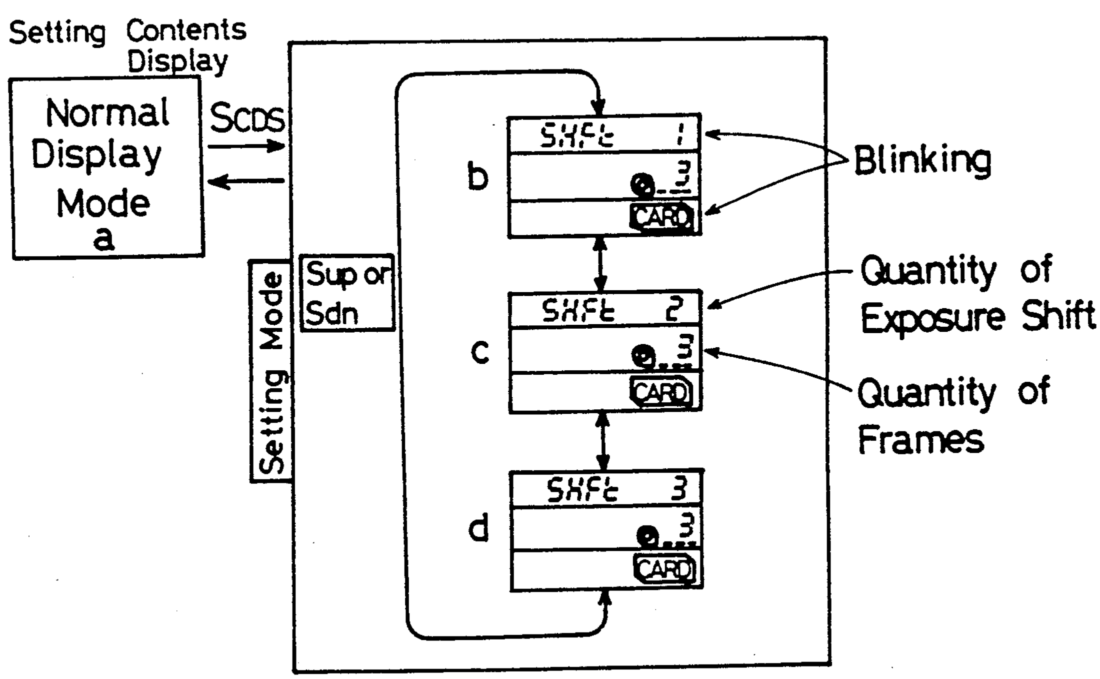

Further FIG. 75 shows the content of display at setting. When the mode is the normal display mode (a), by operating the switch $S_{CDS}$, the mode turns to the setting mode as shown in, for example, (b). Here, "1" and "card" are displayed in a blinking fashion at the top and bottom areas respectively. ∓1" at the top area represents the quantity of exposure shift and "3" at the middle area represents the quantity of exposed film frames. When the up switch Sup or the down switch Sdn is operated in the state of (b), the display is varied in a sequence of (b)→(c)→(d)→(b) — — — , or (b)→(d)→(b)→(c)→(b) — — — with every operation of the switch. In any case, by depression of the switch $S_{CDS}$, the mode returns to the normal display mode (a). In FIG. 75, relating to the normal display mode (a), only a block thereof is shown and illustration of the content of the display is omitted.

(8) H/S card

Next, description is made of the operation of the H/S card.

H/S card is so designed that an exposure is set under by a predetermined quantity (highlight·H) to a correct exposure in order to photograph a black subject as black, or the exposure is set over by a predetermined quantity (shadow·S) in order to photograph a white subject as white.

Figure 76:
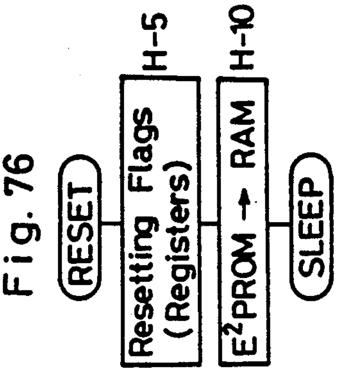
FIG. 76, FIG. 77 and FIGS. 78(*a*) to 78(*c*) are flowcharts showing operation flows of a H/S card.

The micro-computer $\mu C_2$ of the H/S card executes a routine of resetting as shown in FIG. 76 when this card is attached to the camera body, resets all of the flags and the registers (RAM) (H-5), moves information in the $E^2PROM$ to the RAM (H-10), and processing sleeps.

Figure 77:
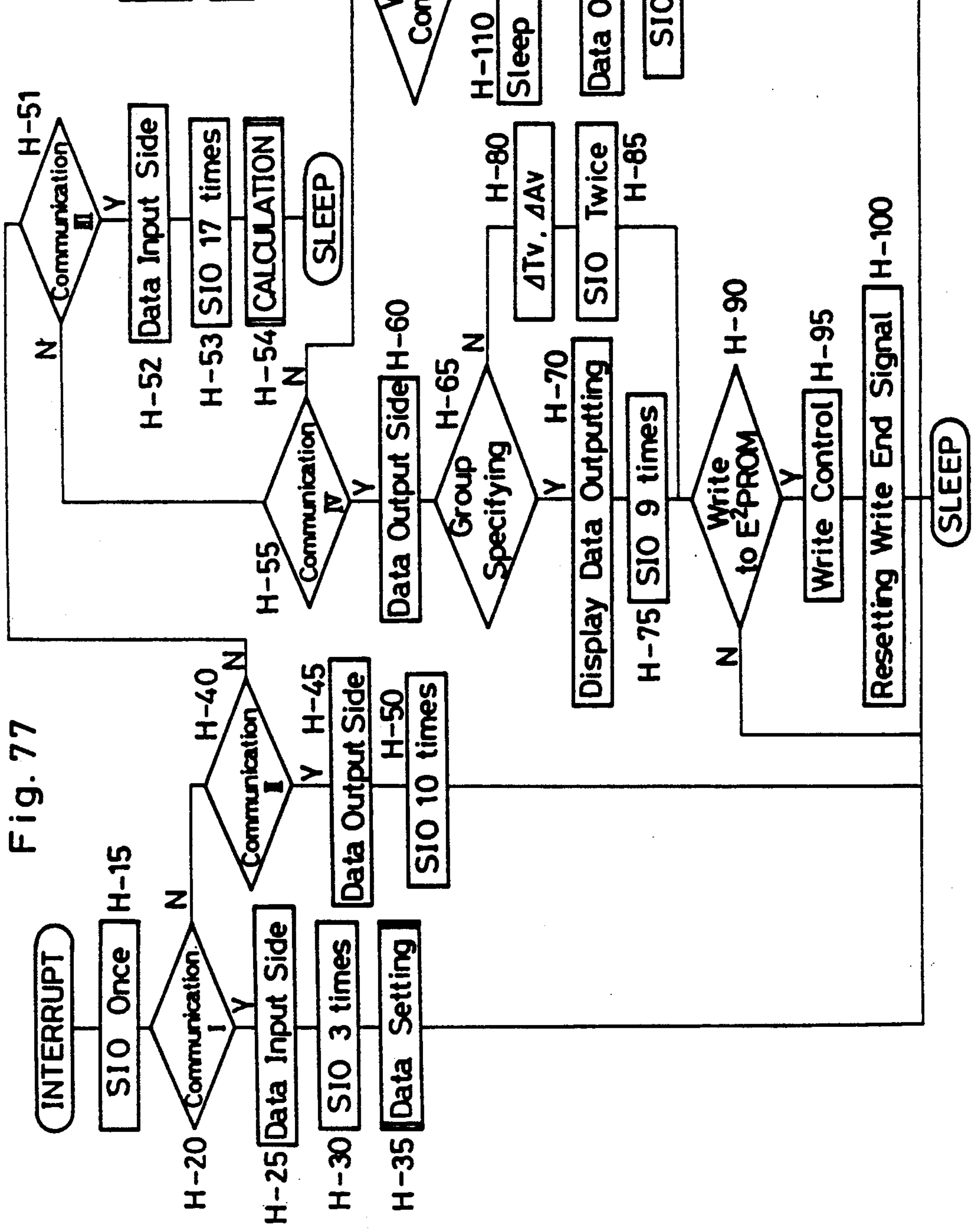

Next, when a signal changing from "L" to "H" is sent from the camera body to the terminal CSCD of this card, the micro-computer $\mu C_2$ of the H/S card executes an interrupt as shown in FIG. 77. Here, in synchronism with clock pulses sent from the camera body, serial communication is performed once to input data showing the kind of communication (H-15).

The kind is judged (H-20) from the data obtained by this communication, and when the kind is the communication (I), the card is set as the data input side (H-25), and serial communication is performed (H-30) to receive data (refer to Table 6 and Table 19) from the camera body. Based on this data, the micro-computer $\mu C_2$ executes a subroutine of data setting (H-35), and processing sleeps.

Here, prior to description on the above-mentioned subroutine, description is made on what kinds of data are outputted from the card in response to a communication.

In the communication (II), all signals other than the following signals are set to "0"

| | |
|---|---|
| FL forced OFF (=1) | CS II -1-$b_2$ |
| Card performs display control | CS II -1-$b_4$ |
| Card function ON/OFF | CS II -1-$b_5$ |
| Communication (V) NO (=0) | CS II -2-$b_2$ |
| Release inhibit | CS II -2-$b_3$ |
| AF inhibit | CS II -2-$b_7$ |
| Tv · Av/display data | CS II -3-$b_3$ |
| Communication (IV) EXIST (=1) | CS II -3-$b_4$ |
| Communication (III) EXIST (=1) | CS II -3-$b_5$ |
| Communication type | CS II -3-$b_6$ |
| Photometric loop repeat | CS II -3-$b_7$ |

Signals marked with ❖ on the table are set to "1" or "0" in response to the respective cases. The determined signals are set to "0" or "1" in a fixed manner. In the communication (II), in addition to the above signals, the number (twice) of communication data of direct address type in the communication (IV) and the address thereof (CS II-7, 8) exist. In order to specify groups $G_1$, $G_3$ of the communication (III) in group communication, CS II-9-($b_1$, $b_2$, $b_3$)=1, 0 is set. Since the communication (IV) is only of display data, CS II-10-$b_1$=1 is set. The others are set to "0".

In addition , any data can be entered in blank spaces on the above-mentioned table.

In the communication (IV), data of ΔAv, ΔTv which is used for adjustment is outputted from the $E^2$PROM.

In the communication (VI), a signal of sleep possible/no is sent.

Figure 78A:
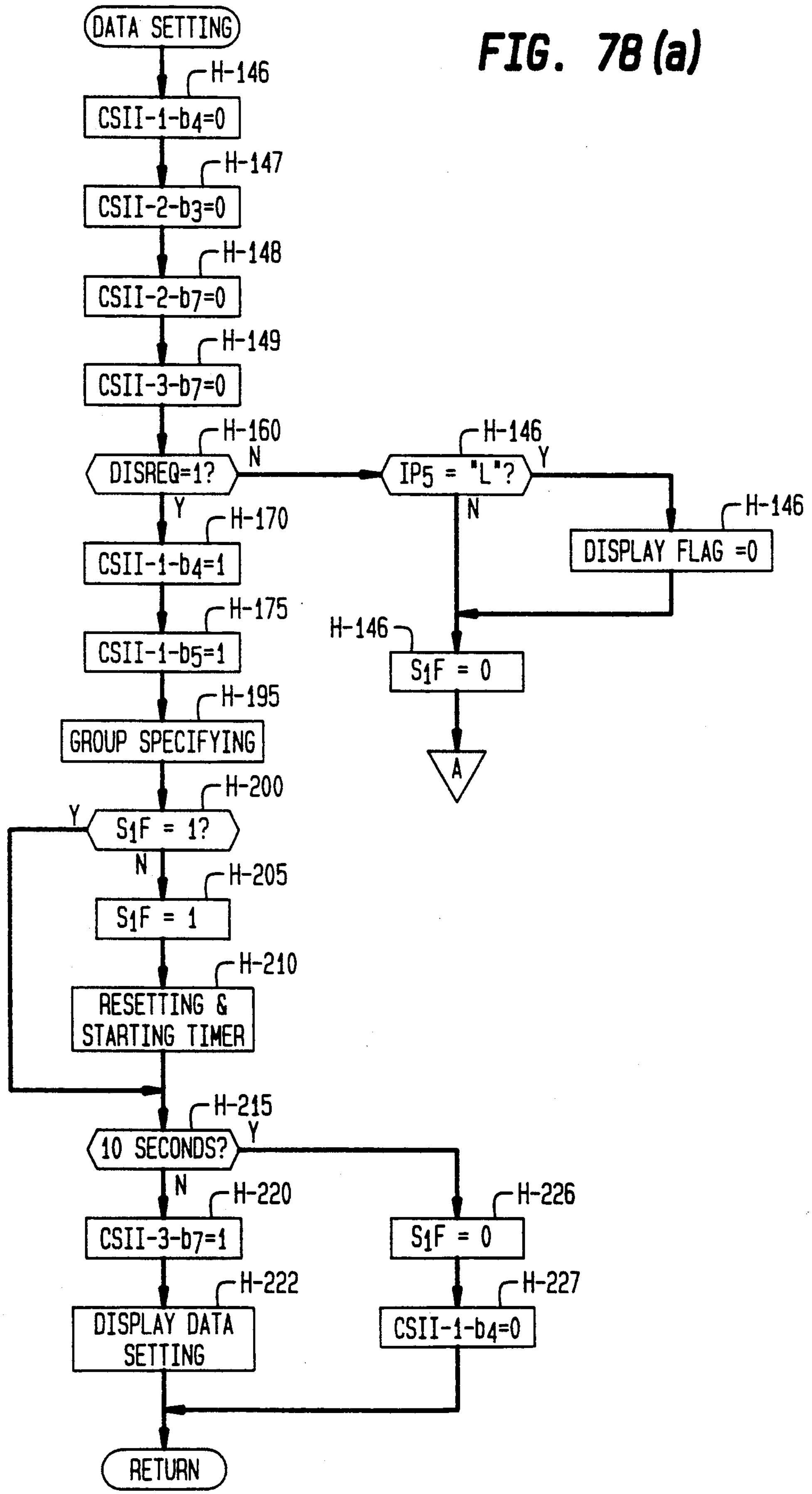
Figure 78B:
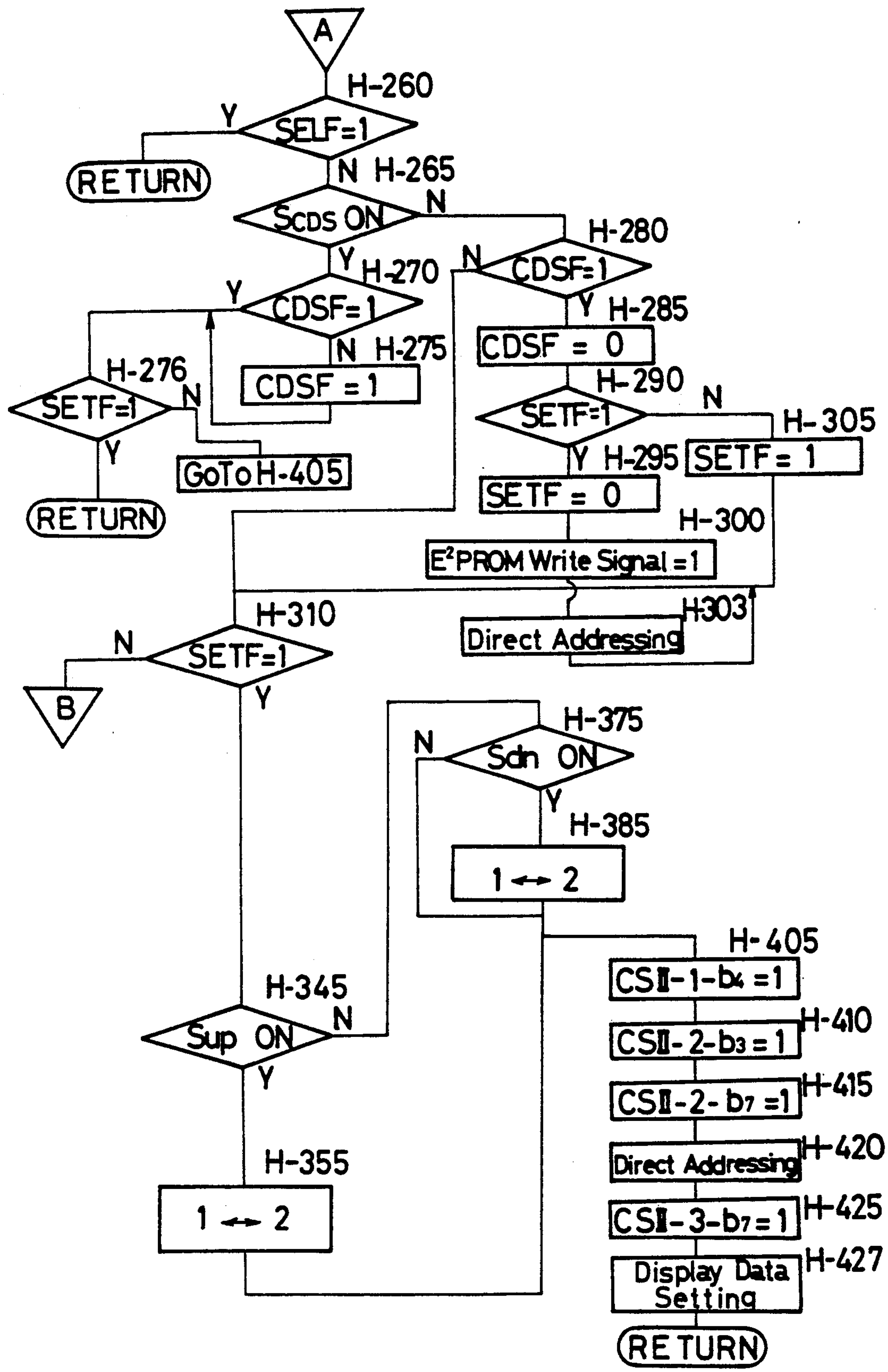
Figure 78:
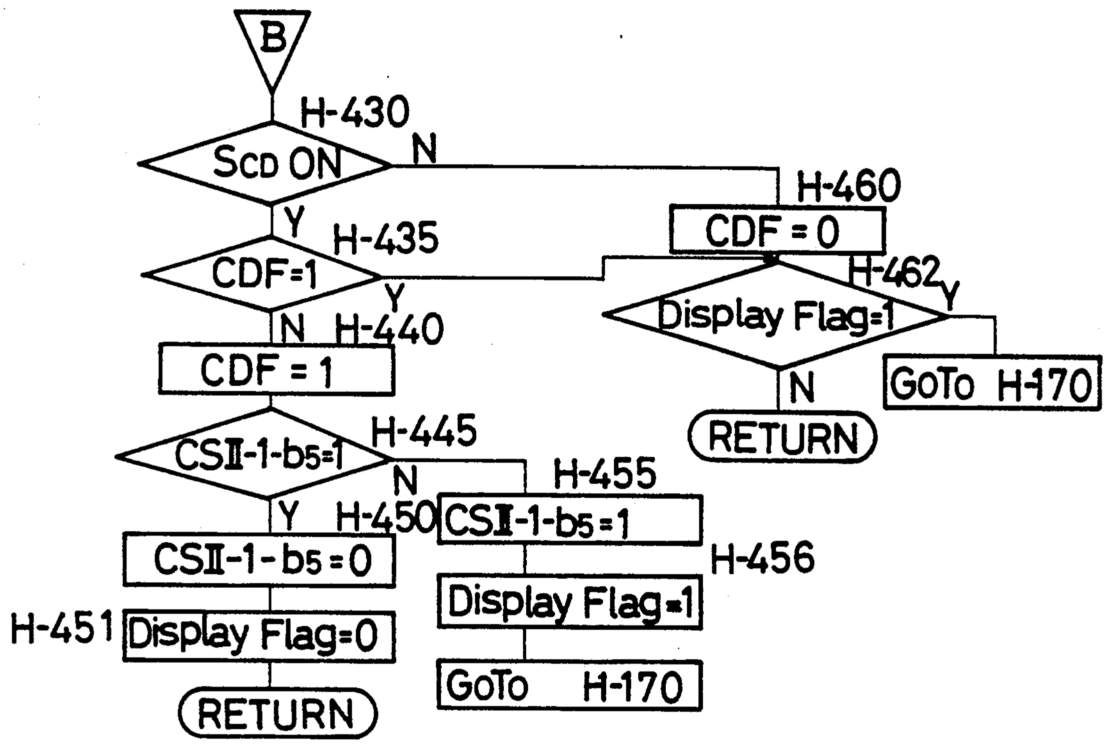
Figure 79:
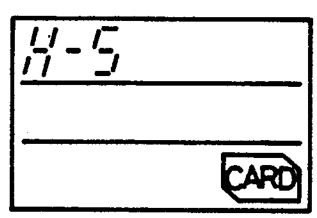
FIG. 79 is a view showing an example of display, FIGS. 80(*a*) and 80(*b*) are flowcharts showing a routine of calculation.

Next, a subroutine of data setting is shown in FIG. 78(*a*) to be explained. First, in steps H-146 to H-149, display control data (CS II-1-$b_4$) is initialized to "0", release inhibit (CS II-2-$b_3$) to "0", AF inhibit (CS II-2-$b_7$) to "0", and photometric loop repeat (CS II-3-$b_7$) to "0", and processing proceeds to step H-160. In step H-160, judgment is made on whether or not a signal DISREQ (request of card name display) obtained by the communication (I) is "1", and where the signal is "1", display control data is set to "1", card display function ON/OFF to ON (1), and data of group specifying to "0" (H-170 to H-195). Subsequently, whether or not the flag S1F has been set is judged (H-200), and where the flag has not been set, assuming that processing passes through this flow for the first time, the flag S1F is set (H-205), and the timer is reset and started (H-210), and processing proceeds to step H-215. When the flag S1F has been set, processing proceeds directly to step H-215. In step H-215, it is judged whether or not 10 seconds has elapsed form the start of the above-mentioned timer, and where 10 seconds has not elapsed, the photometric loop repeat signal is set to "1" (H-220), and data performing only the card name display and the card mark display is set (H-222), and processing returns. FIG. 79 shows this display. On the other hand, where 10 seconds has elapsed, the flag S1F is rest (H-226), and display control data is set to "0" (H-227), and processing returns.

If DISREQ=0 in the above-mentioned step H-160, processing proceeds to step H-162, and judgment is made on whether or not $IP_5$ is "L" (that is, any of the switches $S_{EM}$, $S_{FUN}$, $S_{CD}$, $S_{CDS}$ and $S_1$ is in the ON state), and when $IP_5$ is "L", the display flag showing control performing card name display is reset (H-163), and when $IP_5$ is not "L", processing proceeds to H-165 respectively without performing anything. After resetting the flag S1F in this step H-165, processing proceeds to step H-260 in FIG. 78(*b*), and judgment is made on whether or not the signal SELF obtained by the communication (II) is "1".

Here, when the signal is "1", processing returns to inhibit control by operation of the switches to inhibit controlling by operation of the switches of the camera.

When the signal SELF is not "1", judgment is made on whether or not the card setting switch $S_{CDS}$ has been turned to ON (H-265). When the switch has been turned to ON, in step H-270, judgment made on whether or not the flag CDSF showing that processing has passed herethrough has been set, and if the flag has not been set, this flag is set (H-275), and if the flag has been set, processing proceeds to step H-276 respectively without performing anything. In step H-276, judgment is made on whether or not data is under setting, and if not under setting, processing jumps to step T-405, and performs display control entering the setting mode. If it is already in setting mode (SETF=1), processing returns without performing display control because operation has been made to release under-data-setting. When the card setting switch $S_{CDS}$ is in the OFF state in step H-265, processing proceeds to step H-280, and judges whether or not the flag CDSF has been set, and when it has not been set, proceeds to step H-310. When it has been set, this is reset (H-285), and judgment is made on whether or not the flag SETF showing that data is under setting has been set in step H-290, and when the flag has been set, this is reset (H-295), and an $E^2$PROM write signal is set to 1(H-300), and direct addressing=1 is set (H-303), and processing proceeds to step H-310. Thereby, processing releases under-setting.

When the flag SETF showing under-setting has not been set, processing sets this flag (H-305), enters the data setting mode, and proceeds to step H-310. In step H-310, if data is under-setting (SETF=1), processing proceeds to step H-345. In this step H-345, it is judged whether or not the up switch Sup has been turned to ON, and when it has been turned to ON, processing proceeds in a sequence of 1⟷2 (H-355). Here, 1 represents a highlight mode and 2 represents a shadow mode.

On completing change in this mode, processing proceeds to step H-405. When the up switch Sup is in the OFF state, it is judged whether or not the down switch Sdn has been turned to ON (H-375), and when it has not been turned to ON, processing proceeds to step H-405. The case where it has been turned to ON differs from the case of the above-mentioned up switch Sup only in that the changing direction is reverse, and therefore description thereon is omitted.

On completing processing of the up switch Sup and the down switch Sdn, processing proceeds to step T-405 and the subsequent steps, and performs the following setting: display control =1, release inhibit=1, AF inhibit=1, group specifying=0, and photometric loop repeat=1, and sets data of display of under-data-setting, and returns. In addition, this display of under-setting is described later. Thereby, the micro-computer μC of the camera executes displaying continuously irrespective of display control by the card, release inhibit, AF inhibit and the power holding timer of the camera.

In the above-mentioned step H-310, if judgment is made not to be "under-setting" (SETF=0), processing proceeds to step H-430 in FIG. 78(*c*), and it is judged whether or not the card switch $S_{CD}$ has been turned to ON is judged, and when the card switch $S_{CD}$ is in the OFF state, in step H-460, this flag CDF is reset, and whether or not the display flag has been set is judged (H-462), and when it has not been set, processing returns. When it has been set, processing proceeds to step H-170, and performs control of display of the card name. In the above-mentioned step H-430, when the card switch $S_{CD}$ is in the ON state, judgment is made on whether or not the flag CDF showing that processing has passed herethrough has been set (H-435), and when it has been set, assuming that the switch is kept operated, processing proceeds to step H-462. When the flag CDF has not been set, this flag is set (H-440), and in the following step H-445, judgment is made on whether or not the card function is in the ON state based on data CS II-1-$b_5$ at present, and where it is in the ON state (CS II-1-$b_5$=1), it is set to OFF (data of CS II-1-$b_5$) (H-450), and the display flag is reset (H-451), and processing returns. Conversely where the function is in the OFF state (CS II-1-$b_5$=0), it is turned to On (data of CS II-1-$b_5$) in step H-455, and the display flag is set in step H-456, and processing proceeds to step H-170, performing control of display of the card name.

Reverting to FIG. 77, when the communication is not (I), it is judged in step H-40 whether or not the communication is (II), and when the communication is (II), serial communication is performed ten times (H-50) with the card set as the output side (H-45) to output the above-mentioned set data to the camera and processing sleeps.

When the communication is not (II), whether or not the communication is (III) is judged in step H-51, and when the communication is (III), the card is set as the data input side (H-52), serial communication is performed seventeen times (H-53). Further, calculation of ΔTv, ΔAv is performed (H-54), and processing sleeps.

When the communication is not (III), whether or not the communication is (IV) is judged in step H-55, and when the communication is (IV), the card is set as the output side (H-60), and it is judged in step H-65 whether or not data is of group specifying, and when the data is of group specifying, (H-70), address is set, and serial communication is performed nine times (H-75), and processing proceeds to step H-90. When the result is not group specifying (direct addressing), ΔEv change data is addressed (H-80), and serial communication is performed twice (H-85) and processing proceeds to step H-90. In step H-90, it is judged whether or not and $E^2$PROM write signal has been set, and when it has been set, a write control signal is outputted to write one-byte data of the set number in the setting mode to predetermine addresses of the $E^2$PROM (H-95). Write to the $E^2$PROM is performed by the hardware, and the micro-computer μC has only to send a control signal. Then, a write end signal (on completing the write, this signal is set automatically by a hardware configuration) is reset (H-100), and processing sleeps. When the write signal is not inputted, processing sleeps immediately. When the communication is not (IV), assuming that it is the communication (VI), first, whether or not write has been completed is judged by the above-mentioned end signal (H-105), and when write has been completed, a sleep-good signal is set (H-110), and when it has not been completed, a sleep-no signal is set (H-115), and processing proceeds to step H-120 respectively. In step H-120, the card is set as the output side, and serial communication is performed once in response to clock pulses from the camera body (H-125), and processing sleeps.

Figure 80A:
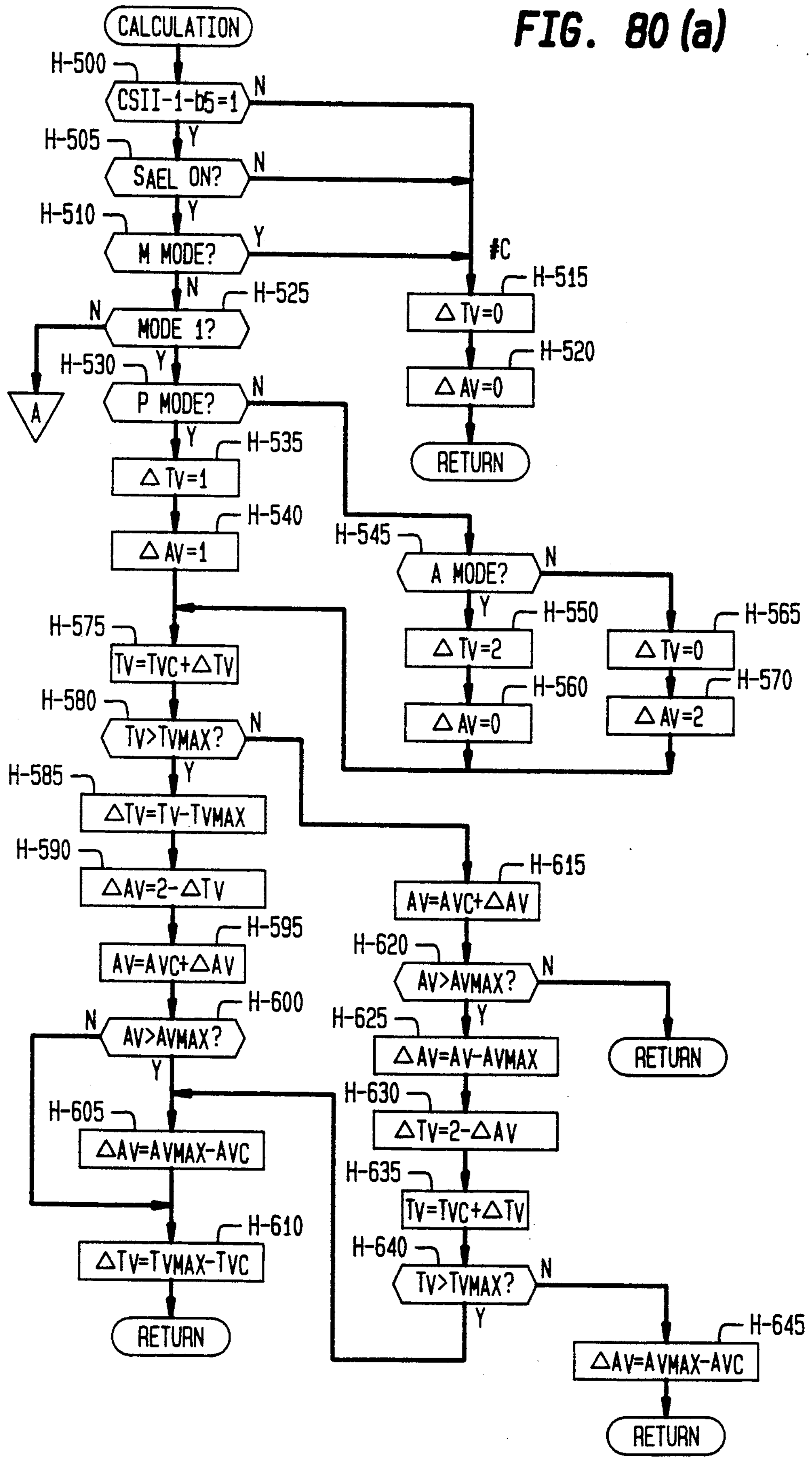
Figure 80B:
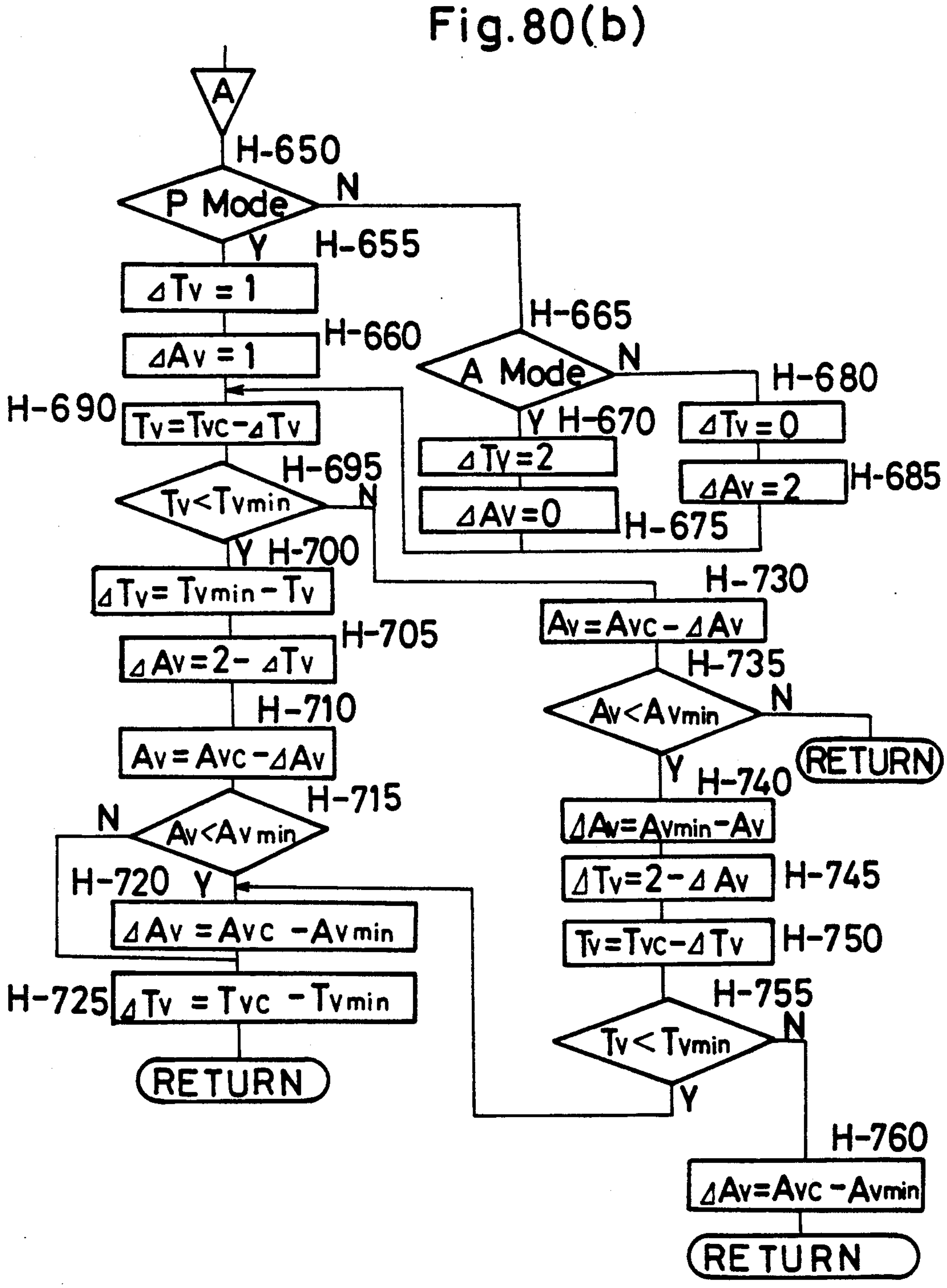

The above-mentioned calculation control in step H-54 in FIG. 77 is shown in FIGS. 80(*a*) and 80(*b*). When the card function is not in the ON state in step H-500 (CS II-1-$b_5$=0), or the AE locking switch $S_{AEL}$ is in the OFF state in step H-505, the quantities ΔTv, ΔAv of adjustment are set to "0" in steps H-515, H-520 respectively. Similarly, when the mode is in the M mode, processing proceeds to step H-515 and further to step H-520. This is because in the M mode, considering that the values Av, Tv set by a photographer have priority, adjustment based on H/S information is not performed. In step H-525, when the mode is not (I), that is, it is the mode (II) (shadow), processing proceeds the flow shown in FIG. 80(*b*). When the mode is (I), processing proceeds to highlight control in step H-530 and the subsequent steps.

When the mode is the P mode, the quantity of adjustment is divided between Tv and Av (H-535, H-540). On the other hand, in the case of the A mode, only the shutter speed Tv is adjusted (H-550, H-560), and in the case of the S mode, only the diaphragm aperture value Av is adjusted (H-4565, H-570).

Tv is evaluated from the control shutter speed Tvc+the quantity ΔTv, of adjustment (H-575) and judgment is made on whether or not Tv exceeds Tvmax (H-580). When it exceeds Tvmax, ΔAv is evaluated by subtracting the exceeding quantity ΔTv (Tv-Tvmax) from the quantity 2 Ev of adjustment (H-590), and processing feeds-back to the diaphragm aperture value and the value Av is evaluated from Avc+ΔAv (H-595). Judgment is made on whether or not this diaphragm aperture value Av exceeds Avmax (H-600), and when it exceeds Avmax, the differences between the limit values of Av, Tv and the control values thereof are respectively set for ΔAv, Δ ΔTv and adjustment is designed to be performed to the utmost. On the other hand, when Av≦Avmax, ΔTv is evaluated from Tvmax-Tvc (H-610).

In step H-580, when Tv≦Tvmax, the diaphragm aperture value Av is evaluated by the adding quantity ΔAv of adjustment to the control diaphragm aperture value Avc, and further if Av≦Avmax, assuming that the diaphragm aperture value Av and the shutter speed after adjustment do not exceed the respective limits thereof, processing returns. If Av>Avmax, the difference ΔAv between the two values is evaluated from Av, Avmax, and ΔTv is re-evaluated from 2 Ev−ΔAv (H-630), and thereafter the shutter speed is evaluated from Tvc+ΔTv. When Tv≦Tvmax holds, ΔAv is evaluated from Avmax-Avc, and on the other hand, when Tv>Tvmax, processing proceeds to H-605.

Next, FIG. 80(*b*) shows control in the case of shadow. Control in the case of shadow differs from control in the case of highlight only in that adjustment is set on (−) side (under side) and the limit value is Avmin or Tvmin.

Figure 81:
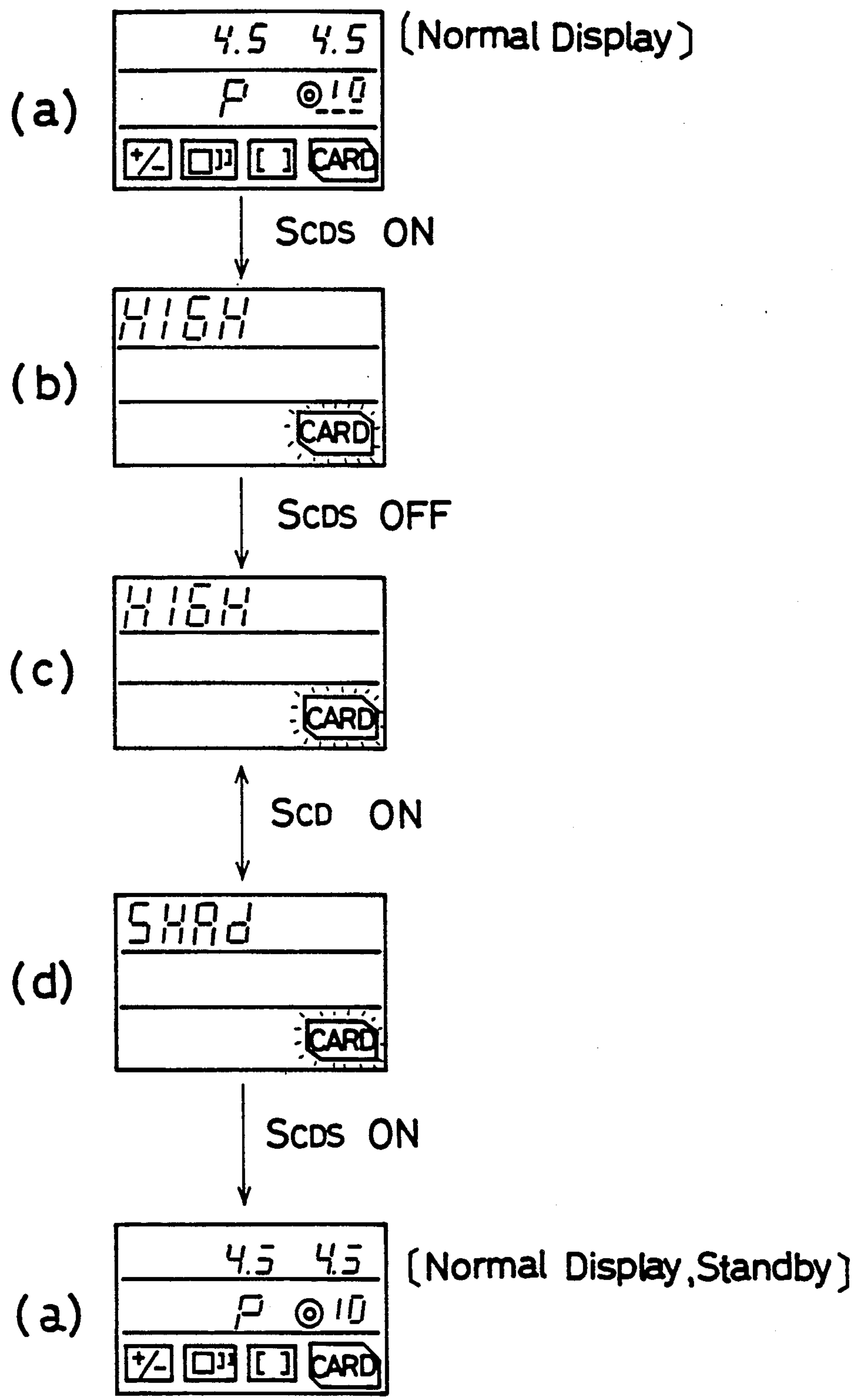
FIG. 81 is an explanatory view relating to card data setting.

FIG. 81 shows the content of display at data setting. In the state of the normal display (a), by turning on the switch $S_{CDS}$, the normal display turns to the display as shown in (b). Subsequently, by turning OFF the switch $S_{CDS}$, the display turns to (c). By turning on the switch $S_{CD}$ in the state of (c), the display turns to (d), and by the next turn-on of the switch $S_{CD}$, the display returns to (c). As described above, every time the switch $S_{CD}$ is turned to ON, (c) and (d) are displayed alternately. Next, when the switch $S_{CDS}$ is turned to ON again, the display returns to the normal display (a).

(9) Portrait card

Next, description is made of the operation of the portrait card.

Figures 82, 84A:
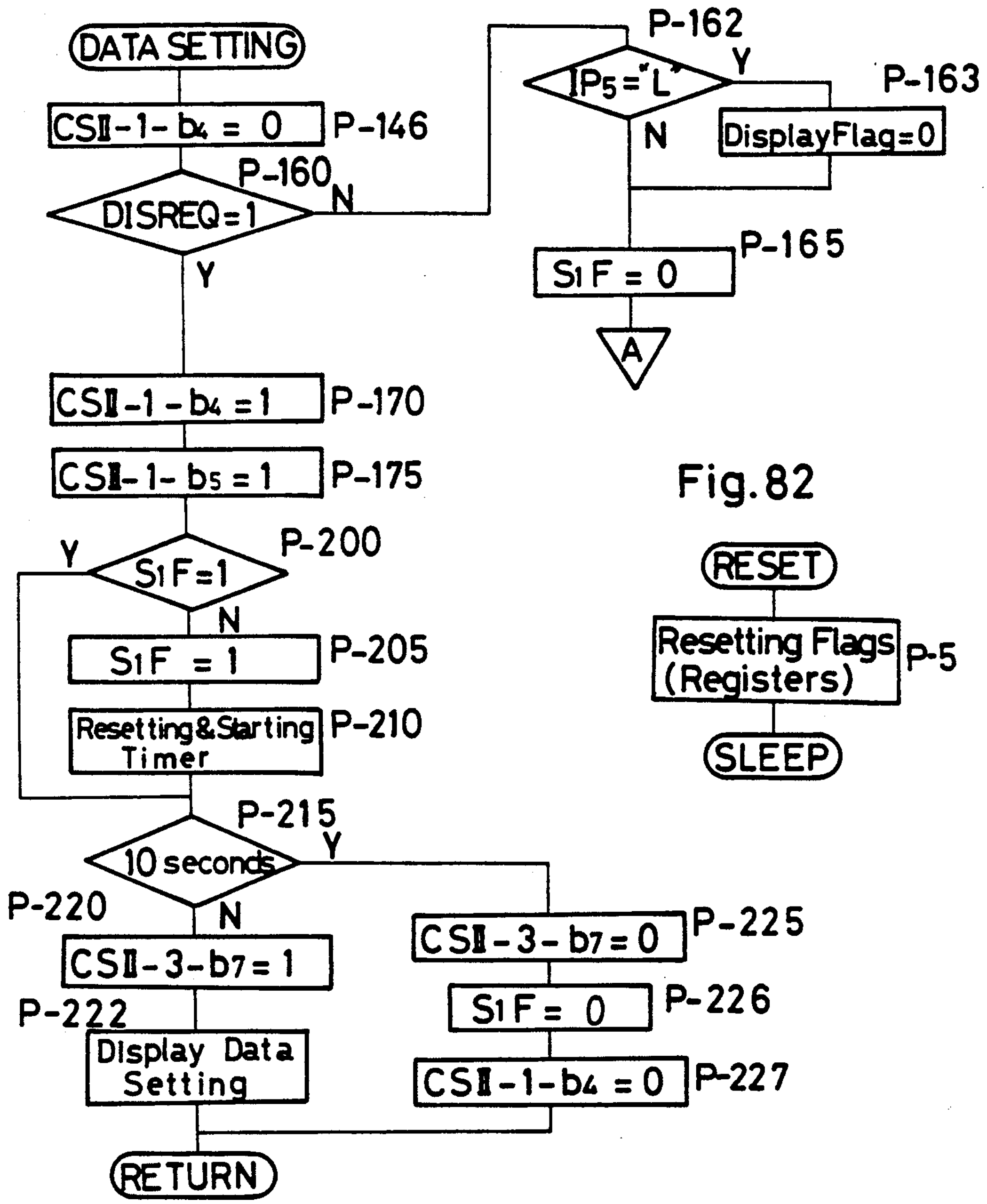

The micro-computer $\mu C_2$ of the portrait card executes a routine of resetting as shown in FIG. 82 when this card is attached to the camera body, resets all of the flags and the registers (RAM) (P-5), and processing sleeps.

Figure 83:
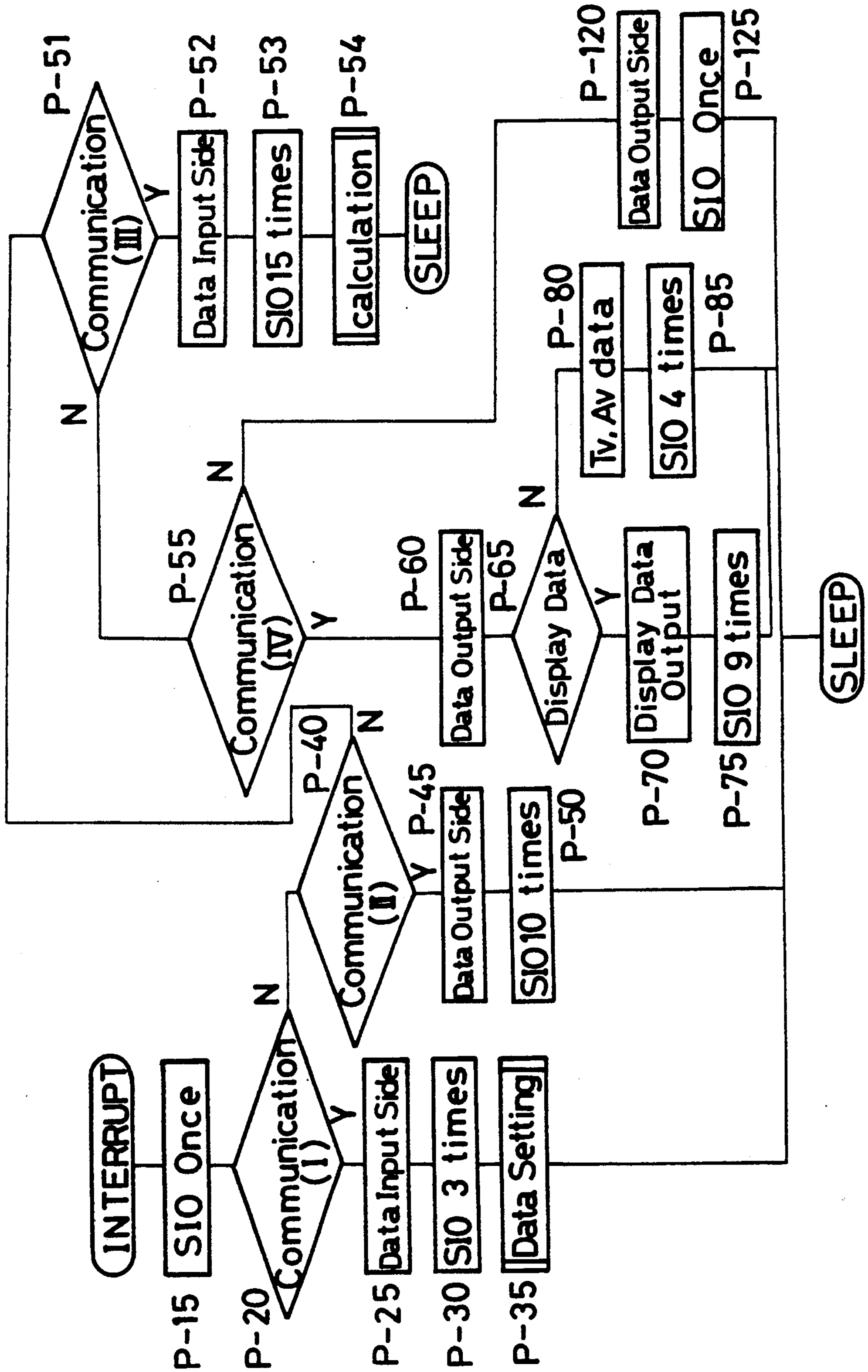
FIG. 82, FIG. 83 and FIGS. 84(*a*) to 84(*c*) are flowcharts showing operation flows of a portrait card.

Next, when a signal changing from "L" to "H" is sent from the camera body to the terminal CSCD of this card, the micro-computer $\mu C_2$ of the portrait card executes a routine of an interrupt as shown in FIG. 83. Here, in synchronism with clock pulses sent from the camera body, serial communication is performed once to input data showing the kind of communication.

The kind is judged (P-20) from the data obtained by this communication, and when the kind is the communication (I), the card is set as the data input side (P-25), and serial communication is performed three times (P-30) to receive data (refer to Table 6 and Table 20) from the camera body. Based on this data, the micro-computer $\mu C_2$ executes a subroutine of data setting (P-35), and processing sleeps.

Here, prior to description on the above-mentioned subroutine, description is made on what kinds of data are outputted from the card in response to a communication.

In the communication (II), all signals other than the following signals are set to "0".

| | |
|---|---|
| Auxiliary light inhibit (=1) | CS II -1-$b_0$ |
| FL forced ON (=1) | CS II -1-$b_1$ |
| GN restriction release (=1) | CS II -1-$b_3$ |
| Card performs display control | CS II -1-$b_4$ |
| Card function ON/OFF | CS II -1-$b_5$ |
| Blurring warning buzzer EXIST/NO | CS II -1-$b_7$ |
| P shift inhibit (=1) | CS II -2-$b_0$ |
| Forced P mode | CS II -2-$b_1$ |
| Communication (V) NO (=0) | CS II -2-$b_2$ |
| AF one-shot (=1) | CS II -2-$b_6$ |
| Forced AF (=1) | CS II -3-$b_1$ |
| Tv · Av/display data | CS II -3-$b_3$ |
| Communication (IV) EXIST (=1) | CS II -3-$b_4$ |
| Communication (III) EXIST (=1) | CS II -3-$b_5$ |
| Group specifying (=0) | CS II -3-$b_6$ |
| Photometric loop repeat | CS II -3-$b_7$ |
| Blurring warning buzzer control (=1) | CS II -4-$b_0$ |

Signals marked with ✧ on the table are set to "1" or "0" in response to the respective cases, and the control thereof in put in the ON state at "1", and put in the OFF state at "0". The determined signals are set to "0" or "1" in a fixed manner. In the communication (II), in addition to the above signals, CS II-9-$b_1$=1 is set to specify group 1 of the communication (III) in group communication. Since the communication (IV) is of two data of display and control data, CS II-10-$b_1$, $b_2$=1, 1 is set. The others are set to "0". In addition, any data can be entered in blank spaces on the above-mentioned table. In the communication (VI), a signal of sleep-good is sent. This is because write control to the $E^2PROM$ does not exist.

In flowchart shown in FIG. 83, when the communication (I) is performed, the micro-computer $\mu C_2$ of the portrait card proceeds to a subroutine of data setting, as similar to the case of other cards.

Figure 84B:
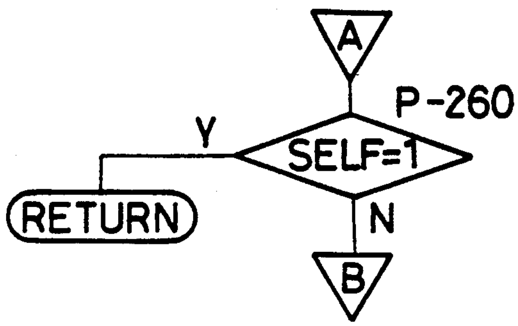
Figure 85:
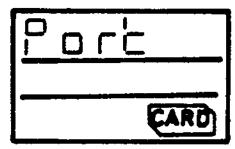
FIG. 85 is a view showing an example of display, FIGS. 86(*a*) and 86(*b*) are flowcharts showing a routine of calculation.
Figure 84C:
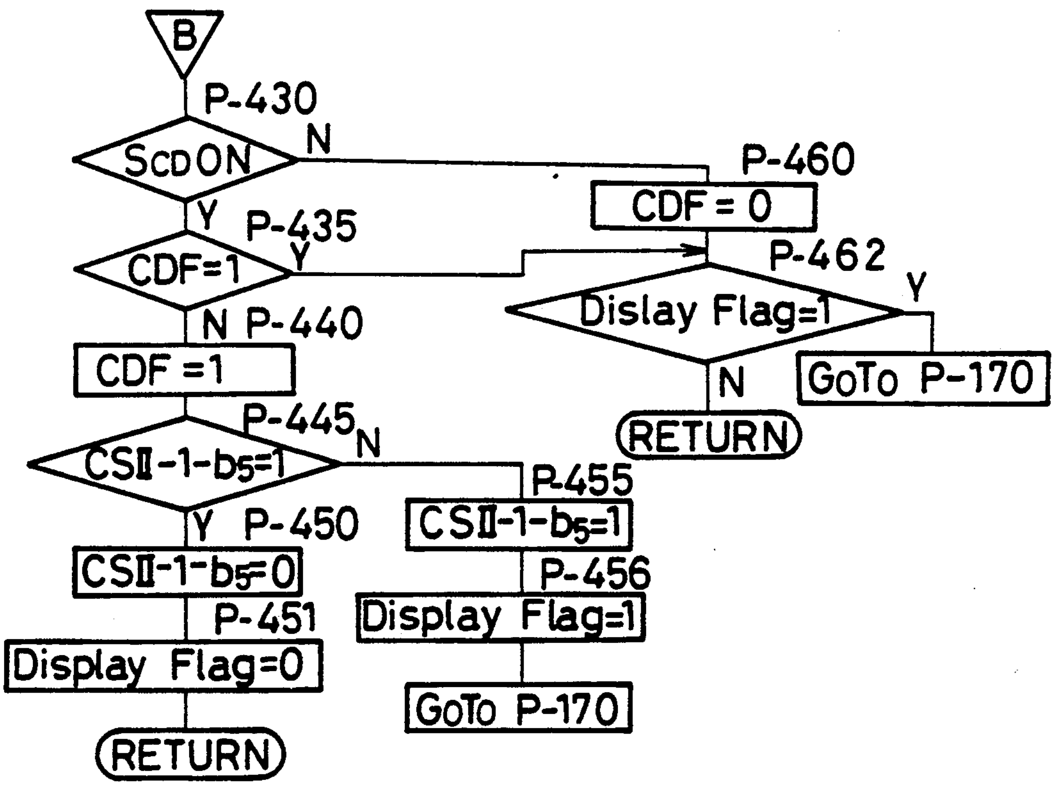

Next, a subroutine of data setting is shown in FIG. 84(*a*) to be explained. First, in step P-146 display control data (CS II-1-$b_4$) is initialized to "0", and processing proceeds to step P-160. In this step P-160, judgment is made on whether or not a signal DISREQ (request of card name display) obtained by the communication (I) is "1", and where the signal is "1", display control data is set to "1" (P-170), card display function (CS II-1-$b_5$) ON/OFF to ON (1) (P-175). Subsequently, it is judged whether or not the flag S1F has been set (P-200), and where the flag has not been set, assuming that processing passes through this flow for the first time, the flag S1F is set (P-205), and the timer is reset and started (P-210), and processing proceeds to step P-215. When the flag S1F has been set, processing proceeds directly to step P-215. In step P-215, it is judged whether or not 10 seconds has elapsed from the start of the above-mentioned timer, and where 10 seconds has not elapsed, the photometric loop repeat signal (CS II-3-$b_7$) is set to "1" (P-220), and data performing the card name display and the card mark display is set (P-222), and processing returns, FIG. 85 shows this display. On the other hand, where 10 seconds has elapsed, the photometric loop signal is set to "0", and the flag S1F is reset (P-270), and display control data is set to "0" (P-227), and processing returns.

If DISREQ=0 in the above-mentioned step P-160, processing proceeds to step P-162, and judgment is made on whether or not $IP_5$ is "L" (that is, any of the switches $S_{EM}$,$S_{FUN}$, $S_{CD}$, $S_{CDS}$ and $S_1$ is in the ON state), and when $IP_5$ is "L", the display flag showing control performing card name display is reset (P-163) and processing proceeds to step P-165, and when $IP_5$ is not "L", processing proceeds to P-165 without performing anything. After resetting the flag S1F in this step P-165, processing proceeds to step P-260 in FIG. 84(*b*), and judgment is made on whether or not the signal SELF obtained by the communication (II) is "1".

Here, when the signal is "1", processing returns to inhibit control by operation of the switches of the camera (relating to the card). When the signal SELF is not "1", processing proceeds to step P-430 in FIG. 84(*c*), and it is judged whether or not the card switch $S_{CD}$ has been turned to ON, and when the card switch $S_{CD}$ is in the OFF state, the flag CDF is reset in step P-460, and it is judged whether or not the display flag has been set (P-462), and when it has not been set, processing returns. When it has been set, processing proceeds to step P-170, and performs control of display of the card name. In the above-mentioned step P-430, as shown in FIG. 85, when the card switch $S_{CD}$ is in the ON state, judgment is made on whether or not the flag CDF showing that processing has passed herethrough has been set (P-435), and when it has been set, assuming that the switch is kept operated, processing proceeds to step P-462. When the flag CDF has not been set, this flag is set (P-440), and in the following step P-445, judgment is made on whether or not the card function is in the ON state based on data CD II-1-$b_5$ at present, and where it is in the ON state (CS II-1-$b_5=1$), it is set to OFF (data of CS II-1-$b_4$) (P-450), and the display flag is reset (P-451), and the processing returns. Conversely where the function is in the OFF state, it is turned to ON (data of CD II-1-$b_4$) in step P-455, and the display flag is set in step P-456, and processing proceeds to step P-170, performing control of display of the card name.

Reverting to FIG. 83, when the communication is not (I), it is judged in step P-40 whether or not the communication is (II), and when the communication is (II), serial communication is performed ten times (P-50) with the card set as the output side (P-45) to output the above-mentioned set data to the camera, and processing sleeps.

When the communication is not (II), it is judged in step P-51 whether or nor the communication is (III), and when the communication is (III), the card is set as the input side (P-52), and serial communication is performed fifteen times (P-53) to input the data of the camera. In the following step P-54, data for controlling the camera is calculated (including exposure calculation), and processing sleeps. This calculation is described later.

When the communication is not (III), it is judged in step P-55 whether or not the communication is (IV), and when the communication is (IV), the card is set as the output side (P-60), and it is judged in step P-65 whether or not data is of display control, and when the data is of display control, display data is outputted (P-70), address is set, and serial communication is performed nine times (P-75), and processing sleeps. When the result is not display control (Tv, Av data), Tv, Av data is addressed (P-80), and serial communication is performed four times (P-85), and processing sleeps.

When the communication is not (IV), assuming that it is the communication (VI), first, the card is set as the output side (P-120), and serial communication is performed once in response to clock pulses from the camera body (P-125), and processing sleeps.

Figure 86:
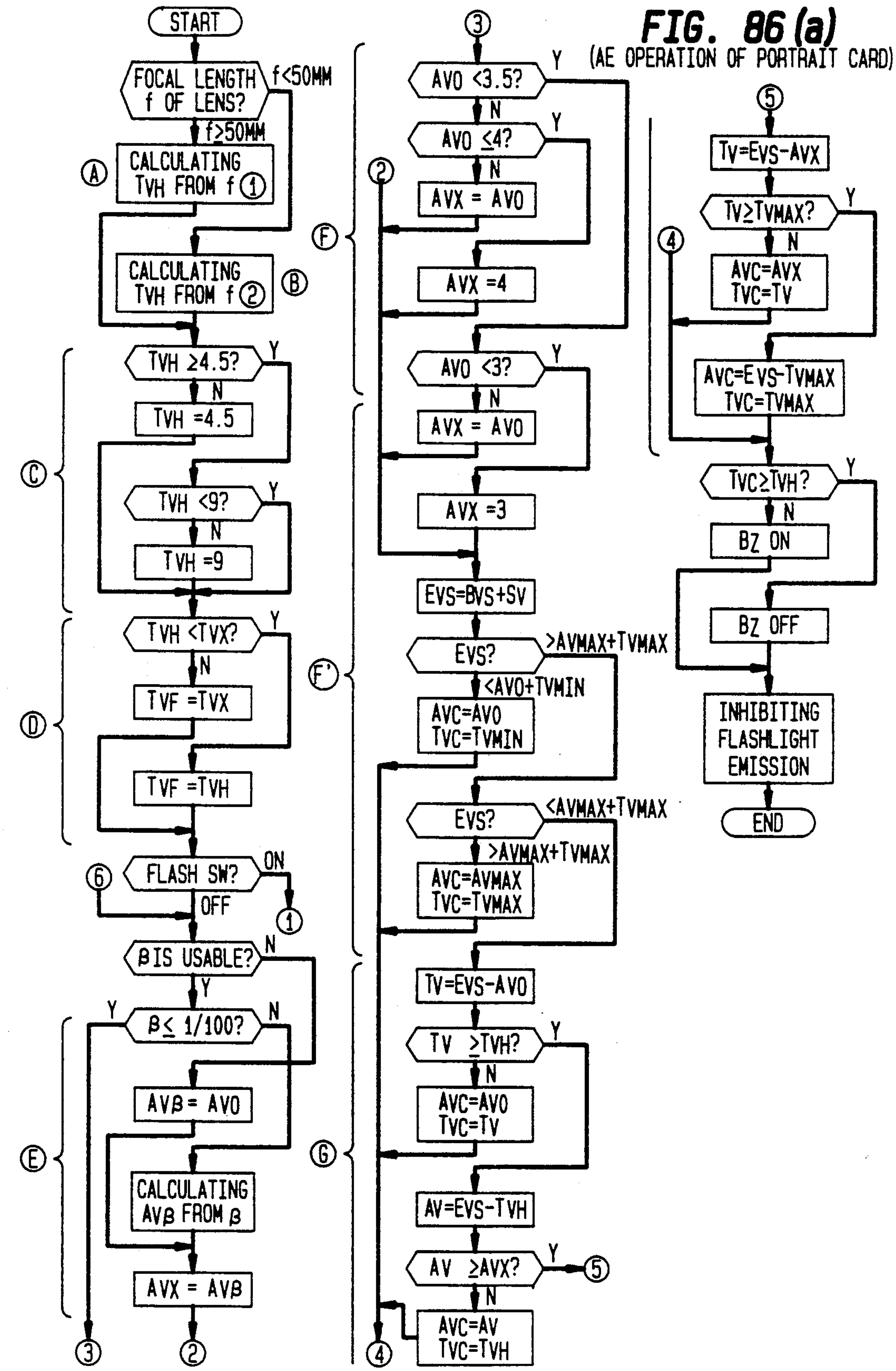
Figure 86B:
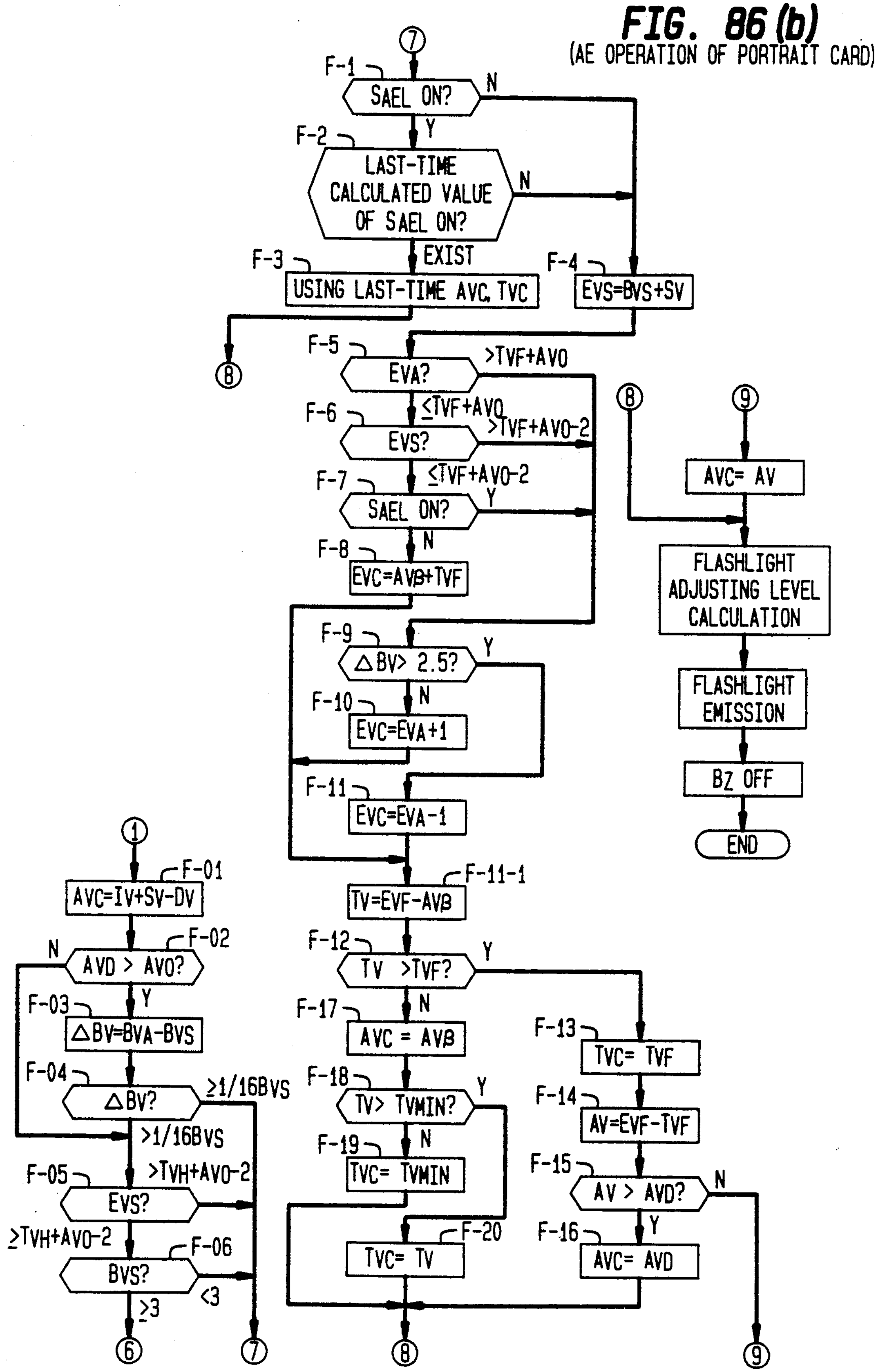

Next, description is made on the above-mentioned calculation control in step P-54 in FIG. 83 in reference to FIGS. 86(*a*) and 86(*b*).

In step Ⓐ, the standard value $T_{vH}$ of shutter speed is calculated to sound the blurring warning buzzer.

With lens having a longer focal length it is easier to cause a blurring, and therefore where the focal length is made longer, $T_{vH}$ is made faster.

$$T_{vH}=1.25\times(zFz-56/16+5.875$$

$$zFz=16\times\log_2(f/50)+56$$

(f: focal length of a lens in mm)

In step Ⓡ, as similar to the case of Ⓐ, $T_{vH}$ is evaluated. When $f<50$ mm, $T_{vH}$ is calculated. This is because a warning is given where Tv becomes extremely slow even in the case of a wide-angle lens.

$$T_{vH}=1.25\times(zFz-56)/16+5.875$$

$$zFz=16\times\log_2(f/50)+56$$

(f: focal length of a lens in mm)

In step Ⓒ, $T_{vH}$ is determined by the focal length; $T_{vH}$ is fast at long and slow at short.

In step Ⓓ, the shutter speed $T_{vF}$ at the bending point of the line diagram at flashlight emitting.

When $T_{vH}\leqq Tvx$, the shutter speed $T_{vF}$ at flashlight emitting is set to the lowest shutter speed $T_{vH}$ at which a blurring is not caused. Thereby, exposure by natural light is performed and the background is exposed beautifully at photographing.

When $T_{vH}>Tvx$, $T_{vF}$ is set to the synchronizing highest shutter speed Tvx.

Figure 89:
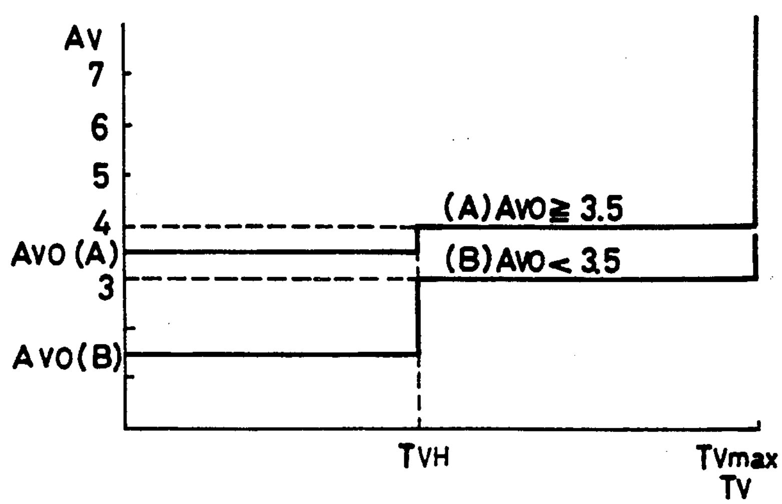

In step Ⓔ, when the flash switch is in the OFF state, considering the depth in response to the image magnification $\beta$, the diaphragm aperture value $Av\beta$ is determined based on $\beta$.

$$Avx=Av\beta=Avo,$$

if the calculated $\beta$ is not reliable: AEFLAG $b_1=0$. $Av\beta$ is determined with the table shown in FIG. 87, if $\beta$ is reliable: AEFLAG $b_1=1$ and $\beta>1/100$. $Av\beta$ is determined in step Ⓕ as shown in FIG. 89, if $\beta$ is reliable: AEFLAG $b_1=1$ and $\beta\leqq 1/100$.

Figure 87:
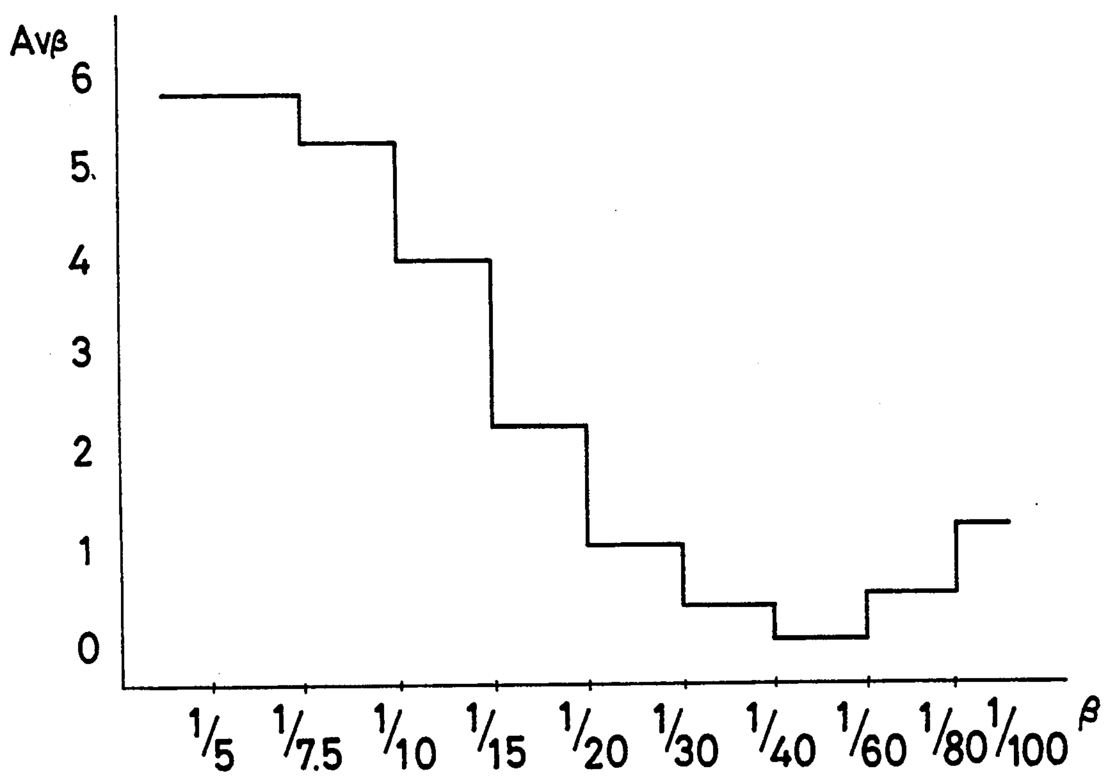
FIG. 87, FIG. 88 and FIG. 89 are explanatory views thereof.

In FIG. 87, it is convenient to set each value of $\beta$ as an address in the memory and to set each value of $Av\beta$ as a data for each address. In FIG. 89 for step Ⓕ, there is a reason for determining $Av\beta$ without depending $\beta$. It is because that it is difficult to be distinguished the main subject from the background irrespective of the aperture value.

In step Ⓕ, setting is made as follows;

$$Avo<3\rightarrow Avx=3$$

$$3\leqq Avo<3.5\rightarrow Avx=Avo$$

$$3.5\leqq Avo\leqq 4\rightarrow Avx=4$$

$$Avo>4\rightarrow Avx=Avo$$

and in the case of a lens having a small open F value, the line of diaphragm apertures is set on a little smaller side and the depth is made a little deeper, and thereby the background is made a little focus-shifting state.

Further, in step Ⓕ, the diaphragm aperture value Evs is evaluated from Bvs+Sv and this value Evs is compared with control light values. When the diaphragm aperture value Evs exceeds the maximum control valve (Avmax and Tvmax), Evs is set to the maximum control value, and when Evs is less than the minimum control value (Avmin+Tvmin), Evs is set to the minimum control values.

In step Ⓖ, the shutter speed Tv at the open F value Avo is evaluated, and when the shutter speed Tv is less than $T_{vH}$, the control shutter speed Tvc is set to Tv and the control diaphragm aperture value Avc is set to Avo, making the shutter speed as fast as possible, and processing proceeds to judgment of blurring. When the calculated shutter speed Tv is not less than $T_{vH}$, Av is calculated from Evs-$T_{vH}$, and when Av<Avx holds, the control diaphragm aperture value Avc is set to Av and the control shutter speed Tvc is set to $T_{vH}$, bringing the control diaphragm aperture value near to the value Avx.

When Av≧Avx, Tv is calculated from Evs-Avx, and when Tv<Tvmax, the control diaphragm aperture value Avc is set to Avx and the control shutter speed Tvc is set to Tv. Conversely, if Tv≧Tvmax, the control shutter speed Tvc is set to Tvmax and the control diaphragm aperture value Avc is re-evaluated from Evs-Tvmax. Thereafter, processing proceeds to judgment of blurring respectively. When a blurring occurs, to give a blurring warning, a signal (S II-1-$b_7$) of the communication (II) is set to 1, and when a blurring does not occur, this signal (S II-1-$b_7$) is set to 0.

Then, a bit $b_0$ of a signal CTRLB of the communication (IV) is set to 0, and flashlight emission is inhibited.

Figure 88:
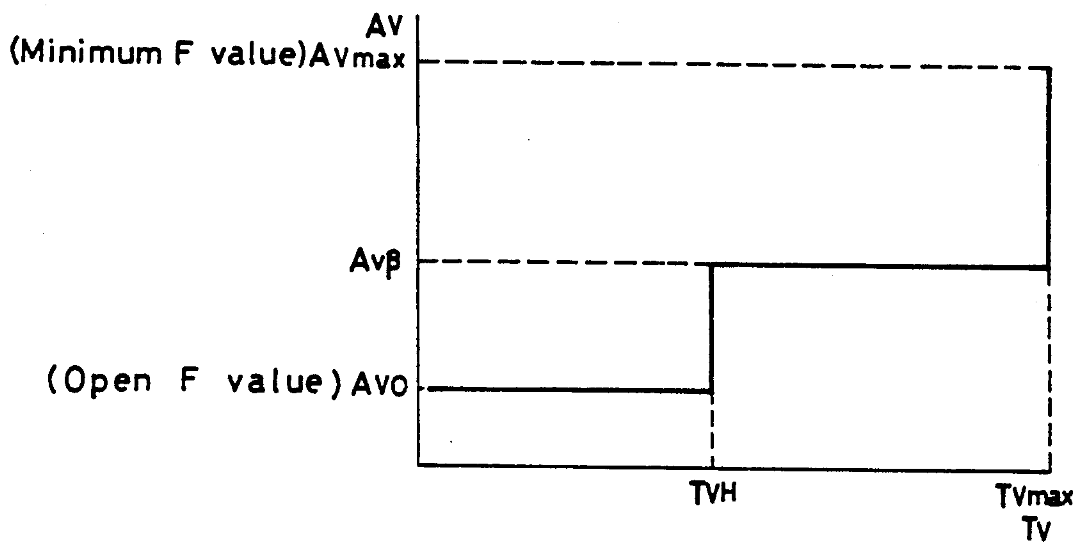

FIG. 88 is a program line diagram relating to Av, Tv thus determined.

In step F-01, when the switch $S_{AEL}$ is operated, the diaphragm aperture value $A_{VD}$ at that is calculated by $$A_{VD}=Iv+Sv-Dv$$

Iv: quantity of light emission (guide number)
Sv: film speed
Dv: apex value replacing the distance from a subject Next, description is made on routine Ⓔ.

| | |
|---|---|
| F-02 — | It is judged whether or not $A_{VD}$ is not less than Avo (open F-value Avo) ($A_{VD}\geqq$Avo). |
| F-03 — | When it is not less than Avo a luminance difference ΔBv from the background is evaluated from $B_{VA}$ (luminance of $Bv_4$)-Bvs (luminance of main subject). |
| F-04 — | It is judged whether or not ΔBv≦1/16 Bvs. As the subject becomes brighter, the level of the judgment thereof is made higher, and thereby the light straying from the background to the subject is added. If ΔBv≦1/16 Bvs, processing proceeds to flash control routine ⑦. |
| F-05 — | If $A_{VD}$<Avo (when $A_{VD}$ is less than the open F value) in step F-02, and if ΔBv<1/16 Bvs in step F-04, processing proceeds to this step. Hereinafter, judgment is made on whether or not the exposure value Evs of main subject is less than the low luminance judging level ($T_{VH}$+Avo−2), and when it is less than this level, flash control routine ⑦is performed. When the exposure value is shifted to the under side by more than 2 steps from the blurring limit shutter speed, assuming that blurring is not permissable, photographing operation using a flashlight is performed. |
| F-06 — | If Evs≦ $T_{VH}$+Avo−2, judgment is made on the level of the main subject luminance, and if Bvs<3, assuming that contrast of, for example, a face of a subject itself is likely to become low, exposure by a flashlight as shown in the routine ⑦is performed. While, if Bvs≦3, exposure ⑥ by natural light is performed. |

Next, description is made on flash control. When the switch $S_{AEL}$ is in the ON state (CS I-1-$b_7$=1), judgment is made on whether or not calculation of the switch $S_{AEL}$ ON has been performed the last time, and when calculation of the switch $S_{AEL}$ has been performed the last time, processing proceeds to flashlight adjustment calculation using the control diaphragm aperture value Avc and control shutter speed Tvc (F-1 to F-3). Where the switch $S_{AEL}$ is not in the ON state, or where the calculation of the switch $S_{AEL}$ ON has not been performed the last time, the exposure value $E_{VA}$ is calculated from the background luminance $B_{VA}$ and the film speed Sv (F-4).

When this exposure value $E_{VA}$ is not more than the later shutter speed $T_{VF}$ between the synchronizing speed Tvx and the blurring speed $T_{VH}$+the open F value Avo, and the main subject exposure value Evs is not more than the above-mentioned shutter speed and $T_{VF}$+the open F value-2.0, both the background and the main subject are assumed to be dark. Then, judgment is made on whether or not the switch $S_{AEL}$ has been turned to ON (F-7), and when it has not been turned to ON, the control exposure value Evc is calculated from the control diaphragm aperture value Avβ and the shutter speed $T_{VF}$ (F-8), and thereafter processing proceeds to step F-11-1.

When the exposure value $E_{VA}$ of the background satisfies $E_{VA}>T_{VF}$+Avo, or the main subject exposure value Evs satisfies Evs>$T_{VF}$+Avo-2, or the switch $S_{AEL}$ is in the ON state, it is judged in step F-9 whether or not ΔBv ($B_{VA}$-Bvs) is not less than 2.5, and when it is not less than 2.5, assuming the against-the-light state, the exposure control value Evc is set to $E_{VA}$-1 in step F-11, and the background is over-exposured to look like a counterlight condition, and the main subject is exposed properly by a flashlight. When it is less than 2.5, assuming that the camera is not in the against-the-light state, the background is under-exposed by one step, and thereby the background and the main subject are intended to be exposed properly by natural light and the background light. In step F-12, judgment is made on whether or not the shutter speed Tv is not less than the speed $T_{VF}$ (the smaller between $T_{VH}$ and Tvx), and when it is not less than the speed $T_{VF}$, the control shutter speed Tvc is set to the speed $T_{VF}$, and the diaphragm aperture value Av is evaluated from Evc-$T_{VF}$, and it is judged whether or not this diaphragm aperture value Av is not less than $A_{VD}$, and when it is not less than $A_{VD}$, the control diaphragm aperture value Avc is set to $A_{VD}$, and this prevents the main subject from being under-exposed.

If Av<$A_{VD}$, the control diaphragm aperture value Avc is set to Av. Then, the flashlight adjusting level is calculated in the respective cases. If Tv<$T_{VF}$ in step F-12, the control diaphragm aperture value Avc is set to the value Avβ calculated from the image magnification β, and judgment is made on whether or not Tv is not less than the minimum shutter speed Tvmin, and when it is not less than Tvmin, the control shutter speed Tvc is set to Tv, and when it is less than Tvmin, the control shutter speed Tvc is set to Tvmin, and processing proceeds to calculation of the flashlight adjusting level, respectively.

(10) Defocusing card

Next, description is made operation of the defocusing card.

The defocusing card is a card for obtaining a soft-focusing effect or a zooming effect by means of driving a focusing lens during exposure time.

Figure 90:
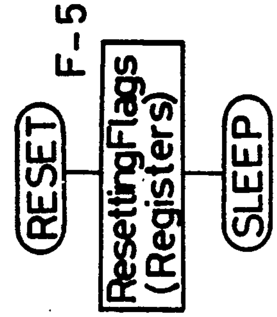

The micro-computer $\mu C_2$ of the defocusing card executes a routine for resetting as shown in FIG. 90 when this card is attached to the camera body, resets all of the flags and the registers (RAM) (F-5), and sleeps.

Figure 91:
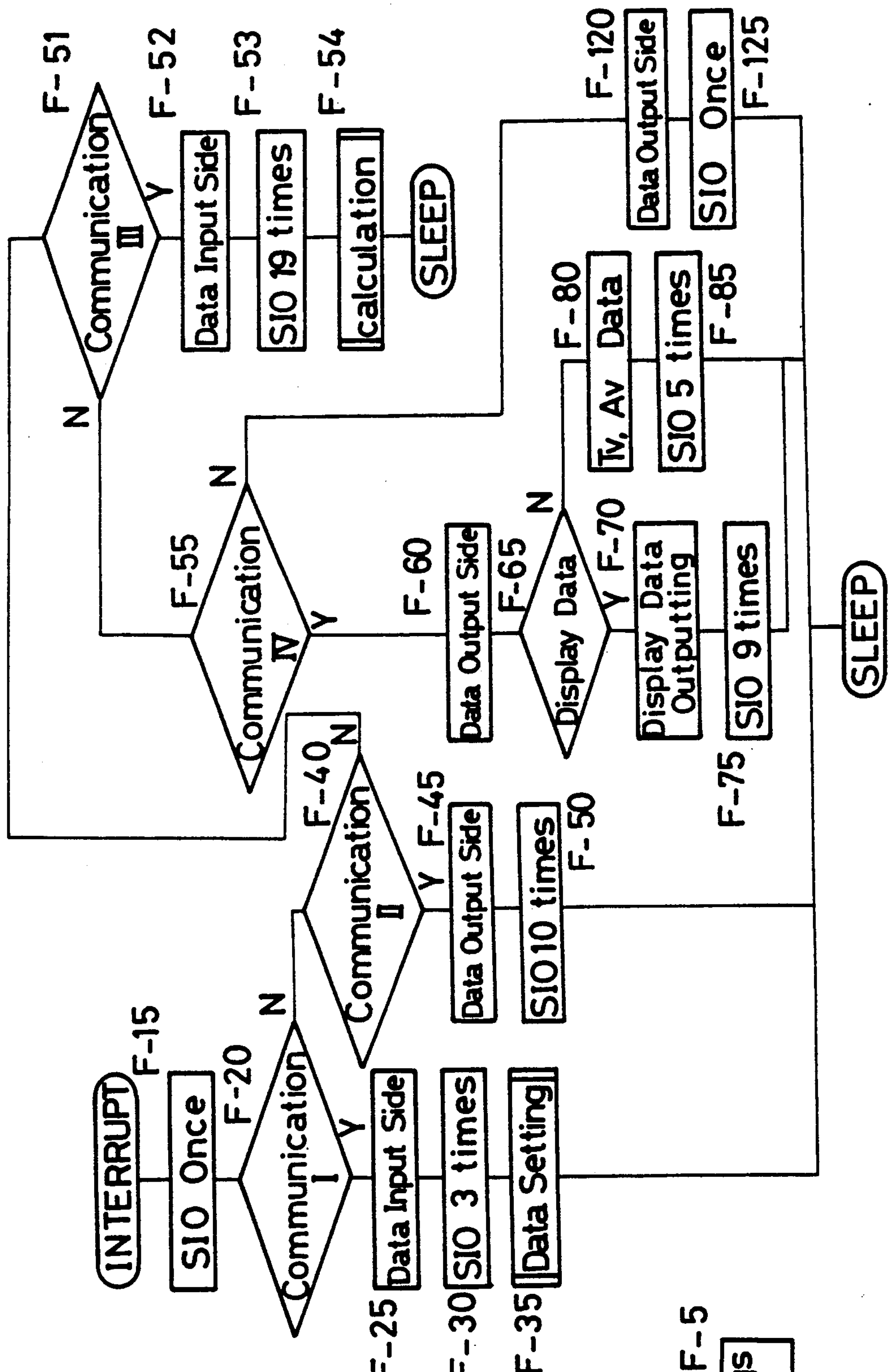
FIG. 90, FIG. 91, FIGS. 92(*a*) to 92(*c*) are flowcharts showing operation flows of a defocusing card.

Next, when a signal changing from "L" to "H" is sent from the camera body to the terminal CSCD of this card, the micro-computer $\mu C_2$ of the defocusing card executes an interrupt as shown in FIG. 91. Here, in synchronism with clock pulses sent from the camera body, serial communication is performed once (F-15) to input data showing the kind of communication.

The kind is judged (F-20) from the data obtained by this communication, and when the kind is the communication (I), the card is set as the data input side (F-25), and serial communication is performed three times (F-30) to receive data (refer to Table 6 and Table 21) from the camera body. Based on this data, the micro-computer $\mu C_2$ executes a subroutine of data setting (F-35), and processing sleeps.

Here, prior to description on the above-mentioned subroutine, description is made on what types of data are outputted from the card in response to a communication.

In the communication (II), all signals other than the following signals are set to "0".

| | |
|---|---|
| FL forced OFF | CS II -2-$b_2$ |
| Card performs display control | CS II -1-$b_4$ |
| Card function ON/OFF | CS II -1-$b_5$ |
| Blurring warning buzzer NO (=0) | CS II -1-$b_7$ |
| P shift inhibit (=1) | CS II -2-$b_0$ |
| Forced P mode (=1) | CS II -2-$b_1$ |
| Communication (V) NO (=0) | CS II -2-$b_2$ |
| Release inhibit | CS II -2-$b_3$ |
| AF one-shot (=1) | CS II -2-$b_6$ |
| Forced AF (=1) | CS II -3-$b_1$ |
| Tv, Av/display data (=0) | CS II -3-$b_3$ |
| Communication (IV) EXIST (=1) | CS II -3-$b_4$ |
| Communication (III) EXIST (=1) | CS II -3-$b_5$ |
| Group specifying (=0) | CS II -3-$b_6$ |
| Photometric loop repeat | CS II -3-$b_7$ |
| Blurring warning buzzer control (=1) | CS II -4-$b_0$ |
| Defocusing (=1) | CS II -4-$b_3$ |
| 10 msec extension (=1) | CS II -4-$b_4$ |

The signal of 10 msec extension is sent for the reason why calculation after the third communication (III) takes a long time.

Signals marked with ※ on the table are set to "1" or "0" in response to the respective cases, and the control thereof is put in the ON state at "1", and put in the OFF state at "0". The determined signals are set to "0" or "1" in a fixed manner. In the communication (II), in addition to the above signals, CS II-9-$b_o$, $b_1$, $b_2$, $b_3$=1, 0, 1 is set to specify groups $G_1$, $G_2$, $G_3$ of the communication (III) in group communication is the communication (IV). Since the communication (IV) is of three data of display control data and lens driving data, CS II-10-$b_1$, $b_2$, $b_3$=1, 1, 1 is set. The others are set to "0".

In addition, any data can be entered in blank spaces on the above-mentioned table.

In the communication (VI), a signal of sleep-good is sent. This is because write control to the $E^2$PROM does not exist.

Figure 92:
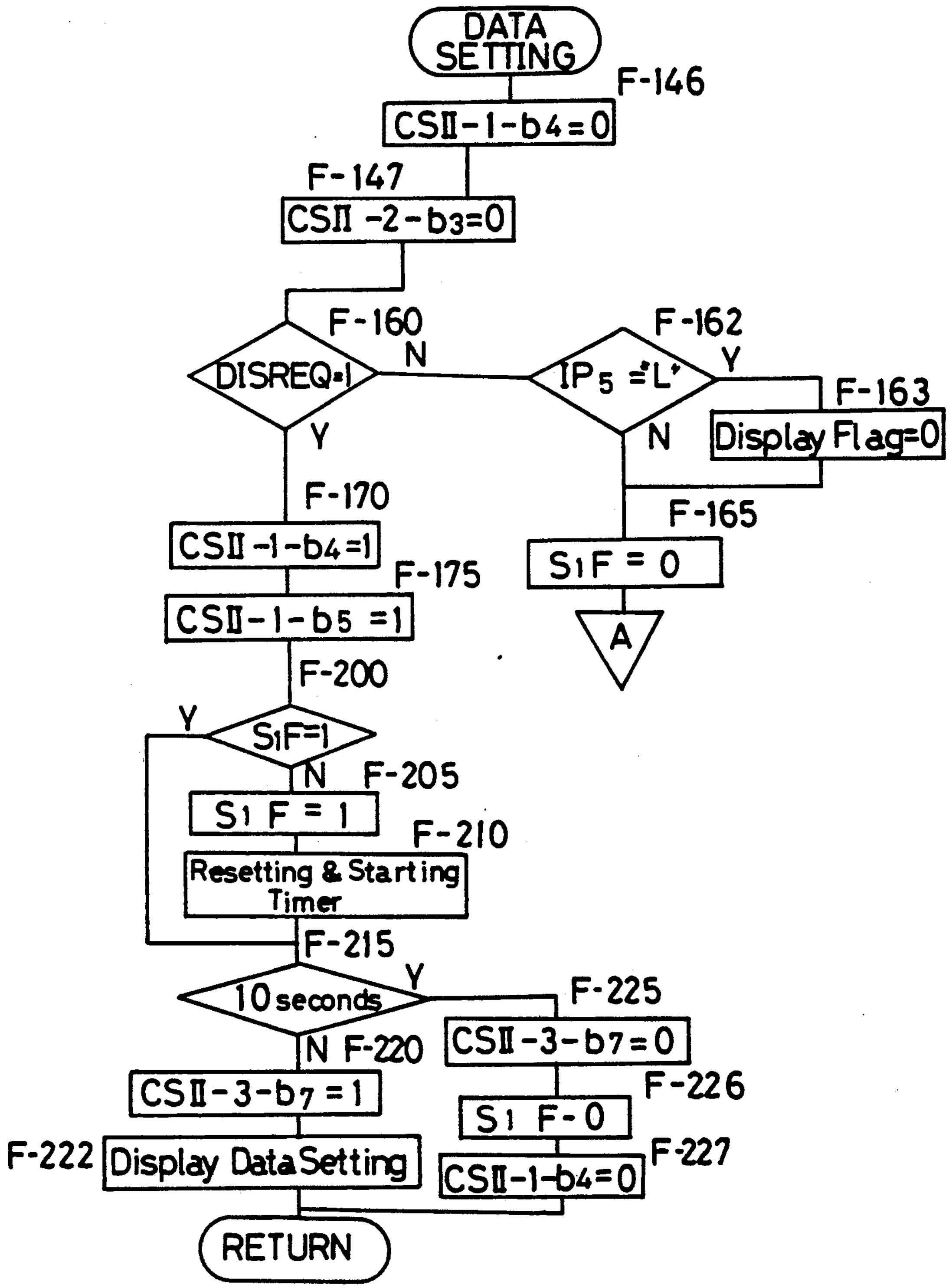
Figure 92:
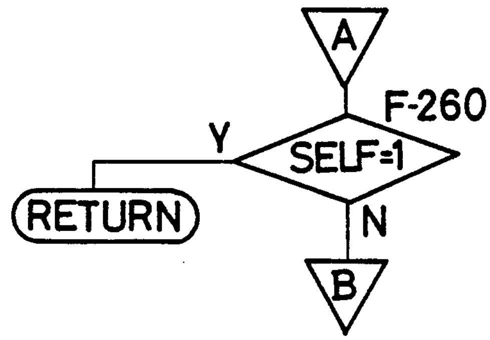
Figure 92:
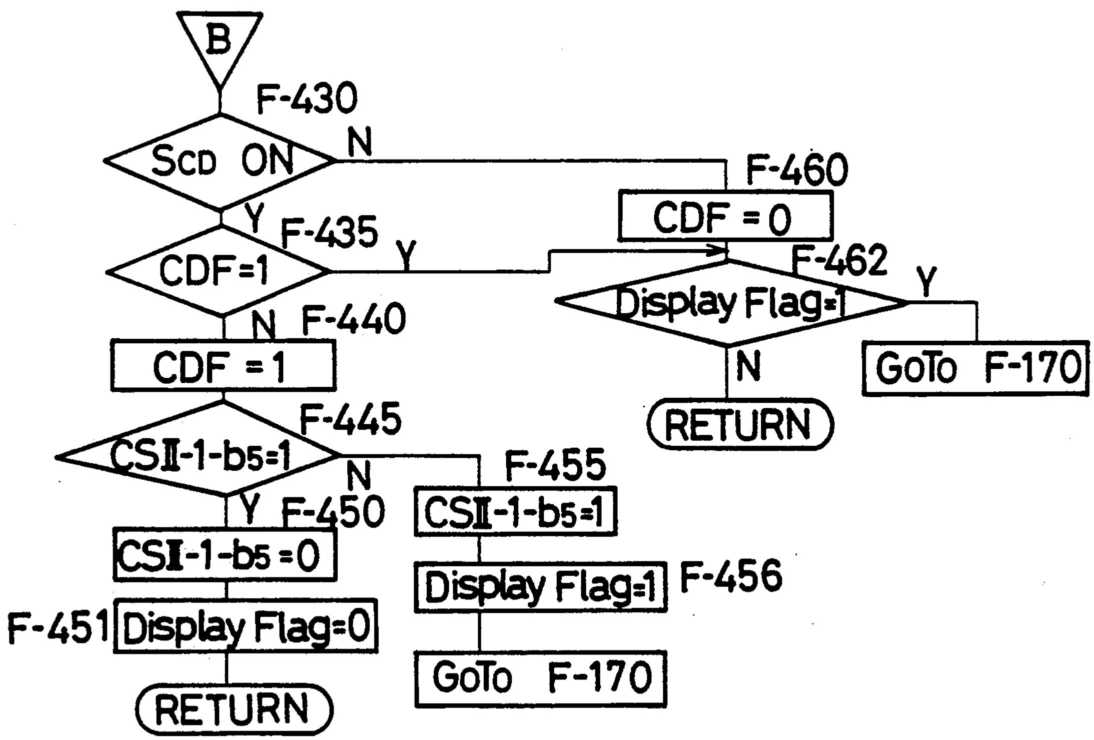
Figure 97:
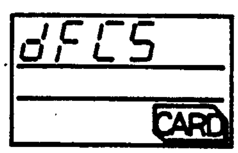
FIG. 97 is a view showing an example of display.

Next, a subroutine of data setting is shown in FIG. 92(*a*) to be explained. First, in steps F-146 and F-147, display control data (CS II-2-$b_3$) is initialized to "0", release inhibit (CDS II-2-$b_3$) to "0", and in step F-160, judgment is made on whether or not a signal DISREQ (request of card name display) obtained by the communication (I) is "1", and where the signal is "1", display control data is set to "1" (F-170), and card display function ON/OFF (CS II-1-$b_5$) is set to ON (1) (F-175). Subsequently, it is judged in step (F-200) whether or not the flag S1F has been set, and where the flag has not been set, assuming that processing passes through this flow for the first time, the flag S1F is set (F-205), and the timer is rest and started (F-210), and processing proceeds to step F-215. When the flag S1F has been set, processing proceeds directly to step F-215. In step F-215, whether or not 10 seconds has elapsed from the start of the above-mentioned timer is judged, and where 10 seconds has not elapsed, the photometric loop repeat signal (CS II-3-$b_7$) is set to "1" (F-220), and data performing only the card name display and the card mark display is set (F-222), and processing returns. FIG. 97 shows this display. On the other hand, where 10 seconds has elapsed, the photometric loop repeat signal is set to "0" and the flag S1F is reset (F-226), and display control data is set to "0" (F-227), and processing returns.

If DISREQ=0 in the above-mentioned step F-160, processing proceeds to step F-162, and judgment is made on whether or not $IP_5$ is "L" (that is, any of the switches $S_{EM}$, $S_{FUN}$, $S_{CD}$, $S_{CDS}$, and $S_1$ is in the ON state), and when $IP_5$ is "L", the display flag showing control performing card name display is reset (F-163), and when $IP_5$ is not "L", processing proceeds to F-165 respectively without performing anything. After resetting the flag S1F in this step F-165, processing proceeds to step F-260 in FIG. 92(*b*). Here, it is judged whether or not the signal SELF obtained by the communication (II) is "1". Here, when the signal is "1", processing returns to inhibit control by operation of the switches of the camera (relating to the card), and thereafter processing returns. When the signal SELF is not "1", processing proceeds to step F-430 in FIG. 92(*c*), and whether or not the card switch $S_{CD}$ has been turned to ON is judged, and when the card switch $S_{CD}$ is in the OFF state, in step F-460, the flag CDF is reset, and it is judged in step F-462 whether or not the display flag has been set, and when it has not been set, processing returns. When it has been set, processing proceeds to step F-170, and performs control of display of the card name. In the above-mentioned step F-430, when the card switch $S_{CD}$ is in the ON state, judgment is made on whether or not the flag CDF showing that processing has passed herethrough has been set (F-435), and when it has been set, assuming that the switch is kept operated, processing proceeds to step F-462. When the flag CDF has not been set, this flag is set (F-440), and in the following step F-445, judgment is made on whether or not the card function is in the ON state based on data CS II-1-$b_5$ at present, and where it is in the ON state (CS II-1-$b_5$=1), it is set to OFF (data of the communication II) (F-450), and the display flag is reset (F-451) and processing returns. Conversely, where the function is in the OFF state (CS II-b-$b_5$=0), it is turned to ON (data of the communication II) in step F-455, and the display flag is set in step F-450, and processing proceeds to step F-170, performing control of display of the card name as shown in FIG. 97.

Reverting to FIG. 91, when the communication is not (I), it is judged in step F-40 whether or not the communication is (II), and when the communication is (II), serial communication is performed ten times (F-50) with the card set as the output side (F-45) to output the above-mentioned set data to the camera body, and processing sleeps.

When the communication is not (II), it is judged in step F-51 whether or not the communication is (III), and when the communication is (III), the card is set as the input side (F-52), and serial communication is performed nineteen times (F-53) to input the data of the camera. In the following step F-54, data for controlling the camera is calculated (including exposure calculation), and processing sleeps.

When the communication is not (II), it is judged in step F-55 whether or not the communication is (IV), and when the communication is (IV), the card is set as the output side (F-60), and it is judged in step F-65 whether or not data is of display control, and when the data is of display control assuming that display data is outputted (F-70), address is set, and serial communication is performed nine times (F-75), and processing sleeps.

When data is not for display control (Tv . Av data), Tv . Av data is addressed (F-80), and serial communication is performed five times (F-85), and processing sleeps.

When the communication is not (IV), assuming that it is the communication (VI), first, the card is set as the data output side (F-120), and serial communication is performed once in response to clock pulses from the camera body (F-125), and processing sleeps.

Figures 93, 93A:
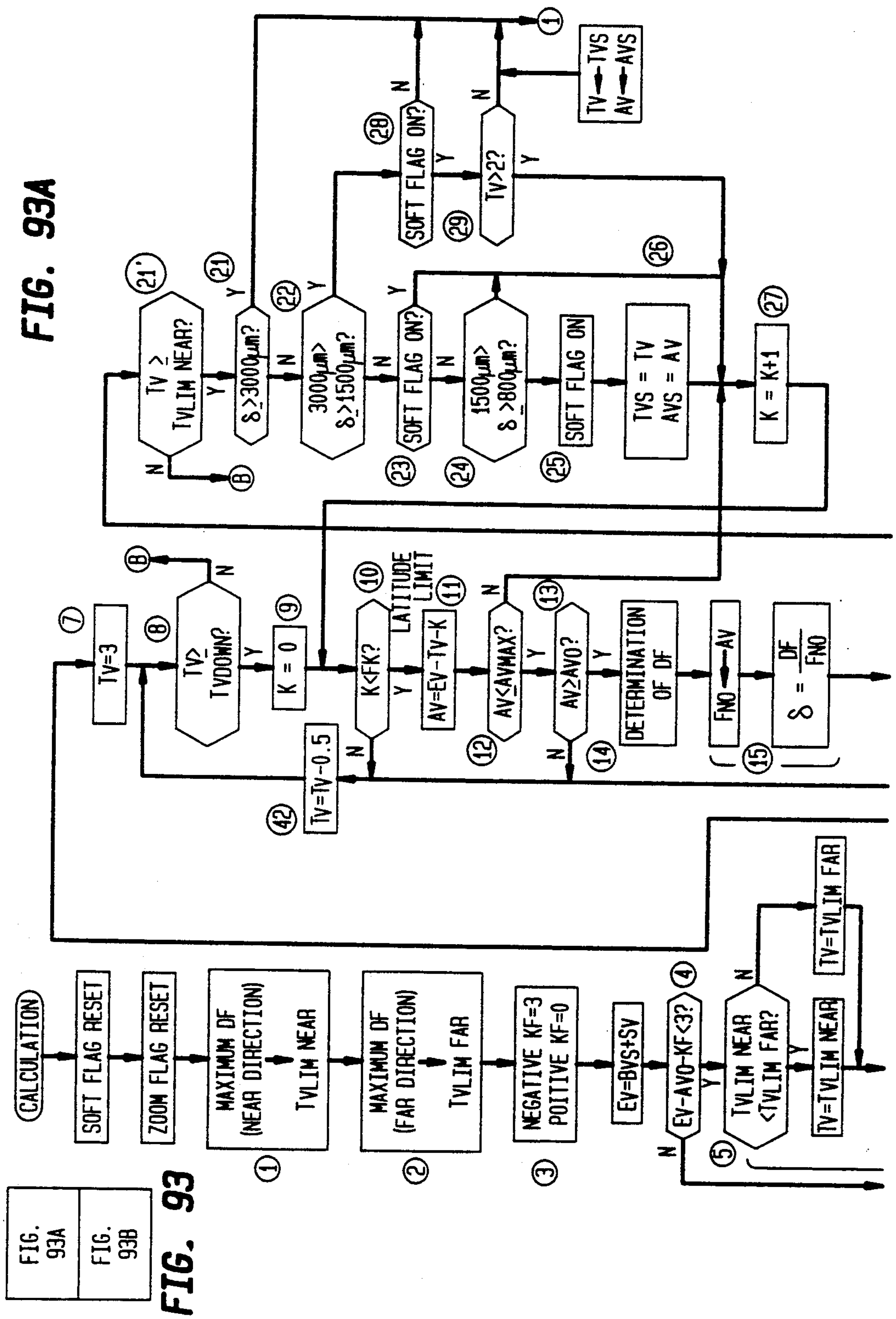
FIG. 93 is a reconstruction key for 93A and 93B.
FIGS. 93A, 93B, and FIG. 94 are flowcharts showing a routine of calculation.
Figure 93B:
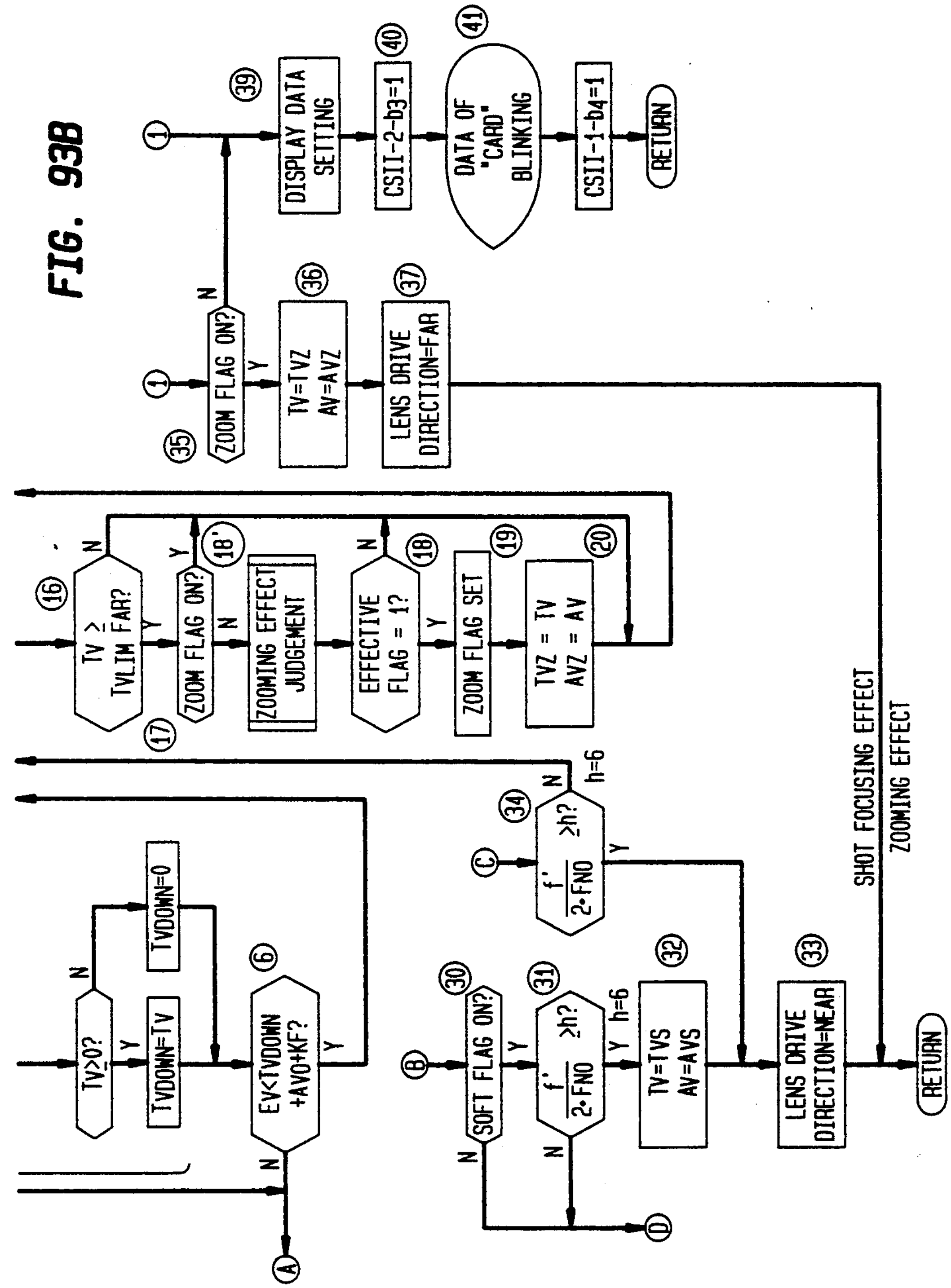
Figure 94:
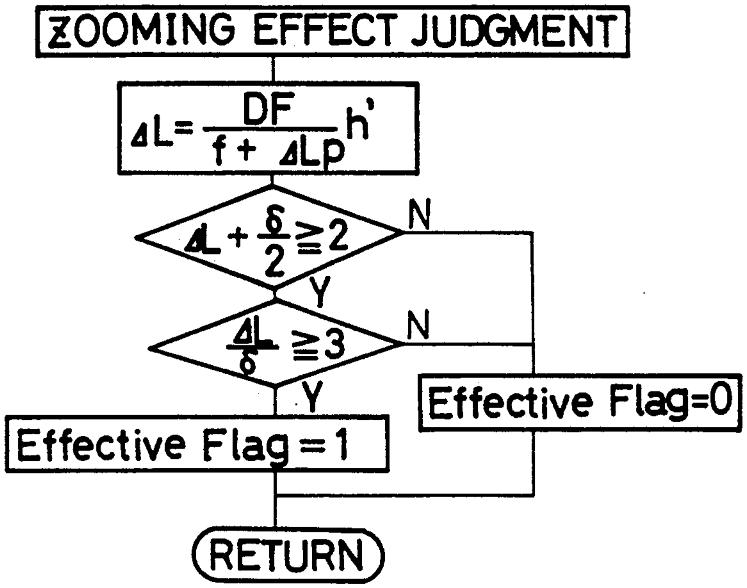

Next, description is made on calculation control in step F-54 in FIG. 91 according to FIG. 93.

First, a soft flag and a zoom flag are reset respectively, and in step (1), $$Lpmin = |Lpmax| - |\Delta Lp|$$

is elevaluated by substracting the absolute value $|\Delta Lp|$ of the quantity of move-out of the lens from the present position against ∞ from the absolute value $|Lpmax|$ of the maximum quantity of move-out of the lens inputted from the camera body.

Figure 95:
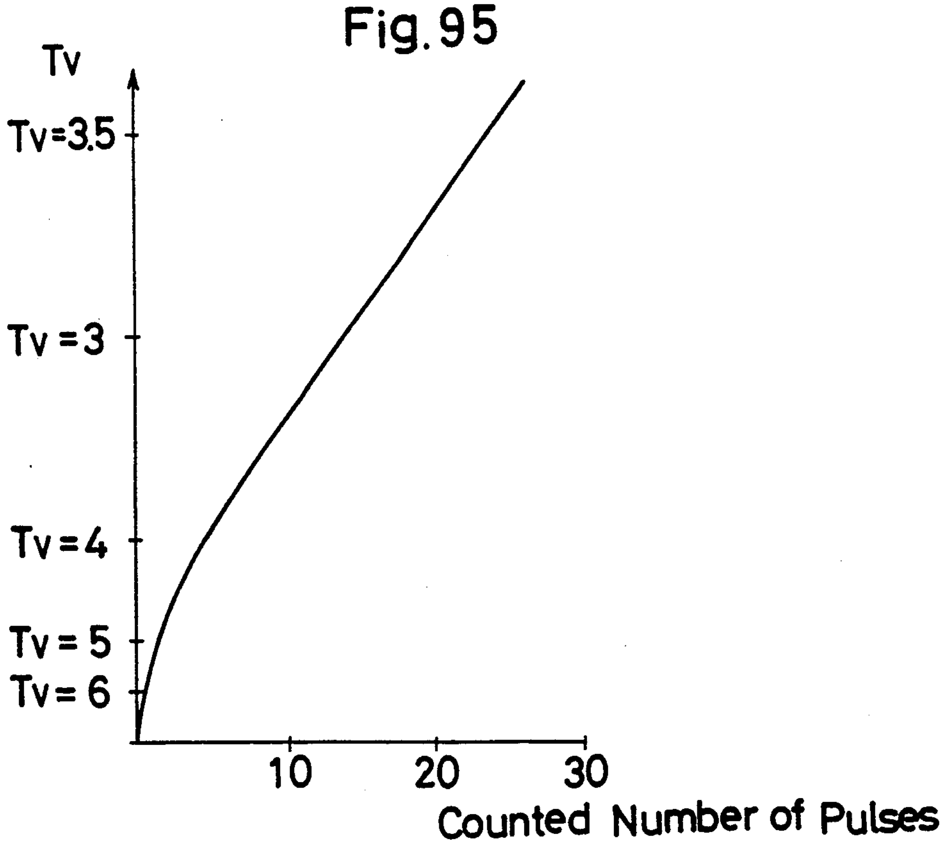
FIG. 95 and FIG. 96 are explanatory views thereof.

Then, the shutter speed corresponding to the time required for moving out by Lpmin (the time of move-out is ¾ of the shutter speed (exposure time), and therefore this shutter speed is determined in view of this) is obtained from FIG. 95 showing the time of lapse and the quantity of rotation of the motor (the number of pulses from the encoder) from a start of motor rotation (in addition, FIG. 95 is a ROM table with the number of rotations taken as address). Then, the obtained value is set as $T_{VLIMN}$.

In step (2), likewise step (1), the time required for moving-in up to ∞ is evaluated from the moving quantity ΔLp from the present lens position to ∞, and this value is set as $T_{VLIMF}$.

In step (3),

Nega—in the case of the negative film, since the latitude is wide, up to 3 Ev-over is allowed, and KF showing this is set to 3.

Posi—in the case of the positive film, since the latitude is narrow, KF is set to 0.

In steps (4) and (39) through (41), the shortest time of the control shutter speed is set to Tv=3 (evaluated from the open F value and the above-mentioned KF), and if Tv>3, no effect is obtained, and therefore processing proceeds to step (A), sets display data, sets release inhibit (=1), prepare display data of only blinking of the card mark, sets display control (=1), and returns.

In step (5), the limit values of Tv are determined. A smaller value out of $T_{VLIMN}$ and $T_{VLIMF}$ is set to Tv, and if Tv≧0, $T_{VDOWN}$=Tv is set, and if Tv<0, Tv=0 is set (SS=1 sec).

In step (6), judgment is made on whether or not $Ev \leqq T_{VDOWN} + Avo + KF$ holds, and where this holds, if the lens is driven, the lens end is blocked (the front end on the rear end), and no close-up effect is obtainable, and therefore processing proceeds to step (A) also in this case, and performs control of warning and release lock.

In step (7), the maximum limit speed Tv=3 is set.

In step (8), it is judged whether or not $Tv \geqq T_{VDOWN}$ this is limit of change of Tv, and processing proceeds to step (13) (step (13) is described later), and it is judged whether or not a soft-focusing effect or a zooming effect is obtained.

In step (9), K showing the quantity of deviation from a proper exposure is initialized (K=0).

In step (10), judgment is made on whether or not the above-mentioned K is a limit of latitude. When it exceeds the limit (KF=3 in the case of the negative film, and KF=0 in the case of the positive film), the shutter speed Tv is set 0.5 Ev-under, and the quantity of defocus obtained in step (14) is multiplied by about 1.5, and processing proceeds to step (8).

In step (11), in the case within the range of latitude, the diaphragm aperture value is calculated.

In step (12), judgment is made on whether or not the diaphragm aperture value is not more than the maximum diaphragm aperture value, and when it exceeds the maximum diaphragm aperture value, processing proceeds to step (27). In step (27), 1 is added to K, and processing proceeds to step (10). Thereby, the diaphragm aperture value is opened toward the open side within the range of latitude, being set within the maximum diaphragm aperture value.

In step (13), when the diaphragm aperture value is not more than the maximum diaphragm aperture value (Av≦Avmax), it is judged whether or not it is not less than the open F value, and when it is smaller than the open F value, processing proceeds to step (42), and calculation is performed in a manner that the diaphragm aperture value is controlled to come to the side not less than the open $F_{NO}$ by substracting 0.5 from Tv.

Figure 96:
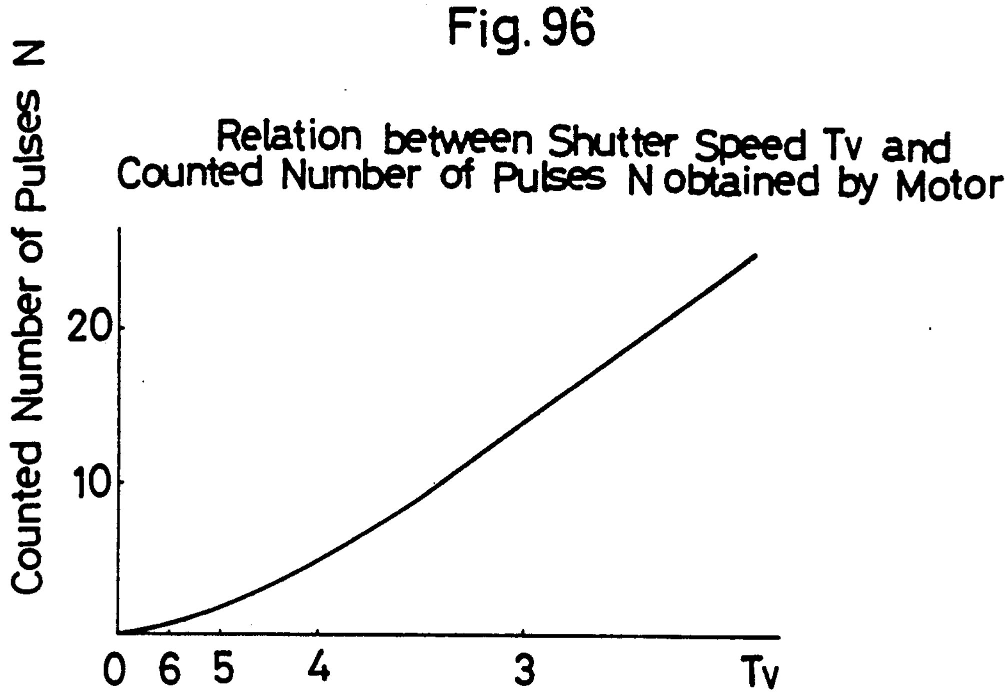

In step (14), the number of rotations (the number of pulses from the encoder) during a time of ¾ of the shutter speed is shown in FIG. 96. This is obtained from a graph of the number N of rotations versus the shutter speed time (note that this is a ROM table with the shutter speed taken as address). Then, a defocus DF is evaluated by multiplying this value by the value KBL (DF=N×KBL).

In step (15), the above-mentioned diaphragm aperture value is changed to $F_{NO}$, and a diameter δ of a circle of confusion is evaluated by $DF/F_{NO}$. Here, changes of DF and $F_{NO}$ with respect to Tv and Av (→$F_{NO}$) is such that if Tv changes by 1 Ev, the time during which the motor can move is doubled, while if Av changes by 1 Ev, $F_{NO}$ changes by $\sqrt{2}$ times.

In steps (16)-(20) judgment is made on whether or not a zooming effect is obtained. Judgment is made on whether or not the shutter speed Tv obtained in steps (7)-(15) is not lens than the longest time ($T_{VLIM}$ far) required for shift-out in the direction of ∞ driven when a zooming effect is shown, and when Tv is less than $T_{VLIM}$ far, assuming that no effect is obtained, processing proceeds to step (21).

In step (17), when Tv is not less than $T_{VLIMF}$, judgment is made on whether or not the zoom flag showing that the zooming effect is obtained has been already set, and when if has been set, assuming that Tv and Av have been set, processing proceeds to step (21). In step (18), when the zoom flag has not been set, judgment is made on whether or not the zooming effect is obtained. The zooming effect is caused by a change in the image magnification attending on defocusing. Now, aiming at a point of h' (12 mm) of image height in a whole-move-out lens, a change $\Delta L_1$ in image height of this point is expressed by $$\Delta L = \frac{DF}{f + X'} \times h'$$

wherein, X' represents the quantity of move-out of a lens. At this time, if $\Delta L + \delta/2 \geqq 2$ and $\Delta L/\delta \geqq 3$, it is assumed that the zooming effect is obtained. Then, a flag (effective flag) is set or reset in response to the result of the above-mentioned calculation (refer to FIG. 9A).

In steps ⑱, ⑲ and ⑳, effective flag has been set is judged, when it has been set, the zoom flag is set, and Tv and Av are set to Tvz and Avz respectively, and processing proceeds to step ㉑. When the effective flag has not been set, processing proceeds also to step ㉑.

In step ㉑-㉙, it is judged whether or not the soft-focus effect is obtained. In step ㉑ judgment is made on whether or not Tv is not less than the longest time ($T_{VLMIN}$) when the less is moved in the driving direction to give the soft-focusing effect, and when Tv is less than the longest time ($T_{VLIMN}$), assuming that a further change to Tv is impossible, processing proceeds to step (A). In step ㉑, ㉝ and ㉞, when Tv is not less than $T_{VLIMN}$, judgment is made on whether or not the above-mentioned evaluated $\delta$ is not less than 3000$\mu$, and when $\delta$ is not less than 3000$\mu$ (effect is of a high level), processing proceeds to step (C), and judgment is made on whether or not the value of f/2 $F_{NO}$ is not less than the image height h' (=6 mm), and if it is not less than h', assuming that the effect is obtained, processing enters a predetermined positive value into $\Delta$Lp to drive the lens in the near-side direction, and returns. If it is less than h, processing proceeds to step 42, repeating the flow of steps ⑧ and the subsequent steps. After 1 has been added to K in step ㉗ as described later by the above procedure, the diaphragm aperture is made open in step ⑪, and thereby $F_{NO}$ is made as small as possible, so that f/2 F (Avo) is made larger.

In step ㉒, judgment is made on whether or not 3000 $\mu$m$>\delta>$1500 holds.

In step ㉓, if $\delta<1500$, judgment is made on whether or not the soft flag showing the soft-focusing effect has been already set, and when it has been set processing proceeds to step ㉗. In steps ㉔, ㉕ and ㉖, when the soft flag has not been set, judgment is made on whether or not $1500>\delta\geqq 800$ holds, and if $\delta$ falls within the above-mentioned range (effect level, low), the soft flag is set, and Tvs and Avs are set as Tv and Av, and processing proceeds to step ㉗. If $\delta<800$ $\mu$m, processing proceeds immediately to step ㉗.

In step ㉗ 1 is added to K to renew K, and processing proceeds to step ⑩. Thereby, the diaphragm aperture is set on the open side within the range of latitude, and as a result, the values of $\delta$ and f/2 F are made larger. For the negative film, this effect is not obtainable.

In step ㉘, if 3000 $\mu$m$>\delta\geqq$1500 $\mu$m (effect level, medium), judgment is made on whether or not the soft flag showing the soft-focusing effect has not been set, and when it has not been set, processing proceeds to step (C).

In step ㉙, when the flag has been set, judgment is made on whether or not Tv$\geqq$2, and if Tv is less than 2, Tv and Av when the effect level is low are used, and processing proceeds to step (C). By this procedure, when the effect is obtained even if small, the shutter speed is not decreased so much. When Tv is not less than 2, processing proceeds to step ㉗. Thereby, the effect level is made higher.

In step ㉚, the flow of (B) is executed, and when the shutter speed cannot be decreased any more, here, first, judgment is made on whether or not the soft flag has been set, and when it has not been set, processing proceeds to step (D).

In step ㉛, when the flag has been set, judgment is made on whether or not f/2 F$\geqq$h (=6 mm), and if f/2 F$<$h, processing proceeds to step (D).

In step ㉜, if f/2 $F_{NO}\geqq$h, Tv and Av are set to Tvs and Avs for the soft-focusing effect, and in step ㉝, the direction of driving the lens is set, and processing returns.

In step ㉟, in this embodiment, the soft-focusing effect is given priority. When no soft-focusing effect is obtained, judgment is made on whether or not the zooming effect is obtained. When no zooming effect is obtained (zoom flag, reset), processing proceeds to step ㊴ (description thereon is omitted).

In steps ㊱ and ㊲, when the zooming effect is obtained (zoom flag, set), Tv and Av are set to Tvz and Avz for zooming, and the direction of driving the lens is set to the far side ($\Delta$Lp becomes a negative value), and processing returns.

In step ㊷, Tv is set 0.5 Ev-under to renew Tv. Thereby, the change in the quantity of DF due to lens driving is increased by a half.

Description for each IC card attached to the camera body has been made hereinabove.

An example of RAM map in the camera body is shown on Table 7. In the case of such RAM (including $E^2$PROM) map, when data families $MP_1$, $MP_3$ and $MP_{10}$ of groups $G_0$, $G_1$ and $G_2$ are respectively required in the communication (II), head address and the number of the above-mentioned data families $MP_1$, $MP_3$ and $MP_{10}$ having stored in advance have only to be read in response to a signal if group specifying is set. These are applicable to conventional card systems due to reading of only the predetermined data. However, in the case where a card having another function is introduced anew, that is, for example, data families $MP_2$ and $MP_4$, which are not included in the above-mentioned data, are required, they can not be read. In order to read these data in one communication, head addresses and the number of data are required to be directly specified (direct addressing type). However, in this case, jumping-over data (for example, data families of only $MP_2$ and $MP_7$) are impossible to be specified, and therefore the whole data of $MP_2$ through $MP_7$ have to be specified, which causes memory device and waste of time concerning data transfer. In view of this, in the present embodiment, data transfer is performed efficiently by selecting group specifying or direct addressing as required. , Additionally, it is for the following reason that direct addressing is performed in the present embodiment. The system in which the cards capable of group specifying are introduced into the camera body has already been realized, so that further increase of group specifying has been made impossible.

Consequently, when cards and a camera are simultaneously in the process of design, group specifying becomes possible even for a card of the above-described direct addressing type.

Further, though in the above embodiment, the IC card adds or changes various functions of the camera body, it is possible, of course, to provide a switch on the camera body to add or change such functions in place of the IC card.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

TABLE 1

| Symbols of switches | Switches | Functions |
|---|---|---|
| $S_{RE}$ | Battery attachment switch | When battery is attached, resets the micro-computer μC. |
| $S_{EM}$ | Exposure mode changing switch | Changes exposure mode (P,A,M,S) in cooperation with up switch Sup or down switch Sdn. |
| $S_{FUN}$ | Function changing switch | Changes function in cooperation with up switch Sup or down switch Sdn. |
| $S_{CD}$ | Card function enable/disable switch | Enables/disables card function when card is attached. |
| $S_{CDS}$ | Card data setting switch | Sets/resets data setting mode performing mode change or data setting when card is attached. |
| $S_1$ | Photographing operation preparing switch | Starts photometry and AF. |
| $S_2$ | Release switch | Starts photographing operation. |
| $S_{WD}$ | One-frame switch | Turns ON when one frame of film is wound up. |
| $S_{AEL}$ | AE locking switch | Performs AE lock. |
| $S_{AF/M}$ | Focus condition adjusting mode changing-over switch | Changes-over between AF and manual focus condition adjustment. |
| $S_{SE}$ | Change data selecting switch | Selects data to be changed. |
| $S_{FLM}$ | Film detecting switch | Detects presence or absence of film. |
| $S_{RC}$ | Rear lid close detecting switch | Detects close of rear lid. |
| $S_{RW}$ | Rewinding switch | Starts rewinding. |
| $S_{CR}$ | IC card attachment switch | OFF when IC card is just attached. Applies reset to the micro-computer of IC card. |
| X | X contact | ON after completing first-curtain running of shutter. Operates electric flash apparatus. |
| Sup | Up switch | In M mode: Up of shutter speed<br>Except in: M mode: Change-over of changing mode, Up function |
| Sdn | Down switch | In M mode: Down of shutter speed<br>Except in: M mode: Change-over of changing mode, Down function |

TABLE 1-continued

| Symbols of switches | Switches | Functions |
|---|---|---|
| $S_{SELF}$ | Self mode switch | ON when self photographing mode is set. |
| $S_{AV}$ | Diaphragm aperture value changing switch | Changes diaphragm aperture value in cooperation with Sup or Sdn in M mode (further changes shutter speed when IC card is attached). |

TABLE 2

| Selected No. | Normal | Focus lock | AF spot | Continuous AF |
|---|---|---|---|---|
| 1 | | ○ | | |
| 2 | | | ○ | |
| 3 | | | | ○ |

TABLE 3

Function Data ($Fb_n$) RAM

| Bits | | Contents |
|---|---|---|
| $Fb_0$ | $b_0b_1 = 00$ | P mode |
| | $b_0b_1 = 01$ | A mode |
| $Fb_1$ | $b_0b_1 = 10$ | M mode |
| | $b_0b_1 = 11$ | S mode |
| $Fb_2$ | $b_2 = 0$ — | Multi-spot mode |
| | $b_2 = 1$ — | Spot mode |
| $Fb_3$ | $b_3 = 0$ — | Single-frame advancing mode |
| | $b_3 = 1$ — | Continuous advancing mode |
| $Fb_4$ | $b_4b_5 = 0,0$ | No adjustment |
| $Fb_5$ | $b_4b_5 = 0,0$ | + adjustment |
| | $b_4b_5 = 1,0$ | − adjustment |
| $Fb_8$ | $b_8 = 0$ | One-shot AF |
| | $b_8 = 1$ | Continuous AF |
| $Fb_9$ | $b_0b_1 = 0,0$ | +/− function |
| $Fb_{10}$ | $0_4b_1 = 0,0$ | S/C function |
| | $b_0b_1 = 1,0$ | S/A function |
| $Fb_{12}$ | $b_{12} = 0$ | Multi-spot photometry (Auto) |
| | $b_{12} = 1$ | Spot photometry |
| $Fb_{13}$ | $b_{13} = 0$ | Auxiliary light mode |
| | $b_{13} = 1$ | Not Auxiliary light mode |
| $Fb_{14}$ | $b_{14} = 0$ | Focus lock by $S_Q$ ON Absence |
| | $b_{14} = 1$ | Focus lock by $S_Q$ ON Presence |
| $Fb_{15}$ | $b_{15} = 0$ | Spot AF before $S_Q$ ON |
| | $b_{15} = 1$ | Multi-spot AF before $S_Q$ ON |

TABLE 4

| Sports card | | | Custom card | | H/S card | | | Bracket card | | card name display card setting display | | | Communication |
|---|---|---|---|---|---|---|---|---|---|---|---|---|---|
| Bvc | ↑ | | ↑ | | | ↑ | | ↑ | | Absence | | | (III) |
| $B_{VAVE}$ | ↑ | | ↑ | | | ↑ | | ↑ | | | | | |
| $B_{VA}$ | ↑ | | ↑ | | | ↑ | | ↑ | | | | | |
| Bvs | ↑ | | ↑ | | | ↑ | | ↑ | | | | | |
| Avo | ↑ | | ↑ | | | ↑ | | ↑ | | | | | |
| Avmax | ↑ | 0 | ↑ | Absence | | ↑ | 0 | ↑ | Absence | | | | |
| f | ↑ | | ↑ | | | ↑ | | ↑ | | | | | |
| Sv | ↓ | | ↓ | | | ↓ | | ↓ | | | | | |
| Iv | ↓ | | ↓ | | | ↓ | | ↓ | | | | | |
| Tvx | ↓ | | ↓ | | | ↓ | | ↓ | | | | | |
| AEFLAG | ↓ | | ↓ | | | ↓ | | ↓ | | | | | |
| Dv | ↓ | | ↓ | | | ↓ | | ↓ | | | | | |
| β | ↓ | | ↓ | | | ↓ | | ↓ | | | | | |
| Tvmin | ↑ | 0 | | | | ↑ | 0 | | | | | | |
| Tvmax | ↓ | | | | | ↓ | | | | | | | |
| | | | | | Tvc | ↑ | 2 | | | | | | |
| | | | | | Avc | ↓ | | | | | | | |
| Av | ↑ | | | EECSTM 0 | ΔAv | | | | ΔAv | | ↑ | | (IV) |
| Tv | ↑ | 1 | | EECSTM 1 | ΔTv | | | | ΔTv | same as display | ↑ | 0 | |
| Sv | ↓ | | | | | | | | | data | ↓ | | |
| CTRLB | ↓ | | | | | | | | | | ↓ | | |

TABLE 4-continued

| Group specifying | | Direct addressing | | ← (IV) | | ← | | Group specifying | | |
|---|---|---|---|---|---|---|---|---|---|---|
| | | | | Group (III) | | | | | | |
| Data memory card | | Auto depth card | | Portrait card | Close-up card | Auto shift card | Defocusing card | | | Communi-cation |
| Absence | Bvc | ↑ | | same as sports card | same as sports card | same as sports card | | ↑ | 0 | (III) |
| | $B_{VAVE}$ | ↑ | | | | | | ↑ | | |
| | $B_{VA}$ | ↑ | | | | | | ↑ | | |
| | Bvs | ↑ | | | | | | ↑ | | |
| | Avo | ↑ | | | | | | ↑ | | |
| | Avmax | ↑ | 0 | | | | | ↑ | | |
| | f | ↑ | | | | | | ↑ | | |
| | Sv | ↓ | | | | | | ↓ | | |
| | Iv | ↓ | | | | | | ↓ | | |
| | Tvx | ↓ | | | | | | ↓ | | |
| | AEFLAG | ↓ | | | | | | ↓ | | |
| | Dv | ↓ | | | | | | ↓ | | |
| | β | ↓ | | | | | | ↓ | | |
| | Tvmin | ↑ | 0 | | | | | ↑ | 0 | |
| | Tvmax | ↓ | | | | | | ↓ | | |
| | KBL | ↑ | 1 | | | | | ↑ | | |
| | FLGO | ↓ | | | | | | ↑ | 1 | |
| | LP | ↑ | | | | | | ↓ | | |
| | | ↓ | | | | | | ↓ | | |
| | | | | | | | LPmax | ↑ | 3 | |
| | | | | | | | | ↓ | | |
| Absence | Av | ↑ | | same as sports card | same as sports card | same as sports card | | ↑ | 1 | (IV) |
| | Tv | ↑ | 1 | | | | | ↑ | | |
| | Sv | ↓ | | | | | | ↓ | | |
| | CTRLB | ↓ | | | | | | ↓ | | |
| | ΔLP | ↑ | 2 | | | | | ↑ | 2 | |
| | | ↓ | | | | | | ↓ | | |
| | | Group specifying | | ← | ← | ← | ← | | | |

TABLE 5

| | | | $b_0$ | $b_1$ | $b_2$ | $b_3$ | $b_4$ | $b_5$ | $b_6$ | $b_7$ |
|---|---|---|---|---|---|---|---|---|---|---|
| $DISP_I$ | $DP_{1H}$ | 1 | | | | SS data | | | | |
| | | 0 | | | | | | | | |
| | $DP_{2H}$ | 1 | blinking | put out | | Diaphragm aperture value | | | | |
| | | 0 | put on | | | | | | | |
| | $DP_{3H}$ | 1 | one among P, A, S, | | | | | | | |
| | | 0 | M modes | | | | | | | |
| | $DP_{4H}$ | 1 | put on | blinking | | Display of quantity of film frames | | | | |
| | | 0 | put out | | | | | | | |
| | $DP_{5H}$ | 1 | put on | | | ⊙ — — — display | | | | |
| | | 0 | put out | | | | | | | |
| | $DP_{6H}$ | 1 | |  display |  display | | |  | put out | |
| | | 0 | |  put out |  put out | | | □ | put on | |
| | $DP_{7H}$ | 1 | blinking CARD | | | | [ ] | put out | | |
| | | 0 | put on CARD | put out CARD | | | □ | put on | | |
| | $DP_{8H}$ | 1 | Δposition | | put on | | | | | |
| | | 0 | | | put out | | | | | |
| | $DP_{9H}$ | 1 | Whole put out | Standby mode | Card display | Under initial load | $S_1$ ON | Under rewinding | One-shot AF | M. AF |
| | | 0 | No-whole put out | No-Standby | Camera display | No under initial load | $S_1$ OFF | No-under rewinding | Servo AF | |
| | $DP_{AH}$ | 1 | Self mode | | | | | | | |
| | | 0 | No-self mode | | | | | | | |
| $DISP_{II}$ | $DP_{CH}$ | 1 | Infocus display | Focus condition detection Impossible | Follow mode | Multi-spot AF | AF | | | |
| | | 0 | Infocus | Focus | Follow | Multi- | M | | | |

TABLE 5-continued

| | $b_0$ | $b_1$ | $b_2$ | $b_3$ | $b_4$ | $b_5$ | $b_6$ | $b_7$ |
|---|---|---|---|---|---|---|---|---|
| | display Absence | condition detection Impossible Absence | mode Absence | spot AF Absence | | | | |

TABLE 6

Data Contents in Data Communications between Camera body and IC cards

| | | $b_0$ | $b_1$ | $b_2$ | $b_3$ | $b_4$ | $b_5$ | $b_6$ | $b_7$ | communication |
|---|---|---|---|---|---|---|---|---|---|---|
| CA ↓ CD | | | Kind of communication | | | | | | | whole |
| CA ↓ CD | S I-1 | One among P,A,S,M modes | | $S_{CD}$ | $S_{ELF}$ | DSPREQ | $S_1$ | $S_2$ | $S_{AEL}$ | (I) |
| | S I-2 | Cancel | $S_{CDS}$ | Sdn | Sup | $IP_5=$ L | $S_{AV}$ | | | |
| | S I-3 | | | | | | | | | |
| CD ↓ CA | S II-1 | Auxiliary light inhibit | FL forced ON | FL forced OFF | GN rest-riction release | Display control | Function ON/OFF | Snap drive bit | Blurring Buzzer ON/OFF | (II) |
| | S II-2 | P shift inhibit | Forced P mode | Communi-cation (V) EXIST/NO | Release inhibit | Forced con-tinuous shot | AF con-tinuous | AF spot | AF inhibit | |
| | S II-3 | ΔTv, ΔAv data | Forced AF | Write to $E^2PROM$ | Tv, Av data | Communi-cation (IV) EXIST/NO | Communi-cation (III) EXIST/NO | Communi-cation type 1:Direct type 0:Group speci-fying | Photo-metric loop repeat | |
| | S II-4 | Blurring buzzer control | AF spot | Low contrast scan inhibit | De-focusing | 10 msec extension | Custom card | | | |
| | S II-5 | | | | | | | | | |
| | S II-6 | | | | | | | | | |
| | S II-7 | | | | the Number of data in communication (IV) | | | | | |
| | S II-8 | | | | Head address in communication (IV) | | | | | |
| | S II-9 | $G_0$ | $G_1$ | $G_2$ | $G_3$ | | | | | |
| | S II-10 | $G_0$ | $G_1$ | $G_2$ | | | | | | |
| CA ↓ CD | | | | | | Differ depending on kind of Card Refer to Tables 12-21 | | | | (III) |
| CD ↓ CA | | | | | | depending on kind of Card Refer to Tables 12-21 | | | | (IV) |
| CA ↓ CD | | | | | | the Number of film frames Open aperture value Control aperture value Control shutter speed Exposure adjusted value Exposure mode Focal length Film speed | | | | (V) |
| CD ↓ CA | | Sleep possible /No | | | | | | | | (VI) |

TABLE 7

| | |
|---|---|
| MP1 | ↑ Communication (II) Group 0 ($G_0$) ↓ |
| MP2 | Other data |
| MP3 | Commuication (III) $G_1$ |
| MP4 | Communication (IV) $G_2$ |
| MP5 | EECSTMO 1 ($E^2PROM$) |
| MP6 | Communication (IV) Group 0 ($G_0$) |
| MP7 | Other data |
| MP8 | Communication (IV) |

TABLE 7-continued

| | |
|---|---|
| | Group 1 ($G_1$) |
| MP9 | ΔAv ΔTv |
| MP10 | Communication (III) Group 2 ($G_2$) |

TABLE 8

Main Flags

| Flags | Contents |
|---|---|
| BATF | F=1 — Flow of initialization of battery attachment has been passed through once |
| | F=0 — After initialization of battery |

TABLE 8-continued

| Flags | Main Flags | Contents |
|---|---|---|
| | | attachment, switch has been operated once or predetermined processing has been finished without performing anything. |
| OPF | F=1 | — Any of switches $S_{EM}$, $S_{FUN}$, $S_{CD}$, $S_{CSD}$, $S_O$ is in ON state. |
| | F=0 | — All of the above-mentioned five switches are in OFF state. |
| AELF | F=1 | — AE lock function is turned to ON. |
| | F=0 | — AE lock function is turned to OFF. |
| SETF | F=1 | — IC card is attached and data setting mode is set. |
| | F=0 | — IC card is attached and data setting mode is not set. |
| AFNF | F=1 | — AF can not be performed. |
| | F=0 | — AF can be performed. |
| AF1F | F=1 | — Quantity of DF of first island is set as quantity of DF for lens driving. |
| | F=0 | — Quantity of DF of first island is not set as quantity of DF for lens driving. |
| AF2F | F=1 | — Quantity of DF of second island is set as quantity of DF for lens driving. |
| | F=0 | — Quantity of DF of second island is not set as quantity of DF for lens driving. |
| AF3F | F=1 | — Quantity of DF of third island is set as quantity of DF for lens driving. |
| | F=0 | — Quantity of DF of third island is not set as quantity of DF for lens driving. |
| AFEF | F=1 | — Infocus state |
| | F=0 | — Out of focus state |
| CDF | F=1 | — When card function enable/disable switch $S_{CD}$ is in ON state, flow of $S_{CD}$ ON has been executed once. |
| | F=0 | — When CDF=1, flow of $S_{CD}$ OFF has been executed. |
| CDFNF | F=1 | — Card function is enabled. |
| | F=0 | — Card function is disabled. |
| CDSF | F=1 | — Card data setting switch $S_{CDS}$ has been operated and flow of $S_{CD}$ ON has been executed once, but flow of $S_{CD}$ OFF has not been executed. |
| | F=0 | — In data setting mode, flow of $S_{CD}$ OFF has been executed. |
| AEONF | F=1 | — AE locking switch $S_{AEL}$ has been operated, and flow of step #1705 and the subsequent steps has been executed once. |
| | F=0 | — AE locking switch is turned to OFF. |
| CDIF | F=1 | — Flow of steps from #2710 to #2720 has been passed through once. |
| | F=0 | — Flow of steps from #2710 to #2720 has never been passed through. |
| DISI1F | F=1 | — When card function is added (by $S_{CD}$ ON), display is performed for a certain time. |

TABLE 8-continued

| Flags | Main Flags | Contents |
|---|---|---|
| | F=0 | — The above-mentioned display for a certain time is not performed. |
| WRTF | F=1 | — Data is written to $E^2PROM$. |
| | F=0 | — Data is not written to $E^2PROM$. |
| CHGF | F=1 | — Changeable function mode NO |
| | F=0 | — Changeable function mode EXIST |
| LCONF | F=1 | — Focus condition detection is impossible. |
| | F=0 | — Focus condition detection is possible. |
| AFE1F | F=1 | — Flow of follow mode is executed for the first two after focusing. |
| | F=0 | — It is not for the first time that flow of follow mode is executed after focusing. |
| $S_1$ONF | F=1 | — $S_1$ is in ON state. |
| | F=0 | — $S_1$ is in OFF state. |
| Follow F | F=1 | — Follow mode |
| | F=0 | — NO-Follow mode |
| MFF | F=1 | — Manual mode, Focus lock |
| | F=0 | — AF mode |
| SQONF | F=1 | — $S_Q$ is in ON state. |
| | F=0 | — $S_Q$ is in OFF state. |
| Follow mode inhibit F | F=1 | — Follow mode is inhibited. |
| | F=0 | — Follow mode is permitted. |

TABLE 9

| | Addresses (8 bits) | Lens (I) Information (Contents of ROM) |
|---|---|---|
| (A) | $00_H$ | Lens attachment signal |
| | xxx00001 | Open F value (Avo) of lens |
| | xxx00010 | Maximum F value (Avmax) of lens |
| | $03_H$ | Moving amount (REVmax) from ∞ to near |
| | xxx00100 | Focal length information |
| | xxx00101 | (Lens drive quantity/Defocus quantity) Converting coefficient K |
| | $06_H$ | $S_Q$ $b_0=0$ (OFF) $b_1-b_7=0$ |
| | $07_H$ | LOK $b_0=0$ ...OK $b_1-b_7=0$ |
| (B) | $10_H$ | Lens attachment signal |
| | xxx10001 | Open F value (Avo) of lens |
| | xxx10010 | Maximum F value (Avmax) of lens |
| | xxx10011 | Moving amount (REVmax) from ∞ to near |
| | xxx00100 | Focal length information |
| | xxx00101 | (Lens drive quantity/Defocus quantity) Converting coefficient K |
| | $16_H$ | $S_Q$ $b_0=0$ (ON) $b_1-b_7=0$ |
| | $17_H$ | LOK $b_0=0$ ...NO $b_1-b_7=0$ |

TABLE 10

| Addresses (8 bits) | Lens (II) Information (Contents of ROM) |
|---|---|
| $00_H$ | Lens attachment signal |
| xxx00001 | Open aperture value (Avo) of lens |
| xxx00010 | Maximum aperture value (Avmax) of lens |
| $03_H$ | Moving amount (REVmax) from ∞ to near |
| xxx00100 | Focal length information |
| xxx00101 | (Lens drive quantity/Defocus quantity) Converting coefficient K |
| $06_H$ | $S_Q$ $b_0=0$ (OFF) $b_1-b_7=0$ |
| $07_H$ | LOK $b_0=0$ ...NO $b_1-b_7=0$ |
| $08_H$ | $S_Q$ $b_0=1$ (ON) $b_1-b_7=0$ |
| $09_H$ | LOK $b_0=1$ ...OK $b_1-b_7=0$ |

TABLE 11

| Addresses in Camera Body | Lens Information in Camera Body Lens Information (1 byte) |
|---|---|
| Bd1 | Lens attachment EXIST/NO |

TABLE 11-continued

Lens Information in Camera Body

| Addresses in Camera Body | Lens Information (1 byte) |
|---|---|
| Bd2 | Open aperture value (Avo) of lens |
| Bd3 | Maximum diaphragm aperture value (Avmax) of lens |
| Bd4 | Moving amount (REVmax) from ∞ to near |
| Bd5 | Focal length information |
| Bd6 | (Lens drive quantity/Defocus quantity) |
| | Converting coefficient K |
| Bd7 | $S_Q$ $b_0$=0... $S_Q$ (OFF) ($b_1-b_7$missing)<br>$S_Q$ $b_0$=1... $S_Q$ ON |
| Bd8 | LOK $b_0$=0... NO ($b_1-b_7$missing)<br>LOK $b_0$=1... OK |

TABLE 12

Custom Card

| | | $b_0$ | $b_1$ | $b_2$ | $b_3$ | $b_4$ | $b_5$ | $b_6$ | $b_7$ | communication |
|---|---|---|---|---|---|---|---|---|---|---|
| CA ↓ CD | | Kind of communication | | | | | | | | whole |
| CA ↓ CD | CS I-1<br>CS I-2<br>CS I-3 | Data (as to switches and so on) input (same as Table 6) | | | | | | | | (I) |
| CD | CS II-1 | 0 | 0 | 0 | 0 | * | * | 0 | 0 | (II) |
| ↓ | CS II-2 | 0 | 0 | 0 | * | 0 | 0 | 0 | * | |
| CA | CS II-3 | 0 | 0 | * | Display data (0) | communication (IV) Presence (1) | communication (III) Absence (0) | * | * | |
| | CS II-4 | 0 | 0 | 0 | 0 | 0 | 1 | | | |
| | CS II-5 | | | | | | | | | |
| | CS II-6 | | | | | | | | | |
| | CS II-7 | the Number of data in communication (IV) | | | | | | | | |
| | CS II-8 | Head address in communication (IV) | | | | | | | | |
| | CS II-9 | 0 | 0 | | | | | | | |
| | CS II-10 | 1 $G_0$ Presence) | 0 | 0 | | | | | | |
| CA ↓ CD | | Absence | | | | | | | | (III) |
| CD ↓ CA | | EECSTM 0<br>EECSTM 1 | ↑<br>↑<br>↑<br>↓<br>↓<br>↓ | or Display data (9 bytes) | | | | | | (IV) |
| CA ↓ CD | | Absence | | | | | | | | (V) |
| CD ↓ CA | | * | | | | | | | | (VI) |

TABLE 13

Data memory Card

| | | $b_0$ | $b_1$ | $b_2$ | $b_3$ | $b_4$ | $b_5$ | $b_6$ | $b_7$ | communication |
|---|---|---|---|---|---|---|---|---|---|---|
| CA ↓ CD | | Kind of communication | | | | | | | | whole |
| CA ↓ CD | CS I-1<br>CS I-2<br>CS I-3 | Data (as to switches and so on) input (same as Table 6) | | | | | | | | (I) |
| CD | CS II-1 | 0 | 0 | 0 | 0 | * | * | 0 | 0 | (II) |
| ↓ | CS II-2 | 0 | 0 | 0 | * | 0 | 0 | 0 | * | |
| CA | CS II-3 | 0 | 0 | 0 | Display data (0) | * | communication (III) Absence (0) | Group specifying (0) | * | |
| | CS II-4 | 0 | 0 | 0 | 0 | 0 | 0 | | | |
| | CS II-5 | | | | | | | | | |
| | CS II-6 | | | | | | | | | |
| | CS II-7 | | | | | | | | | |
| | CS II-8 | | | | | | | | | |
| | CS II-9 | 0 | 0 | | | | | | | |
| | CS II-10 | 1 | 0 | 0 | | | | | | |
| CA ↓ | | Absence | | | | | | | | (III) |

TABLE 13-continued

| | Data memory Card | | | | | | | | |
|---|---|---|---|---|---|---|---|---|---|
| | b0 | b1 | b2 | b3 | b4 | b5 | b6 | b7 | communication |
| CD | | | | | | | | | |
| CD ↓ CA | Display data (9 bytes) | | | | | | | | (IV) |
| CA ↓ CD | Memory data inputting | | | | | | | | (V) |
| CD ↓ CA | | | * | | | | | | (VI) |

TABLE 14

| | | Sports Card | | | | | | | | |
|---|---|---|---|---|---|---|---|---|---|---|
| | | b0 | b1 | b2 | b3 | b4 | b5 | b6 | b7 | communication |
| CA ↓ CD | | Kind of communication | | | | | | | | whole |
| CA ↓ CD | CS I-1<br>CS I-2<br>CS I-3 | Data (as to switches and so on) input (same as Table 6) | | | | | | | | (I) |
| CD ↓ CA | CS II-1 | 1 | 0 | 1 | 1 | * | * | 0 | * | (II) |
| | CS II-2 | 1 | 1 | communication (V) Presence (0) | 0 | 0 | 1 | 0 | 0 | |
| | CS II-3 | 0 | 1 | 0 | * | communication (IV) Presence (1) | communication (III) Presence (1) | Group specifying (0) | * | |
| | CS II-4 | 1 | 0 | 0 | 0 | 0 | 0 | | | |
| | CS II-5 | | | | | | | | | |
| | CS II-6 | | | | | | | | | |
| | CS II-7 | | | | | | | | | |
| | CS II-8 | | | | | | | | | |
| | CS II-9 | 1 | 0 | 0 | 0 | | | | | |
| | CS II-10 | 1 | 1 | 0 | | | | | | |
| CA ↓ CD | | Data (18 bytes) from camera body | | | | | | | | (III) |
| CD ↓ CA | | Av<br>Tv<br>Sv<br>CTRLB<br>ΔLP | | | ↕ | or Display data (9 bytes) | | | | (IV) |
| CA ↓ CD | | Absence | | | | | | | | (V) |
| CD ↓ CA | | Sleep (good) (1) | | | | | | | | (VI) |

TABLE 15

| | | Auto depth Card | | | | | | | | |
|---|---|---|---|---|---|---|---|---|---|---|
| | | b0 | b1 | b2 | b3 | b4 | b5 | b6 | b7 | communication |
| CA ↓ CD | | Kind of communication | | | | | | | | whole |
| CA ↓ CD | CS I-1<br>CS I-2<br>CS I-3 | Data (as to switches and so on) input (same as Table 6) | | | | | | | | (I) |
| CD ↓ CA | CS II-1 | 0 | 1 | 0 | 1 | * | * | 1 | * | (II) |
| | CS II-2 | 1 | 1 | communication (V) Absence (0) | 0 | 0 | 0 | 1 | 0 | |
| | CS II-3 | 0 | 1 | 0 | * | communication (IV) Presence (1) | communication (III) Presence (1) | Group specifying (0) | * | |

TABLE 15-continued

| | | | | | | | | | | |
|---|---|---|---|---|---|---|---|---|---|---|
| | | | | | Auto depth Card | | | | | |
| | | b0 | b1 | b2 | b3 | b4 | b5 | b6 | b7 | communication |
| | CS II-4 | 1 | 0 | 0 | 0 | 0 | 0 | | | |
| | CS II-5 | | | | | | | | | |
| | CS II-6 | | | | | | | | | |
| | CS II-7 | | | | | | | | | |
| | CS II-8 | | | | | | | | | |
| | CS II-9 | 1 | 1 | 0 | 0 | | | | | |
| | CS II-10 | 1 | 1 | 1 | | | | | | |
| CA ↓ CD | | Data (18 bytes) from camera body | | | | | | | | (II) |
| CD ↓ CA | | Av Tv Sv CTRLB ΔLP | | | ↑ ↑ ↑ ↓ ↓ ↓ | or Display data (9 bytes) | | | | (IV) |
| CA ↓ CD | | Absence | | | | | | | | (V) |
| CD ↓ CA | | 1 | | | | | | | | (VI) |

TABLE 16

| | | | | | | | | | | |
|---|---|---|---|---|---|---|---|---|---|---|
| | | | | | Bracket Card | | | | | |
| | | b0 | b1 | b2 | b3 | b4 | b5 | b6 | b7 | communication |
| CA ↓ CD | | Kind of communication | | | | | | | | whole |
| CA ↓ CD | CS I-1 CS I-2 CS I-3 | Data (as to switches and so on) input (same as Table 6) | | | | | | | | (I) |
| CD ↓ CA | CS II-1 | 0 | 0 | 1 | 0 | ✽ | ✽ | 0 | 0 | (II) |
| | CS II-2 | 0 | 0 | communication (V) Absence (0) | ✽ | 1 | 0 | 0 | ✽ | |
| | | | | | | | | ✽ | ✽ | |
| | CS II-3 | 1 | 0 | 0 | Display data (0) | communication (IV) Presence (1) | communication (III) Absence (0) | | | |
| | CS II-4 | 0 | 0 | 0 | 0 | 0 | 0 | | | |
| | CS II-5 | | | | | | | | | |
| | CS II-6 | | | | | | | | | |
| | CS II-7 | Serial communication Twice | | | | | | | | |
| | CS II-8 | Head address in Communication(IV) | | | | | | | | |
| | CS II-9 | 0 | 0 | 0 | 0 | | | | | |
| | CS II-10 | 1 | 0 | 0 | | | | | | |
| CA ↓ CD | | Absence | | | | | | | | (III) |
| CD ↓ CA | | ΔAv ΔTv | | | ↑ ↑ ↑ ↓ ↓ ↓ | or Display data (9 bytes) | | | | (IV) |
| CA ↓ CD | | | | | | | | | | (V) |
| CD ↓ CA | | ✽ | | | | | | | | (VI) |

TABLE 17

| | | | | | | | | | |
|---|---|---|---|---|---|---|---|---|---|
| | | | | | Close-up Card | | | | |
| | | b0 | b1 | b2 | b3 | b4 | b5 | b6 | communication |
| CA ↓ CD | | Kind of communication | | | | | | | |
| CA ↓ | CS I-1 CS I-2 | Data (as to switches and so on) input (same as Table 6) | | | | | | | (I) |

TABLE 17-continued

| | | Close-up Card | | | | | | | | |
|---|---|---|---|---|---|---|---|---|---|---|
| | | $b_0$ | $b_1$ | $b_2$ | $b_3$ | $b_4$ | $b_5$ | $b_6$ | | communication |
| CD | CS I-3 | | | | | | | | | |
| CD | CS II-1 | 0 | 1 | 0 | 1 | * | * | 0 | * | (II) |
| ↓ | CS II-2 | 1 | 1 | communication (V) Absence (0) | * | 0 | 0 | 1 | 0 | |
| CA | | | | | | | | | | |
| | CS II-3 | 0 | 0 | 0 | * | communication (IV) Presence (1) | communication (III) Presence (1) | group specifying (1) | * | |
| | CS II-4 | 1 | 1 | 1 | 0 | 0 | 0 | | | |
| | CS II-5 | | | | | | | | | |
| | CS II-6 | | | | | | | | | |
| | CS II-7 | | | | | | | | | |
| | CS II-8 | | | | | | | | | |
| | CS II-9 | 1 | 0 | 0 | 0 | | | | | |
| | CS II-10 | 1 | 1 | 0 | | | | | | |
| CA ↓ CD | | Data (15 bytes) from camera body | | | | | | | | (III) |
| CD ↓ CA | | Av Tv Sv CTRLB | | | ↑ ↑ ↑ ↓ ↓ ↓ | or Display data (9 bytes) | | | | (IV) |
| CA ↓ CD | | | | | | | | | | (V) |
| CD ↓ CA | | 1 | | | | | | | | (VI) |

TABLE 18

| | | Auto shift Card | | | | | | | | |
|---|---|---|---|---|---|---|---|---|---|---|
| | | $b_0$ | $b_1$ | $b_2$ | $b_3$ | $b_4$ | $b_5$ | $b_6$ | $b_7$ | communication |
| CA | | Kind of communication | | | | | | | | whole |
| CA | CS I-1 | Data (as to switches and so on) input (same as Table 6) | | | | | | | | (I) |
| ↓ | CS I-2 | | | | | | | | | |
| CD | CS I-3 | | | | | | | | | |
| CD | CS II-1 | 0 | 0 | 1 | 0 | * | * | 0 | * | (II) |
| ↓ | CS II-2 | 1 | 1 | communication (V) Absence (0) | * | 1 | 0 | 0 | * | |
| CA | | | | | | | | | | |
| | CS II-3 | 0 | 0 | 0 | * | communication (IV) Presence (1) | communication (III) Presence (1) | group specifying (0) | * | |
| | CS II-4 | 1 | 0 | 0 | 0 | 0 | 0 | | | |
| | CS II-5 | | | | | | | | | |
| | CS II-6 | | | | | | | | | |
| | CS II-7 | | | | | | | | | |
| | CS II-8 | | | | | | | | | |
| | CS II-9 | 1 | 0 | 0 | 0 | | | | | |
| | CS II-10 | 1 | 1 | 0 | | | | | | |
| CA ↓ CD | | Data (15 bytes) from camera body | | | | | | | | (III) |
| CD ↓ CA | | Av Tv Sv CTRLB | | | ↑ ↑ ↑ ↓ ↓ ↓ | or Display data (9 bytes) | | | | (IV) |
| CA ↓ CD | | | | | | | | | | (V) |
| CD ↓ CA | | * | | | | | | | | (VI) |

TABLE 19

| | | b0 | b1 | b2 | b3 | b4 | b5 | b6 | b7 | communication |
|---|---|---|---|---|---|---|---|---|---|---|
| | | | | | | H / S Card | | | | |
| CA ↓ CD | | Kind of communication | | | | | | | | |
| CA ↓ CD | CS I-1 CS I-2 CS I-3 | Data (as to switches and so on) input (same as Table 6) | | | | | | | | (I) |
| CD ↓ CA | CS II-1 | 0 | 0 | 1 | 0 | ✽ | ✽ | 0 | 0 | (II) |
| | CS II-2 | 0 | 0 | communication (V) Absence (0) | ✽ | 0 | 0 | 0 | ✽ | |
| | CS II-3 | 0 | 0 | 0 | ✽ | communication (IV) Presence (1) | communication (III) Absence (1) | ✽ | ✽ | |
| | CS II-4 CS II-5 CS II-6 | 0 | 0 | 0 | 0 | 0 | 0 | | | |
| | CS II-7 | the Number of SIOs in Communication(IV) | | | | | | 2 | | |
| | CS II-8 | Head address in Communication(IV) | | | | | | | | |
| | CS II-9 | 1 | 0 | 1 | 0 | | | | | |
| | CS II-10 | 1 | 0 | 0 | | | | | | |
| CA ↓ CD | | Data (17 bytes) from camera body | | | | | | | | (III) |
| CD ↓ CA | | ΔAv ΔTv | | | ↑↑↑↓↓↓ | or Display data (9 bytes) | | | | (IV) |
| CA ↓ CD | | | | | | | | | | (V) |
| CD ↓ CA | | ✽ | | | | | | | | (VI) |

TABLE 20

| | | b0 | b1 | b2 | b3 | b4 | b5 | b6 | b7 | communication |
|---|---|---|---|---|---|---|---|---|---|---|
| | | | | | | Portrait Card | | | | |
| CA ↓ CD | | Kind of communication | | | | | | | | whole |
| CA ↓ CD | CS I-1 CS I-2 CS I-3 | Data (as to switches and so on) input (same as Table 6) | | | | | | | | (I) |
| CD ↓ CA | CS II-1 | 1 | 1 | 0 | 1 | ✽ | ✽ | 0 | ✽ | (II) |
| | CS II-2 | 1 | 1 | communication (V) Absence (0) | 0 | 0 | 0 | 1 | 0 | |
| | CS II-3 | 0 | 1 | 0 | ✽ | communication (IV) Presence (1) | communication (III) Presence (1) | Group-specifying (0) | ✽ | |
| | CS II-4 CS II-5 CS II-6 CS II-7 CS II-8 | 1 | 0 | 0 | 0 | 0 | 0 | | | |
| | CS II-9 | 1 | 0 | 0 | 0 | | | | | |
| | CS II-10 | 1 | 1 | 0 | | | | | | |
| CA ↓ CD | | Data (15 bytes) from camera body | | | | | | | | (III) |
| CD ↓ CA | | Av Tv Sv CTRLB | | | ↑↑↑↓↓↓ | or Display data (9 bytes) | | | | (IV) |
| CA | | | | | | | | | | (V) |

TABLE 20-continued

| | | Portrait Card | | | | | | | | |
|---|---|---|---|---|---|---|---|---|---|---|
| | | $b_0$ | $b_1$ | $b_2$ | $b_3$ | $b_4$ | $b_5$ | $b_6$ | $b_7$ | communication |
| ↓ CD | | | | | | | | | | |
| CD ↓ CA | | 1 | | | | | | | | (VI) |

TABLE 21

| | | Defocusing Card | | | | | | | | |
|---|---|---|---|---|---|---|---|---|---|---|
| | | $b_0$ | $b_1$ | $b_3$ | $b_3$ | $b_4$ | $b_5$ | $b_6$ | $b_7$ | communication |
| CA ↓ CD | | Kind of communication | | | | | | | | whole |
| CA ↓ CD | CS I-1<br>CS I-2<br>CS I-3 | Data (as to switches and so on) input (same as Table 6) | | | | | | | | (I) |
| CD ↓ CA | CS II-1 | 0 | 0 | 1 | 0 | ❈ | ❈ | 0 | 0 | (II) |
| | CS II-2 | 1 | 1 | communication (V) Absence (0) | ❈ | 0 | 0 | 1 | 0 | |
| | CS II-3 | 0 | 1 | 0 | ❈ | communication (IV) Presence (1) | communication (III) Presence (1) | Group-specifying (0) | ❈ | |
| | CS II-4<br>CS II-5<br>CS II-6<br>CS II-7<br>CS II-8 | 1 | 0 | 0 | 1 | 1 | 0 | | | |
| | CS II-9 | 1 | 1 | 0 | 1 | | | | | |
| | CS II-10 | 1 | 1 | 1 | | | | | | |
| CA ↓ CD | | Data (19 bytes) from camera body | | | | | | | | (III) |
| CD ↓ CA | | Av<br>Tv<br>Sv<br>CTRLB<br>ΔLP | | | ↑<br>↑<br>↑<br>↓<br>↓<br>↓ | or Display data (9 bytes) | | | | (IV) |
| CA ↓ CD | | Absence | | | | | | | | (V) |
| CD ↓ CA | | 1 | | | | | | | | (VI) |

What is claimed is:

1. Camera system, comprising:

a plurality of exposure lines in which each exposure line determines at each brightness value a combination of an aperture value and a shutter speed value and each exposure line is different from each other;

means for selecting one of the exposure lines;

an operable member;

means for changing the combination of the aperture value and the shutter speed value determined by both the selected exposure line and a brightness value, in response to the operation of the operable member; and means for inhibiting the operation of the changing means when a predetermined exposure line is selected by the selecting means.

2. The camera system of claim 1, wherein said exposure lines include a first line and a second line, and wherein said inhibiting means inhibits the change operation of the changing means when the first line is selected by the selecting means and permits the operation of the changing means when the second line is selected by the selecting means.

3. Camera system, comprising:

a plurality of modes in which each mode determines at each brightness value a combination of an aperture value and a shutter speed value;

means for selecting one of the modes;

an operable member;

means for changing the combination of the aperture value and the shutter speed value determined by both the selected mode and the brightness value, in response to the operation of the operable member; and means for inhibiting the change operation of the changing means when a predetermined mode is selected by the selecting means.

4. Camera system for photographing in a flash photographing mode in which flash light is used and in a normal photographing mode in which flash light is not used, comprising:

means for determining at each brightness value a combination of an aperture value and a shutter speed value;

an operable member;

means for changing, in the normal photographing mode, the combination of the aperture value and the shutter speed value determined by both the determining means and the brightness value, in response to the operation of the operable member;

means for inhibiting, in the normal photographing mode irrespective of the combination of the aperture value and the shutter speed value, the operation of the changing means; and means for deciding whether or not the operation of the inhibiting means is actuated.

* * * * *